(12) United States Patent
Anderson et al.

(10) Patent No.: US 9,254,789 B2
(45) Date of Patent: *Feb. 9, 2016

(54) REARVIEW MIRROR ASSEMBLIES WITH ANISOTROPIC POLYMER LAMINATES

(75) Inventors: John S. Anderson, Holland, MI (US);
William L. Tonar, Holland, MI (US);
Henry A. Luten, Holland, MI (US);
George A. Neuman, Holland, MI (US);
Gary J. Dozeman, Zeeland, MI (US);
Tammy G. Morgan, Holland, MI (US);
David J. Cammenga, Zeeland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 1627 days.

This patent is subject to a terminal disclaimer.

(21) Appl. No.: 12/774,721

(22) Filed: May 5, 2010

(65) Prior Publication Data

US 2010/0277786 A1 Nov. 4, 2010

Related U.S. Application Data

(63) Continuation-in-part of application No. 12/629,757, filed on Dec. 2, 2009, now Pat. No. 8,282,224, which is a continuation-in-part of application No. 12/496,620, filed on Jul. 1, 2009, now Pat. No. 8,545,030.

(60) Provisional application No. 61/079,668, filed on Jul. 10, 2008, provisional application No. 61/093,608, filed on Sep. 2, 2008.

(51) Int. Cl.

| | |
|---|---|
| *G02B 27/00* | (2006.01) |
| *G02B 27/28* | (2006.01) |
| *B60R 1/08* | (2006.01) |
| *G02B 5/08* | (2006.01) |
| *G02F 1/157* | (2006.01) |
| *G02B 5/30* | (2006.01) |
| *G02F 1/13* | (2006.01) |

(52) U.S. Cl.
CPC .............. *B60R 1/088* (2013.01); *G02B 5/0816* (2013.01); *G02B 27/28* (2013.01); *G02F 1/157* (2013.01); *G02B 5/3058* (2013.01); *G02F 1/1313* (2013.01); *G02F 2201/44* (2013.01)

(58) Field of Classification Search
CPC .... B60R 1/088; G02B 5/0816; G02B 5/3058; G02B 27/00; G02B 27/28; G02F 1/157; G02F 1/1314; G02F 2301/44
USPC ......... 359/245, 250–256, 265–275, 315–318, 359/485.01, 601–609
See application file for complete search history.

(56) References Cited

U.S. PATENT DOCUMENTS

| | | | | |
|---|---|---|---|---|
| 6,759,945 | B2 * | 7/2004 | Richard | 349/179 |
| 7,916,380 | B2 * | 3/2011 | Tonar et al. | 359/267 |
| 2006/0007550 | A1 * | 1/2006 | Tonar et al. | 359/604 |

OTHER PUBLICATIONS

Cardinal LG, "Optical Distortion in Sea-Storm® Laminated Glass Fabricated with an Encapsulated PET Film," Technical Service Bulletin #LG02, May 2008, 1 page; available at www.cardinalcorp.comldataitsbllg/LG02_05-0S.pdf.

*Primary Examiner* — Thong Nguyen

(74) *Attorney, Agent, or Firm* — Price Heneveld LLP; Scott P. Ryan

(57) ABSTRACT

Anisotropic film laminates for use in image-preserving reflectors such as rearview automotive mirror assemblies, and related methods of fabrication. A film may comprise an anisotropic layer such as a light-polarizing layer and other functional layers. The film having controlled water content is heated under omnidirectional pressure and vacuum to a temperature substantially equal to or above a lower limit of a glass-transition temperature range of the film so as to be laminated to a substrate. The laminate is configured as part of a mirror structure so as to increase contrast of light produced by a light source positioned behind the mirror structure and transmitted through the mirror structure towards a viewer. The mirror structure is devoid of any extended distortion and is characterized by SW and LW values less than 3, more preferably less than 2, and most preferably less than 1.

23 Claims, 64 Drawing Sheets

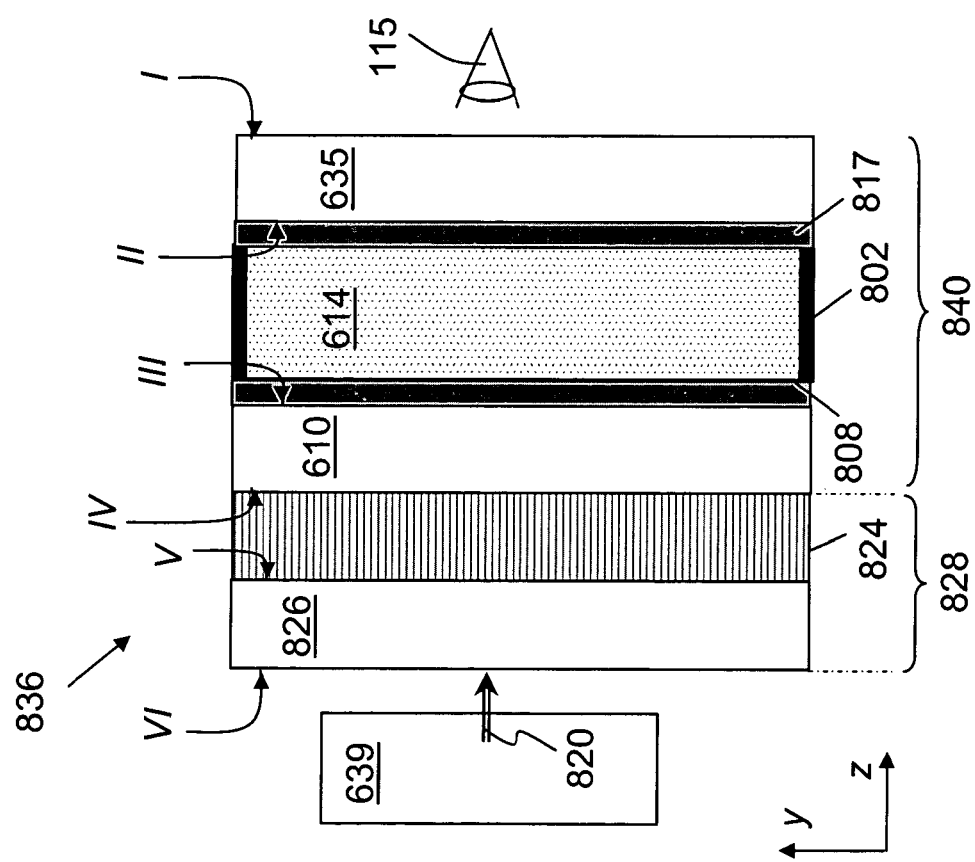

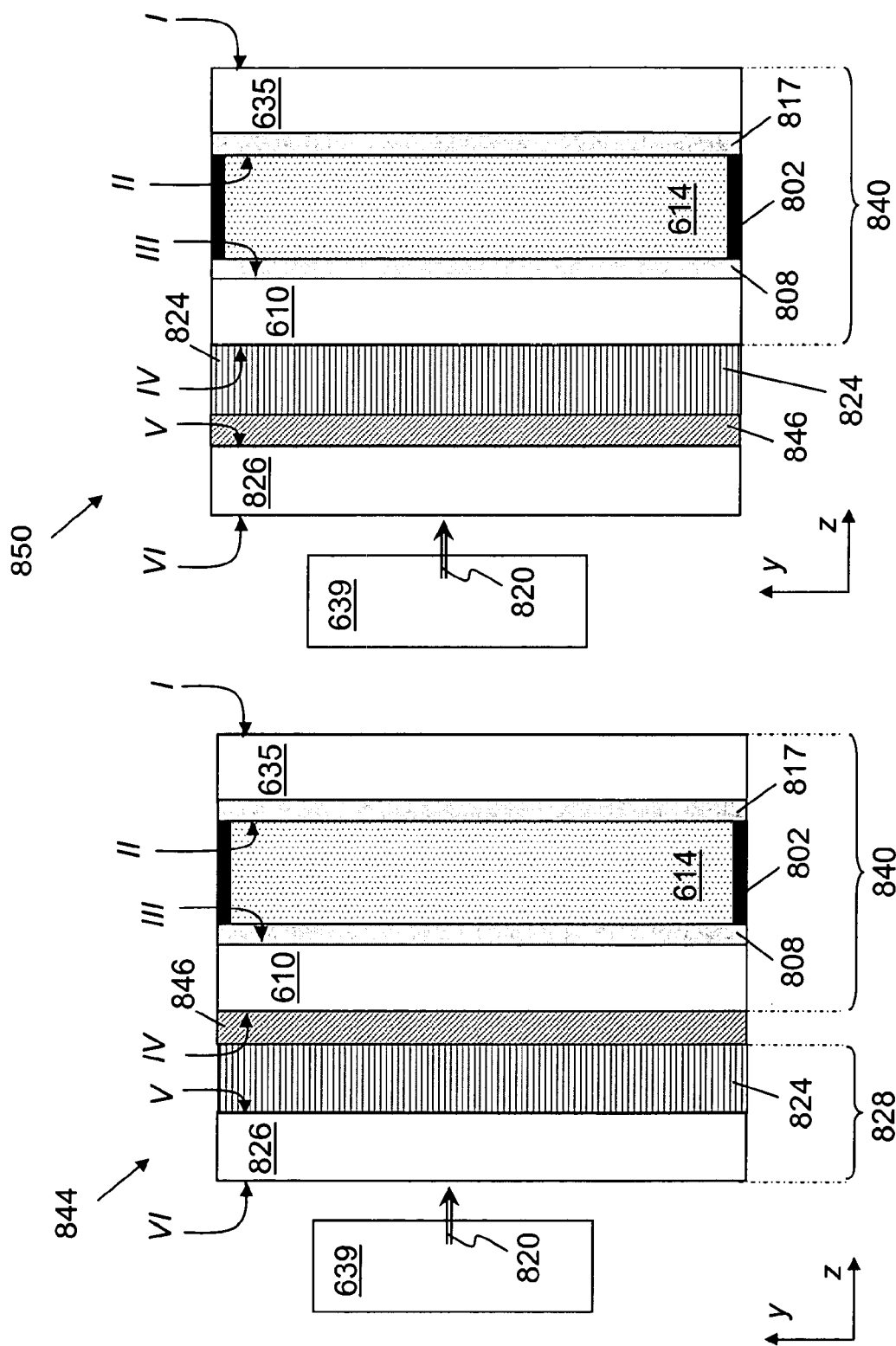

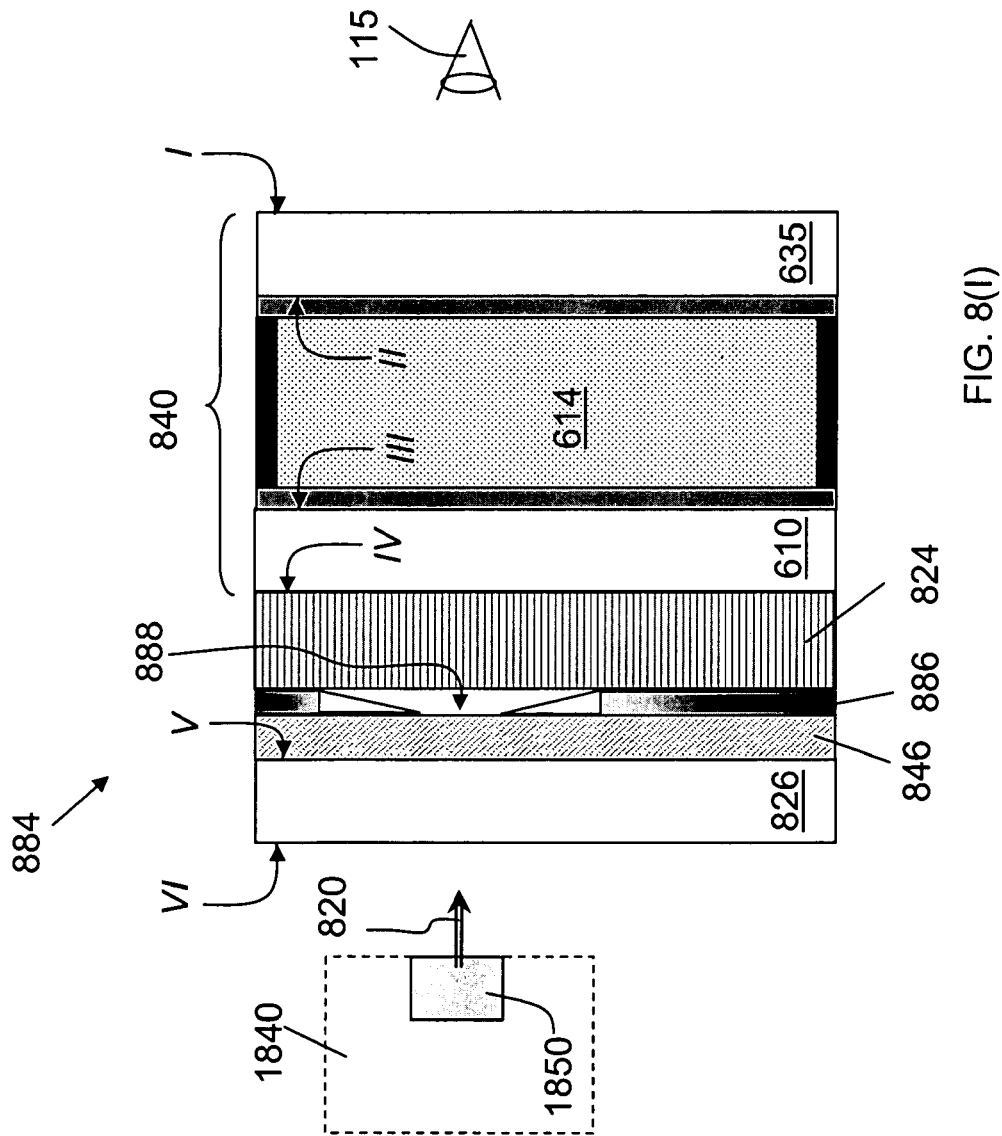

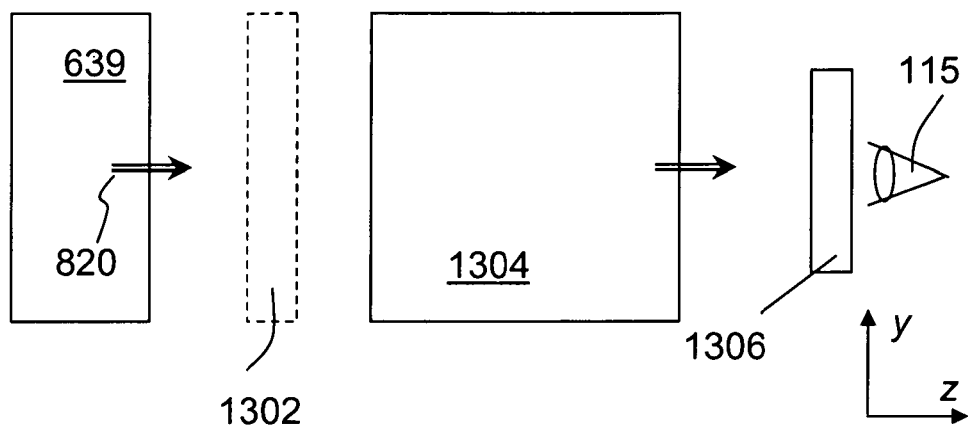
FIG. 13(A)
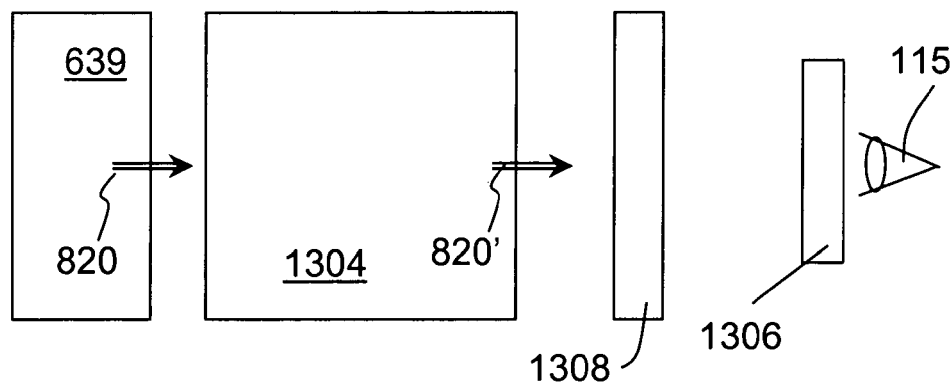
FIG. 13(B)
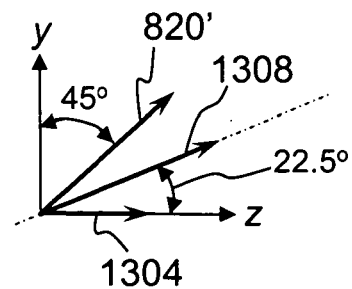

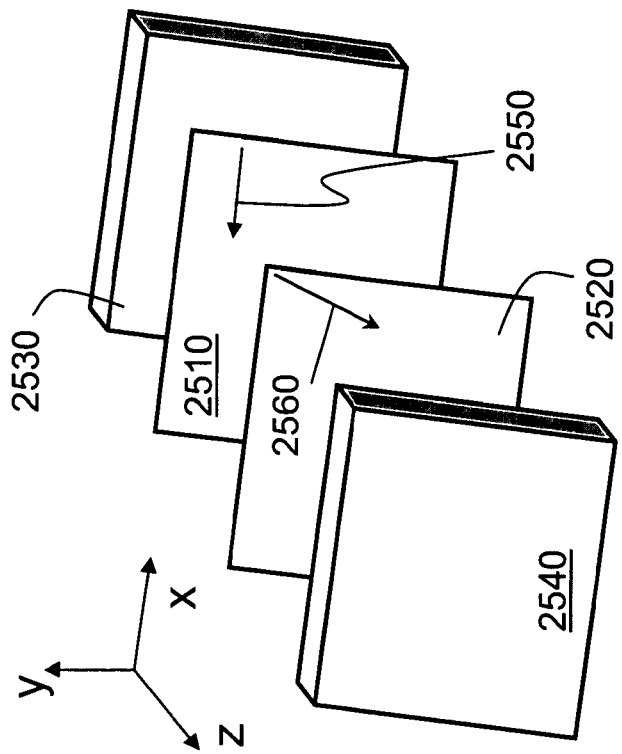
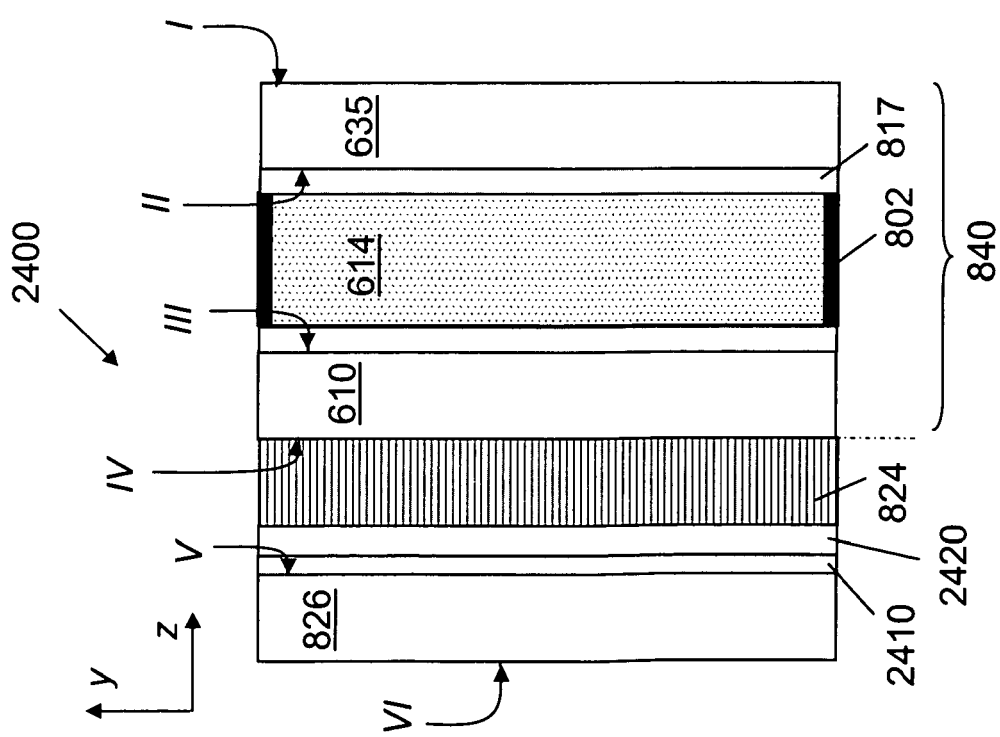
FIG. 24
FIG. 25

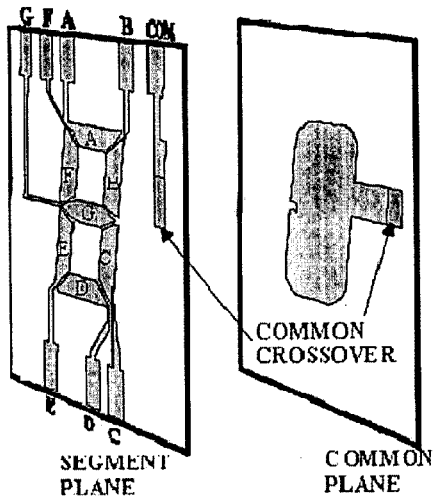
Fig. 45
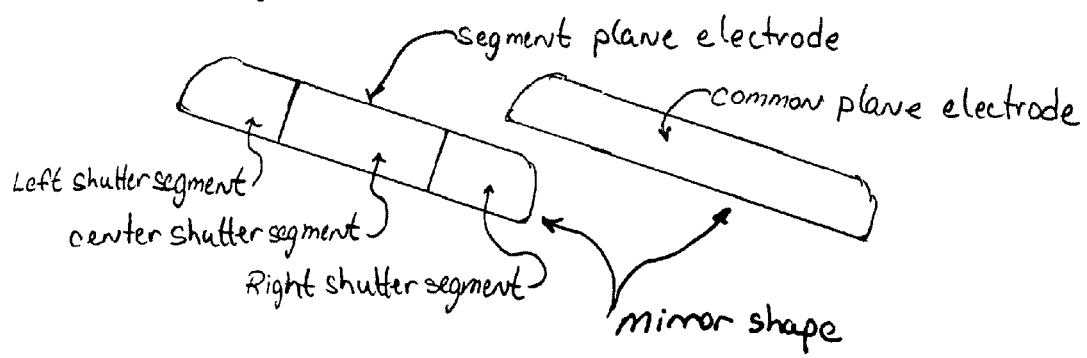

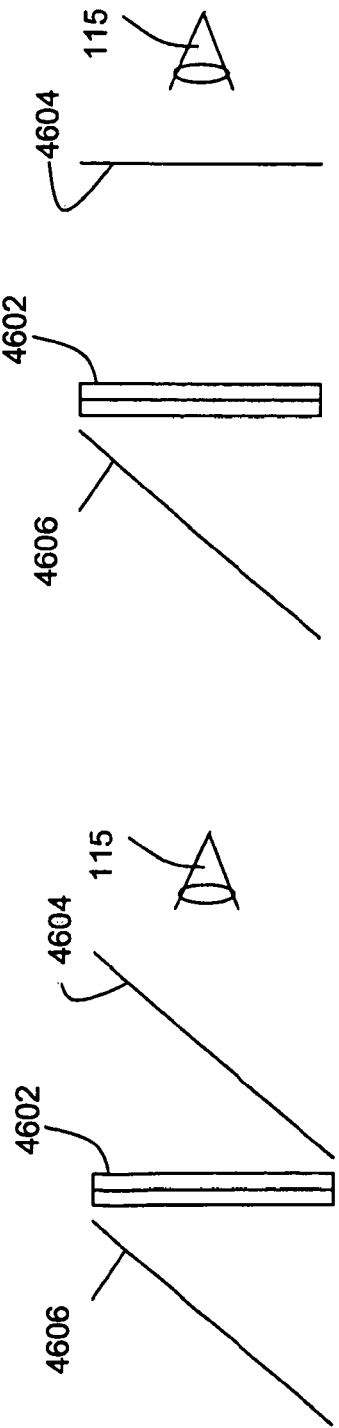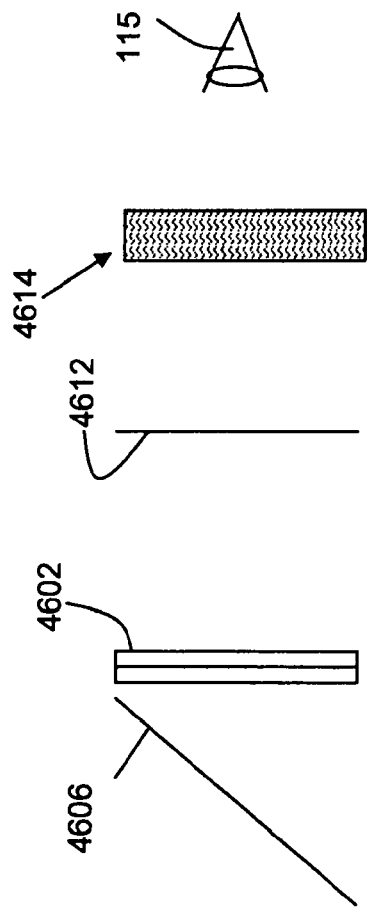
FIG. 46(B)
FIG. 46(G)
FIG. 46(A)

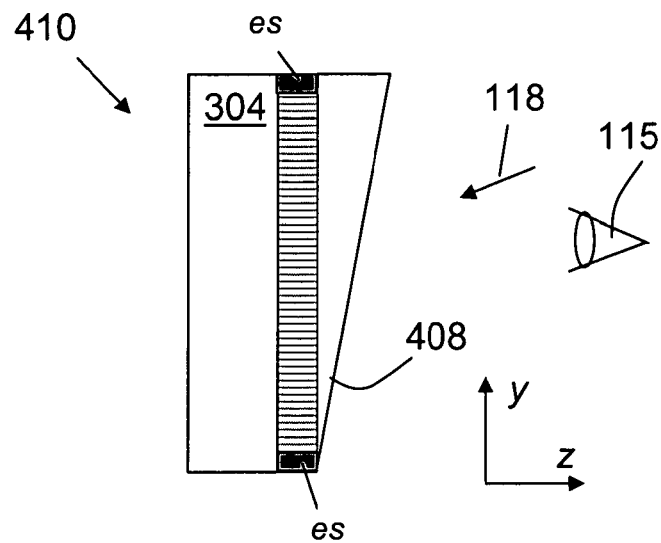
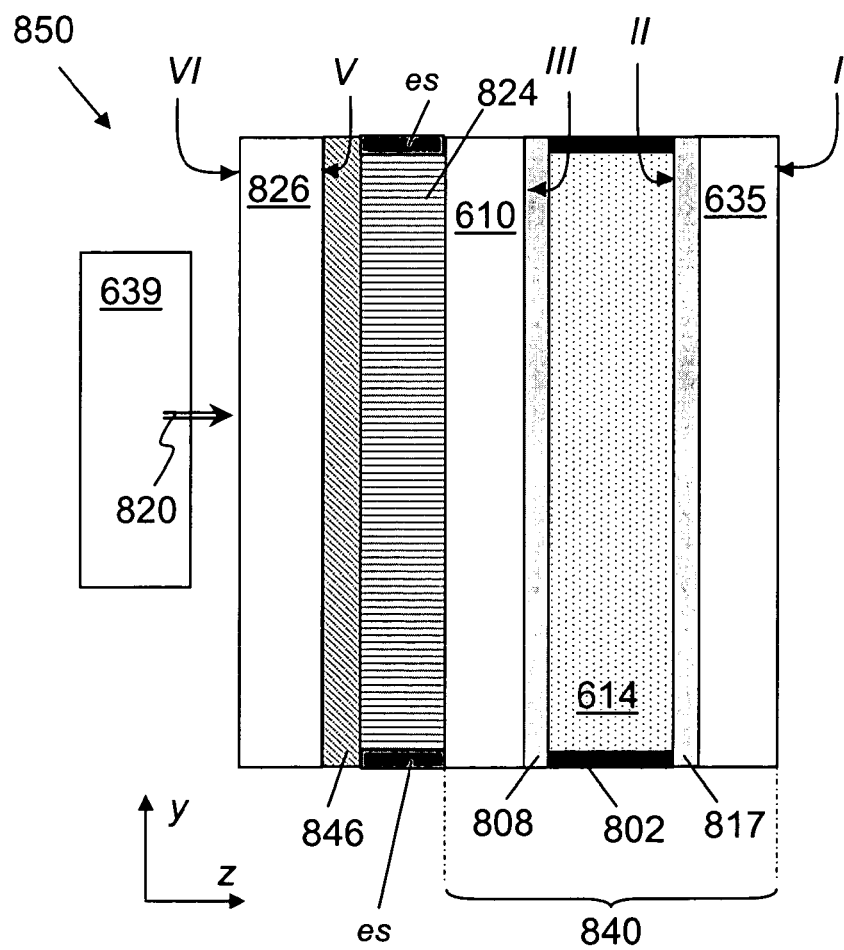
FIG. 50
FIG. 51

REARVIEW MIRROR ASSEMBLIES WITH ANISOTROPIC POLYMER LAMINATES

CROSS-REFERENCE TO RELATED APPLICATIONS

The present application is a continuation-in-part of U.S. patent application Ser. No. 12/629,757 filed on Dec. 2, 2009, now U.S. Pat. No. 8,282,224, which is a continuation-in-part of U.S. patent application Ser. No. 12/496,620 filed on Jul. 1, 2009, now U.S. Pat. No. 8,545,030, which claims priority from U.S. Provisional Applications Nos. 61/079,668 filed on Jul. 10, 2008 and 61/093,608 filed on Sep. 2, 2008. The present application claims priority from each of the above-mentioned applications. The disclosure of each of the above-mentioned applications is incorporated herein by reference in its entirety.

TECHNICAL FIELD

The present invention relates to polymer-based film laminates and, more particularly, to automotive rearview mirrors incorporating laminates comprising polymer-based film structures having an optically anisotropic layer.

BACKGROUND ART

Mirror assemblies have proven to be a convenient location for providing drivers with useful information. For example, a video display disposed behind a mirror, but visible through a portion of the mirror, may supply the driver with a video image of the scene to the rear of the vehicle where the driver's view may otherwise be obstructed. Similarly, an information display may offer the driver such vehicle-telemetry information as vehicle speed, engine status, oil level and temperature, for example, or any other information of interest. Integration of backup or other displays behind the automotive rearview mirror is generally preferred over placing them adjacent to the mirror, thereby increasing the area of the overall mirror assembly and impairing the driver's view through the windshield.

Various types of displays incorporated within the rearview automotive mirror are known in the art, such as alphanumeric displays, graphical displays, video displays, and combinations thereof. These displays are discussed, for example, in U.S. Pat. No. 7,221,363, and in US Patent Publication No. 2008/0068520, each of which is incorporated herein in its entirety by reference. Displays that have been, or might be, used in automotive applications employ various principles such as vacuum fluorescence (VF), electromechanics (EM), light emitting or organic light emitting diodes (LED or OLED), plasma display panels (PDP), microelectromechanical systems (MEMS), electroluminescence (EL), projection (the projection systems include but are not limited to DLP and LCOS), or liquid crystal technology (used in liquid crystal displays, or LCDs), to name just a few. High-resolution LCDs capable of delivering color images, for example, may be mass-produced reliably and at low cost. LCDs are also noteworthy in that the liquid crystal medium changes its polarizing properties under the influence of the applied electric field and the light emanating from an LCD is polarized.

A particular challenge presented by display technology in an automotive context is that of providing the driver with sufficient luminance to see the display clearly, especially under daunting conditions of ambient light, while, at the same time, providing a clear and undistorted reflected view of the rear and peripheral scene to the driver. Since automotive reflectors serve a crucial safety function in identifying objects otherwise outside of the driver's field of view, they must critically preserve image quality.

SUMMARY OF THE INVENTION

Embodiments of the invention provide an image-forming optical reflector comprising a base element (such as an electrochromic element or a prism element) that reflects ambient light incident upon it, a light source, and a laminate that includes an anisotropic film disposed between the base element and the light source. In one embodiment, the image-forming reflector may include a variable reflectance mirror system for use in a rearview mirror assembly having a light source transmitting light of a first polarization through the mirror system. The mirror system may be a multi-zone mirror system. The anisotropic film may extend across the full field-of-view of the mirror system or, alternatively, it may extend substantially over only a transflective zone of the multi-zone system through which the light source transmits light towards a viewer. The film receives the light from the light source, transmitting a portion of this light that has a first polarization and reflecting a portion of this light that has a second polarization that is opposite to the first polarization. The mirror is substantially devoid of any extended distortion. In one embodiment, the mirror system is characterized by surface values SW and LW, derived as discussed below, which do not exceed 3, preferably do not exceed 2 and most preferably do not exceed 1. The anisotropic film may be laminated between a substrate and a superstrate, which may be releasably adhered to the film. The light source may be a part of the laminate and may act as the superstrate. Alternatively or in addition, the base element may be a part of the laminate and may act as the substrate. In a specific embodiment, the laminate may be a stand-alone component of the reflector. The light source may comprise a display subassembly, for example an LCD subassembly. In a specific embodiment, at least one of a reflectance-enhancing and an opacifying layers may be additionally employed adjacent to a surface of the substrate and superstrate. The opacifying layer may substantially cover a portion of the surface that is located outside the transflective portion of the mirror structure.

Additional embodiments of the invention provide an optical element for optimizing transmission of light through an image-forming optical reflector. In a specific embodiment, the optical element of the invention placed within the mirror system of the invention increases a contrast of light transmitted from a light source through the mirror system to a viewer The optical element may comprise an optical substrate, having a surface, and a light-transmitting layered structure adhered to the surface, where the layered structure includes an anisotropic layer that transmits light of a first polarization and reflects light of a second polarization that is opposite to the first polarization. The anisotropic layer may be birefringent. Layers of the layered structure, including the anisotropic layer, may each have associated glass transition temperatures, and the layered structure may be characterized by a range of glass transition temperatures. In one embodiment, the layered structure is characterized by SW and LW that do not exceed 3 after the layered structure has been heated to soften at least a portion of the plastic film, which generally occurs at a temperature approaching or exceeding at least a lower glass-transition temperature from the range of glass transition temperatures associated with the layered structure. In another embodiment, after having been heated to such softening temperature under uniform (and, preferably, substantially omnidirectional) pressure, the layered structure is substantially devoid of any extended distortion. In one embodiment, the optical element may be a laminate integrating at least a substrate and the anisotropic layer. In another embodiment, the optical element may additionally comprise a light-transmitting optical superstrate disposed over the layered structure where the optical superstrate may or may not be releasably coupled to the layered structure. The optical element is substantially devoid of any extended distortion and may be characterized by values SW and LW that do not exceed 3, preferably do not exceed 2 and most preferably do not exceed 1. In a specific embodiment, the optical reflector may be an image-forming reflector, for example a rearview automotive mirror.

In accordance with another embodiment of the invention, a method is provided for fabricating a laminate containing an APBF for use in a rearview mirror assembly. The method includes disposing a film structure characterized by a predetermined water content and having a layer with anisotropic optical properties on a substrate to form a composite. The method further includes applying heat and pressure at controlled humidity levels and, optionally, vacuum to the composite under conditions causing formation of a laminate that comprises a part of the image-forming and image-preserving reflector characterized by SW and LW values that are less than 3, preferably less than 2, and most preferably less than 1. According to one embodiment of the invention it is preferred that the water content of the APBF prior to lamination be less than about 0.6 weight-%, more preferably less than about 0.4 weight-%, even more preferably less than 0.2 weight-%, and most preferably less than about 0.1 weight-%. The temperature selected to laminate the composite may be within a range from about 50° C. to about 160° C., preferably between about 80° C. to about 150° C., and most preferably between about 90° C. to about 110° C. The pressure chosen for lamination is preferably substantially omnidirectional and may be between about 25 psi to about 2,500 psi, preferably from about 50 psi to about 500 psi, and most preferably from about 100 psi to about 400 psi. The film structure may be optionally stretched during the lamination process to assure adequate flatness of the film. In one embodiment, the fabricated laminate may be additionally annealed to enhance the strength of the lamination bond. In one embodiment, the layer with anisotropic properties transmits light having a first polarization and reflects light having a second polarization that is opposite to the first polarization, and the laminate is characterized by SW and LW values less than 3, preferably less than 2, and most preferably less than 1. In another embodiment, the laminate is substantially devoid of any extended distortion and the optical reflector comprising such laminate forms an image satisfying automotive industry standards.

BRIEF DESCRIPTION OF THE DRAWINGS

The foregoing features of the invention will be more readily understood by reference to the following detailed description, taken with reference to the accompanying, drawn not to scale, drawings where like features and elements are denoted by like numbers and labels, and in which:

FIG. 3(A) illustrates an optional pre-lamination treatment of a polymer-based film. FIG. 3(B) shows a step of assembling a composite to be laminated. FIG. 3(C) illustrates a step of lamination of the composite of FIG. 3(B). FIG. 3(D) depicts a laminate resulting from the lamination step of FIG. 3(C). FIG. 3(E) illustrates an optional step of releasing the superstrate of the laminate, during or after the lamination procedure, resulting in an alternative embodiment of the laminate as shown in FIG. 3(F). FIG. 3(G) schematically illustrates the steps of post-lamination processing including a step of inspection of the embodiments of FIGS. 3(D) and 3(F), an optional step of post-lamination anneal, and an incorporation of an embodiment of a laminate into an automotive mirror assembly.

FIGS. 4(C,D): an APBF is laminated in a prism mirror assembly. FIGS. 4(F,G): an APBF-containing laminate is integrated in a prism mirror structure containing a gap.

FIG. 7(A): an arm of a press acts as a releasable superstrate. FIG. 7(B): a superstrate is attached to an arm of a press. FIG. 7(C): the use of a press-roll.

FIGS. 8(D-G) show alternative embodiments of lamination of an APBF between an EC-element and an additional lite of glass.

FIG. 9 illustrates spectral dependences of reflectance characteristics of embodiments of FIG. 8.

FIG. 13 schematically illustrates embodiments used to enhance contrast of a display as perceived by a user wearing polarizing sunglasses. FIG. 13(A): a light output from a conventionally oriented LCD is depolarized. FIG. 13(B): polarization of light output of a conventionally oriented LCD is rotated.

FIG. 17 illustrates types of gradual edges in a chromium opacifying layer used with embodiments of the current invention.

FIG. 21 shows alternative embodiments of the present invention.

FIG. 24 shows an embodiment including an opaque reflectance-enhancing layer.

FIG. 25 shows an embodiment containing two angularly misaligned reflective polarizers.

FIG. 33 shows embodiments of a switchable mirror system of the invention employing an auxiliary LC-cell.

FIG. 45 provides illustrations to the concept of a segmented LC-cell.

FIG. 50 shows an embodiment of the invention containing an edge seal for APBF.

FIG. 51 shows an alternative embodiment of the invention containing an edge seal for APBF.

FIGS. 53(A, B) show the embodiment of FIG. 52 including a Twisted Nematic LC-cell (TN LC) and a Guest-Host LC-cell (GH LC). FIG. 53(B): GH LC-cell is on.

FIGS. 57(A-D) show embodiments of a switchable mirror employing two reflective polarizers disposed within a TN LC-cell of the embodiment.

DETAILED DESCRIPTION OF SPECIFIC EMBODIMENTS

Definitions

Figure 2:
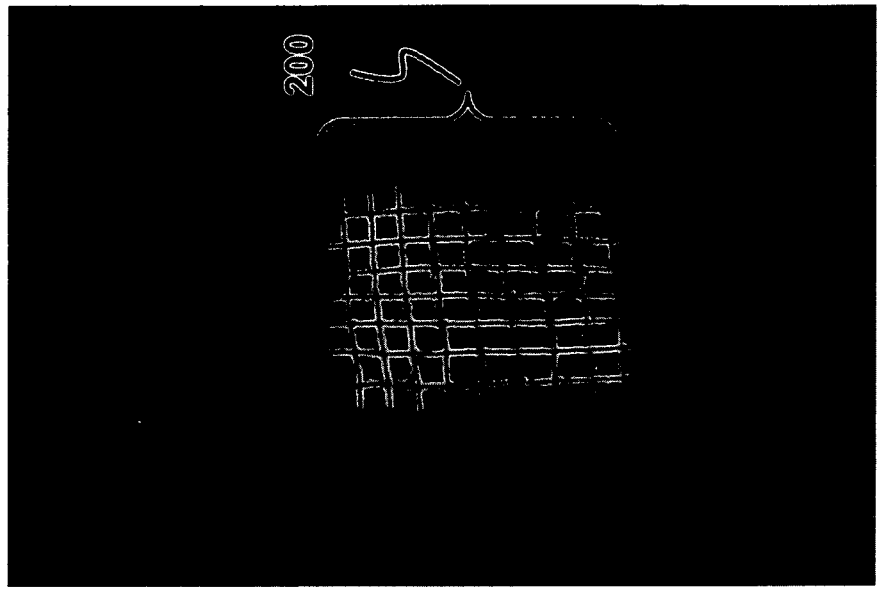
FIG. 2 demonstrates an optical image formed in reflection from a laminate-containing display of a Nokia phone.

As used in this description and the accompanying claims, the following terms shall have the meanings indicated, unless the context requires otherwise:

A "laminate" refers generally to a compound material fabricated through the union of two or more components, while a term "lamination" refers to a process of fabricating such a material. Within the meaning of the term "laminate," the individual components may share a material composition, or not, and may undergo distinct forms of processing such as directional stretching, embossing, or coating. Examples of laminates using different materials include the application of a plastic film to a supporting material such as glass, or sealing a plastic layer between two supporting layers, where the supporting layers may include glass, plastic, or any other suitable material.

An "image-forming" or "image-preserving" reflector is a reflector forming an essentially undistorted image in specularly reflected light. In imaging, optical distortion is understood as a deviation from rectilinear projection. For example, an undistorted image of a straight line formed in a flat reflector is a straight line. For the purposes of this invention, "image-forming" and "image-preserving" include projections that may incorporate predetermined distortions introduced by design into an otherwise undistorted image. For example, an image-forming reflector designed to be non-flat (such as a convex or an aspheric reflector) produces substantially no deviations from the curvilinear image resulting from the design curvature of the reflector.

"Transflective" refers to an optical configuration that reflects at least a portion of light incident from at least one side, and transmits at least a portion of light incident from at least one side.

An "isolated defect" in an optical element is defined as a deformation feature that may be surrounded with a complete annulus within which there is no excursion from the mean figure of the surface perceptible to an ordinary user. Such highly localized defects, moreover, are characterized by high spatial frequency when described in a Fourier domain. For example, a particle of dust trapped within a laminate might form an isolated defect, in which case this deformation is limited to the region encompassing and surrounding a dust particle. Another example of an isolated defect in a laminate may be provided by a lamination interface singularity (i.e., a singularity at an interface between the laminated components) such as a scratch. Isolated defects are sometimes defined by the rate of change in the local slope of a surface measured with a deflectometry-based technique developed by an automotive consortium and discussed by Fernholtz et al. at www.speautomotive.com/SPEA_CD/SPEA2007/pdf/d/enabling_part1_paper4_femholz_ford.pdf.

By way of distinction, however, the terms "extended defect" and "extended distortion" refer to a deformation of the surface of an optical element, such that there exists no complete annulus, surrounding the deformation, which annulus contains imperceptible excursion from the mean figure of the surface. An extended defect in an optical element may include such features as singular elongated scratches, creases and the like as well as groups of similar defects. Extended distortion in a reflecting surface may manifest itself by and be recognized through a measured rate of change of curvature of the surface, or, equivalently, a local change in optical power of the reflecting surface.

An optical element is said to be "substantially devoid of extended distortions" if the element, in its intended use, is substantially free of extended distortions as visually perceived by an ordinary observer. For example, an image-preserving reflector including a laminate, which has extended distortions that reduce the quality of the image formed by the reflector and that can be visually perceived by an ordinary viewer, is not "substantially devoid of extended distortion." A stippled surface referred to as "orange-peel" provides an example of surface having extended distortion. Visual requirements for automotive image-forming reflectors, including rearview mirror assemblies and those with back-up displays, are based on the intended use where images of relatively distant objects, viewed in reflection, are moving across the field of view of the reflectors in a generally horizontal direction when the vehicles is in motion. Therefore, a reflector producing an acceptable image for a closer and stationary object (such as a decorative room mirror, for example), may not yield an acceptable image for an automotive application. Verification of whether various laminate-containing automotive image-forming reflector assemblies form images that satisfy the visual requirements may be carried out with different tests such as, for example, a test for visual distortion evaluation of a flat mirror as described in the DaimlerChrysler Corporation standard no. MS-3612 (referred to hereinafter as visual evaluation test). If, as required by this standard, an ordinary observer located at about 36 inches away from the reflector, does not see blurring or fuzziness in the image of a 1 inch grid, consisting of intersecting straight horizontal and vertical lines and placed at about 15 ft in front of the planar reflector, such reflector will be perceived as substantially devoid of extended distortions in its intended use. When performing a visual evaluation test, the observer will often move his head relative to the mirror to assure that a slightly discernible distortion of the image of the grid does not become objectionable for the purposes of the mirror use. Such dynamic evaluation is not required by the MS-3612 standard. It is understood, however, that other standards may be applied in determining the fitness of the image-preserving automotive reflector for its intended purpose.

A "first polarization" and a "second polarization opposite the first polarization" generally refer to two different polarizations. In a particular case, the first and the second polarizations may be orthogonal polarizations (such as two linear polarizations represented by mutually perpendicular vectors, or left and right circular or elliptical polarizations).

A "light source" generally refers to a device serving as a source of illumination inclusive of optical elements that may gate or shape the illumination. Thus, for example, an LCD or any other display illuminated with the light from a light emitter is included within the meaning of a "light source". A light source may be used, e.g., for display of information, video images, or for illumination of an object.

A "stand-alone" element of a mirror assembly is an element that, upon being fabricated, does not include any elements of the mirror assembly that serve purposes other than the purpose of the stand-alone element. No component of a stand-alone laminate of the mirror assembly may be a structural element of any other subset of the mirror assembly. A stand-alone laminate, when fabricated, can be inserted into the mirror assembly and removed from it without disturbing the performance of the remaining elements of the assembly. In comparison, a laminate may integrate another element of the mirror assembly: e.g., a substrate for a mirror component may be simultaneously utilized as a substrate for the laminate, thus becoming one of the compound material components of the laminate.

In reference to an optical component, being "opaque" implies having transmittance low enough to substantially conceal mirror assembly components located behind the optical component. "Opacification", in turn, refers to an act or process of rendering an optical component substantially opaque.

A "depolarizer" is an optical structure that effectively changes a state of polarization of polarized light transmitted or reflected by the depolarizer into a different polarization state such that differences between the fundamental polarization components of incident polarized light are reduced after passing through or reflecting from said polarizer. One example of a depolarizer for present purposes would be an ideal depolarizer that scrambles the polarization of light and outputs randomly polarized light whatever the input. A practical depolarizer of this type typically produces pseudo-random output polarization. For example, an element that randomizes the phase difference between the s and p components of incident linearly polarized light passing through such element provides one example of a depolarizer. Another example of a depolarizer for present purposes would be a phase retarder converting linearly polarized light into elliptically polarized light such as, e.g., light polarized circularly, or into randomly polarized light. The addition of a depolarizer to the mirror assembly may result in a more uniform distribution of intensity with a tilt angle in both reflectance and transmittance when a viewer wears polarizing sunglasses. In addition, the presence of such depolarizer minimizes certain artifacts that appear in reflected and transmitted images.

The following disclosure describes embodiments of the invention with reference to the corresponding drawings, in which like numbers represent the same or similar elements wherever possible. In the drawings, the depicted structural elements are not to scale and certain components are enlarged relative to the other components for purposes of emphasis and understanding. References throughout this specification to "one embodiment," "an embodiment," or similar language mean that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. For example, to simplify a particular drawing of an electro-optical device of the invention not all thin-film coatings, electrical interconnections, elements of structural support (such as housing, for example), or auxiliary devices (such as sensors, for example) may be shown in a single drawing. It is understood, however, that such coatings, interconnections, structural support elements, or auxiliary devices are implied as they may be required for proper operation of the particular embodiment. In the following description, numerous specific details are recited to provide a thorough understanding of embodiments of the invention. One skilled in the relevant art will recognize, however, that the invention may be practiced without one or more of the specific details, or with other methods, components, or materials.

Figure 18:
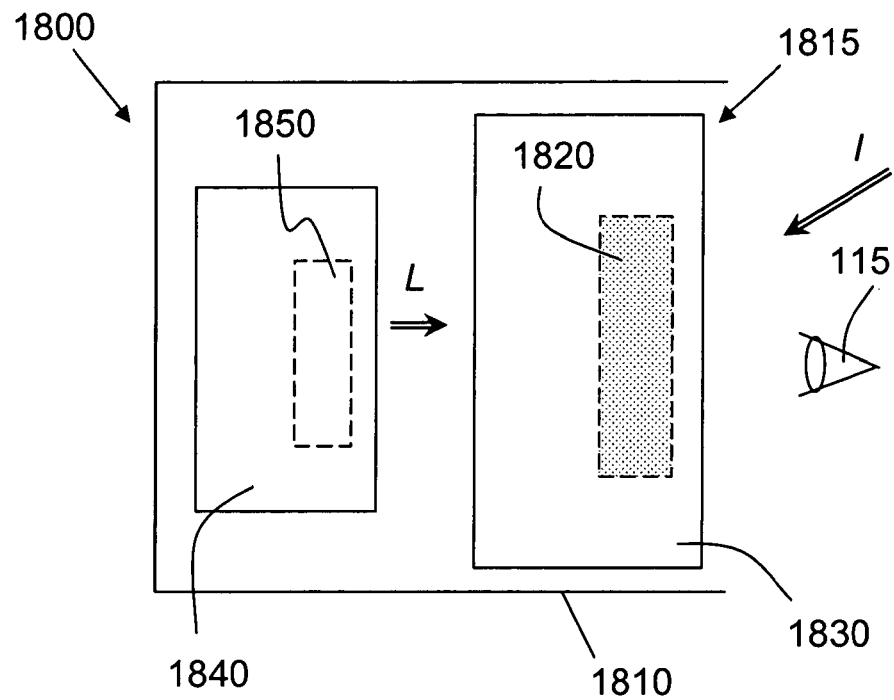
FIG. 18 schematically illustrates, in side view, major sub-assembly-blocks of an automotive rearview mirror containing an electronic device behind the mirror system.

Types of rearview mirror assemblies that contain a display and to which embodiments of the present invention may advantageously be applied include, without limitation, mirrors comprising transflective elements (i.e. elements that are partially transmissive and partially reflective), reflective elements including prismatic reflective elements, and electrochromic mirrors. Transflective optics may be, without limitation, partially transmissive, multichroic, polarization-sensitive, or directionally transmissive. Various rearview mirror structures and related methods of fabrication have been addressed, for example, in U.S. Pat. Nos. 5,818,625, 6,166,848, 6,356,376, 6,700,692, 7,009,751, 7,042,616, 7,221,363, 7,502,156 and U.S. Patent Publication No. 2008/0068520, 2008/0030836, and 2008/0302657, and U.S. patent application Ser. No. 12/570,585 filed on Sep. 30, 2009 and Ser. No. 12/367,143, filed on Feb. 6, 2009, each of which is incorporated herein in its entirety by reference in its entirety. These patent documents are collectively referred to herein as "Our Prior Applications." Displays and transflective optics may be incorporated in various vehicle locations, not only in rearview mirrors (interior or exterior to the vehicle) and side-view mirrors, such as sun visors, instrument panels, dashboards, overhead consoles and the like. The rearview mirror assemblies may comprise surfaces of various geometries such as, by way of non-limiting example, planar, cylindrical, convex, aspheric, prismatic, other complex surfaces, or combinations thereof. As schematically illustrated in FIG. 18 in side view, an embodiment 1800 of a typical automotive rearview mirror assembly comprises a housing 1810 with a mirror system or assembly 1815 that includes a mirror element or subassembly 1820 and optional auxiliary optics 1830 such as, e.g., various filters affecting optical parameters of light. The mirror element 1820 may include an electrochromic element or, e.g., a prismatic element. The mirror system 1815 is often used in conjunction with an electronic device 1840, e.g., a light source that may include a display 1850 such as an LCD, the light L from which may be delivered through the mirror system 1815 towards a viewer 115 to produce a displayed image visible to the viewer. The light source 1840 may be disposed within the housing 1810 as a stand-alone component behind the mirror system 1815 as viewed by the viewer 115. Alternatively, the light source may be in physical contact (not shown) with the mirror system. Quite often contrast of a displayed image, perceived by the driver 115 through the mirror system 1815 against a reflection, by the mirror system of ambient light I may remain quite low, particularly when the ambient light I is plentiful. In some embodiments, the electronic device 1840 may be a light-detecting optical component for receiving light through the mirror system 1815.

Embodiments of the invention may be incorporated in a rearview mirror assembly that may include a glare light sensor and an ambient light sensor, which are described in commonly assigned U.S. Pat. Nos. 6,359,274 and 6,402,328. The disclosure of each of these patents is incorporated herein by reference in its entirety. The electrical output signal from either or both of these sensors may be used as inputs to a controller on a circuit board of the assembly that controls the intensity of display backlighting. The details of various control circuits for use herewith are described in commonly assigned U.S. Pat. Nos. 5,956,012; 6,084,700; 6,222,177; 6,224,716; 6,247,819; 6,249,369; 6,392,783; and 6,402,328, the disclosures of which are incorporated in their entireties herein by reference. These systems may be integrated, at least in part, in a common control with information displays and/or may share components with the information displays. In addition, the status of these systems and/or the devices controlled thereby may be displayed on the associated information displays.

Figure 26:
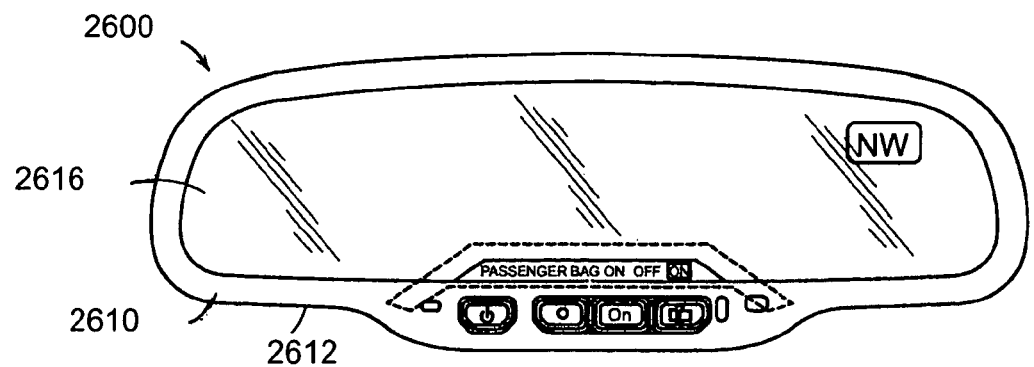
FIG. 26 shows, in front view, an embodiment electrochromic mirror assembly incorporating an embodiment of the present invention.
Figure 27:
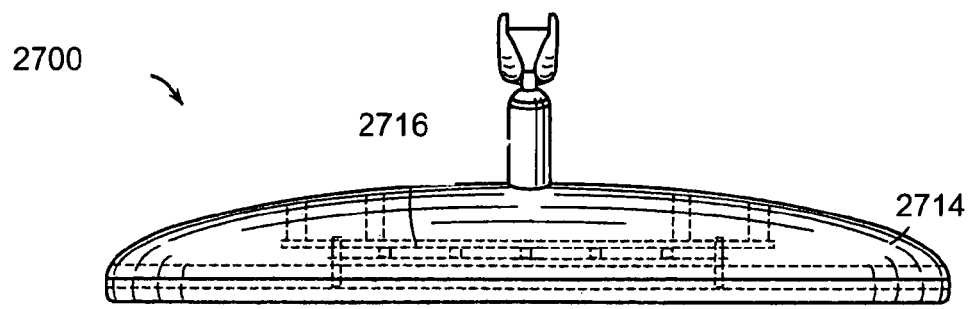
FIG. 27 shows a side view of the mirror assembly of FIG. 26.
Figure 28:
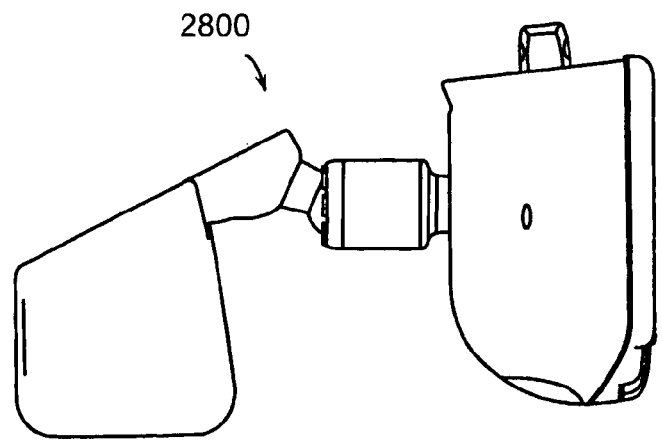
FIG. 28 shows, in side view, an alternative embodiment of an electrochromic mirror assembly incorporating an embodiment of a mirror element o the present invention.

As schematically shown in examples of FIGS. 26 and 27, a mirror assembly 2600 includes a housing 2610 and, optionally, a bezel 2612 that define a cavity 2714, and further includes an electrochromic mirror subassembly 2616 supported in the cavity 2314 along with a printed circuit board 2716. The printed circuit board 2716 has a circuit thereon that is configured to operate the electrochromic mirror subassembly 2616 for controlled darkening to reduce glare in the mirror assembly 2600. FIG. 28 shows, in side view, another embodiment 2800 of a mirror assembly incorporating the mirror element of the invention and a display. Other examples of mirror assemblies that may include embodiments of the present invention are disclosed, e.g., in commonly-assigned patent application Ser. Nos. 11/684,336; 12/193,426; 12/189,853; and 12/196,476, the disclosure of each of which is incorporated herein by reference in its entirety.

Generally, a mirror assembly incorporating embodiments of the invention may include, within the housing of the assembly, an EC-mirror element or a prismatic tilt mirror element, a light source such as that including an information display behind the mirror element, and various auxiliary components such as a voice activated system, a microphone, a compass system, a digital sound processing system, a telemetry system, a sensor such as a moisture sensor or a light sensor, for example, a loran system, a GPS, a vehicle vision system, and camera, a climate control system, a turn signal, a security system, an adaptive cruise control system, garage door openers, BlueTooth modules and map lights. Detailed description of embodiments of mirror elements and system configured within automotive rearview mirror assemblies is provided in Our Prior Applications.

In further reference to FIG. 18, a reflective polarizer (RP) may provide one class of possible solutions to the recognized problem of transmitting a sufficient and optimized amount of light from a display through the mirror system to the driver. A reflective polarizer substantially transmits light having one type of polarization while substantially reflecting light of the opposite polarization. This may produce an effect of making the mirror system essentially transparent to the polarized light L, generated by the light source 1840, while maintaining a useful level of overall reflectance of unpolarized ambient light I incident upon the mirror system 1815. An RP might be a linear polarizer, an elliptical polarizer or a circular polarizer and might include an optical retarder such as a quarter-wave plate or a half-wave plate. A wire-grid polarizer provides one example of an RP. Alternatively, a reflective polarizer may include a polymer-based film structure comprising at least one optically anisotropic layer. Such polymer-based film structure is generally referred to herein as an anisotropic polymer-based film (APBF). In reference to FIG. 18, an APBF may be incorporated within the mirror system 1815 by laminating the APBF to one of the components of the mirror system such as a glass substrate, for example. Alternatively, the RP may be used as an addition to the front polarizer component (exit polarizer) of an LCD 1850 positioned behind the mirror system 1815. The RP may also be used as a replacement for the front polarizer of the LCD. When the viewer 115 wears polarizing glasses, it may be desirable to orient various polarizers within the embodiment 1800 of an automotive rearview mirror assembly so as to optimize the relative intensities of the displayed and reflected images visible to the viewer.

For example, some automotive industry standards require only about 40 percent reflectance for inside rearview mirror assemblies and about 35 percent reflectance for outside rearview mirror assemblies. With the use of such mirror assemblies, the contrast of the illumination from a display, as perceived by the driver through a mirror system against a background of ambient light reflected by the mirror system, remains quite low, particularly when the ambient light is plentiful such as on a bright sunny day. For example, a commonly-assigned U.S. patent application Ser. No. 12/370,909 filed Feb. 13, 2009 and now published as U.S. 2009/0207513, which is further referred to herein as "Multi-Zone Mirror Application" and the entire disclosure of which is incorporated herein by reference, provides a discussion of the display contrast in a multi-zone mirror system having both opaque and transflective areas. The contrast is defined as the ratio of the intensity of display-generated light reaching the viewer and the intensity of ambient light reflected by the mirror system. As shown in Table 1 below, for a mirror system having a transflective area with absorbance of about 10% and an assumed 4,000 cd/m$^2$ raw display signal luminance and 1,000 cd/m$^2$ ambient light luminance, the contrast of the display increases rapidly as the reflectance of the transflective area of the mirror system decreases. Embodiments of the present invention, used in rearview mirror assemblies including a display device, may provide for the display contrast that is greater than 1, preferably greater than 2, more preferably greater than 3, and most preferably greater than 4. The use of laminates comprising polymer-based films (such as an APBF) or other reflective polarizers in automotive rearview mirror assemblies may facilitate transmitting an optimized amount of light from the light source through the mirror assembly to the driver. For example, by aligning the polarization axis of the APBF with the polarization vector of generally linearly polarized light delivered from a typical LCD located behind the mirror system, the losses of light from the display upon passing through the APBF may be minimized. Consequently, the overall amount of light transmitted from the display through the mirror towards the driver tends to be increased. Teachings of such a concept employing an optically anisotropic polarizer (whether a conventional wire-grid or a laminated foil made of multiple layers of plastic film at least one of which is optically anisotropic, e.g. wherein some or all of the film layers have internal molecular orientation that induces a directional difference in refractive index) are presented in U.S. Pat. No. 7,502,156. For example, a wire-grid polarizer, oriented within the mirror assembly so as to transmit a substantial majority of the linearly polarized light generated by a TFT LCD display located behind the mirror assembly, would reflect up to about a half of unpolarized ambient light incident upon the front of the mirror assembly and, therefore, provide for high visual contrast of the display on the ambient background. Examples of use of reflective polarizers in mirror/display devices are discussed in WO 2005/050267, WO 2005/024500, and WO 2003/079318, each of which is incorporated herein by reference in its entirety.

TABLE 1

| % T | % R | Luminance of signal from display, cd/m$^2$ | Luminance of reflected ambient light, cd/m$^2$ | Contrast Ratio |
|---|---|---|---|---|
| 10 | 80 | 400 | 800 | 0.5 |
| 20 | 70 | 800 | 700 | 1.1 |
| 30 | 60 | 1200 | 600 | 2.0 |
| 40 | 50 | 1600 | 500 | 3.2 |

TABLE 1-continued

| % T | % R | Luminance of signal from display, cd/m² | Luminance of reflected ambient light, cd/m² | Contrast Ratio |
|---|---|---|---|---|
| 50 | 40 | 2000 | 400 | 5.0 |
| 60 | 30 | 2400 | 300 | 8.0 |
| 70 | 20 | 2800 | 200 | 14.0 |
| 95 | 50 | 3800 | 500 | 7.6 |

Various APBFs so far have been employed in energy efficient displays such as computer displays. Non-limiting examples of APBFs are provided by a multilayered polymer film comprising a body of alternating layers of a crystalline-based polymer and another selected polymer, or by microstructured film-based polarizers such as brightness enhancement films, or by dual brightness enhancement films (DBEF-E, and DBEF-Q, APF 25, APF 35, APF 50, for example), all by 3M, Inc. (see, e.g., WO 95/17303, U.S. Pat. No. 5,422,756), or by multilayered films containing alternating polymeric layers stretched in chosen directions. See Steve Jurichich, Summary of The TFT LCD Material Report (www.displaysearch.com/products/samples/execsummary-materials.pdf); see also 3M product description at http://solutions9.3m.com/wps/portal/3M/en_US/Vikuiti1/BrandProducts/main/energyefficiency.

Fabrication of laminates comprising glass and polymer films has been previously directed to safety glazing (see, e.g., U.S. Pat. Nos. 3,471,356 and 4,277,299) and to windows that reject a portion of solar light (so-called heat mirrors, see, e.g., U.S. Pat. Nos. 6,797,396 and 7,215,473). The use of polarizing films for enhancement of reflectivity in a conventional viewing mirror was discussed, e.g., in U.S. Patent Application No. 2007/0041096 and U.S. Pat. No. 7,551,354. However, fabrication of laminates containing plastic films for employment in rearview automotive mirror assemblies has not been addressed and presents problems that significantly differ from those faced in the fabrication of the abovementioned conventional products. The differences stem from the performance requirements imposed upon image-forming properties of rearview automotive mirror assemblies by commonly accepted industry standards.

For example, a polymer film laminated between a glass substrate and a glass superstrate for use in safety glazing is generally not required to possess any special optical or mechanical properties other than meeting transmission standards in visible light (i.e., at wavelengths between approximately 380 nm and 750 nm). A typical safety-glazing laminate is used in transmission, and the index matching provided by such polymer film for the glass substrate and superstrate is known to facilitate visual concealment of imperfections present at glass surfaces. In contradistinction, in a case of a plastic-film-based laminate with intended use in a rearview mirror assembly, where the laminate includes glass lites and a functional anisotropic polymer-based film and operates both in transmission and reflection, the use of an additional index-matching layer may not necessarily conceal imperfections. On one hand, such index-matching layer added to the polymer film will affect optical properties of the overall mirror system (e.g., reflectance, transmittance, and image-preserving properties such as ability to form undistorted images satisfying stringent standards of automotive industry). On the other hand, while possibly concealing the structural defects of glass surfaces, the index-matching layer may not necessarily conceal the structural defects of the polymer film itself or defects of the lamination. Moreover, plastic film-based laminates used in safety glazing do not utilize structurally anisotropic and often multilayered films such as those employed in embodiments of the present invention but, instead, conventionally utilizes homogeneous films the material properties of which are uniform. Therefore, technical approaches suitable to safety glass manufacture are not applicable to solve the problems of automotive mirror design.

Methods of conventional lamination of glasses and polymer films and the resulting laminates used in conventional applications mentioned above are well known. For example, typical flaws of a safety-glazing laminate may involve occasional inclusions of contaminating material such as particulates with dimensions on the order of a few microns that are sporadically scattered across, and embedded in, the safety-glazing laminate and may be perceived by a naked eye as annoying visual defects of the laminate. See U.S. Pat. No. 5,631,089. These flaws are examples of isolated defects characterized by high spatial frequency that do not reduce the integrity and quality of the laminate for its intended use in safety glazing. As far as safety glazing applications are concerned, prior art does not consider low-spatial-frequency optical distortions, resulting from the lamination process, to be defects of the laminates. See, e.g., Laminated Glass Product Standards, at www.viracon.com/laminatedStandards.html. Similarly, plastic films contained within heat-mirror laminates may not perfectly conform to the curvatures of the underlying window glass and may form wrinkles, pleats and even cracks in the functional layer. Although structural defects of laminates used in heat-mirrors often lead to optical defects as discussed, e.g., in U.S. Pat. Nos. 7,215,473 and 6,797,396, each of which is incorporated herein in its entirety by reference or at www.cardinalcorp.com/data/tsb/lg/LGO2_05-08.pdf, these laminate defects are also known to not reduce the quality of the heat-mirror laminates for their intended use.

In contradistinction, structural defects in laminates used in an automotive rearview mirror may significantly reduce the quality of such mirror for its intended use. In fact, reflective polarizers such as APBFs, used either as stand-alone components or in laminated combinations, have not been commercialized to-date in image-forming automotive reflectors such as rearview mirrors, where the application requires image-forming quality satisfying automotive standards. Moreover, prior art specifically acknowledges the drawbacks of APBF-containing conventional mirrors known to-date by teaching that such reflectors produce inhomogeneities of reflection (both in color and direction) that result in disturbed reflected images prohibiting the use of APBFs and APBF-containing combinations of elements (such as, e.g., laminates) in automotive applications. See, e.g., U.S. Pat. No. 7,551,354. The present application addresses these well-recognized problems and offers embodiments of APBF-based laminates and automotive rearview mirrors containing such laminates that satisfy existing automotive standards.

In various applications, a primary purpose of a mirror is to form a clear and undistorted image. When a mirror assembly of interest is used as a rearview automotive mirror, and the image of the environment surrounding the driver is distorted, the unwanted image aberrations may distract the driver from correctly evaluating the traffic situation. We have empirically found that (in contrast to known applications such as safety glazing applications, or heat mirrors, for example), a conventionally performed lamination, with or without a cover plate, of an APBF to a substrate in a rearview mirror assembly compromises the quality of the resulting mirror for its intended use. Such reduction in image quality arises from lamination defects that are characterized by low spatial frequency in a Fourier domain. These defects may be described, in some embodiments, as detachments of the APBF from the substrate, rather considerable in size (generally on the order or a millimeter or more in at least one dimension) and substantially distributed across the resulting laminate's field of view (FOV). Often these defects visually present themselves to an ordinary viewer as "stretch marks" in the laminated film. As a result of such sizeable, low spatial frequency blemishes within a rearview mirror, an image of the surrounding seen by the driver is at least distorted and may be significantly aberrated in the portions of the rearview mirror affected by the described shortcomings in the APBF lamination.

Figure 1:
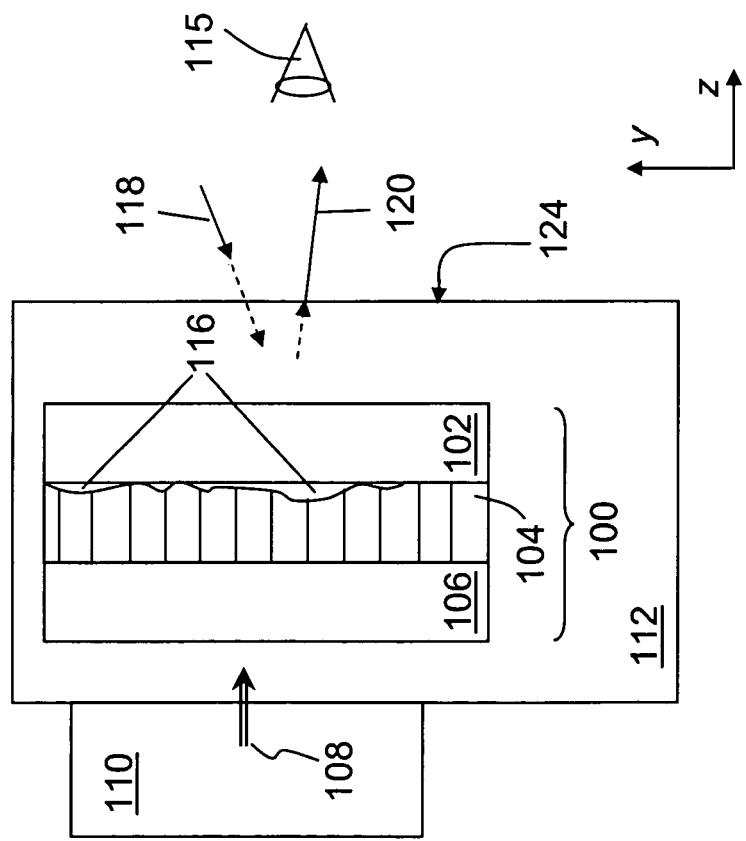
FIG. 1 schematically illustrates an automotive rearview mirror assembly with reduced optical quality resulting from a laminate that is fabricated conventionally and that is incorporated within the mirror.

FIG. 1 schematically illustrates an example of extended distortions in the context of a laminate 100 fabricated using conventional methods of lamination. The laminate 100 includes a substrate 102, a plastic film such as an APBF 104, and a cover plate 106 and might be intended to serve to optimize the transmission of light 108 generated by an optional display 110 through a mirror structure 112 towards the user 115. Any mirror structure 112 that incorporates a conventionally-fabricated APBF-laminate 100 generally has a reduced optical quality, regardless of whether the assembly includes the display 110 or not. Lamination defects 116 adversely affect the uniformity of reflectance across the FOV of the mirror structure 112.

Arrows 118 and 120 indicate light incident on a proximal, as observed by the viewer 115, side 124 of the mirror structure 112 and that reflected from the mirror structure, respectively. The mirror structure 112 (or, similarly, any other optical quality image-forming reflector) that includes an APBF-laminate 100, appears to have an uneven surface characterized by non-uniform and irregular low-spatial frequency waviness and extended distortions 116. An image formed in reflection from such a mirror appears, in turn, to be optically distorted, and, in the automotive context, the mirror structure 112 would be deficient in providing the driver 115 with an image of the scene behind the vehicle. An example of a reflector creating optical distortions that are prohibitive for automotive purposes is shown in FIG. 2. As shown, grid image 200 is observed in reflection, according to a specified visual evaluation test, by the front of a Nokia N76 phone display that contains a polymer-film based laminate. FIG. 2 demonstrates distinctive bending of lines and image warping perceivable by an ordinary observer. The reflector of such quality would not be acceptable for the intended use of an automotive rearview mirror, for example.

Exemplary Embodiments of a Method of the Invention

Figure 3:
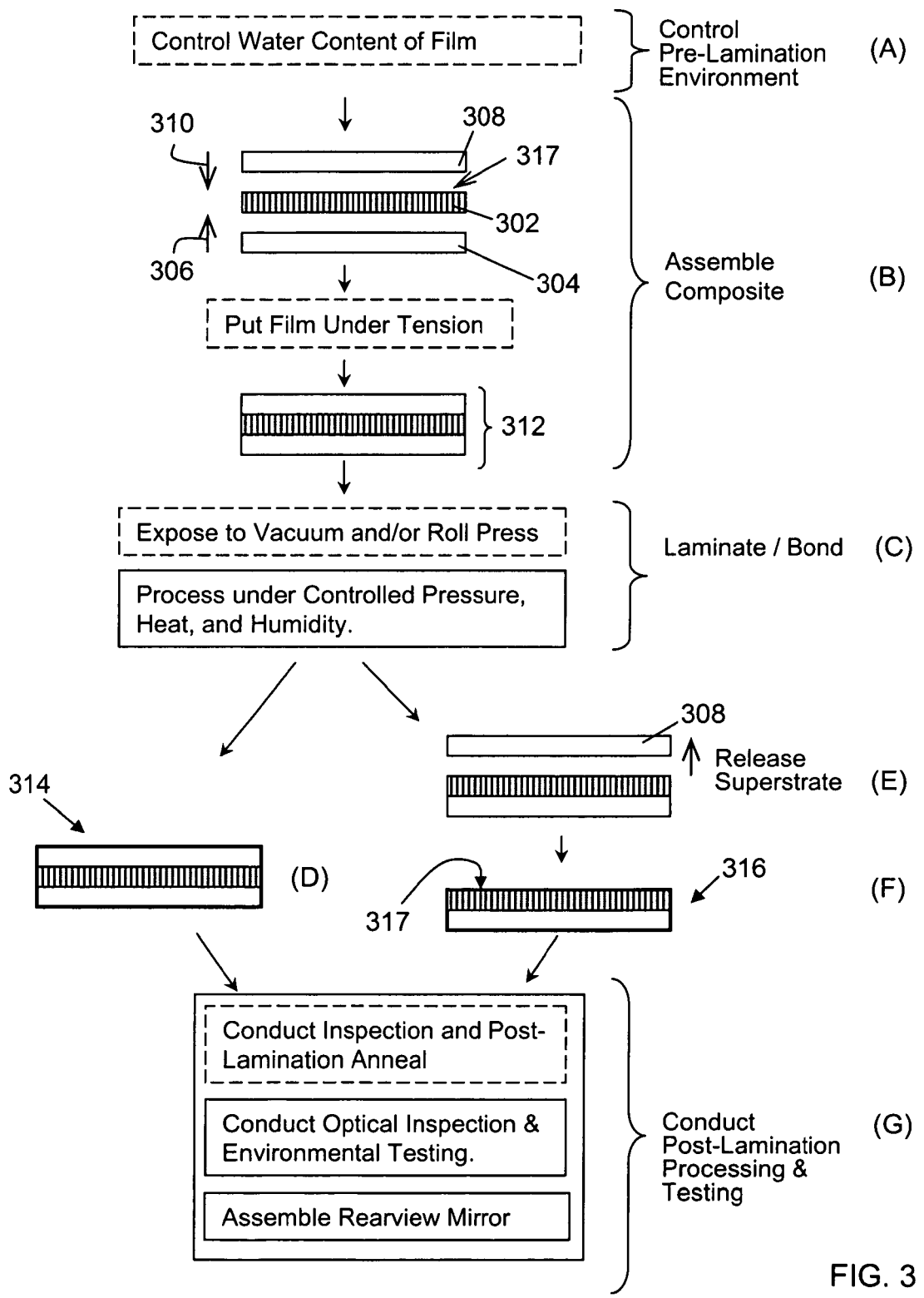
FIG. 3 is a flow-chart depicting steps of fabricating a laminate for use in an automotive rearview mirror assembly, in accordance with an embodiment of the invention.
Figure 7:
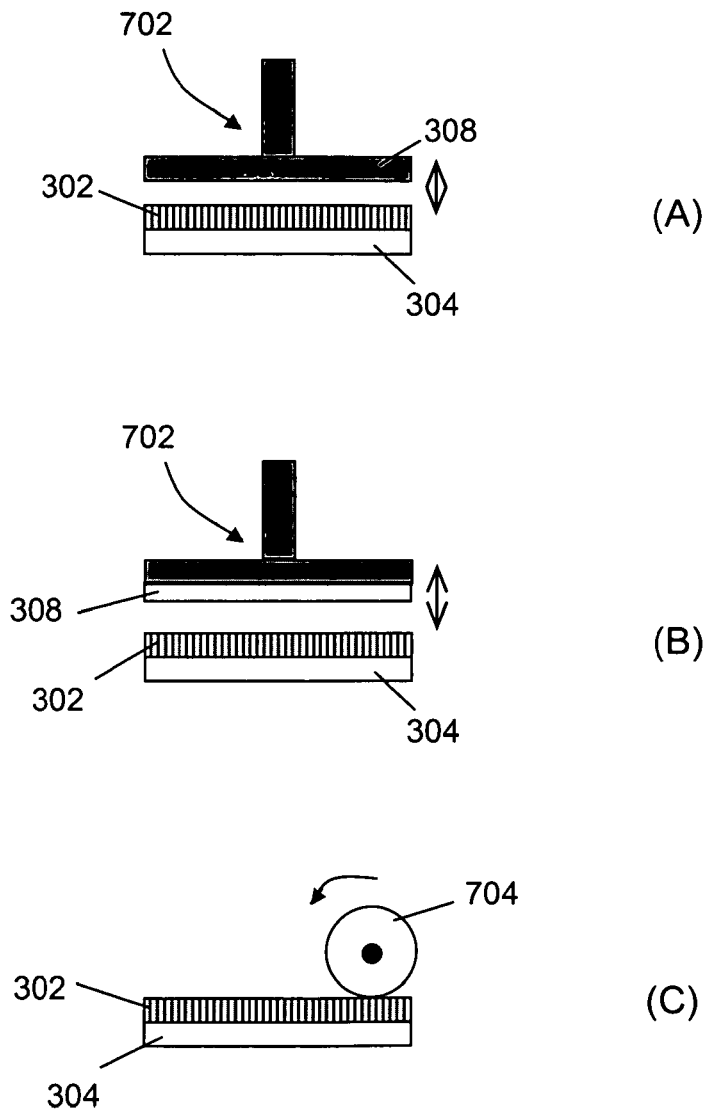
FIG. 7 shows auxiliary optional steps of the embodiment of the method of the invention illustrated in FIG. 3.

FIGS. 3 and 7 schematically illustrate embodiments of a lamination process of the invention. In accordance with one embodiment of the present invention, processing steps are provided for the manufacture of an image-preserving embodiment of this invention is now described with reference to FIGS. 3(A-G).

It was discovered that the ambient humidity at which the APBF is stored prior to the fabrication process and the humidity level maintained during the fabrication process may affect optical properties, structural stability, and durability of the embodiments of the resulting laminates. In particular, the elevated levels of humidity during the pre-processing storage generally led to increased haziness (and, therefore, to reduced transmittance and increased scatter of light) in the fabricated laminates after the durability testing. Therefore, optionally, an embodiment of the fabrication process of the invention includes a step of pre-lamination processing of the APBF (shown in a dashed line as step (A) in FIG. 3), during which the water content of the film is assured not to exceed a chosen level. Characterization of haze levels was conducted according to standards of the ASTM (American Society for Testing and Materials) and is discussed in more detail below. For a resulting laminate-containing embodiment of the invention to exhibit transmitted haze levels that are less than about 5% after the post-fabrication testing (such as testing at 96 hours at 105° C.), the employed APBF should preferably be stored, prior to the lamination process, at a temperature not exceeding about 40° C. and the relative humidity (RH) less than 95% for less than 8 hours, or conditions that lead to an equivalent water content change in the polymeric material. Similarly, in order to maintain haze levels below about 3% after the post-fabrication testing, the film should preferably be stored at less than 40° C. and less than 95% RH for periods less than 4 hours. Similarly, to reduce transmitted haze to below about 1% after the post-fabrication testing, the pre-processing storage temperature should preferably be lower than 25° C. and at RH should be lower levels of less than about 30%.

Alternatively or in addition, to keep a pre-lamination moisture content of the film within the preferred limits resulting in reduced haze of the final laminate, the APBF may be appropriately treated prior to the lamination process. Such treatment may include drying the APBF film under vacuum and elevated temperatures (approximately between 25° C. and 40° C.) for at least 4 hours. It shall be appreciated that measurements of moisture content in a given APBF can be carried out using different techniques. For example, a sample of DBEF-Q of a known area (e.g., dimensioned to match the full size of the rearview mirror substrate) may be precisely weighed and then subjected to particular storing conditions such as 40° C. at 95% RH, 40° C. in vacuum, or control ambient conditions (room temperature, open lab bench). The sample then may be precisely weighed at known time intervals (e.g., 2, 4, 8 hours) to determine the extent of weight gain or loss. The change in weight-% of moisture in the film is then determined from two weight measurements. The lamination processing and post-processing testing that follows allow for correlating various optical properties, including transmitted haze levels, of the laminate-containing embodiment of the invention with the determined initial levels of moisture content of the APBF. According to one embodiment of the invention it is preferred that the water content of the APBF prior to lamination be less than about 0.6 weight-%, more preferably less than about 0.4 weight-%, even more preferably less than 0.2 weight-%, and most preferably less than about 0.1 weight-%.

During the fabrication process, an optionally pre-treated at step (A) APBF 302, which may be about 100 μm thick, is disposed, at step (B) ("Assemble a Composite") of FIG. 3, on a surface of a substrate 304 as shown by an arrow 306. A superstrate 308 (also alternatively referred to herein as a cover plate) is then disposed over the APBF, which is indicated with an arrow 310, to form a composite 312. Although exemplary embodiments of FIG. 3 are discussed with reference to an APBF, it shall be understood that generally any other film may used for application to the substrate 304 with a purpose of fabricating a laminate that satisfies automotive image-forming requirements, as described below.

In a specific embodiment, the substrate may be made of optical quality glass or other materials suitable for use in an image-preserving reflector assembly and may be flat or have a selected curved shape. The configuration of the superstrate 308 may be substantially the same as that of the substrate 304, and surfaces of the substrate and superstrate may be conforming to each other. It should be realized, however, that overall dimensions of the substrate and superstrate are generally not required to be the same. In the context of rearview mirror assemblies, a component of the mirror system may perform as a substrate or a superstrate for a laminate. For example, the mirror element 2220 of FIG. 22 may be used as a substrate, and an additional lite of glass or appropriately chosen plastic (with optionally deposited optical coatings) may serve as a superstrate.

The polymer-based film 302 may be extruded or molded, or fabricated using other known methods, it may comprise a single layer (such as a layer of a low-density polyethylene, see, e.g., U.S. Pat. No. 5,631,089) or be a multi-layer film stack (such as a stack of alternating layers having high- and low refractive indices) some of the layers of which may be optically anisotropic (e.g., birefringent). For example, the film 302 may contain commercially available plastics such as acrylics, polycarbonates, silicone, polyester, polysulfone, polycyclic olefin, PVC, or the like having nominal indices of refraction from about 1.3 to about 1.8. The stack of layers with alternating refractive indices may be used to enhance the reflectance of light having a given polarization while simultaneously optimizing the transmittance of light having another polarization state. Such anisotropic layers may include, in one embodiment, a prismatically microstructured surface similar to that disclosed in U.S. Pat. No. 5,422,756 that facilitates the separation of the incident light into two components having orthogonal polarizations. In addition or alternatively, the film 302 may comprise a plurality of alternating polymeric layers of at least two types having, respectively, high and low refractive indices at one polarization and different high and low refractive indices at an orthogonal polarization. One example of such film, comprising alternating layers of crystalline naphthalene dicarboxylic acid polyester, was described in WO 95/17303. In yet another alternative embodiment, the multilayer polymer film 302 may comprise a layer that has a spatially oriented structure realized, for example, by stretching an otherwise isotropic polymer film in a chosen direction.

It should be noted that, to assure adequate flattening of the film 302 between the plates 304 and 308 at the step (B) of FIG. 3, the film may be optionally put under tension. For example, the film 302 may be uniformly stretched in radial directions at about 0.1 oz. to about 60 lbs per linear inch. In some embodiments, the preferred tension may be between about 1 and about 10 lbs per linear inch. In one embodiment, the initial application of the optionally stretched polymer-based film 302 onto the substrate can be complimented with using a soft press roll at a nip pressure of about 5 to 500 psi to assure that the film 302 conforms to the surface of the substrate 304.

During the "Laminate/Bond" step (C) of FIG. 3, heat, pressure, and optionally vacuum are applied to the composite 312. In general, the composite may be vacuum-bagged, evacuated, and autoclaved under pressure for time sufficient to bond the film 302 to at least the substrate 304 without forming spatially extended lamination defects described above and to form a substantially image-preserving laminated optical component. It was unexpectedly discovered that application of pressure to the surface of the composite at elevated temperatures, as discussed in the literature, may not be adequate for ironing out the imperfections and wrinkles from the film 302 for the purpose of producing a laminate possessing optical qualities that satisfy automotive industry standards. One possible solution to this problem is to apply substantially omnidirectional pressure (such as that attained in a pressure autoclave) to the laminate composite. Processing parameters and the resulting laminates are further discussed below. Following the application of heat and substantially omnidirectional pressure, the laminate is formed. In the embodiment 314 of the laminate of FIG. 3(D), for example, the polymer film 302 is shown to have adhered to both the substrate 304 and the superstrate 308. In a specific embodiment, no adhesive is used between the layers 302, 304, and 308 of the composite 312 during the lamination procedure. Although the presence of adhesive along a surface within the laminate structure does not change the principle of the method of the invention or the resultant construct/assembly, it was unexpectedly found that laminates formed with substantially no adhesive along at least one lamination interface between the plastic film and the cover plates tend to have higher probability of producing image-preserving rearview mirror assemblies of optical quality defined by automotive standards.

In a related embodiment, a superstrate portion 308 of the laminate may be removed, as shown at an optional step (E), "Release Superstrate", for example after the lamination has been complete but prior to the quality inspection step of the process of the invention. As shown in FIG. 3(F), the polymer-based portion 302 of the laminate 316, which resulted after a superstrate release, has an exposed surface 317. To facilitate a release of the superstrate 308 at the "Release Superstrate" step (E) of FIG. 3, the superstrate may be appropriately treated, prior to the "Assemble Composite" step (B) of FIG. 3, according to any method known in the art to prevent it from being permanently adhered with the film structure 302. For example, in reference to FIG. 3(A), a suitable film or coating (also referred to as a release layer) may be applied to the inner surface 318 of the superstrate 308 facilitating the removal of the superstrate and allowing for the APBF 302 to remain attached to the substrate 304. Alternatively, the inner surface 318 may be treated with a release-facilitating chemical agent such as, e.g., an alkylsilane, or any of the commercially available silicone or wax-based release agents. It has been discovered that these various release agents do not facilitate formation of visibly perceivable defects in the laminate and do not appreciably impede transmission of light through the laminate. In addition or alternatively, the surface 317 of the polymer-based film 302 may be similarly treated prior to the assembly of the composite. As a result, the superstrate 308 is releasably adhered to the film 302 and can be easily removed either manually or automatically.

To enhance adhesion of the DBEF or other APBF to a desired substrate or superstrate and to improve durability of the resulting laminate, the substrate and/or the superstrate is preferably cleaned (not shown) before the lamination process to remove contaminants which could interfere with adhesion and induce optical defects. Cleaning can be accomplished chemically using detergents, solvents, or etchants to remove gross contamination. In addition or alternatively, mechanical cleaning of a substrate may be employed using polishing compounds such as aluminum oxide or cerium oxide can be used to further prepare the substrate surface. In addition, at least one of the substrates and the polarizing film can be optionally pretreated (not shown) to enhance adhesion. Surface treatment such as with flame, ozone, corona plasma, or atmospheric plasma can be used to further clean and/or functionalize the surfaces to be bonded. Adhesion promoters or coupling agents such as organofunctional silanes, organotitanates, organozirconates, zircoaluminates, alkyl phosphates, metal organics or adhesion-promoting polymers can be deposited in a thin-film form using a variety of techniques. These promoters and coupling agents are used to bridge the interface between the inorganic and organic substrates and improve overall adhesion and resistance to humid environments. Examples of suitable adhesion promoters include Z-6011 silane (from Dow Corning) and Silquest A-1120 silane (from G.E. Silicones).

It shall be also understood that in an embodiment where the superstrate is removed (or released) and thus does not remain part of the laminate, the superstrate generally does not have to be made of a transparent material. In such embodiment, various superstrate materials can be suitably used such as, e.g., ceramics, metals, carbide, boron-nitride, fluorocarbon, phenolic, acetal or nylon. Moreover, in such embodiment, at the initial steps of fabrication of a laminate, the use of a superstrate 308 may not be required at all.

FIG. 7 illustrates some alternative embodiments pertaining to intermediate steps of fabrication of a laminate with and without a superstrate. As shown in FIG. 7(A), for example, an arm 702 of a pressing mechanism may be made of a material suitable for release from the polymer portion 302 of the laminate and is withdrawn after the bonding step of the process. Therefore, the arm 702 itself may perform as a superstrate 308 releasable from the laminate 316 of FIG. 3(E) during the laminate fabrication cycle. In comparison, as shown in FIG. 7(B), a superstrate 308 may be initially attached to the arm 702 and remain a bonded part of laminate 314, prior to being released. FIG. 7(C) illustrates fabrication of the embodiment of the laminate using a press-roll 704. As was mentioned above, in some embodiments, to assure that the quality of the laminate satisfies the imposed image-preserving requirements, applying omnidirectional pressure may be preferred to applying pressure otherwise. The lamination of the DBEF in an autoclave has been shown to assure processing conditions adequate to modify the optical quality of the DBEF for use as a high quality specular image-preserving reflector. The DBEF or other APBF itself can be optionally pre-processed prior to attachment to the mirror element. A web method for pre-processing the APBF for higher optical quality is to pass the APBF compressed between one or more pairs of rollers that may be optionally heated. This optional treatment facilitates flattening of the film and may be used in addition or as an alternative to stretching the film, as discussed above. The flattened APBF can then be laminated.

(1) Heat-Press Operation: An APBF-including composite (such as, e.g., the composite 312 of FIG. 3(B)) may be initially placed cold in a press and then heated under substantially omnidirectional pressure to a final processing temperature, in accordance with step (C) of FIG. 3. Generally, the applied pressure may be varied based on the processing temperature. By way of example, one embodiment may include a two-step processing, when a composite that is kept at some predetermined initial pressure may be heated to a preferred processing temperature at the first step. At the second step, once the preferred processing temperature has been reached and maintained, the pressure is ramped up as a chosen function of time. Alternatively, at the first step, the pressure applied to the composite may be ramped up as a chose function of time at a constant level of temperature, and then, at the second step, the temperature may be ramped up to a preferred operational level while the level of pressure is maintained. Alternatively, the composite may be first preheated to a fraction of the final processing temperature, then appropriately pressed and heated further to the final temperature. Various other options of changing temperature and/or pressure with time, simultaneously or separately, are contemplated as embodiments of the present invention. Optionally, the cover plates 304 and 308 and the APBF 302 may be first each preheated to some fraction of the final processing temperature, then assembled with an APBF into the composite 312, which is further exposed to pressure and heated to the final processing temperature. Optionally, the cover plates 304 and 308 and the APBF 302 may be heated to final processing temperature, then assembled into the composite and further exposed to the required pressure. If a press is used, the press anvil(s) may be flat or profiled and made of a compliant material and designed to apply force as required. In one example, a composite 312 of FIG. 3(B) was laminated with the use of a hydraulic press equipped with a heated bottom plate and a top plate having a silicone bladder. The bottom plate of the hydraulic press was preheated to 95° C. using a heat exchanger and re-circulated heat transfer fluid. Following the placement of the cold composite into the press cold and application of approximately 130 psi of pressure (as measured at the bladder, or approximately 1800 psi at the hydraulic ram), the composite was allowed to age 30 to 60 minutes. Samples produced in this manner exhibited acceptable optical properties and met durability requirements as described below.

(2) Oven/Roller System: The composite such as composite 312 of FIG. 3(B) may be placed in a cold oven, heated to the final processing temperature, and pressed in at least one roller press. Alternatively, at least one of the cover plates 304 and 308 may be preheated to a fraction of the final temperature, following which the composite with the APBF is assembled, then pressed in at least one roller press and heated to the final processing temperature. Optionally, the components of the composite may be heated to the final processing temperature, assembled into the composite, and the roll-pressed. Press rollers used may be flat or profiled to apply force as required.

(3) Sonic Heat Press and Inductive Heat Press provide alternative fabrication approaches. For example, heating at least one of the cover plates 304 and 308 and the film 302 during the lamination process may be accomplished ultrasonically. A sacrificial film (e.g., a film disposed between the APBF and an anvil in the embodiment of FIG. 7(B)) may be used to preserve the cosmetics or functionality of the APBF. Heating may also be accomplished inductively using the transparent conductive oxide (TCO) or metal films that are adjacent to the APBF and operate as the heating element to attain at least a fraction of the final processing temperature. For example, the components to be laminated may be conventionally preheated to some portion of the final temperature, then pressed and inductively heated. The inductive heating and pressing may be advantageous in allowing for selective sealing of the APBF to substrates that have conductive properties. The press anvil(s) used may be flat or profiled to apply force as required.

(4) RF-Lamination Press: Radio frequency (RF) lamination technology, such as FastFuse™ RF Glass Lamination Technology available from Ceralink Inc. (Troy, N.Y.), combines high-speed RF-heating with pressure to produce laminates and may be advantageously used to produce glass/plastic film laminates with potential time and energy savings. In practice, an APBF-including composite such as the composite 312 of FIG. 3(B) may be initially placed cold in a press and then heated using RF while simultaneously applying pressure. Specific temperature and pressure parameters of such embodiment are discussed elsewhere in this application. Various options of changing temperature and/or pressure with time, simultaneously or separately, are contemplated as embodiments of the present invention.

At a post-lamination processing step (G), shown in FIG. 3, the quality of embodiments of a fabricated laminate (such as the laminate 314 having an APBF sandwiched between two cladding elements or the laminate 316 having the film bonded to only one cladding element) may be verified visually or by using an appropriate measurement technique. For example, a wave-scan device from BYK-Gardner (see www.byk.com), such as the "wave-scan dual" may be readily adopted for measuring through the substrate or superstrate, the quality of the lamination interfaces. Defects in an interface formed by laminated or bonded surfaces may be characterized based on sizes of the lamination defects, with respect to if and how these defects affect the clarity of the image obtained in reflection from such interface. In particular, the BYK-Gardner measurement system uses a "short wave", or SW, designation for detected defect features having dimensions from about 0.1 mm to approximately 1.2 mm and a "long wave", or LW, designation for detected distortion features of 1.2 mm to approximately 12 mm in size. (Characterization in smaller dimension ranges is also possible). The values SW and LW are provided on a normalized scale from 0 to 100, where lower values correspond to smaller structural distortions and waviness of the laminated interface than higher values. Alternative metrics provided by the same wave-scan dual approach provide quantification of surface distortions on a more detailed spatial scale. These metrics, Wa, Wb, Wc, Wd and We quantify surface distortions with frequencies corresponding to 0.1 to 0.3 mm, 0.3 to 1.0 mm, 1 to 3 mm, 3 to 10 mm and 10 to 30 mm, respectively. Depending on the application, distortions on different length scales may be more or less noticeable and/or objectionable to the viewer. In the case of automotive mirror applications, surface undulations on the scale of less than about 3 mm are the most important, because these shorter-wavelength optical distortions are more disruptive to perceived reflective images as compared to the longer-wavelength distortions. Because the W metrics are more detailed than the SW and LW metrics, inclusion of the W readings (in particular the Wa, Wb and Wc readings) as additional or alternate metrics to quantify acceptable distortion may lead to a more complete set of criteria for determining acceptable distortion levels.

Using a "wave-dual scan" measurement technique and applying SW and LW metrics, it has been empirically found that a reflector may be suitable for most non-automotive applications if it is characterized by SW and LW values less than about 10, preferably less than about 7, more preferably less and 5, and most preferably less than 3. In contradistinction, image-preserving reflectors with intended use in rearview automotive mirror assemblies (including those containing laminated interfaces) should preferably be characterized by SW and LW values that are less than 3, more preferably less than 2, and most preferably less than 1. The alternative use of individual Wa, Wb and Wc metrics indicates, however, that, in order to have a mirror system with acceptable reflective properties, at least one of these W-metrics should be less than 7, more preferably less than 5, and most preferably less than 3. It is preferred, however, that more than one of these W-metrics be less than 7, more preferably less than 5, and most preferably less than 3. It is understood that various other optical techniques such as interferometric profilometry, or measuring of light scattering, or any other known in the art approach suitable for surface characterization may be alternatively used to describe the quality of the laminate fabricated according to an embodiment of the method of the invention.

As yet another alternative, the quality of the APBF-based laminates and mirror structures containing such laminates can be characterized with the use of ONDULO technology developed by Visiol Technologies (France) based on the principle of phase shifting deflectometry and commonly used in automotive industry for evaluation of visual defects occurring when two panels are bonded together. The goal of this non-contacting technique is to quantify the structural defects in inspected reflecting interface (whether curved or flat) based on distortions of the reflection of a fiducial object in that interface. Based on the evaluation of such distortions, the data are generated representing spatial derivatives of the slope of the surface of the reflector, and a conclusion of the type and distribution of structural defects in that reflector is obtained. The metric used for evaluation of the optical distortions with this technology is defined as "Curvature Units" (CU). The advantage of using the deflectometry approach is its high spatial resolution, the ability to recognize both isolated, point defects and extended defects, and a good correlation with visual tests. We have empirically found that image-preserving laminates with intended use in rearview automotive mirror assemblies should be characterized by CU values with moduli not exceeding approximately 0.04, preferably no exceeding 0.03, more preferably not exceeding 0.02, and most preferably not exceeding 0.01. An alternative technique for quantifying medium and small scale defects in an embodiment of a laminate of the invention may be based on a (local) measurement of a difference in optical powers of a flat reflecting surface and that of a flat reference surface, caused by the presence of structural defects in the reflecting surface. See, e.g., a description by ISRA Vision AG at www.isravision.com. In this technique, a set of fiducial lines is projected onto the tested reflecting surface, moved in front of the computerized line-scan detector that captures and analyzes the reflected image in comparison with a reference image. A conclusion about the surface defects is expressed in units of millidiopters of optical power of the surface under test. According to the embodiments of the present invention, image-preserving laminates with intended use in rearview automotive mirror assemblies and measured using ISRA approach are characterized by local optical power values of less than 1,000 millidiopters, more preferably less than 750 millidiopters, even more preferably less than 500 millidiopters, and most preferably less than 250 millidiopters.

The following discussion provides some examples of lamination processes and the resulting laminate structures, obtained according to the embodiments of the invention for the intended use in automotive rearview mirror assemblies. Generally, the temperature T selected to laminate an initial composite is within a range from about 50° C. to about 160° C., preferably between about 80° C. to about 150° C., and most preferably between about 90° C. to about 110° C. The levels of substantially omnidirectional pressure P chosen for lamination are between about 25 psi to about 2,500 psi, preferably from about 50 psi to about 500 psi, and most preferably from about 100 psi to about 400 psi. The weight content of water in an APBF to be laminated is maintained as discussed above. The lamination time can generally vary between about 1 and 600 minutes, preferably between 5 and 180 minutes and most preferably between 15 and 60 minutes. However, different processing parameters may be used, provided that the quality of the optically active, polarization-affecting layer of the APBF is not compromised. Optimal time, temperature, humidity, and pressure generally depend on the choice of materials used in fabricating the APBF and particular media used in an autoclave. In some embodiments, the use of liquid in an autoclave improves the uniformity of temperature across the composite and improves heat transfer.

In one embodiment, for example, a glass-plastic composite of about 55 mm by 75 mm in size was formed by sandwiching an APBF reflective polarizing film (from Nitto Denko corporation), having a thickness of about 2 mils and a pressure-sensitive adhesive on one of its sides between a 1.6 mm thick substrate and a 1.1 mm thick superstrate, with the film's adhesive side facing the superstrate. The laminating process included assembling a composite at preferred levels of water content in the film and vacuum bagging the composite, followed by autoclaving at the temperature of about 90° C. and a gauge pressure of about 200 psi for 1 hour. Both the visual image testing, as described above, and the wave-scan BYK-Gardner testing confirmed that the quality of the laminate was satisfactory for its intended purpose in the automotive rearview mirror assembly. In particular, the wave-scan measurement of the laminated glass-polymer interface through the substrate produced normalized averaged surface figures of about SW 0.4 and LW 0.8 for the first and the second dimensional ranges of features measured by the BYK-Gardner device. When an APBF has surfaces with different texture, it may be advantageous to form a laminate in such a fashion as to have this smoother side later on placed towards the observer in the overall rearview mirror system.

In further reference to FIGS. 3(A-G), we have discovered that, in order to facilitate a defect-free fabrication of a laminate containing the film 302 that is multi-layered, it may be preferred in some embodiments to have the cladding or adjacent layers of the multilayer film 302 comprise materials having different glass transition temperatures or other properties. In other words, prior to fabrication of an APBF-containing laminate, a targeted engineering of an APBF component may be required to improve at least one of adhesion and optical properties to obtain a laminate that is substantially free of extended distortions and that meets the environmental requirements and the requirements on the quality of optical image. In one embodiment, the APBF may include a three-layer or a multi-layer film structure with at least one core optically anisotropic layer having high $T_g$ (e.g., $T_{g,core}$~140° C.) that is sandwiched between two or more generally dissimilar cladding layers each of which has a corresponding different (e.g., lower, $T_{g, clad} < T_{g, core}$) glass transition temperature and different material and mechanical properties such as hardness. In forming the laminate composite with such multi-layered APBF structure, where the cladding layers are placed in contact with components serving as a substrate and a superstrate of the composite, the lamination process may be advanced in several ways. First, an appropriate choice of materials for cladding layers may assure that the core, anisotropic layer of the APBF is sufficiently flat and would not be crumpled between the glass plates during the lamination. In one embodiment of the present invention, the plastic-based cladding layers of the multi-layered APBF are chosen to possess a hardness value of at least Shore A 70, as measured with methods known in the prior art. In another embodiment, the hardness if at least Shore A 80 is preferred. Second, it was discovered that the lowest glass transition temperature (among the transition temperatures of the cladding layers) generally correlates with the preferred lowest suitable lamination temperature. Therefore, in one embodiment of the invention, during the lamination of a multi-layered APBF between a substrate and a superstrate such as those made of glass, the amount of heat applied to the composite of 312 of FIG. 3(B) could be defined, for example, by a temperature exceeding the lower limit of the applicable dynamic range of glass-transition temperatures. The optimal temperature for laminating a composite containing a multilayered APBF was found to be generally between a first temperature value (that is about 10° C. below the onset of the lowest temperature within the dynamic range of glass transition temperatures) and a second temperature value (that is about 10° C. higher than the highest temperature within the dynamic range). Multi-layered APBFs engineered for the purposes of laminates with intended use in automotive rearview mirror assemblies may be more complex. For example, a core, optically anisotropic layer of a multilayered APBF may itself include multiple isotropic and birefringent layers. Optionally, one of the cladding layers of the multi-layered APBF film structure may be a depolarizing layer employed to depolarize a portion of the display-generated light and/or the light reflected by the mirror assembly.

Figure 19:
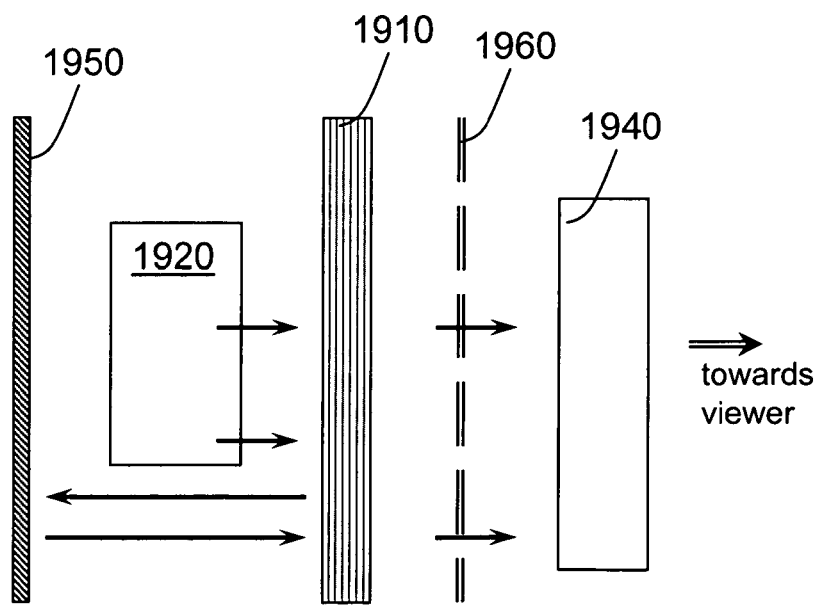
FIG. 19 provides an example of the use of a reflective polarizer combined with a depolarizer in a conventional display application.

A major effect of adding a depolarizing component to a reflective polarizer in a conventional application was considered in a prior art backlighting system, where a reflective polarizer was shown to enhance the perceived brightness of the LCD. To achieve such enhancement, the reflective polarizing film was placed between a light emitter and an LCD in such a fashion as to align polarization of light transmitted from the light emitter through the reflective polarizer with a direction required for optimal operation of the LCD. It will be realized that the addition of a depolarizing component to such a conventional backlighting system between the reflective polarizer and the LCD (i.e., on the other side of the RP as seen from the light emitter) reduces a degree of polarization otherwise resulting when only the reflective polarizing film is present. This situation is illustrated in FIG. 19. Indeed, in this case, polarization of light transmitted from the light emitter towards the LCD through a sequence of the reflective polarizer and depolarizer would be substantially randomized, and the overall backlighting display system would to an extent operate as if the combination of the reflective polarizer and depolarizer were not placed between the light emitter and the LCD at all. As shown, an RP 1910 is used to optimize transmission of unpolarized light from a light emitter 1920 through an LCD 1940 in a conventional display application by re-circulating a portion of the emitted light between the RP 1910 and a reflector 1950, positioned on the opposite sides of the light emitter 1920 in a fashion described in prior art. Here, the addition of a depolarizing component 1960 negates, to some extent, the benefit provided by the RP. In contradistinction with conventional applications such as the above-described backlighting application, the use of a combination of the RP and depolarizer in one embodiment of the invention provides certain advantages, as discussed below. Specifically, the resulting embodiment of a rearview mirror is not only characterized by optimized transmittance of light from the light source through the mirror system but it also performs in a fashion substantially unaffected by angle effects otherwise typically noticed by an image observer (such as a driver) wearing polarized glasses.

In a specific embodiment of the invention, at least one of the substrate and superstrate of the laminate may be made of plastic. The resulting laminate may be used, e.g., as a stand-alone component within the mirror system to provide an image-preserving rearview mirror satisfying the automotive standards. In this embodiment, plastic materials may be chosen to have corresponding glass transition temperatures exceeding the optimal temperature used in the lamination process. Examples of such materials are polycyclic olefin, polycarbonate, acrylic, polyimide, polyether-sulfone or epoxy. It shall be understood, however, that any other material suitable for use, in an image preserving reflector, as a substrate or a superstrate for a polymer-based film laminate can be used. In an embodiment where a superstrate of the laminate is not released, a component of the mirror system performing the role of the superstrate and positioned between the display and the reflective polarizer should preferably be formatted to not substantially depolarize light.

Once the lamination interface has been formed, it may be optionally protected (not shown in FIG. 3) from oxygen, water, or other contaminants by having the edge of the laminate sealed. If necessary, the film may be cut slightly smaller than the substrate and superstrate thus providing a notch therebetween for the sealing material to reside. Sealing may be accomplished with a variety of crosslinked materials such as moisture cured materials, thermoset or UV cured materials, preferably with materials having low curing temperatures. Silicones, epoxies, acrylates, urethanes, polysulfides provide but a few examples of such materials. Additionally, thermoplastic materials such as warm or hot melt polyamides, polyurethanes, polyolefins, butyl rubber, polyisobutylene and the like may be used for the purpose of sealing the laminate. Examples of suitable sealing materials include LP651/655 (from DELO, Germany) and the Eccoseal series of sealants (from Emerson & Cuming).

Exemplary Embodiments Utilizing a Prismatic Element or an EC-Element

Figure 4A:
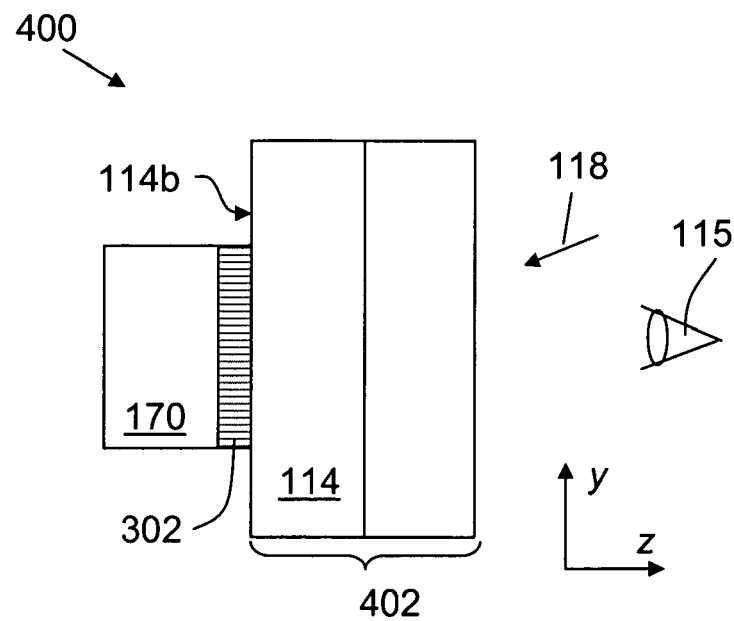
FIG. 4(A): an APBF is laminated in a rearview electrochromic mirror assembly.
Figure 4B:
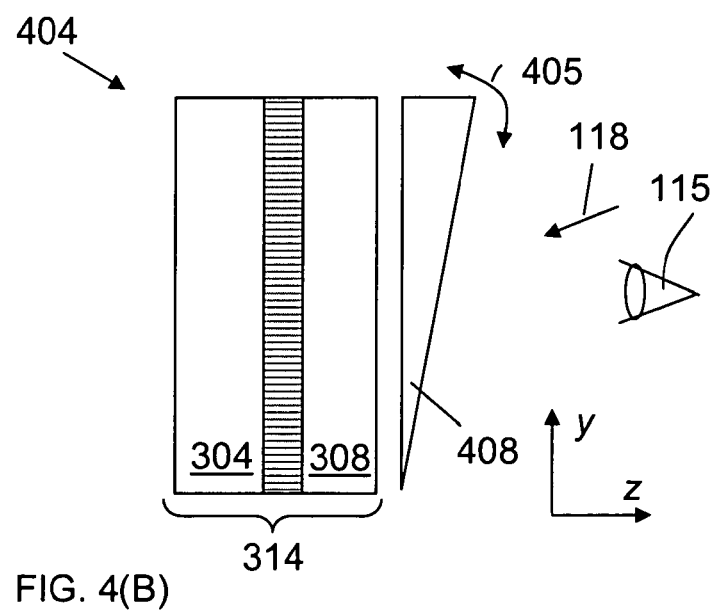
FIG. 4(B): an embodiment of the APBF-laminate is incorporated, as a stand-alone component, into a rearview tilt prism mirror assembly.
Figure 4C:
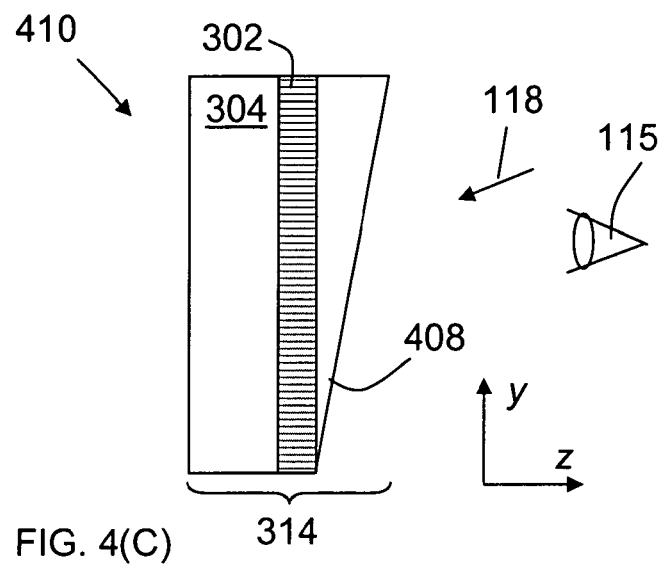
FIG. 4 schematically illustrates APBF-containing embodiments of rearview mirror assemblies of the invention.
FIG. 4(E): a display performs as a substrate of a laminate containing an APBF.
FIG. 4(H): an APBF-containing laminate is integrated in a mirror structure containing a wedge-shaped gap. Light source is not shown in FIGS. 4(B-D, F-H).

Embodiments of laminar structures provided by the process of the invention (e.g., the embodiments 314 and 316 of FIGS. 3(D) and 3(F), respectively) are useful in image-preserving and image-forming reflector assemblies such as rearview automotive mirrors, which form images substantially free of extended distortions because of the quality of the employed laminar structures. For example, as shown in an embodiment 400 of an electrochromic dimmable mirror assembly of FIG. 4(A), the APBF 302 is laminated to the embodiment 402 of an electrochromic element (discussed with reference to FIG. 7 of the commonly-assigned U.S. Pat. No. 7,009,751, the disclosure of which is incorporated herein in its entirety) between the rear surface 114b of the rear element 114 of the EC-element and the light source 170, which may be a backup display. In an alternative embodiment, however, a laminate of the invention can be advantageously used with other types of reflecting structures. As shown in FIG. 4(B), e.g., the laminate 314 of FIG. 3(D) may be employed as a stand-alone component within a non-dimming tilt prism-mirror structure 404 (including a stand-alone tilt prism element 408), behind which there may be optionally positioned an information display (not shown). Alternatively, a tilt prism element assembly 410 may incorporate an RP (APBF) element 302 that is laminated to one of the components of the tilt mirror itself, as shown in FIG. 4(C).

A) Specific Embodiments of a Switchable Mirror System Employing a Liquid-Crystal Cell and a Prismatic Mirror Element.

Figure 4D:
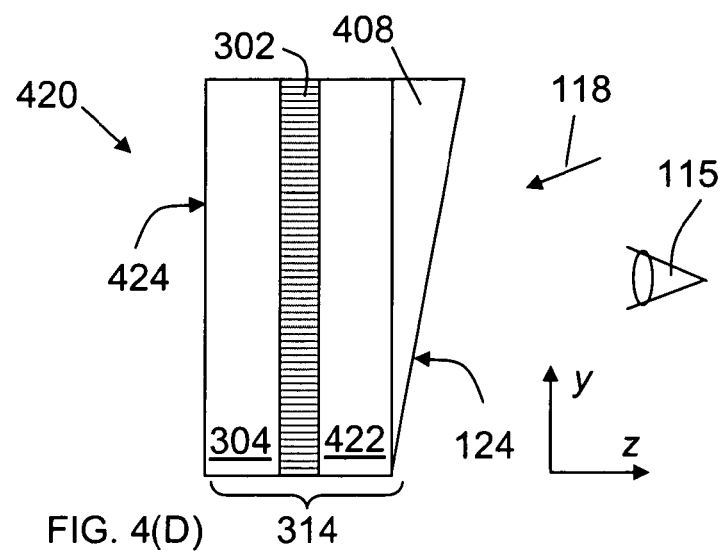

Furthermore, embodiments of the present invention may incorporate a "switchable" mirror system that utilizes an auxiliary LC-cell or device. Such switchable mirror system may operate at different levels of reflectance, transmittance, or both. Although such a switchable mirror may be configured to operate in either a high-reflectance or a low-reflectance state when the power to the LC-cell is off, it may be preferred to configure the switchable mirror system of the present invention to operate in the former mode. If this configuration is achieved, the mirror system will provide for and maintain the optimal rear-vision conditions when the system fails, that is when either the mirror system itself or a display behind the mirror system fails or loses power. As shown in an embodiment 420 FIG. 4(D), a liquid crystal cell or device 422 may be any LC-cell capable of modulating light (by, e.g., changing a polarization state of light through either rotation of polarization or absorption of light having a particular polarization). Examples of applicable LC-cells include a Twisted Nematic (TN) cell, a Super Twisted Nematic (STN) cell, a guest host or phase-change LC device incorporating a dichroic dye, a Ferroelectric LC device such as a smectic ferro-electric cell, a nematic Distortion of Aligned Phases (DAP) LC device. Any of these cells or, alternatively, one or more cells containing cholesteric material and used with or without a quarter-wave plate as described in a commonly assigned U.S. Pat. No. 7,502,156 can be placed in front of the RP (APBF) element 302 to modulate the ambient light 118 incident upon the proximal side 124 of and reflected by the mirror system 420 and/or light transmitted through the system 420 from a light source disposed behind the distal, with respect to the observer, side 424 of the system 420. In operation, this embodiment allows for switching the reflectance state of the mirror system from an intermediate state (of about 35% or above) or a high state (about 70% and above) to a level of reflectance of about 4% provided by only a first surface of the embodiment, by "flipping" the prism manually or automatically as done in vehicles currently equipped with prismatic rearview mirror assemblies. Although the embodiments of FIGS. 4(B) through 4(D) are shown as employing a prismatic mirror element, it will be appreciated that "switchable" mirror-system embodiments may also employ an auxiliary LC-device in a combination with a dimming mirror structure such as one containing an EC-element. Non-limiting examples of EC-element based embodiments of "switchable" mirror systems of the invention are further discussed below in reference to FIGS. 33 (A, B) and 34. It should be noted that, in a practical rearview mirror system, preservation of image quality and clarity and reduction of spurious reflections and double-imaging as viewed by the observer 115 dictates that a separation between any two highly reflective surfaces of the system be minimized. In embodiments of the invention such separation should be reduced to less than 2.5 mm, and preferably to less than 1, and most preferably to less than 0.5.

B) Embodiments Employing a Prismatic Mirror Element.

Figure 4E:
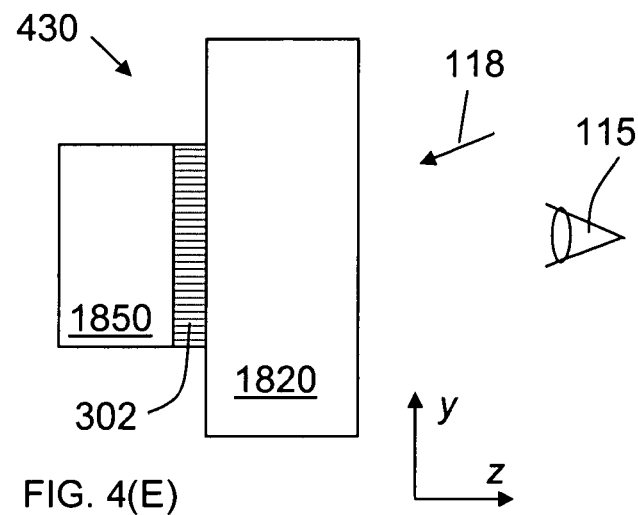

In a specific embodiment, schematically shown in FIG. 4(E), the RP 302 may be laminated directly to the LCD subassembly 1850 or some components of the LCD subassembly and then to the mirror element 1820 (which may include a prismatic optical element or an electrochromic element) so as to optimize the number of optical interfaces present and improve the overall reflectance and transmittance properties of the rearview mirror system. In another embodiment it may be useful to include an additional layer of PSA containing a UV-blocking agent, or a UV-blocking polymer film in front of an APBF, as seen by the observer. The addition of such UV attenuating agents or blockers may prevent visual degradation of the APBF and/or degradation of the integrity of the APBF-containing laminate. The implementation of such UV-blocking elements in embodiments of the invention is discussed in detail below. In embodiments where the APBF is located behind the electro-optic cell such as an EC-element or a cholesteric element, it is possible to dispose the UV-attenuating agents within the electro-optic cell. Cholesteric devices and EC-elements including these agents are taught, respectively, in a commonly assigned U.S. Pat. No. 5,798,057 and in commonly assigned U.S. Pat. No. 5,336,448 and U.S. Pat. No. 6,614,578, each of which is incorporated herein in its entirety.

Reflecting structures and assemblies such as rearview mirrors incorporating polymer-based films laminated according to the embodiment of the invention generally do not exhibit optical blemishes, are devoid of extended distortions, and do not produce image distortions that distract the viewer, as discussed above, thus preserving the quality of optical imaging within the requirements of automotive industry standards. Although embodiments of the invention are discussed in this application with respect to placing an APBF-containing laminate of the invention in particular locations within a rearview mirror assembly, it will be noted that, generally, positioning a laminate of the invention in other suitable locations is also contemplated. In one embodiment of the rearview mirror, e.g., an additional APBF-containing laminate may be disposed behind the display, as seen by the observer.

Figure 4F:
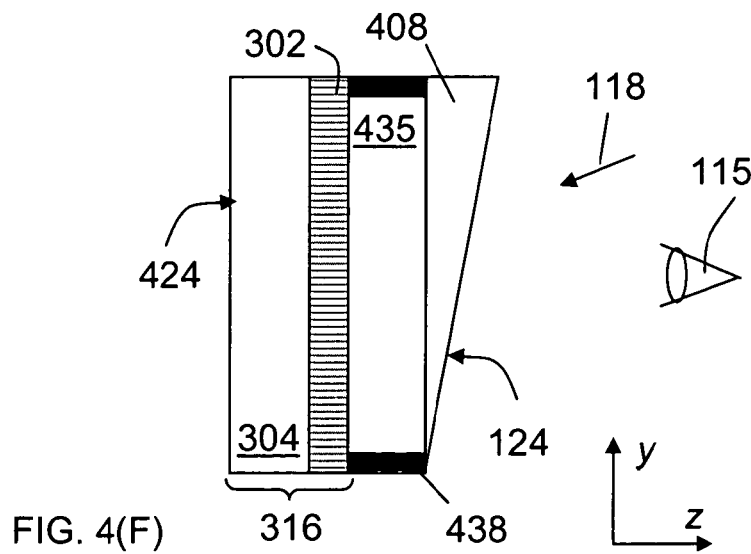
Figure 4G:
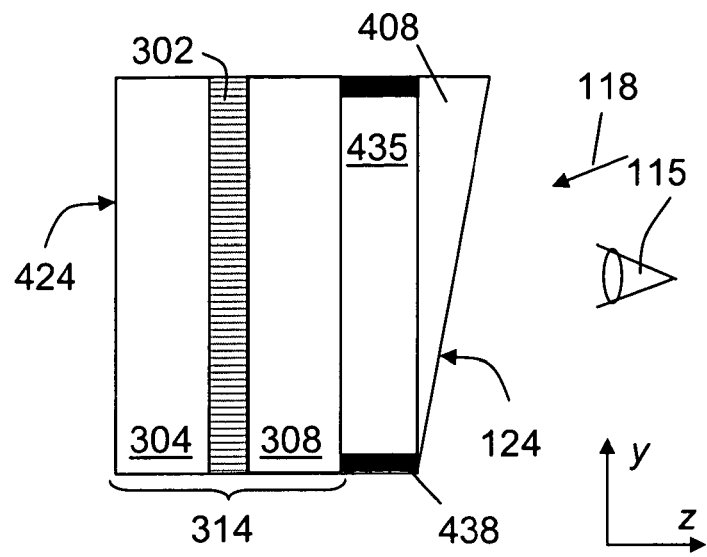
Figure 4H:
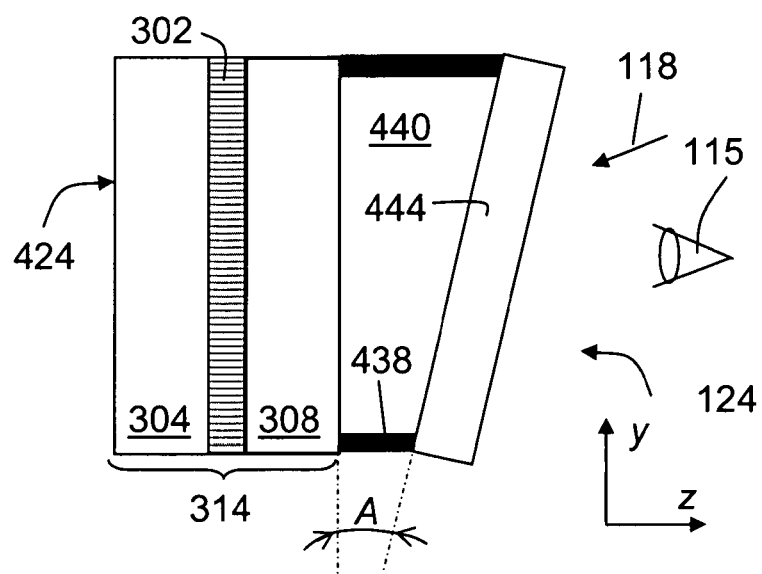

In a specific embodiment, an air gap or cavity can be formed between surfaces of the mirror system and later preferably sealed with a perimeter seal to avoid entrapment and/or condensation of vapors and dust. For example, a mirror assembly may include constructions such as [G/RP/air/G] or [G/RP/G/air/G/ITO/EC/ITO/G]. In these exemplary constructions, the components or media are listed starting with the one farthest from the viewer, the "air" denotes a cavity or a gap that may be defined by the perimeter seal and/or spacer disposed between the adjacent components separated from one another, "RP" refers to a layer of reflective polarizer such as APBF, for example, and "G" denotes a lite of glass or other suitable substrate material. FIGS. 4(F) through 4(H), schematically showing embodiments of a mirror assembly employing a prismatic mirror element, provide several non-limiting examples of such construction sequences. FIG. 4(F) illustrates a prism-based embodiment that relates to the embodiment of FIG. 4(C), but in which the prism 408 is spatially separated from a laminate 316 containing the RP 302 and the glass substrate 304 by an air-filled cavity 435 formed with the use of a perimeter seal and/or spacer 438 placed between the prism 408 and the RP 302. The corresponding construction sequence may be described as [G/RP/air/prism]. FIG. 4(G) provides an alternative embodiment including the air-gap 435, in which the laminate 314 is formed by sandwiching the RF 302 between two lites of glass 304, 308, as previously discussed. The corresponding construction sequence may be described as [G/RP/G/air/prism]. Shaping the air cavity 440 as a wedge, as shown in FIG. 4(H), provides an additional benefit of constructing an embodiment 442 of the mirror assembly with the use of only standard, off-the-shelf glass plates (304, 308, and 444). The sequence of components and media corresponding to the embodiment of FIG. 4(H) may be listed as [G/RP/G/prism-shaped air/G]. The wedge-shaped cavity 440 may be formed, for example, by disposing the laminate 314 and the plate 444 at an appropriate angle A and sealing the non-uniform peripheral gap along the edge of the plates 304 and 444 with a perimeter seal. It would be appreciated that any air-gap (including the wedge-shaped air-gap), once formed, may be filled with a clear adhesive material (such as urethane, silicone, epoxy, acrylic, PVB or equivalent materials), liquid (such as mineral oil, glycol, glycerin, plasticizer, propylene carbonate or the like), or gel, if desired. In constructing such prismatic mirror structures, supplemental transparent layer and opaque reflectance-enhancement layers can be applied to any substrate surface other than the surface closest to the viewer. Enhancement of reflectance characteristics of the embodiments of the invention is discussed below. The air cavity may be formed in other locations as desired, e.g., between the flattened reflective polarizer and a substrate element. In a related embodiment, the optically anisotropic film used in a laminate may be cast, coated or fabricated directly onto the optically flat substrate or glass and may not require further processing to achieve optical characteristics desired for use as a high quality mirror such as an automotive rear-view mirror. Any component used as a substrate or a superstrate for the APBF must possess optical quality to pass all optical requirements corresponding to the intended use of the final product. In contradistinction to the use of PVB in a windshield laminate, the unique reflecting qualities of the APBF do not compensate for the optical deficiencies of the substrate or superstrate surface adjacent to the APBF in present embodiments. Therefore the substrate and superstrate surfaces adjacent to the APBF, in general, must initially have acceptable optical properties for a given application. In particular, the quality of the glass surface in contact with APBF that is closer to the observer is more critical. In comparison, surfaces of an optical component that are not in contact with the APBF may have a different level of optical quality without the inducing unacceptable distortion characteristics into the finished assembly.

C) Embodiments Employing an EC-Element.

Figure 6:
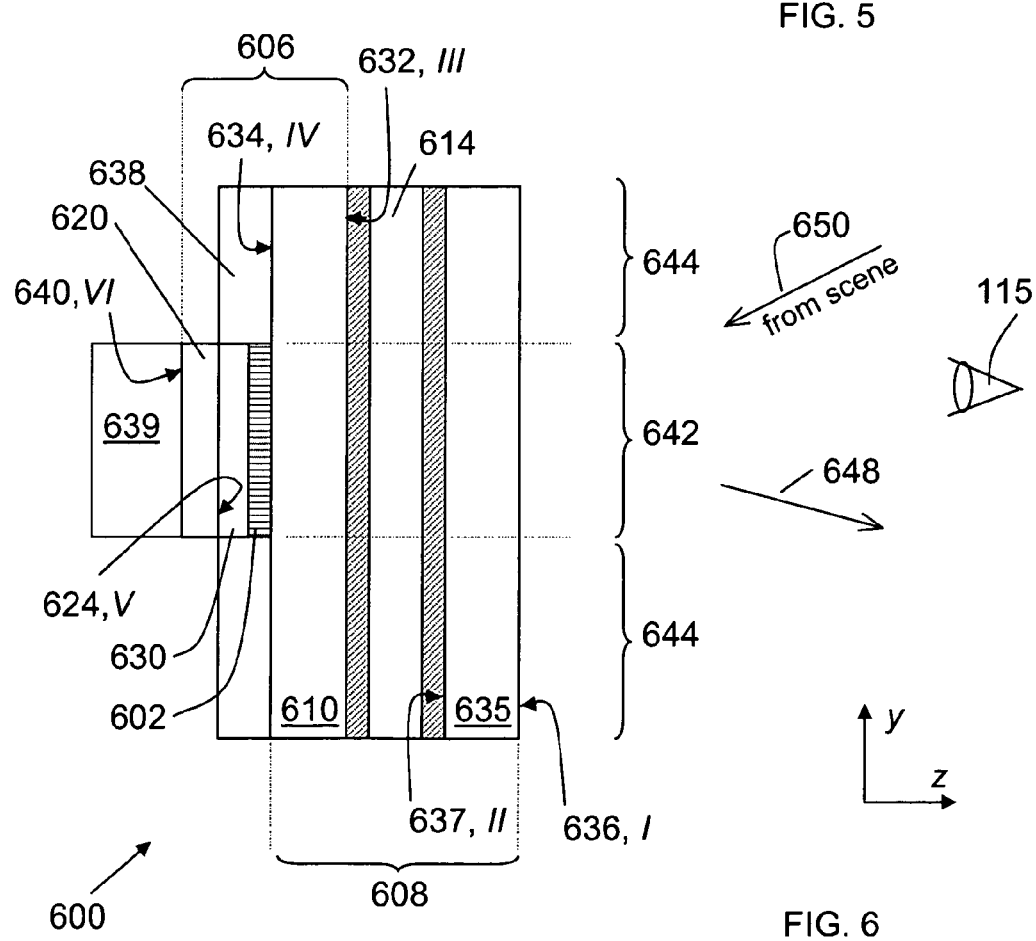
FIG. 6 presents a schematic cross-section of the embodiment of FIG. 5.

A simplified scheme, not to scale, of an embodiment 600 of the mirror assembly is shown in FIG. 6 in a cross-sectional view. The APBF film 602, which is a part of the laminate 606 shared with the EC-element 608, is a 5 mil thick DBEF-Q film manufactured by 3M Inc. A substrate 610 of the laminate 606 includes a 1.6 mm thick soda-lime glass plate performing as a back plate for an approximately 137 μm thick chamber 614 that contains EC-medium. A superstrate 620 of the laminate 606 includes a 1.6 mm soda-lime glass plate 620 that is overcoated, on the surface 624 facing the APBF film 602, with a thin-film stack 630 including, in the order of deposition, approximately 450 Å of titania, $TiO_2$, and approximately 150 Å of indium tin oxide, ITO. The chamber 614 containing the EC-medium is formed by the back glass plate 610 (having surfaces 632 and 634) and a front glass plate 635 (having surfaces 636 and 637). Each of the plates 610 and 635 is coated, on the respective surfaces 632 and 637 facing the chamber 614, with a transparent conductive coating such as ITO (the half-wave optical thickness of which may be chosen at a selected wavelength or as a mean value for a spectrum, for example). Some embodiments of the EC-chamber are discussed in a commonly assigned U.S. Pat. No. 6,166,848, which is incorporated herein by reference in its entirety. Another surface of the plate 610—surface 634—is coated, in the area outside of the laminate assembly as viewed along the z-axis, with a thin-film stack 638 comprising chromium-ruthenium-chromium layers, as described in U.S. Pat. No. 7,379,225. The various abovementioned thin-film layers can be fabricated by a variety of deposition techniques such as, for example, RF and DC sputtering, e-beam evaporation, chemical vapor deposition (CVD), electrodeposition, or other suitable deposition techniques. Embodiments of the invention are not limited to using a given deposition method for these or other thin film coatings.

As discussed above, the display subassembly shown in FIG. 6 as 639 and in FIG. 18 as 1850 may be optionally disposed behind the laminate 606 (i.e., adjacent to the surface 640 of the plate 620). In the following description, the display subassembly will be interchangeably labeled as either 639 or 1850. In such a case, the embodiment 600 may be viewed by the observer 115 as exhibiting three distinct areas: the transflective, "display" region 642, through which light generated by the display assembly may propagate through the laminate 606 and the EC-chamber towards the observer, and the outer, reflective region(s) 644 adjacent to the transflective region. As shown in FIG. 6, the APBF 602 covers only a display portion 642 of the mirror structure 600. In a related embodiment, the APBF 602 and/or the resulting laminate 606 may cover the full FOV of the mirror assembly, i.e. both the display zone 642 and an opaque zone 644. In such an embodiment, all of the surface 634 of the plate 610 may be laminated over with the APBF. Table 2 lists the relative color and brightness characteristics, according to CIELAB, for the display and opaque regions, 642 and 644, respectively, of the laminate-containing reflector described in reference to FIGS. 5 and 6. Display (transflective) area of the mirror system: $L^*=76.7$, $a^*=-2.7$, $b^*=-1.8$, reflectance (interchangeably referred to as Y or Cap Y)=51%, Opaque (non-display) area of the mirror system: $L^*=77.5$, $a^*=-2.3$, $b^*=1.1$, reflectance=52.5%.

TABLE 2

|  | Display Area | (Adjacent) Opaque Area |
|---|---|---|
| L* | 76.7 | 77.5 |
| a* | −2.7 | −2.3 |
| b* | −1.8 | 1.1 |
| Reflectance | 51% | 52.5% |

From the position of the observer 115, the surfaces 636, 637, 632, 634, 624, and 640 of the structural elements of the assembly such as glass plates are viewed as the first, the second, the third, the fourth, the fifth, and the sixth surfaces, respectively, and may be alternatively labeled with roman numerals as I, II, III, IV, V, and VI, as shown in FIG. 6, to indicate their position with respect to the observer. In this embodiment, surface I corresponds to a front, or proximal, side of the EC-mirror element 608 and surface IV corresponds to a rear, or distal, side of the EC-mirror element 608, with respect to the observer. Generally, the chosen surface numbering applies to any embodiment of the present invention. Specifically, surfaces of the structural elements (such as substrates) of an embodiment of the invention are numerically labeled starting with a surface that corresponds to the front portion of a rearview assembly and that is proximal to the observer.

The use of the APBF-containing laminate in conjunction with a light source in a rearview mirror assembly, for the purposes of increasing the effective brightness of the light source on the background of the ambient light, may be particularly advantageous when the employed light source generates polarized light that is preferentially transmitted by the APBF. Light sources emitting either partially or completely polarized light—such as displays equipped with an LED, or a laser diode, or an LCD—provide particularly suitable examples. When the display assembly 639 comprises an LCD, the front polarizer of the LCD may be replaced with the laminate of the invention. In an alternative embodiment, a substrate of the LCD, through which light exits the LCD, may be used as a superstrate for a laminate of the invention. In this case, a reflective polarizer included within the laminate of the invention may be used to transmit light having the first polarization and generated by the display located behind the laminate, and to reflect light having a second polarization that is orthogonal to the first polarization.

Figure 5:
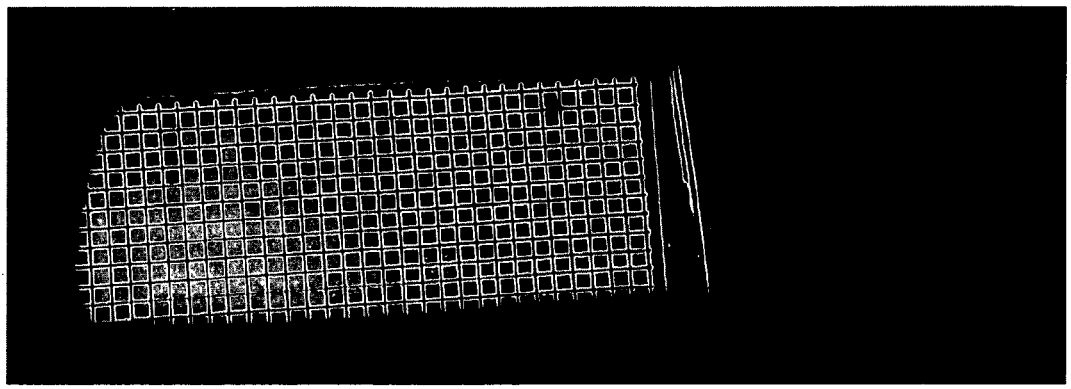
FIG. 5 is a photograph of an electrochromic mirror assembly comprising an embodiment of the laminate of the invention and forming an image of a reference grid object positioned behind the viewer.

Referring again to FIG. 6, a series of laminates 606 were fabricated using an embodiment of the process of the invention that included at least (i) vacuum bagging of the composite comprising the EC-element 608 (performing as a substrate), the APBF 602, and the superstrate 620 having the coating 630 on its inner surface 624, and (ii) autoclaving the composite at a temperature within a range from about 80° C. to about 110° C. and a gauge pressure of about 100 psi to about 400 psi for at least 15 minutes. Alternative ranges of processing parameters are discussed elsewhere in this application. The EC-element was fabricated according to the principles described in U.S. Pat. Nos. 5,818,625 and 6,870,656. The suitability of any of the resulting laminate-containing mirror structures for use in the automotive image-preserving reflectors is demonstrated in FIG. 5, showing a substantially distortion-free image of the etalon grid formed in reflection 648 of incoming light 650 by the embodiment 600 of FIG. 6. As discussed above, a successful visual evaluation test is defined by an image that is substantially free from image distortions. As shown in FIG. 5, the image is continuous across the full FOV of the embodiment 600, the FOV spanning both the display region 642 and the outer region(s) 644.

In another embodiment, small differences in hue and brightness of the image portions formed by the regions 642 and 644 of the element 600 may be used advantageously to allow easy visual location of the display in the "off" state.

The following examples, described with reference to FIGS. 8(A-J), illustrate advantages of using a reflective polarizer laminated, in accordance with embodiments of the present invention, within an automotive rearview mirror assembly that includes a display (an LCD, or otherwise) positioned behind the mirror system. Various data representing optical parameters of the system such as reflectance, transmittance, and absorbance are provided as eye-weighted values (i.e., for light centered at 550 nm). While the examples of mirror systems and assemblies discussed with reference to FIGS. 8(A, D-G) incorporate an electrochromic element and an LCD, it is understood that any other type of automotive mirror element—such as, e.g., a prism mirror element—can be utilized, and, similarly, that any other suitable type of display may be used. Discussion of light throughput from a display through a particular embodiment of the mirror system towards the user assumes the original luminance of the reference display, at the display output, to be 8,000 cd/m$^2$. This value is not limiting but chosen arbitrarily for the purposes of performance comparison among various embodiments.

Figure 8A:
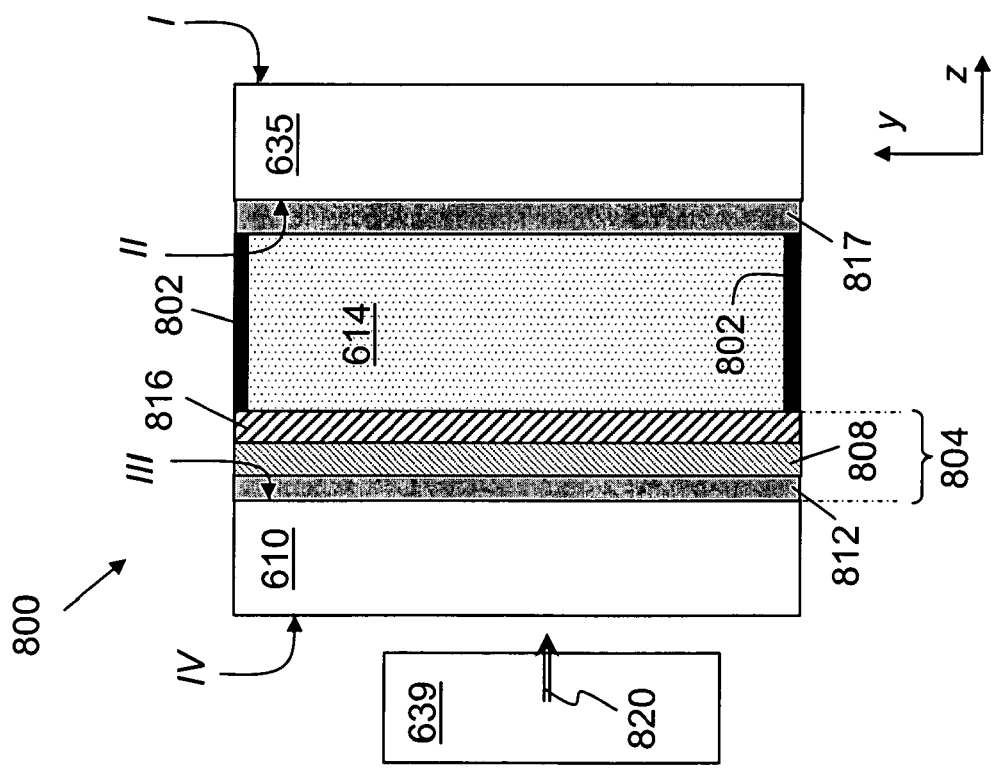
FIG. 8(A) shows a prior art embodiment.

FIG. 8(A) shows a prior art embodiment comprising an EC element 800 formed by EC-medium secured, within a chamber 614 formed by the first and second lites of glass (i.e., glass plates) 635 and 610, with a perimeter seal 802 made of a sealant such as epoxy. As shown, an approximately 145 μm thick ITO coating 817 is applied to the second surface (denoted as II, in accordance with the convention defined above) of the first lite of glass 635. The third surface (surface III, of the glass plate 610) is coated with a three-layer coating 804 consisting of a layer 812 of TiO$_2$ deposited directly on the second lite 610, an ITO coating 808 on the TiO$_2$ layer, and a layer 816 of a metal coating comprising an alloy of silver and gold, the concentration of gold being about 7 weight-%. Seal 802 may or may not be in physical contact with both glass plates 610 and 635. As shown, the seal 802 provides a bond between the coating 804 and 817. The thicknesses of the coating layers 808, 812, and 816 are adjusted to provide for the approximately 55% overall reflectance of the EC element 800. The overall transmittance of the EC-element 800, measured for unpolarized light, was in the range of about 29% to 33%. These reflectance and transmittance levels are selected to provide a generally suitable compromise between the display light output, reflectance intensity and ability to make the display components behind the mirror system to be unperceivable by the observer 115. The brightness of an LCD subassembly 639 (emitting light with luminance of about 8,000 cd/m$^2$ towards the EC element 800, as shown with an arrow 820) perceived by the observer 115 corresponds to the reduced luminance of about 2,000 cd/m$^2$ due to losses upon the propagation of the LCD-generated light 820 through the element 800.

In contradistinction with prior art and in accordance with the present invention, an embodiment of a laminate 828 containing a reflective polarizer 824 (e.g., an APBF manufactured by 3M, Inc.) may be advantageously incorporated within a rearview mirror assembly. As now described in reference to FIG. 8(B), the reflective polarizer 824 was laminated, according to an embodiment of the method of the invention, to a surface I of a single 1.6 mm thick lite of glass 826. A resulting transflective laminate 828 was characterized by the overall (unpolarized light) reflectance of about 51.1%, and the overall transmittance of about 46.5%, with the loss on absorption being about 2.4%. Since the absorbance of the glass plate 826 was about 0.7%, the absorbance of the reflective polarizer 824 was estimated to be about a 1.7%.

Figure 8C:
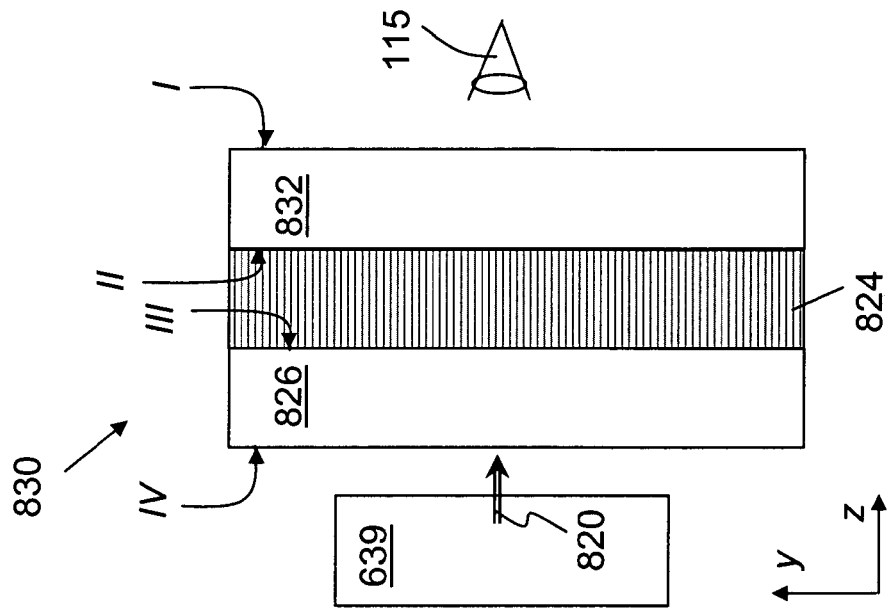
FIG. 8(C) illustrates an embodiment of an APBF-containing laminate including a superstrate.
Figure 8B:
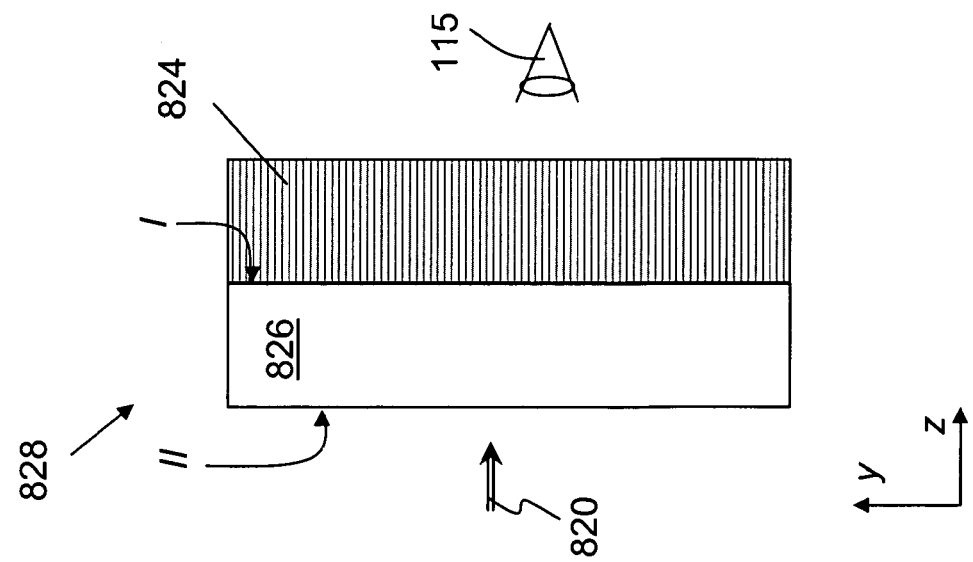
FIG. 8(B) illustrates an embodiment of an APBF-containing laminate without a superstrate.
Figure 8G:
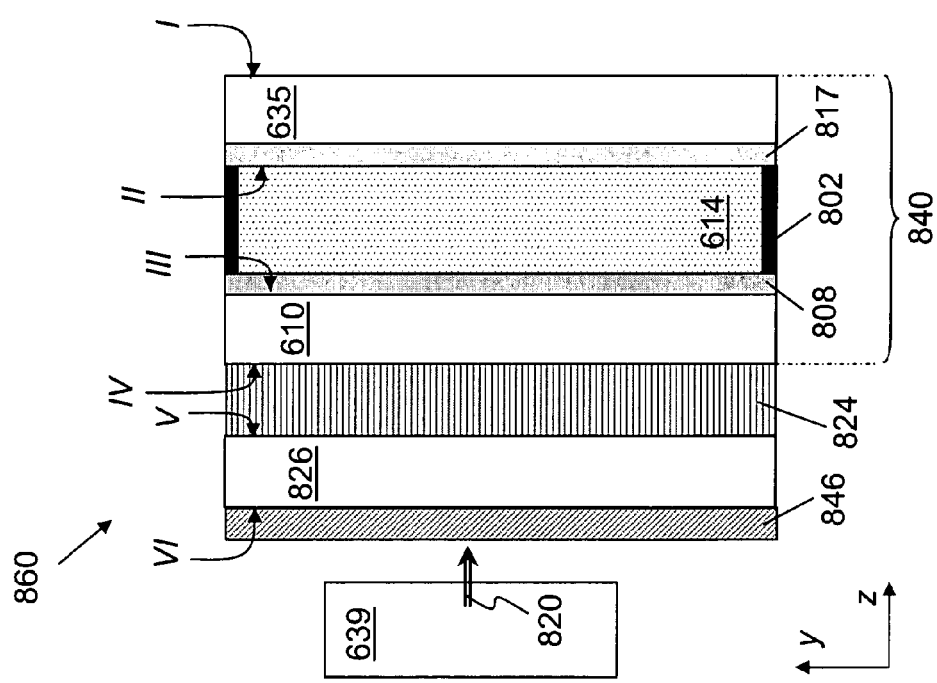
FIG. 8 shows reflecting structures pertaining to automotive rearview mirror assemblies.
FIG. 8(H) demonstrates a perspective view of another embodiment of the invention.
FIG. 8(I) shows another embodiment of the invention containing an APBF laminated between the EC-element and an additional lite of glass including a graded-thickness opacifying layer.
FIG. 8(J) shows an embodiment similar to the embodiment of FIG. 8(D) but including a stand-alone additional lite of glass with a graded-thickness opacifying layer disposed thereon.
Figure 8H:
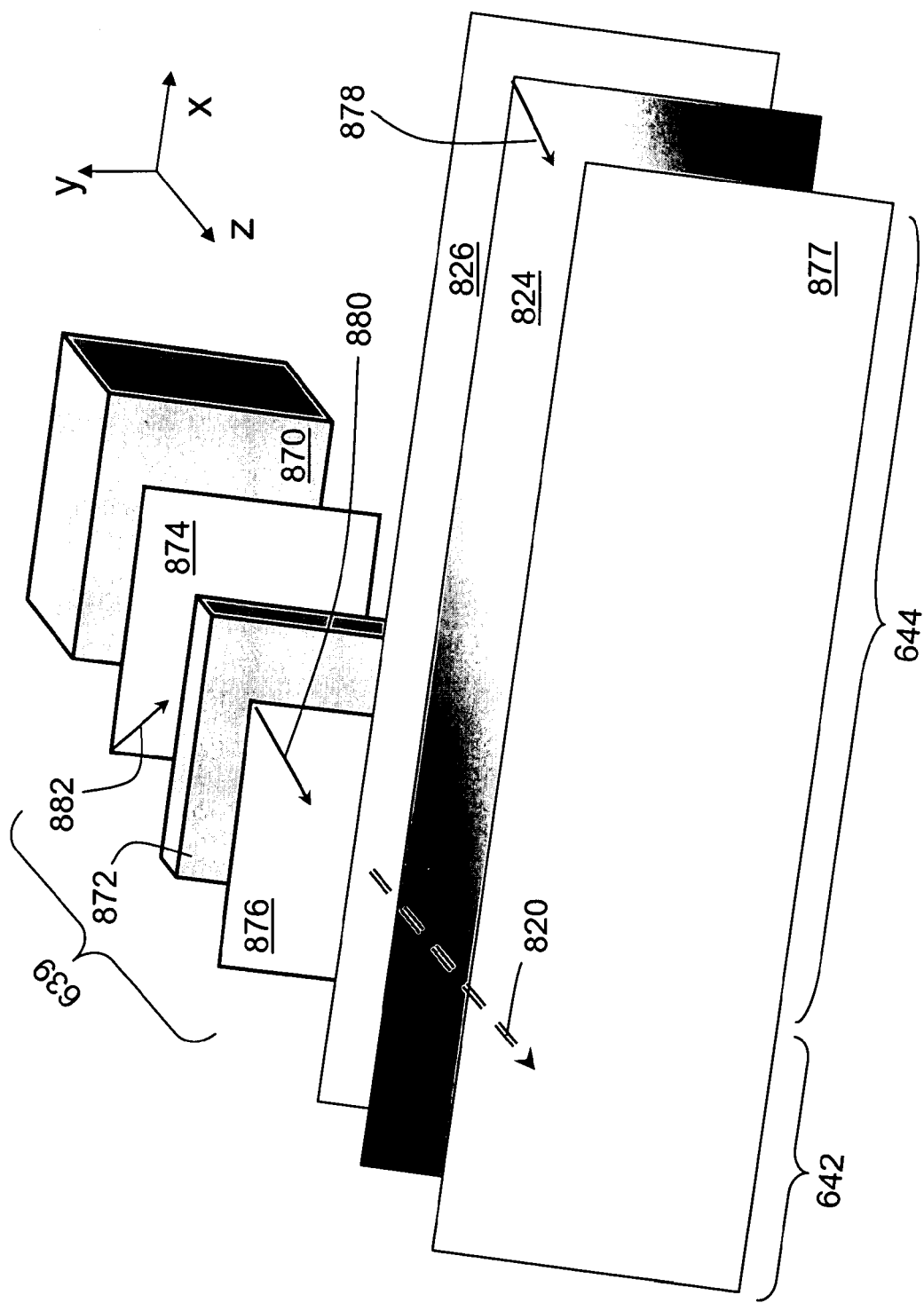
Figure 8J:
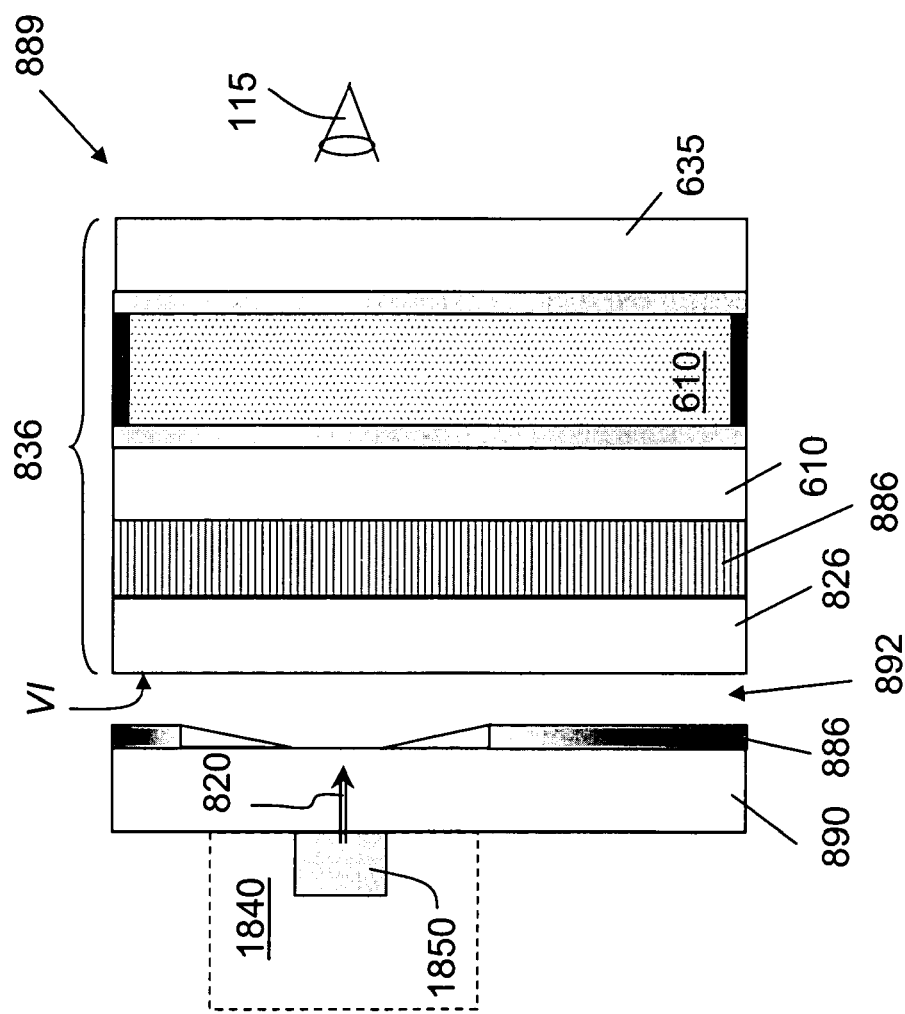
Figure 9A:
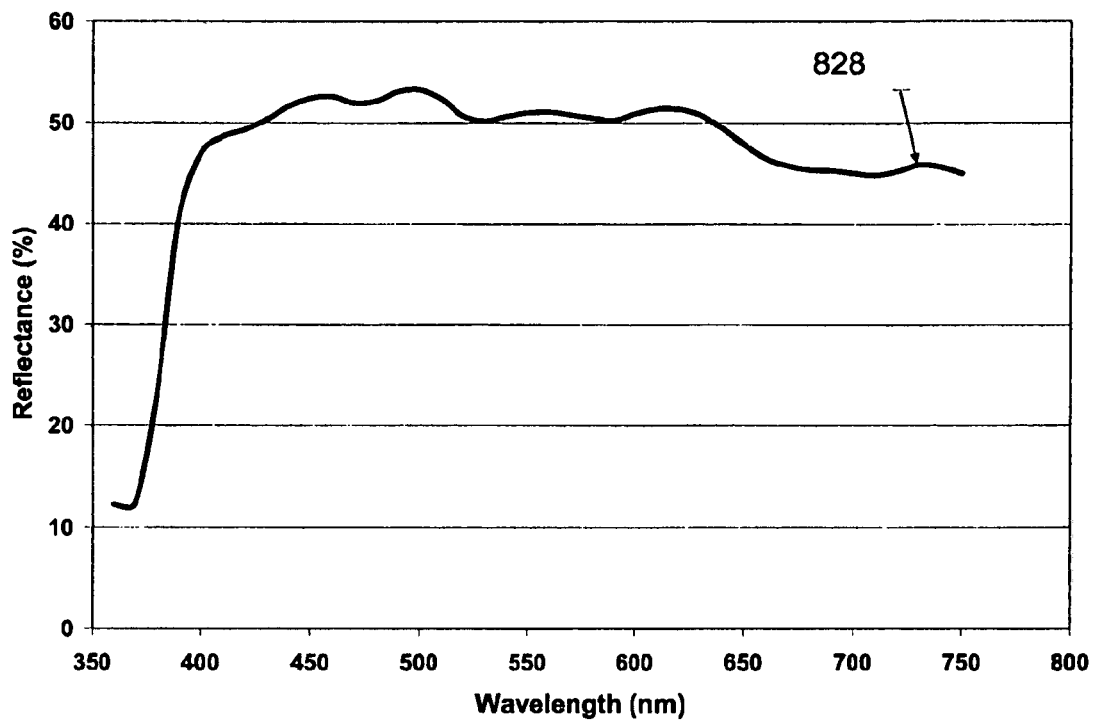
FIG. 9(A) shows a reflectance curve for the embodiment of FIG. 8(B).

FIG. 9(A) graphically presents a measured spectral dependence of the reflectance of the laminate 828 of FIG. 8(B). For the purposes of comparison, optical performance of the embodiment 828 of FIG. 8(B) was also calculated with a thin-film design program, using a thin-film stack of 145 alternating layers having refractive indices of 1.35 and 1.55 to simulate the APBF 824. The thickness of the layers was optimized via a Simplex algorithm so that the reflectance and transmittance matched the values measured with embodiment of FIG. 8(B). The values of transmittance and reflectance calculated based on the human eye's sensitivity, are 46.4% and 51.3%, respectively, demonstrating good agreement with empirical results discussed above. Specific birefringent properties of the APBF films of the embodiments of FIGS. 8(A) through 8(I) were not incorporated in the thin-film design model.

Figure 9B:
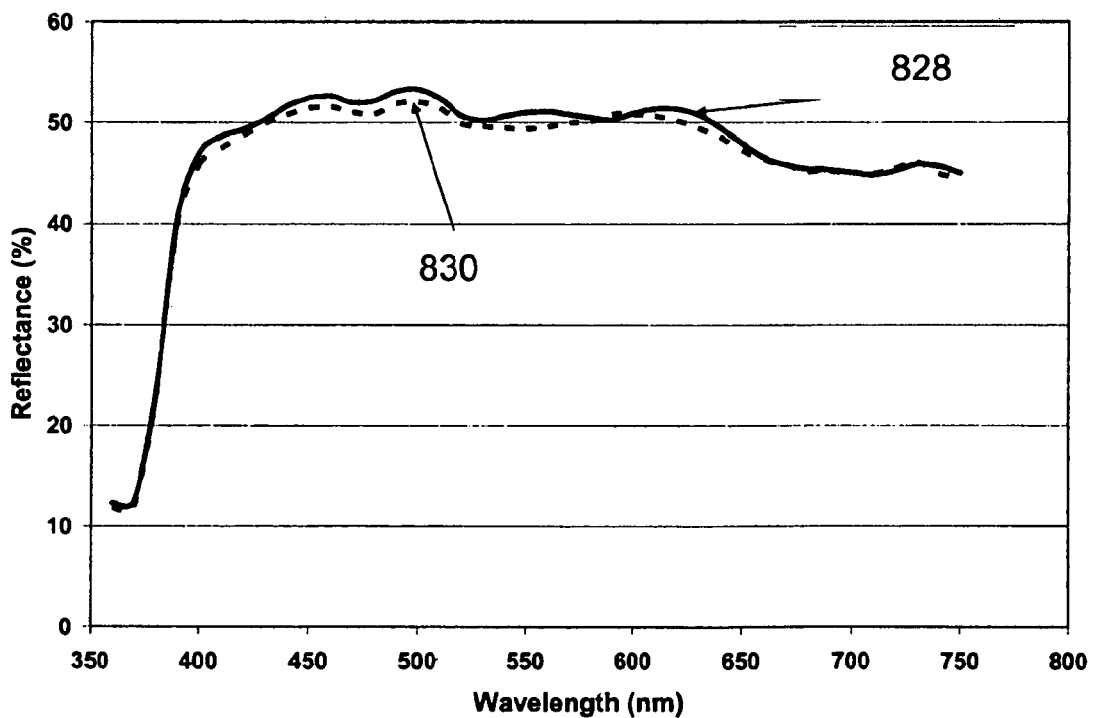
FIG. 9(B) shows reflectance curves for the embodiments of FIGS. 8(B, C).

Referring now to the embodiment 830 in FIG. 8(C), the APBF 824 is laminated to two lites of glass, 826 and 832, between surfaces II and III. The Y reflectance value was within a range of about 48% to about 51% and the Y transmittance value is within a range from about 47% to about 49%. Here, a portion of light 820 penetrating, through the plate 826 and the APBF 824, towards the glass plate 832, is reduced due to the high value of reflectance of the reflective polarizer 824. In comparison with the embodiment 828 of FIG. 8(B), the overall absorption of the embodiment 830 is higher by about 0.4%. The slight reduction of reflectance figure may be due to either variations in the properties of the APBF 824 or, alternatively, due to the change in refractive-index contrast at the APBF-surface facing the viewer 115. The modeling of the optical characteristics of the embodiment 830 resulted in values of about 44.1% and about 52.5% for the Y reflectance, the polarized transmittance (PT) value of about 89.5%, and transmittance of light having polarization orthogonal to that of the display-generated light of about 3.1%. The measured spectrum of overall reflectance of the embodiment 830 in comparison with that of the embodiment 828 of FIG. 8(B) is shown in FIG. 9(B) in dashed line.

Figure 9C:
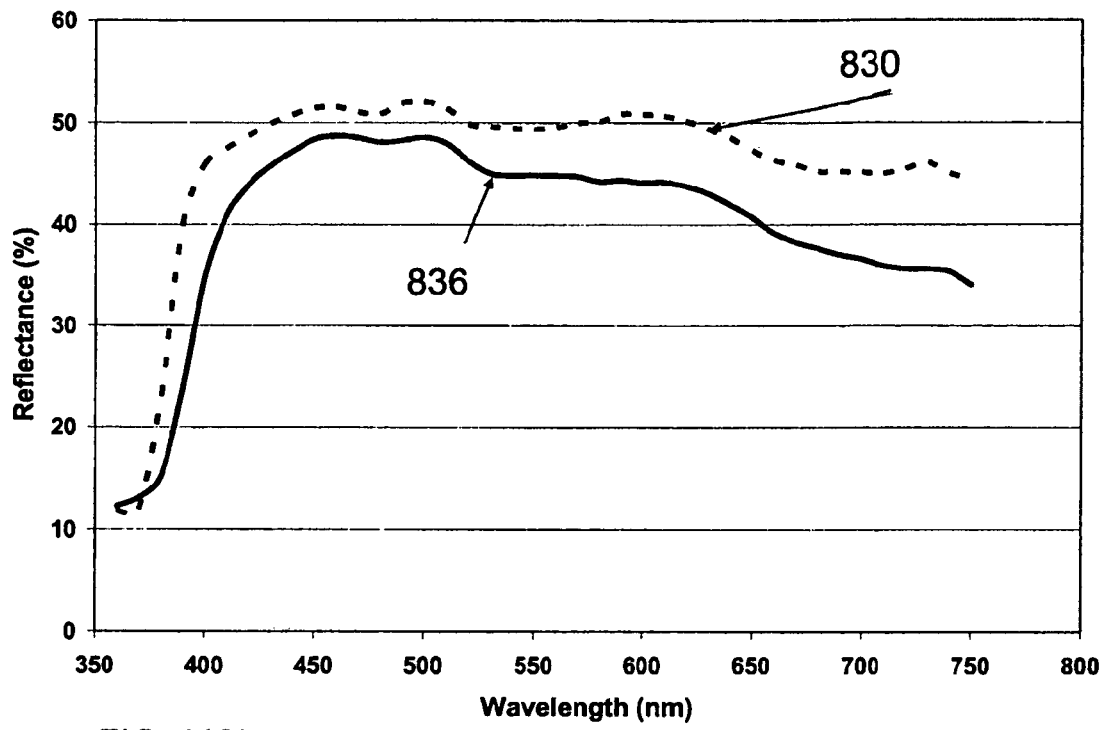
FIG. 9(C) shows reflectance curves for the embodiments of FIGS. 8(C,D).

FIG. 8(D) depicts an embodiment 836 of a rearview mirror assembly comprising an EC-element 840, which includes the two glass plates 610 and 635 that are appropriately overcoated, at surfaces II and III, with ITO layers and that form the EC-medium chamber 614, and the embodiment 828 of the laminate of FIG. 8(B), bonded to the surface IV of the glass plate 610. During the fabrication process, the EC-chamber 614 is formed by filling the gap between the plates 610 and 635 with an EC-medium and sealing it along the perimeter with an appropriate material such as epoxy. The reflective polarizer 824 is then laminated to the surface IV of the electrochromic element with the addition of a third lite of glass (i.e., plate 826). Alternatively, the reflective polarizer 824 may be first laminated between the lites 826 and 610, followed by the formation of the EC cavity 614 and the EC-element 840. Alternatively or in addition, the plate 826 may be made of plastic or other transparent material having suitable optical and physical properties. As described, therefore, the plate 610 may be viewed as a laminate substrate and the plate 826 may be viewed as a laminate superstrate. The overall reflectance and transmittance of this embodiment were measured to be within a range of 42% to about 48%, and within a range of about 41% to about 47%, respectively. In comparison with the above-discussed embodiments 828 and 830, the reflectance values are substantially reduced due to the absorption of light in the EC-element 840. Here, the overall absorbance of the embodiment 836 was about 9% to 11%. In the case of optimal orientation of the laminate 828 (corresponding to the situation when the transmission axis of the RP 824 is collinear with the polarization vector of linearly polarized light 820 generated by the LCD 639), the optimal transmittance for polarized light 820 (also referred to herein as the polarized transmittance value, PT) ranges from about 75% to about 85%, and that for light having the orthogonal polarization ranges from about 3% to about 5%. When the LCD subassembly 639 produces an output of 8,000 cd/m$^2$, the net effective luminance of the display perceived by the viewer 115 in transmission through the embodiment 836 is about 6,720 cd/m$^2$. The experimentally measured spectral distribution of the overall (unpolarized light) reflectance of the embodiment 836 is shown in FIG. 9(C) in a solid line, in comparison with that for embodiment 830 of FIG. 8(C), shown in a dashed line. The values of reflectance and transmittance for the embodiment 836 are about 47.2% and about 41.5%, respectively. The modeled absorbance is about 11.3%, which is similar to the experimentally obtained results.

In comparison to the embodiment 836 of FIG. 8(D), the embodiments of FIGS. 8(E-G) include supplementary coatings, added to increase the reflectance of corresponding mirror assemblies. An embodiment 844 of FIG. 8(E), for example, includes a bi-layer 846 consisting of a layer of TiO$_2$ and an ITO layer deposited, in that order, onto the surface IV of the lite of glass 610 prior to laminating the reflective polarizer 824. The bi-layer 846 is designed to be a thin-film structure with a predetermined thickness, e.g., a quarter-wave optical thickness at 550 nm. Any measure, taken to modify optical characteristics of the mirror structure at the reference wavelength, will affect the visually perceived performance of the structure such as the effective luminance of ambient light reflected by the mirror assembly to the user 115. The addition of the bi-layer 846 increases the overall (unpolarized light) reflectance to about 48% to 55% and decreases the transmittance to about 33% to 42%, in comparison with the embodiment 836. The transmittance, from the display 639 to the user 115, of light 820 with the preferred polarization is about 68% to 76% and that of light with orthogonal polarization is about 3% to 5%. The net throughput of the display-generate light through the embodiment 844 is about 5,930 cd/m$^2$, Comparing now the embodiment 850 of FIG. 8(F) to the embodiment 844 of FIG. 8(E), in the former the TiO$_2$/ITO bi-layer 846 is deposited on the surface V of the glass plate 826 prior to the lamination of the RP 824 between the glass plates 826 and 610. As a result, the overall reflectance of the assembly 850 is about 48% to 55%, which is similar to the reflectance of the embodiment 844 of FIG. 8(E). The overall (unpolarized light) transmittance, however, is decreased to about 33% to 42%. The transmittance value obtained for light of optimal polarization is about 68% to 76%, while that for light having an orthogonal polarization is about 3% to 5%. The net luminance, of the display-generated light, perceived by the user 115 through the embodiment 850, is about 5,460 cd/m$^2$. It appears, therefore, that in comparison with the embodiment 850, the major effect produced by reversing the order of the bi-layer 846 and the APBF 824 is the slight difference in the optimal transmittance of light having preferred polarization. This may be due to either the experimental variability in the measurement process or variations in the materials used in constructing the optical system.

Figure 9D:
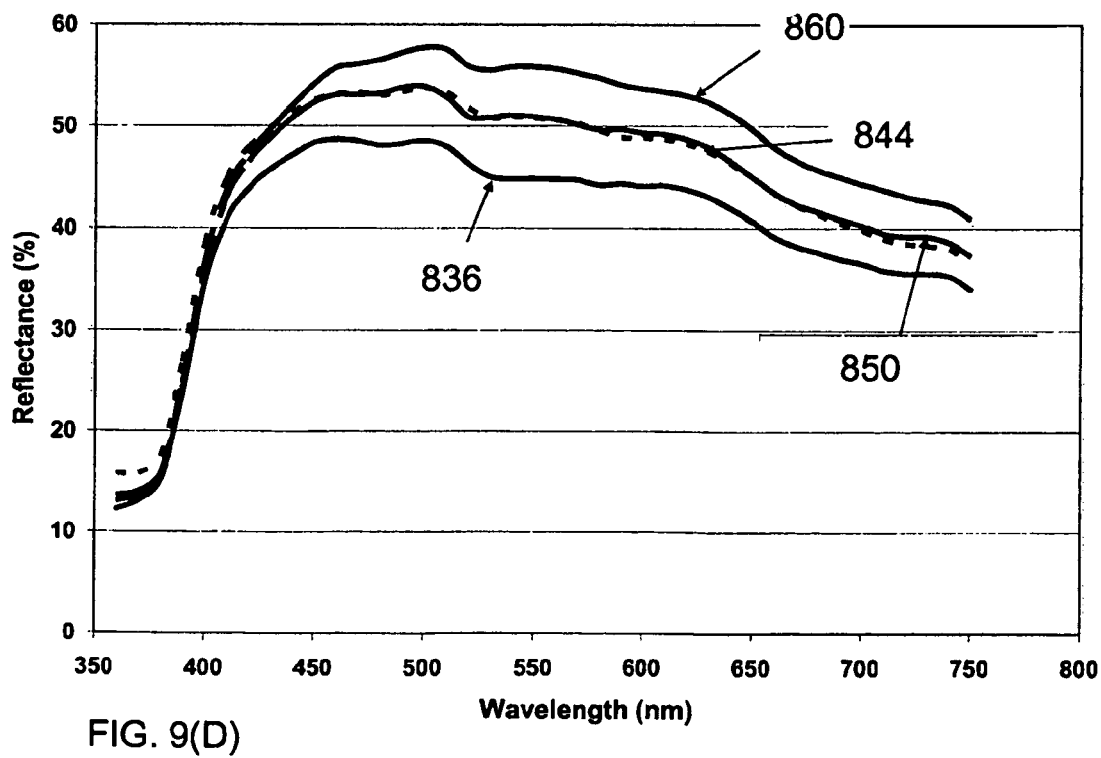
FIG. 9(D) shows reflectance curves for the embodiments of FIGS. 8(D-G).

In the embodiment 860 of FIG. 8(G), the TiO$_2$/ITO bi-layer 846 is disposed on surface VI of the glass plate 826. Such positioning of the layer 846 results in the overall (unpolarized light) reflectance of about 55.1%, while the overall (unpolarized light) transmittance is about 31.4%. The transmittance of light having the optimal polarization (i.e. polarized transmittance value, PT) is about 59.6% while the transmittance of light with the orthogonal polarization is 3.1%. The net throughput of the display light 820 through the embodiment 860 is about 4,770 cd/m². Comparison of the experimentally determined spectra for reflectance of the unpolarized light for embodiments of FIGS. 8(D-G) is presented in FIG. 9(D).

Figure 29A:
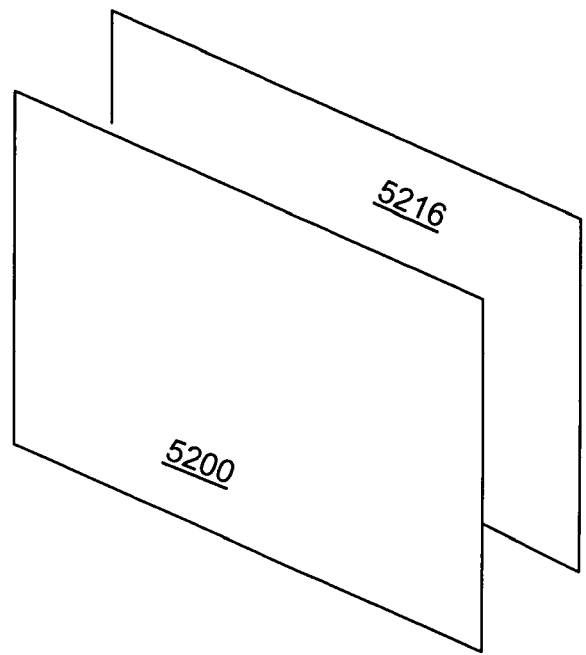
FIGS. 29(A,B) illustrate a concept of a full-mirror display.
Figure 29B:
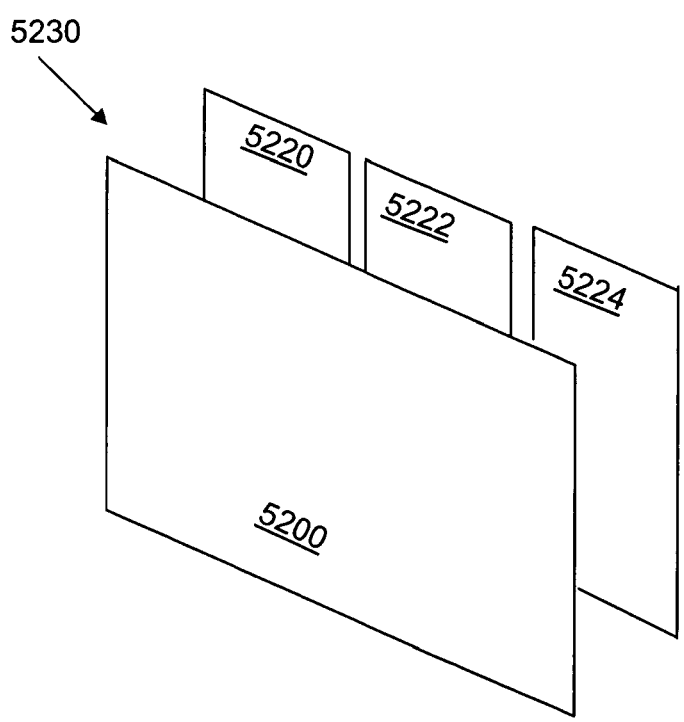

In another embodiment of the invention, schematically shown in FIG. 8(H) in an exploded view, the APBF 824 is laminated between the plate 826 and the EC-element 877, which are all disposed in front of the LCD 639 and a light engine 870. As shown, a conventional LCD 639 includes an LC-medium 872 sandwiched between two polarizers, an entrance polarizer 874 and an exit polarizer 876, and is smaller than the EC-element 877. As a result, the display area (transflective area) of this embodiment has a lesser lateral extent that that of the whole mirror system. It would be appreciated, however, that a concept of a "full-mirror" display, where a display or a plurality of displays located behind the mirror system overlaps, in projection onto the viewable surface of the mirror system, with most or all of this viewable surface, is also contemplated by the various embodiments of this invention. A particular shape of either the mirror system or a (group of) display(s) does not affect the underlying principle of the embodiment of the invention. Schematic examples of such display(s) forming a "full-mirror" group of displays, positioned behind a mirror system 5200, is shown in assembly embodiments 5210 and 5214 of FIGS. 29(A, B). In particular, FIG. 29(A) illustrates a single display 5216 that is substantially co-extensive with the viewable surface of the mirror system 5200, while FIG. 29(B) shows three discrete displays 5220, 5222, and 5224 forming a "full mirror" display within the assembly 5230.

If further reference to FIG. 8(H), optimization of light transmission from the light engine or light source 870 through the LCD 639 through the laminate 828 towards the EC-mirror system 877 may be achieved by orienting the APBF 824 so as to have its transmission axis 878 to be collinear with the transmission axis 880 of the exit polarizer 876 of the LCD. The transmission axis of the entrance polarizer 874 of the LCD is denoted as 882. (Optionally, the orientation of the polarizer 874 in the xy-plane may be changed if desired so as to rotate the axis 882 by a predetermined angle, e.g., ninety degrees, to change the display mode from "bright" to "dark.") In this "maximum transmission" orientation, the RP 824 transmits approximately 88.5% of polarized light 820 emanating from the LCD 639 generally in +z direction and reflects about 50% of the unpolarized ambient light (not shown) incident upon the laminate through the EC-element 877 back to the viewer 115 (not shown). In this case, the brightness of the LCD subassembly 639 having luminance of 8,000 cd/m² would be perceived by the viewer 115 as corresponding to about 7,080 cd/m². In a minimum transmission orientation of the RP 824 (corresponding to a setting in which the transmission axes 878 and 880 are substantially perpendicular, not shown) the transmission of light from the LCD 639 to the viewer 115 drops to about 3.8%. In contradistinction, the polarization-insensitive transflective elements of prior art, such as those comprising the embodiment of FIG. 8(A), would not be capable of simultaneously attaining the 88% transmittance and 50% reflectance. It is worth noting that, generally, a front polarizer 876 of the LCD 639 can be removed, in which case the properly oriented RP 824 can operate as the front polarizer of the LCD. In an embodiment of a display employing the absorptive polarizer the RP may be used instead of the absorptive polarizer. In this case, the extinction ratio, i.e., the ratio of intensities of light with two orthogonal polarizations, will affect the effective contrast ratio of the display. Preferably, the transmittance of light with the off-axis polarization state (the polarization state when the LCD is in the off position) should be less than 5%, preferably less than 2.5%, more preferably less than 1% and most preferably less than 0.5%. The lower transmittance values of the off-axis polarization state leads to images with darker "black" parts of the image.

D) Specific Embodiments of a Switchable Mirror System Employing a Liquid-Crystal Cell and an EC-Element.

Switchable mirror system (SMS) embodiments may employ various LC-cell-based devices such as, e.g., one or more cells containing a cholesteric LC-material, which manipulates (transmits and/or reflects) circularly polarized light and used with or without an additional quarter-wave plate. Embodiments may also employ a Twisted Nematic (TN) cell, a Super Twisted Nematic (STN) cell, a guest-host or phase-change LC device incorporating a dichroic dye, a Ferroelectric LC device such as a smectic ferro-electric cell, a nematic Distortion of Aligned Phases (DAP) LC device, an In-Plane Switching (IPS) device; an Optically Compensated Bend (OCB) device, or a Multi-Domain Vertical Alignment (MVA) device, which manipulate (transmit and/or reflect) linearly polarized light. Although the following embodiments of a switchable mirror system are described in reference to a TN LC-cell, it is appreciated that any of the above-mentioned devices can be generally used to provide for switchable operation of a mirror system. To reflect light of red/green/blue (RGB) colors in a particular circular polarization (right-handed, for example), three cholesteric LC-cells would be required. Therefore, it would require six cholesteric LC-cells to reflect RGB colors in both circular polarization. Broadband polychromatic Circularly polarized light can be reflected by a cholesteric cell containing a variable pitch medium, but because of the difficulty in forming the variable pitch difficulty, this technology has not been successfully commercialized. Cholesteric LC-based systems are, in addition, very temperature-sensitive because the cholesteric pitch length changes with temperature. This change results in a temperature-dependent shift in the wavelength of reflected light over as little as a 10 deg C. temperature range. Automotive mirrors, as well as architectural and aerospace windows must perform over a large temperature range (−40 deg C. to 80 deg C.), thereby making the use of cholesteric systems impractical for these applications. Therefore, devices that manipulate linearly polarized light (such as a TN LC-cell) are preferred.

Figure 33A:
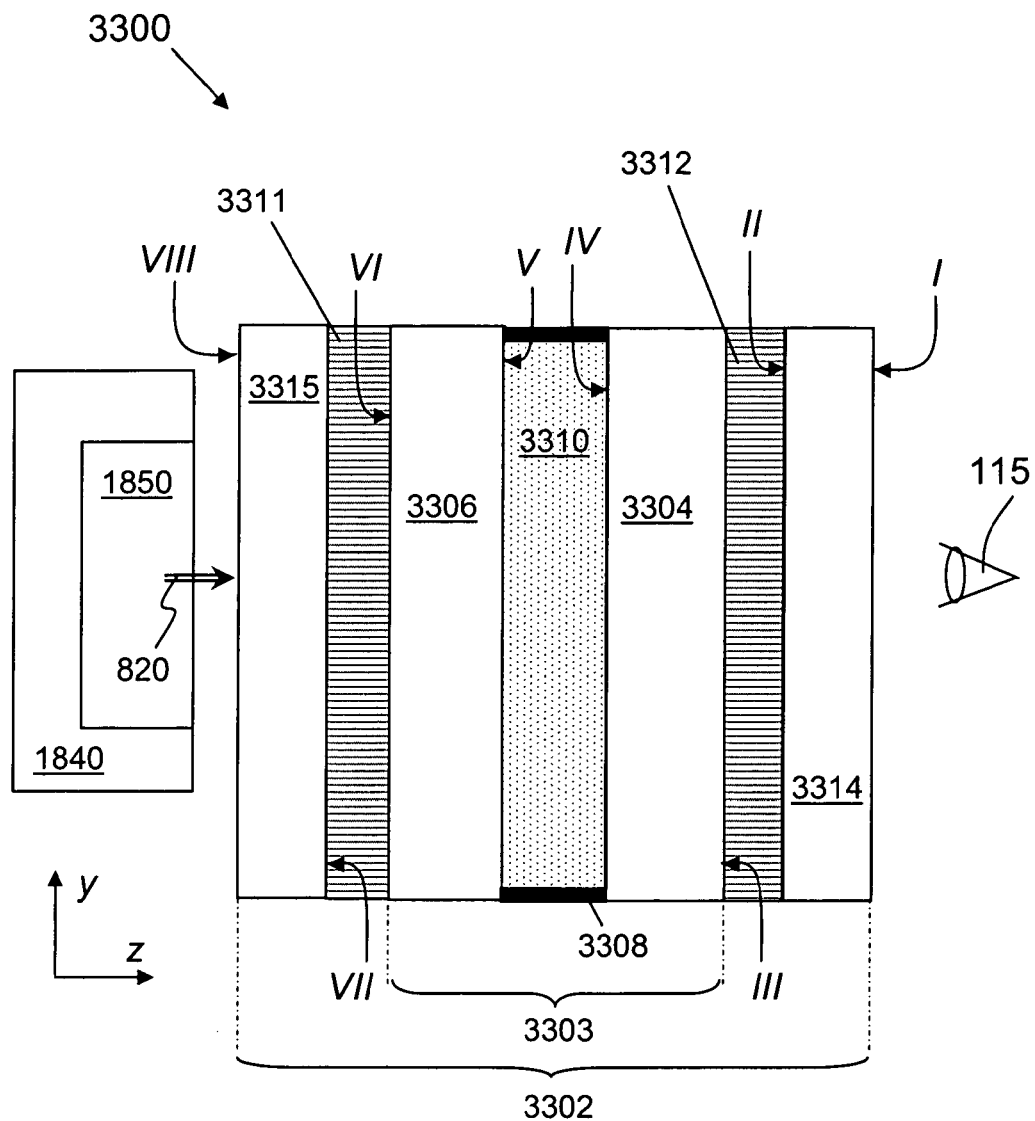
FIG. 33(A): two APBF-laminates are used.

For simplicity of illustrations, FIGS. 33(A,B) show no coatings such as transparent electrically conductive coatings or reflective or absorptive or other functional coatings such as alignment or passivation coatings of the embodiment that may be present on various surfaces of illustrated embodiments as described in reference to other drawings in the present application. Similarly, no auxiliary elements such as electrical connections between or among various layers, or mechanical components such as holders, clips, supporting plates, or elements of housing structure are depicted, although practical implementations of the discussed embodiments may contain all these features. Embodiment 3300 of FIG. 33(A) employs a switchable mirror system 3302 configured on the basis of an auxiliary TN LC-cell 3303 that includes substrates 3304 and 3306 and a seal 3308 encasing an LC-layer 3310. The embodiment further contains two APBF-based reflective polarizers 3311 and 3312 that are laminated between the LC-cell 3303 and a lite of glass 3314 and the LC cell 3303 and a lite of glass 3315, respectively, according to an embodiment of the method of the invention as described herein. As known in the art, the twisted nematic effect is based on the precisely controlled realignment of LC molecules between differently ordered molecular configuration under the action of an applied electric field. The LC-cell 3303 was configured so as to rotate by 90 degrees the polarization of light incident upon the cell when no voltage is applied to the cell (i.e., in the "off" state). In an actual structure fabricated according to the embodiment of FIG. 33(A), the linearly polarizing APBF-layers 3311 and 3312 were oriented so as to have their polarization axes mutually parallel. Accordingly, the resulting "off"-state reflectance and transmittance of the mirror system 3302 were measured to be 88% and 6%, respectively, for unpolarized light incident upon the system generally along the z-axis. The "off"-state characteristics of an embodiment 3302 of a switchable mirror system of the invention measured in unpolarized light may be generally referred to as "high reflectance/low transmittance" (or "high R/low T") state. When the LC-cell was energized ("on", with voltage applied), however, the LC-cell 3302 did not rotate polarization of light incident upon the cell, and characteristics of the mirror system 3302 measured in unpolarized light included 50% reflectance and 41% transmittance. The "on"-state characteristics measured in unpolarized light may be referred to as "mid R/high T" state. The same system 3302 was also characterized in polarized light 820 emanating from the display 1850. Provided that the operation of the embodiment was optimized, namely, that polarization of light 820 emanating from the LCD 1850 towards the viewer 115 was aligned with the polarization axes of the APBFs 3311 and 3312, such polarized light throughput of the mirror system 3302 from the LCD 150 towards the viewer 115 in the "on" state of the LC-cell was measured to be 76%. It is understood that, in practice, an additional EC-element or a prism element may be optionally employed in front of this embodiment, as viewed by the viewer 115.

Figure 33B:
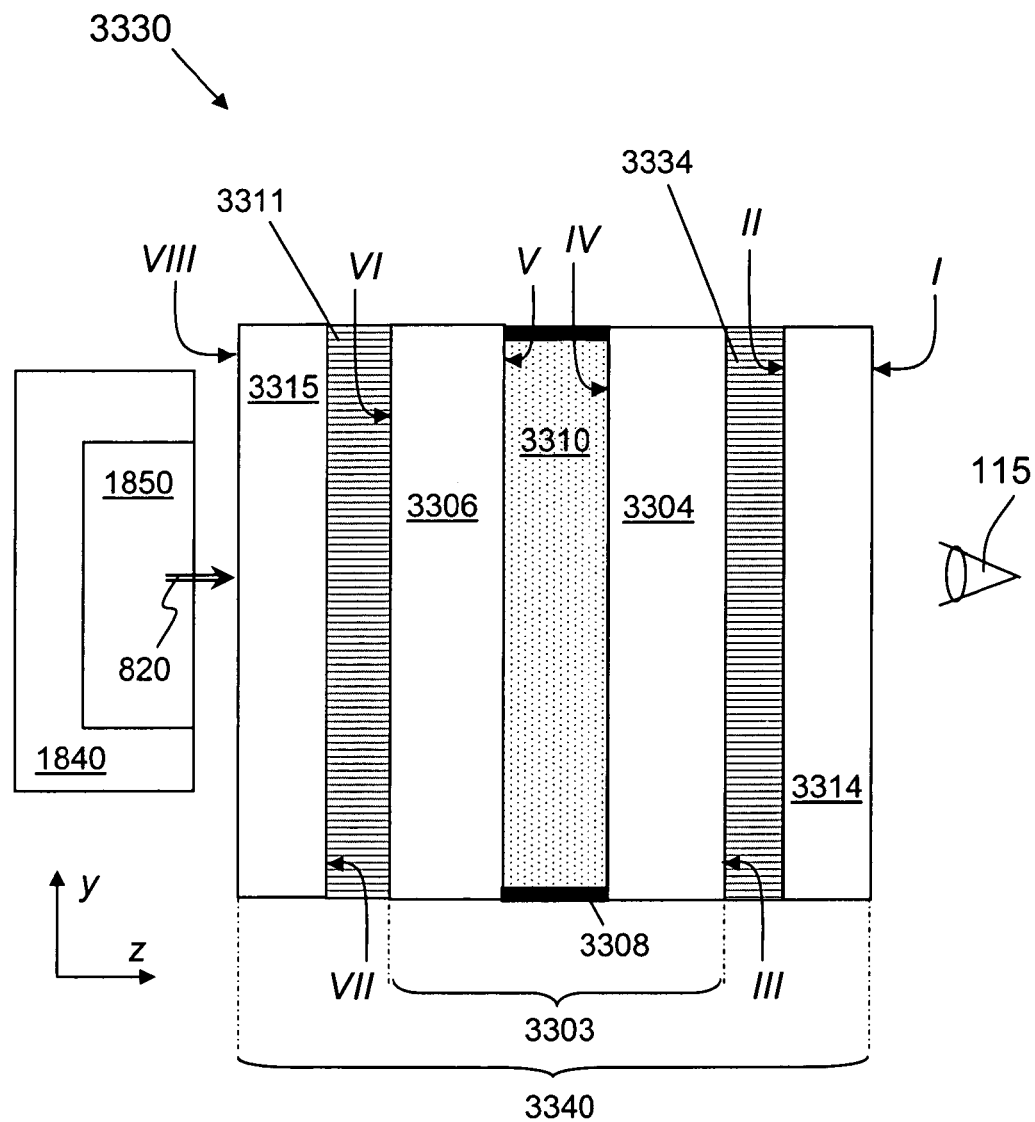
FIG. 33(B): an APBF-laminate and an absorptive polarizer are used.

FIG. 33(B) illustrates an embodiment 3330 that is structurally similar to the embodiment of FIG. 33(A). In fabrication of this embodiment, however, a polarizing layer 3334 placed in the laminate between the LC-cell 3303 and an optional first substrate 3314 was a typical absorbing polarizer. Polarization axes of the APBF 3311 and the absorbing polarizing layer 3334 were mutually parallel. In this embodiment, the "off" state reflectance and transmittance of the switchable mirror system 3340 measured in unpolarized light were, respectively, 41% and 3%. This state of operation of the system 3340 may be referred to as "mid R/low T". In comparison, in the powered ("on") state the reflectance and transmittance of unpolarized light was 6% and 38%, respectively ("low R/high T"). It will be understood that, generally, in any "low reflectance" state a dominating contribution to the total reflectance of the device and the optical quality of an image formed in reflection by the mirror system is provided by light reflected off of the first surface of the device (such as surface I in FIG. 33(B)), and not the surfaces of the absorbing polarizer (surfaces II and III). If the surface of the substrate is optically flat such as with most glass substrates, the optical quality of the mirror device in its low reflectance state is suitable for use as an automotive mirror. The reflectance of the mirror in the low reflectance state is comparable with the first surface reflectance of a prism in its low reflectance state. The same system 3340 was characterized in polarized light 820 emanating from the display 1850. The optimized throughput of light from the LCD 1850 (i.e., when polarization of light 820 was aligned with polarization axes of polarizers 3311, 3334) to the viewer 115 with the LC-cell 3303 powered "on" was measured to be 69%. This embodiment is particularly advantageous for use with a display, for example a TFT-LCD video screen. Because the reflective polarizer is behind the LC element, with respect to the viewer 115, the embodiment 3330 has very low reflectance in the "on" state that is essentially equal to the reflectance of the first surface. As a result, the embodiment 3330 produces very low glare in incident ambient light. Consequently, when the display 1850 is "on" a combination of the low glare and the high transmittance of the embodiment due to the alignment of polarization of the light 820 with the transmission axis of the APBF 3311 results in a highly contrast image.

As mentioned in reference to FIG. 4(D), embodiments of any LC-cell-based switchable mirror system of the invention may additionally incorporate a prismatic element. Alternatively or in addition, an embodiment of a switchable mirror system may employ a combination of an LC-based-device and an auto-dimming mirror structure such as one containing an EC-element.

Example 1

Figure 34:
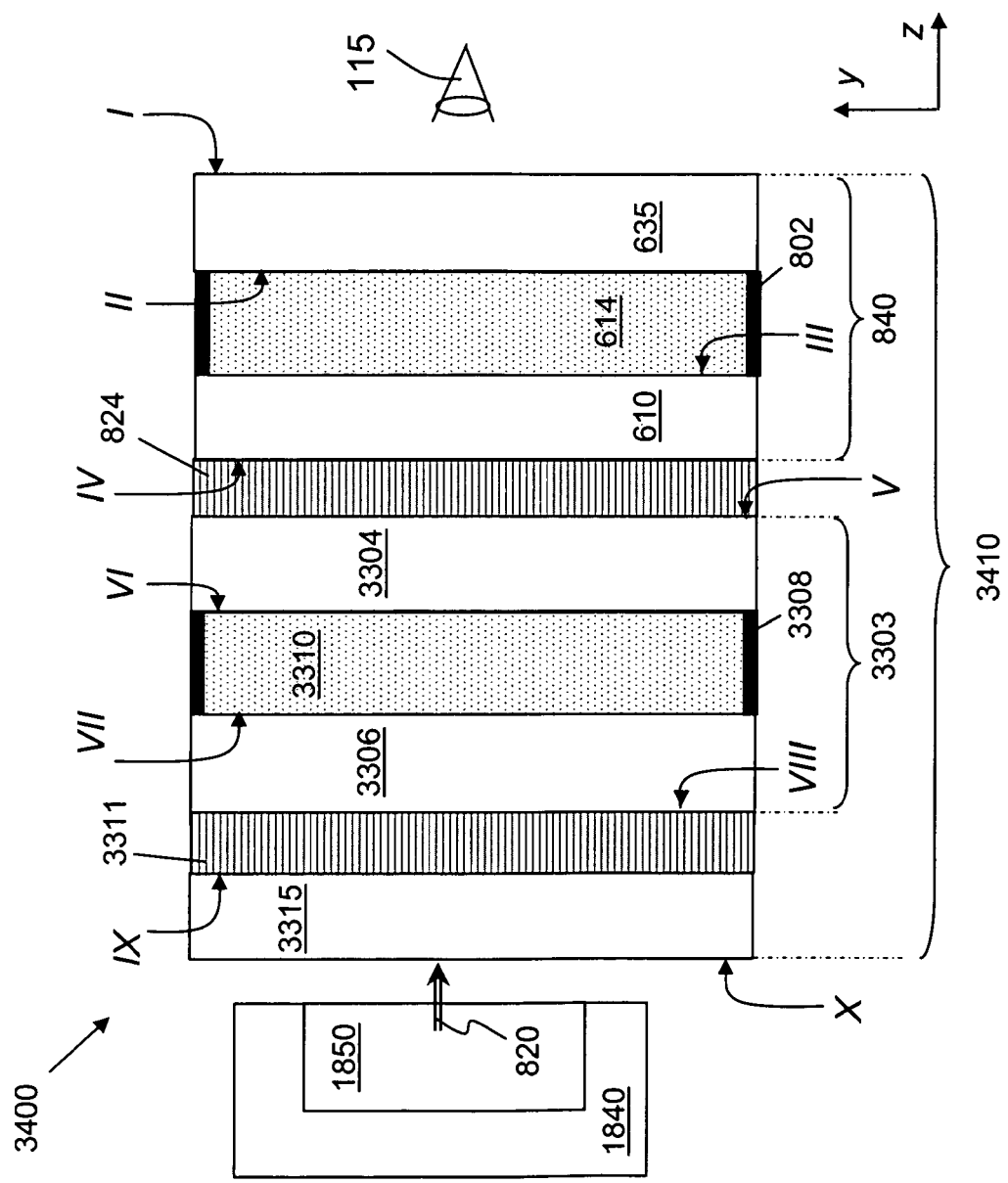
FIG. 34 illustrates an embodiment of a switchable mirror system of the invention that employs a combination of an LC-cell and an EC-element.

An example of such embodiment is illustrated in FIG. 34. As shown, the embodiment 3400 includes a TN LC-cell and an EC-cell. A switchable mirror system 3410 was fabricated as a combination of the EC-mirror element 840 (140 micron wide EC-chamber filled with EC-fluid)) and the TN LC-cell 3303 (LXD Inc., Cleveland, Ohio). The sample of the mirror system further included one APBF 3312 (DBEF-Q) laminated between the element 840 and the substrate 3304 of the LC-cell 3303 and another APBF 3311 (DBEF-Q) laminated between the LC-cell 3303 and the lite of glass 3315. The thickness of glass lites was approximately 1.6 mm. (Various optical coatings, electric connections, and housing elements necessary for proper operation of either the LC-cell or the EC-mirror element and discussed elsewhere in this application are not shown in FIG. 34 for simplicity of illustration.) The polarization axes of both polarizers 3311 and 3312 were aligned. When both the LC-cell 3303 and the EC-element 840 were in the "off" state (no voltage applied to either of them), the reflectance and transmittance of the system 3410 were measured in ambient, unpolarized light to be 72% and 6%, respectively. Such operational state of the embodiment 3410 may be referred to as "high R/low T" state. With the LC-cell being powered "on" and the EC-element 840 being still "off", the system 3410 demonstrated, in ambient unpolarized light, the reflectance of 42% and the transmittance of 37%, This state of operation is characterized by intermediate level of reflectance and high level of transmittance and may be referred to as "mid R/high T" state. It is understood that when both the LC-cell and the EC-cell are powered "on", both the reflectance and transmittance of the embodiment 3410 measured in unpolarized light will be low ("low R/low T"). In comparison, performance of the system 3410 was also measured in polarized light (such as light output 820 from the LCD 1850 having optimal polarization aligned along the axes of the polarizers 3311, 3312). When the LC-cell 3303 is "on", the system 3410 throughput of such optimally polarized light from the LCD 1850 to the viewer 115 was measured as 75%.

Example 2

Figure 56A:
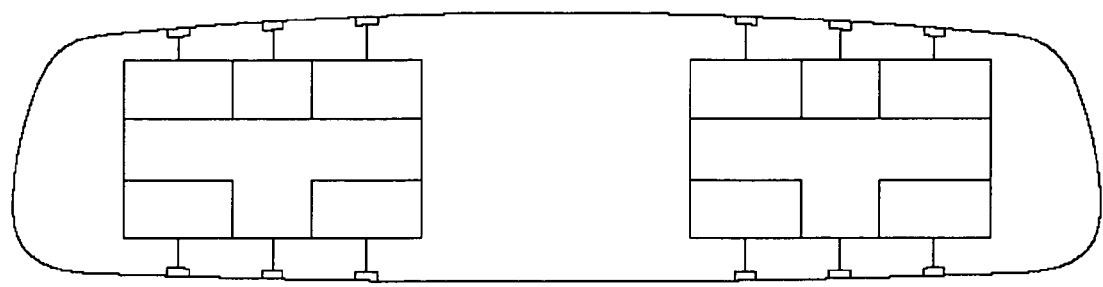
FIG. 56(A) schematically shows a front view of a segmented embodiment of the switchable mirror of the invention.

Another sample of the switchable mirror system was also fabricated according to the structure 3410, with polarization axes of the RPs 3311 and 3312 mutually aligned. The EC-element 840 included two glass substrates, each approximately 6 cm by 26 cm in size and 1.1 mm thick and carrying approximately 145 nm thick ITO electrode layers on the surfaces forming the EC-chamber. The EC-chamber of approximately 140 microns in width was assembled with the use of amine cure epoxy and filled with EC-fluid comprising 27 mM of the anodic material 5,10 dimethyl 5,10 dihydrophenazine and 32 mM of the cathodic material octylviologen tetrafluoroborate. The RPs 3311, 3312 were made of DBEF-Q sold by 3M Corp. of St. Paul, Minn. and flattened ad laminated according to the method of FIG. 3. The TN LC cell 3303 comprising two pieces of 1.1 mm glass was purchased from LXD Inc. of Cleveland, Ohio. The TN LC-cell based device was segmented, as described elsewhere in this application, to allow for independent activation of multiple areas of the mirror system. There were a total of 23 segments of various sizes and shapes contained within this switchable mirror, as schematically shown in FIG. 56(A).

The switchable mirror system of Example 2 was assembled according to the method described in reference to FIG. 3. In Example 2, the EC-element 840, the TN LC-cell element 3303, and the back glass 3315 were appropriately configured to have transverse offsets to allow electrical buss clips to be applied to both electrodes of the EC-element as well as to both electrodes of the TN LC-cell device. Offsets in the TN LC-cell 3303 allowed the ground plate to be contacted on the side while the segments of the other electrode could be contacted on both the top and bottom of the substrate. Buss clips were added to the EC-element offset and to the TN LC-cell offsets so as to allow activation of each element individually. Table 2A summarizes discrete states of reflectance/transmittance of unpolarized light by the switchable mirror system of Example 2. (The "high T" value of 41.9% measured in unpolarized light corresponds to approximately 80% transmittance of optimally polarized light output from the LCD 1850.)

TABLE 2A

| Status of EC-cell 840 | Status of TN LC-cell 3303 | Level of reflectance, % | Level of transmittance, % |
|---|---|---|---|
| Power ON | Power OFF | 6.0 ("low R") | 0.8 ("low T") |
| Power OFF | Power OFF | 79.7 ("high R") | 7.0 ("low T") |
| Power ON | Power ON | 5.5 ("low R") | 4.8 ("low T") |
| Power OFF | Power ON | 47.6 ("mid R") | 41.9 ("high T") |

Generally, the embodiment 3400 has advantageous characteristics that come from its ability to combines a rapid response of an LC-cell-based switch with a large dynamic range of an EC-element. Specifically, due to the fast performance of the LC-cell 3303 the embodiment 3400 can be switched from a high-reflectance (in excess of 70%) state to a low-reflectance (several %) state very rapidly, (within approximately 100 milliseconds). At the same time, the EC-element can gradually (within 1 to 5 seconds) reduce the reflectance of the overall system from "high R" state or an intermediate-reflectance state ("mid R", where the value of R is approximately between 35% and 70%) to a "low R" state (R of about a few percent) or, if required, to any other specified level of reflectance. As demonstrated below, the reflectance of an embodiment of the overall APBF-containing mirror system can be varied by controlling the absorption of light in the components of the system such as an EC-element or, generally, an electrooptic element located in front of reflecting layers.

It is appreciated that alternative implementation of a switchable mirror system may include wire-grid reflective polarizers used instead of APBF-based reflective polarizers in either of the embodiments of FIG. 33(A, B) or 34. In comparison with the APBF-based RPs, wire-grid polarizers require no flattening and can be used as electrodes and even as alignment layers for the LC-medium.

Segmentation of a Mirror System:

Overall, embodiments employing a combination of an LC-cell with a prismatic element or an EC-element, such as those of FIGS. 4(D), 33, and 34, benefit from the ability to rapidly switch the LC-cell-containing mirror system to a "low reflectance/high transmittance" state so as to maximize transmission of the image produced by the LCD 1850 to the viewer 115, and so as to maximize contrast ratio of the image (by minimizing the reflectance of ambient light, as is taught in the U.S. 2009/0207513). In a specific embodiment, the LC-cell-based switchable mirror system of the invention can be further segmented by forming multiple pixels or shutters in the LC-element as known in the art, e.g., as illustrated in FIG. 45. The shutter segmentation would allow for independent and, if required, programmable and reconfigurable modulation of different portions of the mirror system. Consequently, a segmented embodiment would allow the user to modify optical characteristics of a chosen mirror segment, e.g., a segment of the mirror situated directly in front of a particular component located behind the mirror (such as display of the switchable mirror assembly).

Components located behind the segmented portion of the mirror may include a photosensor, a camera, an icon (indicia) with or without a backlight. If the photosensor that detects glare conditions at night is located behind the switchable mirror in an eyehole area, the corresponding "eyehole" area could be segmented in order to remain in the "high R" stealth mode during daytime (directed by the forward-looking photosensor) and switch to the "mid R/high T" mode during nighttime. Similarly, when information from a camera located behind the mirror assembly is not required, the segmented area in front of the camera could remain in the "high R" stealth mode and then switch to the "mid R/high T" mode of operation when image information from the camera becomes necessary. Such switching could happen at a rate consistent with the response frequency of the LC-cell based device. Accordingly, operation of the camera, the sensor, the lighted icon or the indicator could be modulated at the rate of switching of a corresponding segmented area of the switchable mirror so that pictures or measurements are taken, or the icon or indicator light source is turned on and off, only during the periods of "high transmittance" of such segmented area of the SMS. (At a switching rate of about 30 Hz or higher, for example, the human eye would not detect the "flicker" of the switching event.) Depending on the requirements of the system, the relative on/off time, period, and duty cycle of switching of a particular segment of the SMS can be adjusted to balance the needs of the sensor (or the camera) and the desire to maintain a stealth appearance for the mirror. If the camera or sensor is sensitive to aberrations caused by polarized light, a de-polarizer could be placed in front of the camera or sensor. Likewise, a visual icon or indicia can be hidden behind a segmented portion of the mirror in the "high R" mode and made visible (preferably with a backlight switching on) at the same time as the corresponding mirror segment switches from "high R" to "mid R/high T" mode. All of these examples refer to switching of the TN LC-cell section of the SMS that is positioned between two polarizers.

It should be noted that, generally, any element of the switchable mirror system can be segmented. A EC-element portion of the mirror if present can be segmented and selectively switched. So can a GH LC-cell portion described below. Similarly, the TN LC-cell portion of the mirror can be segmented and selectively switched.

In a specific embodiment, the LC-cell could be segmented so as to facilitate transmission of numeric or alpha-numeric images from the display through a mirror system to the viewer. Alternatively, the LC-cell could be segmented in a dot-matrix fashion. Images could then be displayed to the viewer by alternating the high and low reflection states of the segments of the mirror system or, if the area is back-lit, by alternating the high and low transmission states of the segments.

Combinations of Liquid-Crystal Cells with Polarizers:

Embodiments of various LC-cells in combinations with polarizers (either reflective or absorptive), and an EC-element or a prism element are schematically illustrated in FIGS. 46(A-H). For each of the depicted combinations, FIGS. 46(A-H) illustrate its operation depending on whether the LC-cell is powered or not. FIG. 46(A) shows an LC-cell 4602 positioned between the absorptive and reflective polarizers 4604, 4606, the polarization axes of which are mutually parallel. The operation of such a combination in different reflectance states depending on whether the LC-cell 4602 is powered. FIG. 46(B) shows an arrangement similar to that of FIG. 46(A) with the polarization axes of the two polarizers 4604, 4606 being mutually orthogonal. FIG. 46(C) shows an embodiment containing an LC-cell 4602 located between two reflective polarizers 4606 with mutually parallel axes. The operation of such a combination in different reflectance states depending on whether the LC-cell 4602 is powered. FIG. 46(D) shows a combination of an LC-cell 4608 containing an absorbing anisotropic dye 4610 with a reflective polarizer 4606, where the absorptive dye absorbs light having linear polarization parallel to the polarization axis of the reflective polarizer. FIG. 46(E) illustrates a similar embodiment where the anisotropic dye 4610 absorbs light having linear polarization that is perpendicular to the polarization axis of the reflective polarizer. FIG. 46(F) shows a combination of the cholesteric LC-cell 4611 and a reflective polarizer 4606 where the cholesteric molecules 4611a have random orientation. FIG. 46(G) shows a combination of a reflective polarizer 4606, a LC-cell 4602, a quarter-wave plate 4612, and a cholesteric reflective polarizer 4614, where the cholesteric material of the polarizer is characterized by a variable pitch. FIG. 46(H) illustrates two embodiments I, II that may be employed in automotive rearview mirror assemblies. The first embodiment I includes, in order from the viewer, an EC-element 4620, a polarizer 4622 (either absorptive or reflective such as APBF, for example), an LC-cell 4624, another polarizer 4626 (either absorptive or reflective such as APBF, for example), and an additional support substrate 4628 which can be a front surface of the LCD 4630. In the second embodiment II, in comparison with the embodiment I, the EC-element 4620 is substituted with a prismatic element 4632. Each of these embodiments I, II represents a corresponding combination of either an EC-element or a prism element with a switchable multiple-stage LC-cell-based reflector. In a specific embodiment, a prism element 4632 may be substituted with a flat piece of glass. As discussed in reference to FIG. 33(B), a preferred configuration of LC-cell is such as to permit the mirror system to have high reflectance when the LC-cell is off. The discussion below follows this convention. One of the multiple stages of operation of either embodiment I or II of FIG. 46(H), when the LC-cell 4624 is "off", is generally characterized by: a) the overall reflectance, R, of more than 35%, preferably more than 40%, more preferably more than 50%, even more preferably more that 60%, and most preferably greater than 70%; and b) the polarized transmittance, PT, of less than 10%.

Figure 46C:
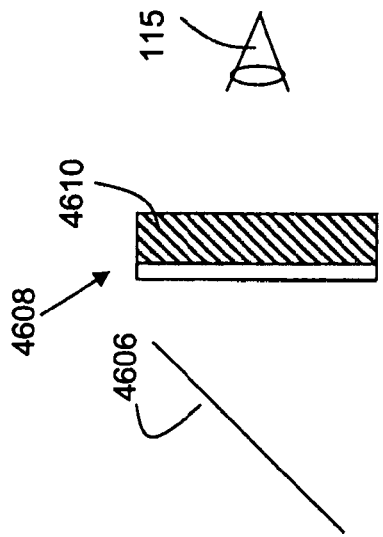
FIGS. 46(A-H) provide examples of combinations of a polarizer used in conjunction with an LC-cell in various embodiments of the invention.
Figure 46D:
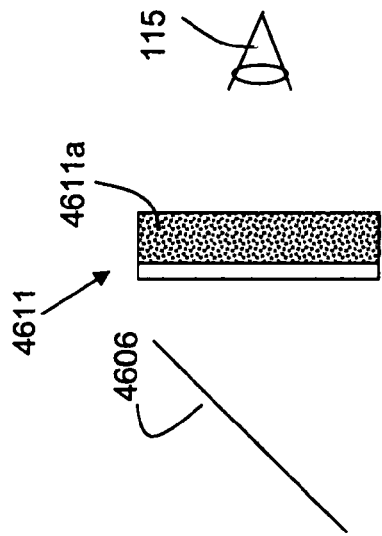
Figure 46E:
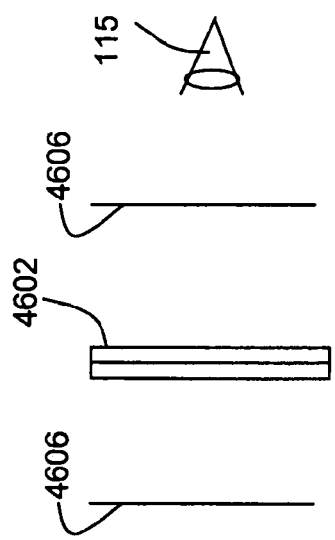
Figure 46F:
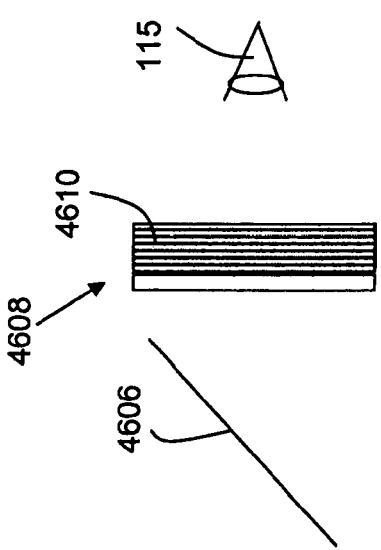
Figure 46H:
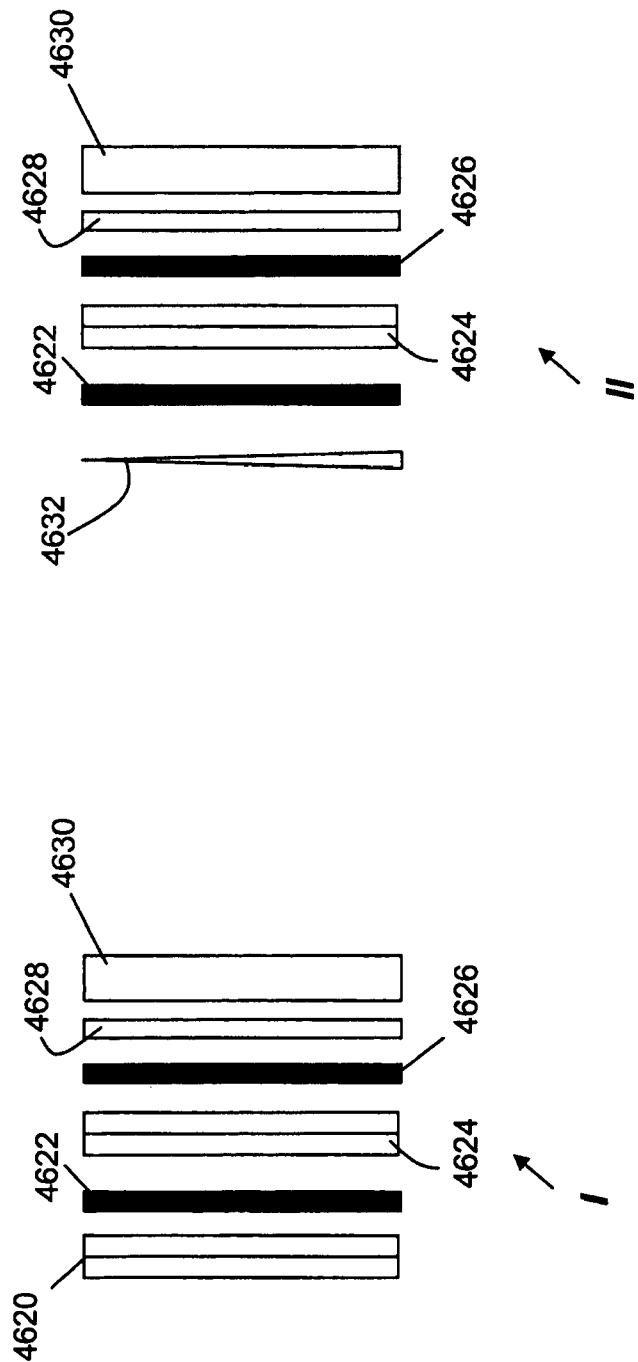

Another stage of operation, when the LC-cell 4624 is on, is characterized by: a) the overall reflectance, R, of less than 50%, preferably less than 30%, more preferably less than 20%, and most preferably less than 10%; and b) the polarized transmittance, PT, of more than 50%, preferably more than 60%, and most preferably more than 70%. It is understood that switching among the multiple stages of operation of the embodiments I, II of FIG. 46(H) is enhanced by either switching the EC-element or tilting the prism element, depending on the embodiment. In a practical rearview mirror assembly, a light source including a display may be positioned behind either of these embodiments. It is understood that implementing various above-mentioned optical characteristics of any of the embodiments of FIG. 46(H) will also depend on whether the polarization of light emanating from the display is aligned with the polarization of light transmitted by the corresponding embodiment in its high transmission stage of operation.

D1) Specific Embodiments of a Switchable Mirror System Employing a Combination of Liquid-Crystal-Cell Based Devices A rearview assembly incorporating a mirror system and a source of light such as a display behind the mirror system should allow for operation in a "display" mode, when the image formed with the use of light-output from the display is projected through the mirror system for viewing by the user, as well as in a "mirror" mode, when it is the image of the surrounding formed in reflection of the ambient light by the mirror system that the viewer pays attention to. It is appreciated that, for the purposes of the invention, the optimized embodiment of the mirror system in such an assembly should have maximized transmittance and minimized reflectance in the "display" mode in order to assure that the brightness of the displayed image is optimal, especially when ambient light is plentiful. In the "mirror" mode, however, the same embodiment of the mirror system should be configured to have transmittance as low as possible and reflectance as high as possible to assure that amount of light reaching the viewer from behind the mirror system is minimized so that the quality of the image of the surrounding does not suffer. In other words, the dynamic range of reflectance/transmittance characteristics in an embodiment of a switchable mirror system (SMS) of the rearview assembly should be maximized. From the discussion provided in reference to FIGS. 33 and 34 it is appreciated that embodiments of a switchable mirror system that are based on either an LC-cell or a combination of an EC-cell and an LC-cell are advantageous in that they possess significant dynamic ranges of operation. However, it is also appreciated that these dynamic ranges of reflectance/transmittance characteristics are limited. Specifically, the dynamic range of the exemplary embodiment 3410 was limited by the ability of the embodiment to switch between the "high R/low T" and "mid R/high T" states. Such limitation stems from the fact that a typical EC-element operates by absorbing, in its "on" or "colored" state, light of any polarization and therefore attenuates both light reflected and light transmitted by the mirror system. Such limitation is understood to remain in any mirror system that includes an optical element that simultaneously affects light in both orthogonal states of polarization.

We have discovered that configuring a mirror system (and, in particular, the switchable mirror system that includes an LC-cell-based device) in such a fashion as to provide for independent attenuation of light components having different polarization states further increases the attainable dynamic range of reflectance/transmittance characteristics of the rearview assembly for the purposes of the invention. In particular, a switchable polarizer that operates in two modes (transparent for light with any polarization in the first mode and absorbing light with a particular polarization in a second mode) may be incorporated into a mirror system. Examples of such switchable polarizer are provided by a Guest-Host Liquid Crystal (GH LC) element containing a dye and an EC-element containing an orientated EC-medium such as stretched polyaniline, as described by P. Anderson in *Appl. Phys. Lett.* 83(7), 1307-1309 (2003). This publication is incorporated herein by reference in its entirety. The first example (GH LC-cell with a dye such as an anthraquinone dye or an azo dye) is predominantly used below in describing embodiments of a switchable mirror system of the invention. It shall be appreciated, however, that the EC-element containing an orientated EC-medium can be used instead of the GH LC-cell, which use is within the scope of the present invention.

Incorporating such switchable polarizer as part of a switchable mirror in front of the SMS that contains an RP allows for selectively absorbing a portion of ambient incident light that is reflected by the RP towards the front of the mirror system without significantly attenuating a portion of light having a different polarization.

Figure 52:
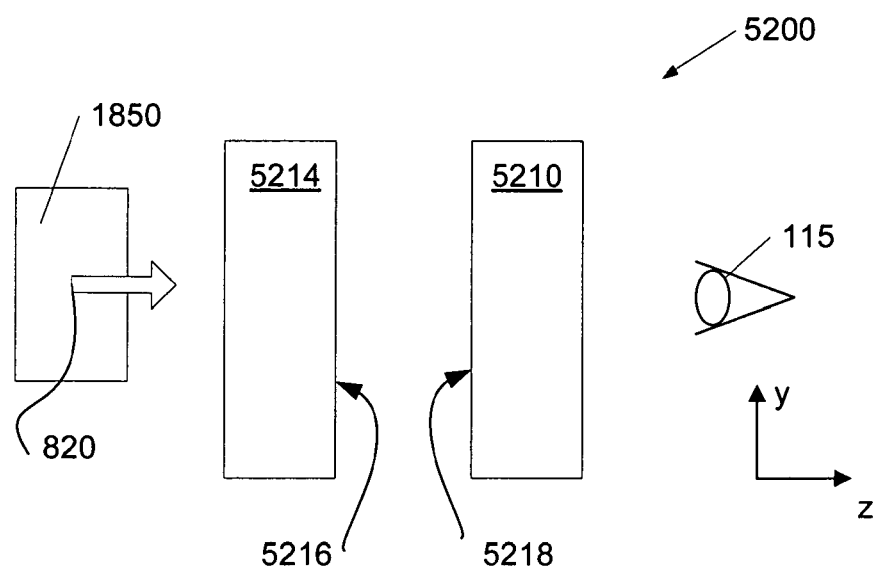
FIG. 52 schematically illustrates an embodiment of a switchable mirror system employing a switchable absorptive polarizer.

An exemplary embodiment 5200 configured according to this principle is schematically illustrated in FIG. 52 showing, in side view, a switchable polarizer 5210 disposed in front of the switchable mirror 5214. The switchable mirror 5214 may include, e.g., the SMS 3302 of FIG. 33(A), or the SMS 3340 of FIG. 33(B), or the SMS 3410 of FIG. 34, or the SMS of FIG. 34 where instead of the EC-element a prismatic element is used. Although the devices 1850, 5214, and 5210 are shown to be separated from one another, it is understood that in another implementation some of the surfaces of at least some of these devices may be in physical contact. For example, the outer surface 5216 of the mirror system 5214 and a neighboring surface 5218 of the switchable polarizer 5210 may be attached to one another. Alternatively or in addition, it is understood that the component devices forming an embodiment 5400 may share a substrate when the embodiment 5400 is configured with the use of the method of invention described in reference to FIG. 3.

Figure 53A:
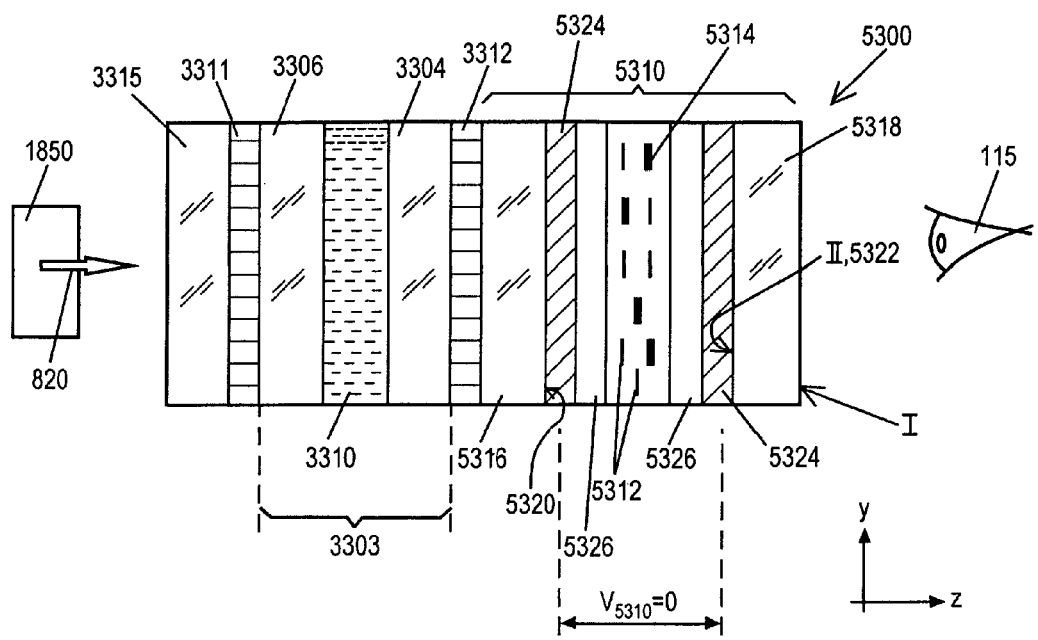
FIG. 53(A): GH LC-cell is off.
Figure 53B:
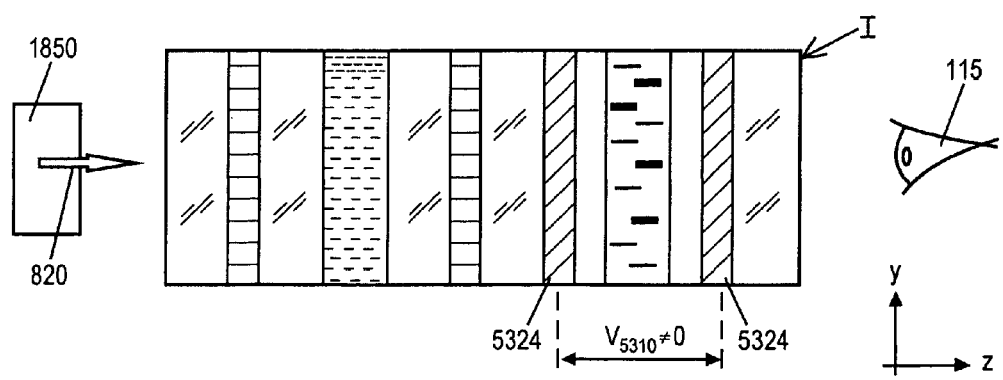

Principle of Operation:

FIGS. 53(A, B) and 54(A, B) illustrate a principle of operation of a specific embodiment 5300 of a switchable mirror system that includes a TN LC-cell 3303 that is sandwiched between the two APBFs 3311 and 3312 and further laminated to a GH LC-cell 5310. The GH LC-cell 5310, corresponding to the front of the embodiment, includes an LC medium 5312 serving as a host medium to the molecules of dye 5314 and disposed in a cavity formed between two glass substrates 5316, 5318. Each of cavity-defining surfaces 5320, 5322 of the substrates 5316, 5318 carry an electrically-conductive layer 5324 of TCO (such as ITO, for example) overcoated with an alignment layer 5326 (such as polyimide, PVA, or angularly deposited $SiO_x$) to facilitate the alignment of the LC-molecules along a preferred direction. In the embodiment 5300, the LC fluid 5312 has a positive dielectric anisotropy in that the molecules of the host LC medium 5312 and the molecules of the guest dye 5314 are aligned substantially parallel to the surfaces 5320, 5322 when no voltage is applied between the electrode layers 5324 ($V_{5310}=0$), as shown in FIG. 53(A). However, when the voltage between the electrodes 5324 is non-zero ($V_{5310}\neq 0$), the molecules of the host LC-medium 5312 and the molecules of the guest dye 5314 are rotated and align substantially along the vector of electric field created across the LC-medium 5312, as shown in FIG. 53(B). As a result, when no voltage is applied to the cell 5310 (the cell 5310 is "off") the guest dye absorbs light having a linear polarization component parallel to surfaces 5320, 5322. When the cell 5310 is energized (voltage is "on") however, the attenuation of light in any polarization state within the medium 5312 due to absorption in the dye 5314 is substantially non-existent.

The LC-medium-alignment layers 5326 and the reflective polarizers 3311, 3312 are configured within the embodiment 5300 in such a way as to assure that the LC-molecules 5312 (and, accordingly, the dye molecules 5314) are aligned predominantly parallel to both reflection axes of the RPs 3311, 3312 (y-axis in FIG. 53(A)) when no electric field is applied across the medium 5312.

Figure 54A:
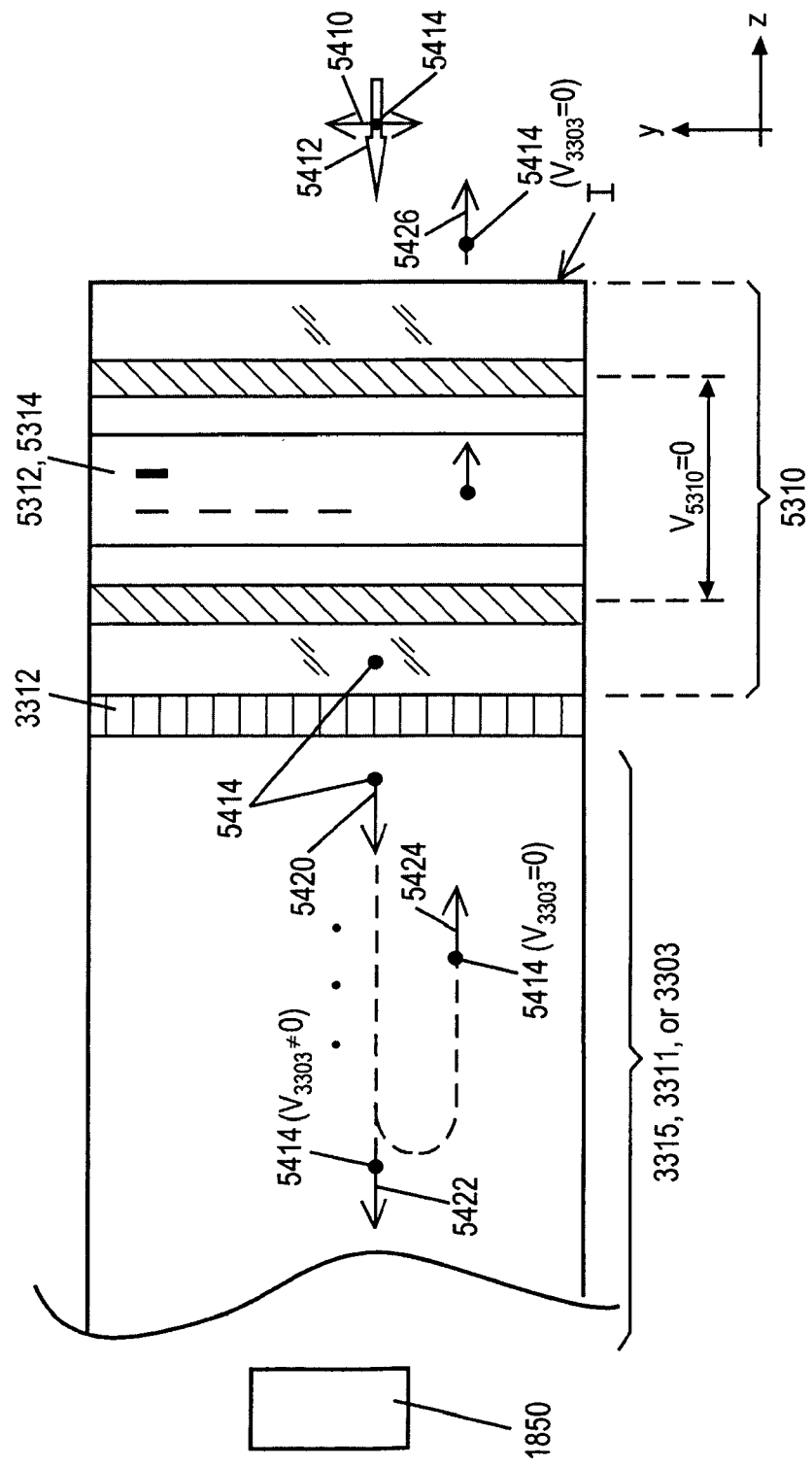
FIGS. 54(A) and 54(B) show corresponding sub-sets of FIGS. 53(A) and 53(B), respectively, and illustrate the principle of operation of the embodiment of FIGS. 53(A, B).

FIG. 54(A) illustrates a sub-set of FIG. 53(A) and shows that, as a result of such alignment when no electric field is applied across the medium 5312, a component 5410 of ambient light 5412 incident upon surface I and polarized along the absorption axis (y-axis in FIG. 54(A)) of the dye 5314 will be absorbed by the dye. At the same time, a light component 5414 having orthogonal polarization (along the x-axis) is transmitted through the GH LC-cell 5310 and the RP 3312 towards the TN LC-cell 3303, as shown by an arrow 5420. If the TN LC-cell 3303 is "on" ($V_{3303}\neq 0$), the light component traverses the cell 3303 (in the −z direction in FIG. 54(A)) and the RP 3311, as shown by an arrow 5422, assuring sufficiently high level of transmission for unpolarized light. (The rear-view assembly may be further configured to have this light component absorbed if necessary, e.g., in the back portion of the mirror system in, e.g., an opacifying layer such as an appliqué layer or a partially transmissive layer disposed in the back of the mirror system specifically for this purpose.) If, in addition, surface I of the embodiment 5300 is AR-coated, the reflection of ambient light by the embodiment 5300 will be extremely insubstantial and approaching zero. It shall be appreciated, therefore, that this operation of the switchable mirror system is characterized by low reflectance and high transmittance ("low R/high T") of unpolarized light that could not have been achieved in any of embodiments described so far. On the other hand, if the TN LC-cell 3303 is "off" ($V_{3303}=0$), the polarization vector of the component 5420 is rotated by 90 degrees upon traversal of the cell 3303 to a position parallel to the reflection axes of the RP 3311. Consequently, the RP 3311 reflects the light component 5420 towards the viewer 115. The reflected light component 5420 further traverses the cell 3303 and continues to propagate through the mirror system upon return to the viewer 115, as shown by arrows 5424 and 5426.

Figure 54B:
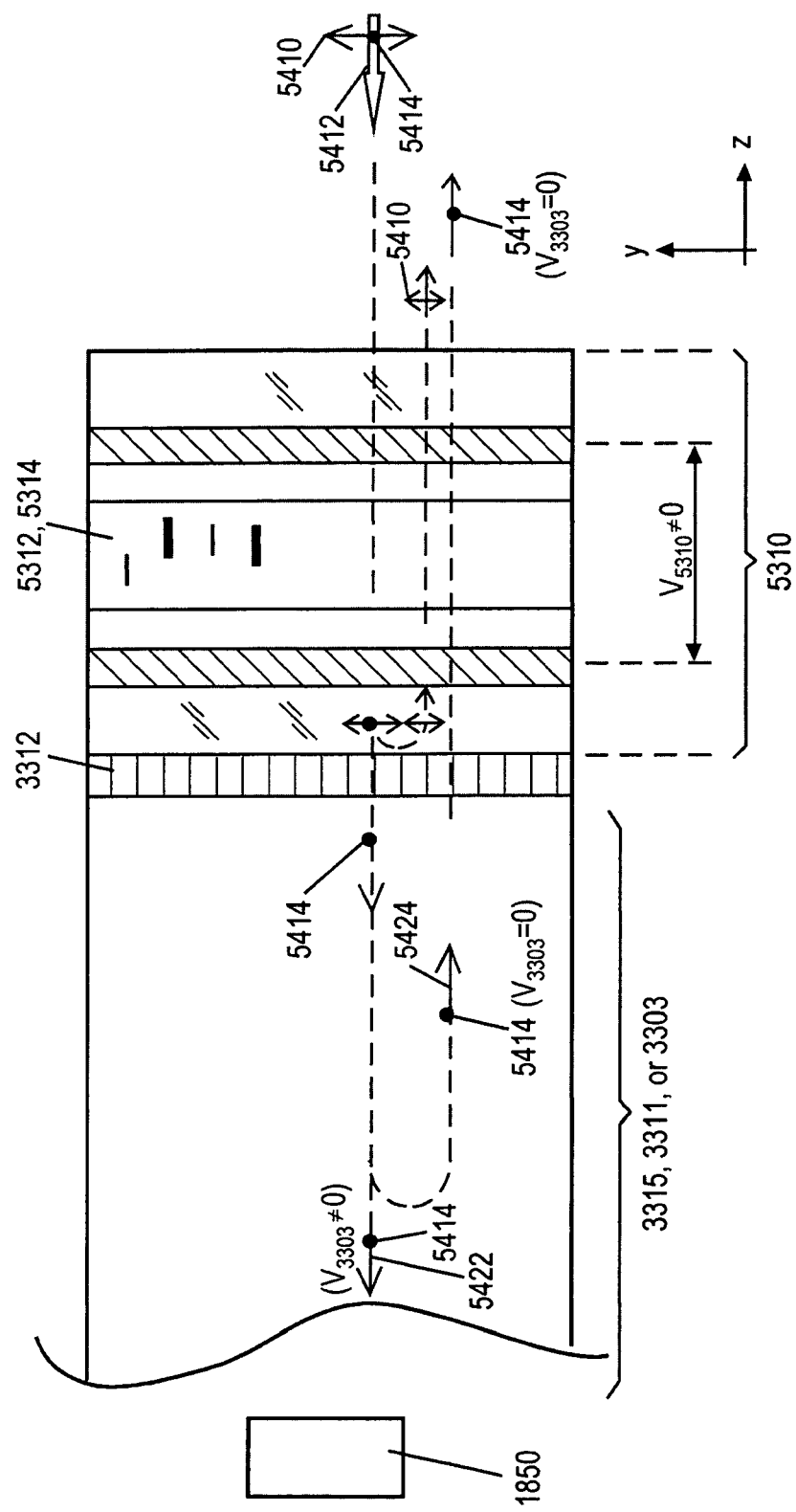

Similarly, in further reference to FIG. 53(B), when voltage required to switch the GH LC cell 5310 "on" is applied ($V_{5310}\neq 0$) between the electrode layers 5324, the effective absorption in the dye medium 5314 of ambient light 5412 is zero, and a portion 5410 of the incident light that has polarization vector parallel to the reflection axis of the RP 3312 is reflected by the RP 3312 back to the viewer 115. This is schematically illustrated in FIG. 54(B) showing a sub-set of FIG. 53(B). The propagation of a portion 5414 of incident light having an orthogonal polarization depends on the state of the TN LC-cell 3303, as discussed in reference to FIGS. 53(A) and 54(A): the light component 5414 will be reflected by the mirror system towards the viewer 115 when the cell 3303 is "on".

Table 2B summarizes the discrete states of reflection/transmission of unpolarized light by the switchable mirror system of the embodiment 5300 depending on the operational status of each of the switchable absorptive polarizer 5310 and the TN LC-cell 3303, as well as reflectance/transmittance values estimated for conventional guest-host LC media and materials used in fabrication of the TN LC-cell. The "low R" values represent an embodiment where surface I is not AR-coated. AR-coating of surface I will reduce the values of reflectance even further. In comparison, Table 2B1 summarizes the discrete states of reflectance/transmittance of unpolarized light by a similar SMS where, instead of the GH LC-cell 5310, an EC-element containing orientated EC-medium is used.

TABLE 2B

| Status of cell 5310 | Status of cell 3303 | Level of Reflectance | Level of Transmittance |
|---|---|---|---|
| Power ON | Power OFF | High ("high R"); Approx 65% to 75% | Low ("low T"); Approx 0.3% to 7% |
| Power OFF | Power OFF | Intermediate ("mid R"); Approx 35% to 45% | Low ("low T"); A;pprox 0.15% to 4% |
| Power ON | Power ON | Intermediate ("mid R"); Approx 35% to 45% | High ("high T"); Approx 35% to 45% |
| Power OFF | Power ON | Low ("low R"); Approx 6% to 15% | High ("high T"); Approx 35% to 45% |

TABLE 2B1

| Status of orientated EC-cell | Status of cell 3303 | Level of Reflectance | Level of Transmittance |
|---|---|---|---|
| Power ON | Power OFF | "Mid R" | "Low T" |
| Power OFF | Power OFF | "High R" | "Low T" |
| Power ON | Power ON | "Low R" | "High T" |
| Power OFF | Power ON | "Mid R" | "High T" |

As shown, therefore, an embodiment of the switchable mirror system of the invention can be operated in a tri-state reflectance mode ("high R", "mid R", and "low R") to reduce glare or optimize the brightness of the display (specifically, in "mid R" and "low R" modes of operation). In addition to that, the embodiment assures an operation in a dual transmission mode ("low T" to be used when the display 1850 is "off" and "high T" mode to be used when the display 1850 is "on"). A comparison with Table 2A shows that the embodiment 5300 offers an advantage over the embodiment 3400 in that only the former can be operated in a "low R/high T" mode and thus has a higher dynamic range of reflectance/transmittance modes of operation.

Gradual Variation of Optical Performance:

It shall be further appreciated, however, that the operation of embodiments of the invention is not limited to discrete reflectance/transmittance levels listed in Table 2C but may be further controlled in a continuous, variable, "grey scale" fashion between these levels. Specifically, the "grey scale" operation can be achieved by adjusting the voltage $V_{5310}$ applied to the switchable polarizer 5310 in a continuous fashion. For example, as the applied voltage is gradually increased from the zero level, the host-medium LC molecules 5312 and the guest-medium dye molecules 5314 rotate from a default orientation parallel to the chamber wall surfaces 5320, 5322 to that perpendicular to the chamber wall surfaces. Due to this rotation the amount of ambient light 5412 absorbed by the dye 5314 (FIG. 54(A)) will be gradually reducing and the amount of light returned to the viewer by the RPs 3311, 3312 will be gradually increasing. More specifically, the level of ambient light reflected by the embodiment towards the user can be gradually increased from (FIG. 54(B)) "low R" level (corresponding to no light reflected when $V_{5310}=0, V_{3303}\ne 0$, in FIG. 54(A)) through "mid R" level (corresponding to either light 5420 reflected when $V_{5310}=V_{3303}=0$, in FIG. 54(A) or light 5410 reflected when $V_{5310}\ne 0, V_{3303}\ne 0$, in FIG. 54(B)) to "high R" level (corresponding to light 5410 and 5420 reflected when $V_{5310}\ne 0, V_{3303}=0$, in FIG. 54(B)) by gradually varying the voltage applied to the switchable polarizer 5310.

Figure 55:
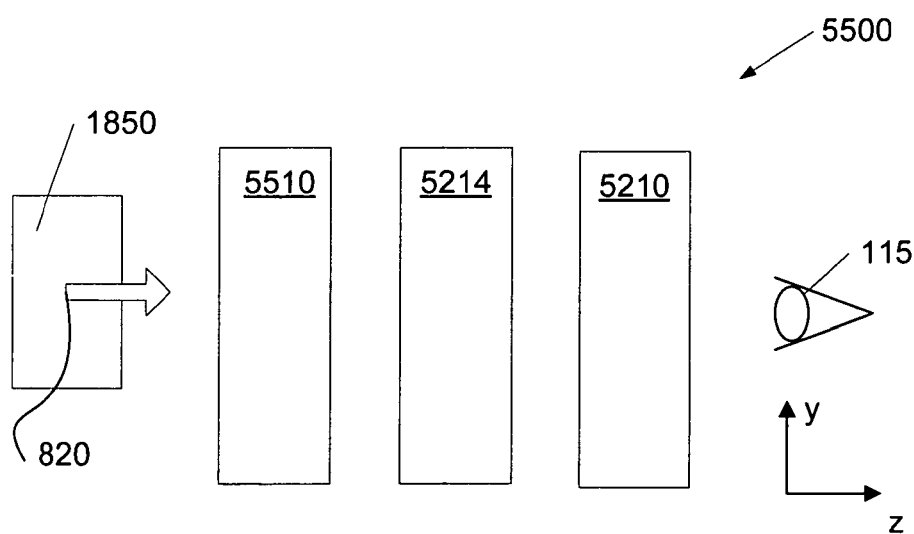
FIG. 55 schematically shows an alternative embodiment of a switchable mirror of the invention employing two switchable absorptive polarizers.

If a rearview assembly incorporating the embodiment 5300 is to operate in a glare-reduction mode with the TN LC-cell 3303 performing in a high transmission mode ($V_{3303}\ne 0$), care must be taken to minimize the amount of light reflected off of assembly components located behind the mirror system. All surfaces behind the mirror system should be coated with an AR coating or be blackened to maintain stealthy appearance. To improve the stealthy appearance further, a second switchable polarizer 5510 can be employed. For example, as shown in FIG. 55, an embodiment 5500 of the switchable mirror can comprise a sequence, starting from the front of the rearview assembly, of the first GH LC-cell 5210 and the switchable mirror 5214 (such as, e.g., the embodiment 3303 of FIG. 33(A)) followed by the second GH LC-cell 5510. Here, the second GH LC-cell 5510 could be mounted in the back of the rearview assembly so as to have its absorbing axis be parallel to the transmitting axis of the second reflective polarizer of the switchable mirror 5214. As a result, the GH LC-cell 5510 is enabled to operate as an opacifying means in areas of the mirror where low transmission of light is required, thereby improving the contrast between regions of the switchable mirror that are in the "high transmittance" mode and those in the "low transmittance" mode. Such improvement is particularly relevant in a system employing an edge-lit display, which often would not have zero transmittance in the "off" state thereby leaking some light from a light source through the display towards the viewer.

It is appreciated that in applications requiring only a portion of the display of the rearview assembly to be visible at any given time (e.g., to activate a particular indicator), the use of the second GH LC-cell device 5510 disposed at the back of the switchable mirror facilitates blocking an undesired light transmission through selected areas of the mirror thereby resulting in a more aesthetically pleasing product.

It is recognized that variation on embodiments of a SMS described herein could be used not only in a rearview automotive assembly but also in windows in architectural, transportation or aerospace applications.

Figure 56B:
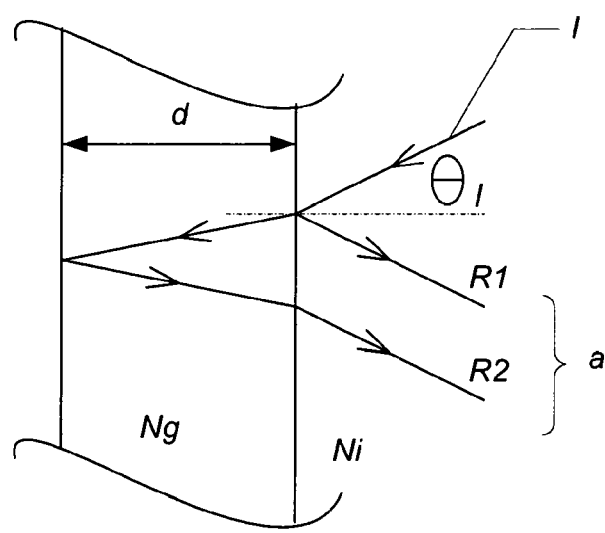
FIG. 56(B) illustrates multiple reflection within the plane-parallel plate.

Reduction of Double Imaging:

"Double imaging" is a familiar phenomenon arising from reflection of light from several surfaces in a multi-surface structure and often referred to as parallax. Multiple images formed in reflection from multiple surfaces obscure the main image of interest and are mutually offset, in the image plane, by distances that are dependent on the geometry of the positioning of the multiple reflective surfaces and the optical properties of the media involved. In the well-known example of a multiple reflection of the incident beam I of light from a plane-parallel optical plate, schematically illustrated in FIG. 56(B), a transverse offset $\Delta a$ between the first and second order reflected beams $R_1$ and $R_2$, respectively, is calculated according to $\Delta a = d \cdot \tan(\sin^{-1}(n_I \sin \theta_I/n_G))$, where d is the thickness of the plane-parallel plate, $n_I$ and $n_G$ are the refractive indices of the incident medium and the material of the plate, respectively, and $\theta_I$ is the angle of incidence. It is appreciated, therefore, that unless precautions are taken, embodiments of a switchable mirror system of the invention that incorporate two RPs may generate more than one image in reflection at least because the two RPs are offset with respect to one another along the direction of incidence of ambient light and have similar reflectance characteristics. Moreover, the spurious reflections produced by other reflecting surfaces will further camouflage the main image. It is also appreciated that formation of multiple images becomes particularly detrimental to the user of the rearview assembly when the multiple images have intensities that differ within several tens of percent or are substantially comparable.

For example, when the RPs of the embodiments of the invention are separated by about 1.8 mm and viewed at an angle of about 25 degrees then the resulting transverse offset between the two images formed in reflection from the RPs is about $\Delta a=1$ mm and this separation represents a limit that may be acceptable for automotive applications. Accordingly, embodiments of the invention are judiciously configured so as to assure that the transverse offset between the two images formed in reflection of ambient light in the RPs of the invention is less than 0.75 mm, more preferably less than 0.50 mm, and most preferably less than 0.25 mm.

One approach to minimization of the double imaging is a reduction of separation distance between the reflecting surfaces at issue. In a practical embodiment of the SMS that contains a LC-cell-based device and two RPs such approach implies that the separation between the RPs should be reduced. It is appreciated that, in general, the RPs used in embodiments of the SMS of the invention may be either APBF-based or wire-grid based. FIGS. 57 and 58 provide several examples, mostly concentrating on structures of the TN LC-cell that is part of the SMS of the invention. It will be appreciated that numerous components and elements of the rearview assembly incorporating embodiments of the SMS discussed in reference to FIGS. 57 and 58 are not shown in these figures in order to simplify the illustration. The presence of such components and elements is known from other teachings of this application.

Figure 57A:
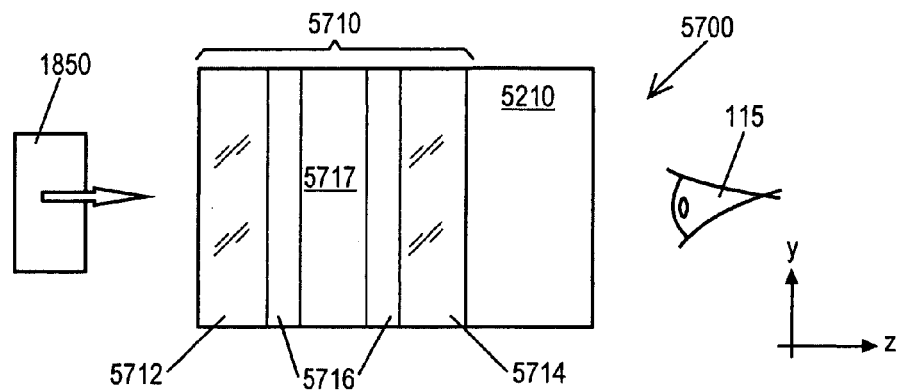
FIG. 57(A): general structure.
Figure 57B:
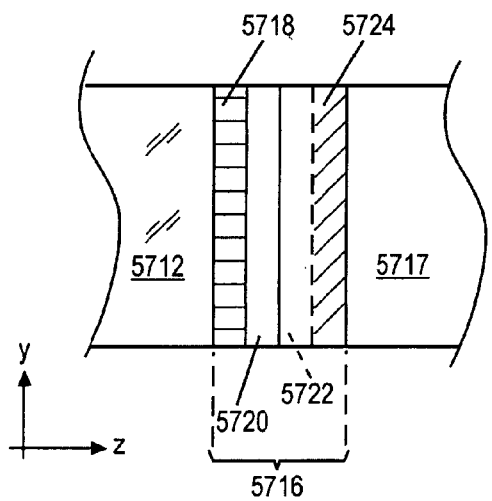
FIG. 57(B): both reflective polarizers are APBF-based.
Figure 57C:
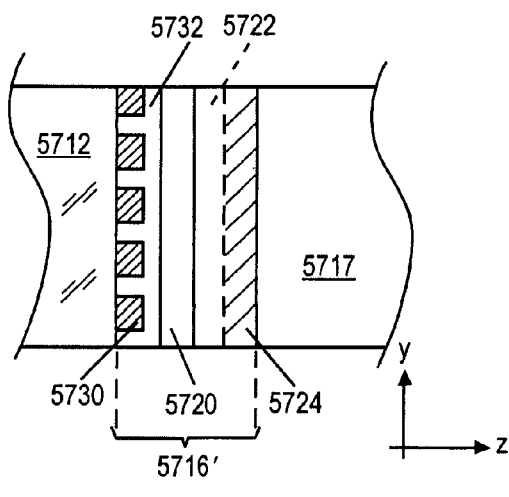
FIG. 57(C): both reflective polarizers are wire-grid polarizers.
Figure 58:
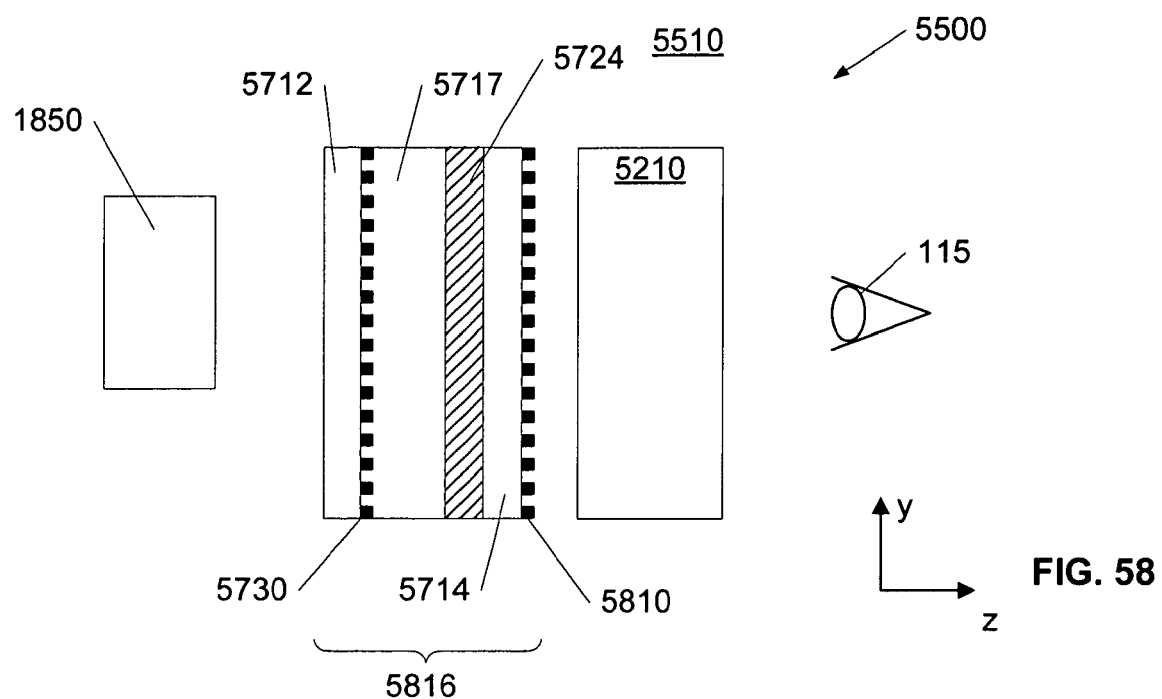
FIG. 58 illustrates an embodiment of a switchable mirror system employing two wire-grid polarizers one of which is disposed within the TN LC-cell of the embodiment and another is disposed outside of the TN LC-cell.

FIG. 57(A) illustrates an alternative embodiment of a SMS of the invention that includes a switchable polarizer 5210 in front of a switchable mirror 5710. The switchable mirror 5710 comprises a TN LC-cell formed by substrates 5712 and 5714 the inner surface of each of which carries a multi-layer structure 5716. The cavity of the TN LC-cell is filled with the TN LC-medium 5717. As shown in partial view of FIG. 57(B), an embodiment of the multi-layer structure 5716 is includes an APBF 5718, a layer 5720 of TCO such as, e.g., ITO, an optional passivation layer 5722 (such as $SiO_2$ or $Ta_2O_5$), and an alignment layer 5724 that is in physical contact with the LC-medium 5717. The remaining portion of the embodiment is structured as a mirror image of the portion described. Another embodiment of the thin-film structure 5716' is shown in partial view in FIG. 57(C) to contain a layer of wire-grid polarizer 5730 overcoated with a planarization layer 5732 (to provide a flat surface and a barrier between the wire-grid layer and the LC-medium 5717), followed by a TCO layer 5720, an optional passivation layer 5722, and the alignment layer 5724. The remaining portion of the embodiment is structured as a mirror image of the portion described. In both embodiments of FIGS. 57(B) and 57(C), therefore, the reflective polarizers 5718 (or 5730) are incorporated within the TN LC cell 5710 (i.e., disposed on the inner surfaces of the substrates of the TN LC cell), thereby reducing the separation distance between the reflective polarizers to that equal to the sum of thickness of a gap of the cell 5710 and the thicknesses of all intermediately located layers. In a typical TN LC device, the LC-layer thickness is approximately 3 to 20 um. The two RPs separated by such a distance would essentially appear as one reflective surface to the human eye. The 20 micron separation between the RPs would result in a transverse offset between double images of only 0.012 mm, while the 3 micron case would have an image separation of 0.002 mm. In either of these cases the two images would be essentially coincident and perceived by the viewer as one.

Figure 57D:
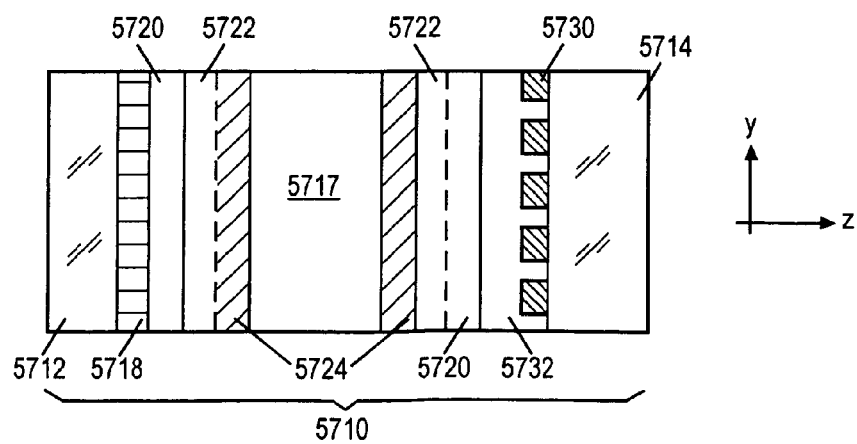
FIG. 57(D): one reflective polarizer is ABPF-based and another is a wire-grid polarizer.

It is appreciated that a combination of the wire-grid and APBF-based RPs may also be employed in an embodiment of the invention, as shown in FIG. 57(D). With respect to FIGS. 57 (B-D), if the thickness of the medium 5717 is 50 microns then the separation between images formed in reflection from the two RPs of the LC cell 5710 would be about 0.029 mm, as calculated with the use of the above-referenced formula.

In another embodiment of the SMS of the invention employing two RPs, one of the RPs may be disposed within the TN LC-cell of the embodiment while another is disposed outside of the cell. This structure is illustrated in an embodiment of FIG. 58, with the example of using wire-grid polarizers 5730 and 5810 (although a similar embodiment with APBF-based RPs is also within the scope of the invention). As shown, the rear polarizer 5730 is disposed inside the TN LC-cell 5816 and the front polarizer 5810 is disposed on the outer surface of the substrate 5714 of the cell 5816. The separation between the reflective layers 5730 and 5810 in this case is reduced to approximately the sum of thickness of the substrate 5714 and the LC-medium 5717. It is also appreciated that, in the embodiment of FIG. 58, the wire-grid polarizer 5730 is used simultaneously as the reflective polarizer and the electrode layer of the TN LC-cell 5816.

The wire-grid layer only has high conductivity in the direction of the wire Therefore, in any embodiment where the wire-grid polarizer is used as an electrode, it may be necessary to supplement the conductivity with a TCO layer under or over the wire-grid layer. Such a TCO layer is shown in FIGS. 57(C, D) as 5724 and not shown in FIG. 58. Alternatively or in addition, the wire grid pattern could contain a wire-to-wire conductive bridges to establish some conductivity perpendicular to the wire direction.

As shown in examples of FIGS. 57(C, D) and 58, in embodiments employing wire-grid structures as RPs, a passivation layer and/or planarization layer of a polymer or metal oxide can be used to overcoat the wire-grid structure to protect it from mechanical damage and corrosion. Due to its directional structure, the wire-grid polarizer could also act as an alignment layer for the LC-cell as the long axes of the LC medium molecules will tend to align with wires. If alignment of the long axis of the liquid crystal molecules perpendicular to the grid is required, then a planarization layer may be necessary to flatten the structure of the wire-grid and to reduce its effect on orientation of the LC-medium molecules. A TCO coating and/or a LC-medium alignment coating (such as rubbed polyimide or polyvinyl alcohol) can be applied on top of the wire-grid structure if desired. However, given the delicate nature of the wire-grid structure, non-contact methods for creating an LC-medium alignment layer (such as angular deposition of SiOx or UV exposure of the alignment layer) may be preferred.

Figure 59:
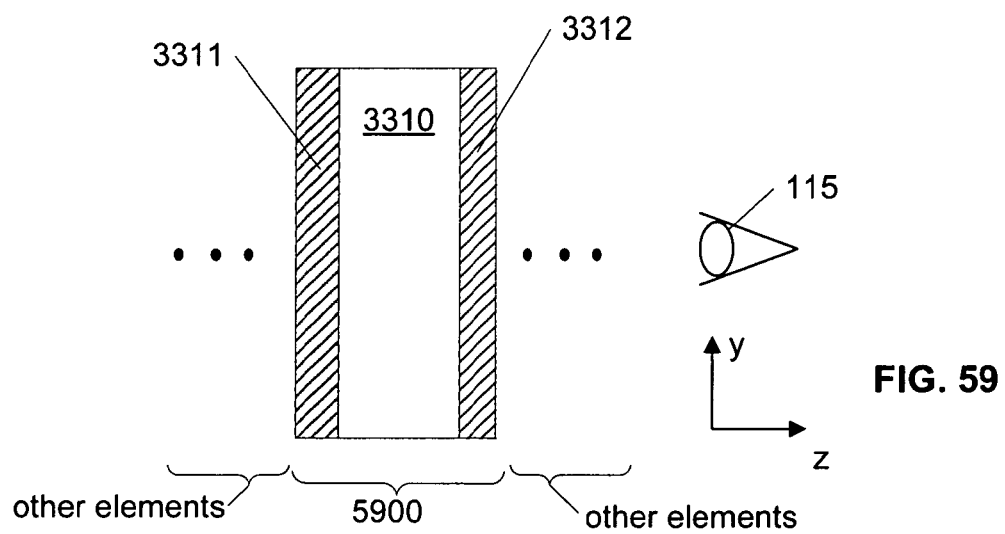
FIG. 59 illustrates a concept of using flattened APBFs as substrates for a TN LC-cell of an embodiment of a switchable mirror according to the invention.

Overall, the APBF-based RPs used in embodiments of a SMS may include DBEF-Q, APF-25, APF-35, APF-50 or other equivalent plastic-based reflective polarizer materials. When the employed RP is APBF-based, it is preferably laminated to a corresponding substrate, using the method of the invention discussed in reference to FIG. 3, in such a fashion as to satisfy distortion requirements of the automotive industry as discussed above. It is appreciated that, in the embodiments of the SMS of the invention, an APBF-based RP could be overcoated with a TCO, an optional passivation layer, and a LC alignment film as discussed in reference to FIGS. 57,58. Moreover, the use of a plastic-based reflective polarizer as substrate for the LC-cell based device is also invisioned within the scope of the invention. An example of a LC-cell 5900 configured according to this principle is shown in FIG. 59 and could be compared with the device 3303 of FIG. 33(A).

Another approach to minimization of the spurious imaging is modification of the substrates of an embodiment.

It is appreciated that, generally, the substrates of the SMS of the invention could be made of glass or plastic materials. In addition, in certain embodiments it is advantageous for the substrate to preserve the polarization states of reflected and transmitted light. In certain embodiments it is desirable for either the first or the second substrate (where the first substrate is one closest to the viewer) or both the first and second substrates to de-polarize light. It is preferable to have at least one or more substrates be less than 1.2 mm thick, more preferable less than 0.75 mm thick and most preferably less than 0.5 mm thick. If, as an example, the RPs of the embodiment of FIG. 33(A) were separated but such distances, the transverse offset between the images, formed in reflection from the RPs 331, 3312 at a 25 degree viewing angle, of 0.77 mm, 0.44 mm and 0.29 mm, respectively, as calculated with the above-referenced formula. The substrates could be processed as individual cut-to-shape pieces, processed as an array in sheets or, if the substrates were thin enough, processed using a roll-to-roll process.

Using thinner substrates and/or reducing the number of substrates and/or using transparent plastic substrates rather than glass substrates is contemplated by the embodiments of the invention and will reduce the weight of the overall mirror system which is desirable in the transportation and aeronautic applications. Reducing the thickness of the overall mirror system also allows for thinner, sleeker, and more aesthetically pleasing mirror package designs.

As a baseline example, an SMS embodiment having two DBEF layers as RPs is configured according to the following sequence (when viewed from the front of the mirror system): Glass/TCO/LC1/TCO/Glass/RP1/Glass/TCO/LC2/TCO/LC/Glass/RP2/Glass. Here, TCO represents a transparent conduction oxide or the like, LC1 represents a guest-host LC medium or an orientated EC-medium, and RP represents an APBF. The LC-cells are preferably produced first and then bonded/laminated to the RP material. In fabrication, the two LC-cells are placed on either side of a first reflective polarizer RP1, the second reflective polarizer RP2 is disposed between the second LC-cell and another lite of glass. The entire five-lite structure further undergoes a bonding/lamination process described in reference to FIG. 3 to form the final assembly.

Figure 60:
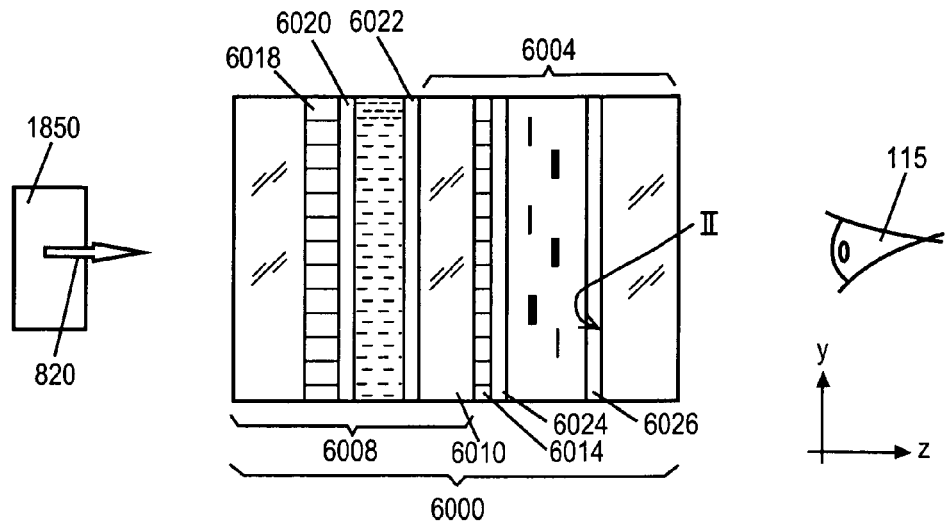
FIG. 60 shows an embodiment of the switchable mirror system with a reduced number of substrates.

It is recognized that, in a specific embodiment, the number of substrates used to configure the SMS of the invention may be reduced. For example, FIG. 60 illustrates a SMS embodiment 6000 in which the GH LC-cell 6004 and the TN LC-cell 6008 share a substrate 6010. As shown, the front RP 6014 is disposed within the GH LC-cell 6004 and outside the TN LC-cell 6008, while the rear RP 6018 is disposed within the TN LC-cell 6008. Transparent electrode layers 6020, 6022, 6024, and 6026 are appropriately deposited on the internal surfaces of corresponding cells and/or corresponding APBFs to make the cells 6004 and 6008 operational. Lamination of each of the APBFs 6014, 6018 to a corresponding substrate and lamination of the components comprising the embodiment 6000 is accomplished using the lamination method of the invention as described herein. It is recognized that the front APBF 6014 can be instead disposed on surface II. It is also appreciated that, in an alternative embodiment, a wire-grid polarizer (not shown) can be employed in place of at least one of the APBFs 6014, 6018.

Depending on the quality of the glass, it may be necessary to have each lite of glass be 1.6 mm thick or even thicker. (Thinner, less expensive glass may have inadequate optical distortion properties, but its use is also contemplated) The total mass of this construction then is approximated as weight of a piece of glass having transverse dimensions of a substrate and thickness of about 8 mm. Given the density of glass of about 2.44 grams/cm$^3$, the preferred net weight of the embodiment per unit area is about 2.0 grams/cm$^2$. (The TCO and RP layers are relatively thin and can be ignored to the first order of magnitude). In some applications the weight per unit area of 2.0 grams/cm2 may not be acceptable. For instance, in automotive rearview mirrors where the mirror is suspended from the windshield, minimization of arising vibrations of the mirror may dictate a reduction of its weight. Therefore, weight per unit area of the embodiments of the SMS of the invention, regardless of the number of substrates used, is preferably less than 2.0 g/cm2, more preferably less than 1.2 g/cm2, more preferably less than 1.0 g/cm2 and most preferably less than 0.75 g/cm2. For instance, if 1.6 mm thick glass substrates are used in a structure defined above, the weight per unit area of the SMS embodiment would be about 1.17 g/cm2. If higher quality glass were used, the thickness of the lites could be reduced to 0.7 mm and the weight per unit area would be approximately 0.51 g/cm2.

Minimization of Transmission in a "Low Transmission" Mode:

One possible shortcoming of a segmented switchable mirror system employing RPs may stem from the fact that light from a display backlight or a backlight illuminator of such system may leak through the segments of the mirror that are not active at the moment. An example of such situation is provided by a rearview assembly employing a segmented mirror system and a TFT-LCD, which is continuously illuminated but only a portion of which has to be viewable at any given moment through a corresponding segment of the mirror (e.g., to provide visible readings of a compass heading, time, or temperature to the viewer). One possible solution to the light-leakage problem and assuring that transmission of the segmented mirror system in "high R/low T" mode is minimized is the use of RPs having high polarizing efficiency. For efficient use in rearview mirror assemblies the light leakage through the mirror system operating in the low-transmission state should be below 7%, preferably below 4%, and most preferably below 2% of the amount of incident light. The efficiency of a given polarizer can be determined by measuring the light transmission through a combination of the given RP and an efficient absorptive polarizer. Table 2C shows the polarizing efficiencies for several types of polarizers based on measurements, while paired with an absorptive polarizer, in two configurations: a) transmission axes of the two polarizers are collinear; and b) transmission axes of the two polarizers are perpendicular.

TABLE 2C

| Absorptive Polarizer Paired With: | a) % T of light (transmission axes collinear) | b) % T of light (transmission axes perpendicular) | Polarizing Efficiency |
|---|---|---|---|
| Absorptive Polarizer | 77.58 | 0.14 | 551 |
| APF-50 (3M Inc.) | 88.91 | 2.40 | 37 |
| APF-35 (3M Inc.) | 89.97 | 3.23 | 28 |
| DBEF-Q (3M Inc.) | 88.31 | 6.29 | 14 |
| Wire-grid polarizer (Moxtek) | 89.23 | 0.39 | 230 |

In a segmented mirror system employing a TN LC-cell device and a pair of RPs (see, e.g., embodiments of FIGS. 33, 34, 52-55), an alternative solution to the above-described problem may be provided by having a dye added to the TN LC-medium in such a fashion as to have the absorption axis of the dye be collinear with the reflective axis of the RP located at the back of the TN LC-cell. In such configuration, the light transmitted from the backlight or display through the rear RP will be absorbed by the dye.

Yet another solution to minimize the transmission of the mirror system in a "high R/low T" mode of operation would be to add an absorptive polarizer behind the front RP (relative to the viewer) such that the absorption axis of the former is collinear with the reflection axis of the latter.

The same techniques used to enhance the viewing angle and contrast ratio of LCD's can be used to improve the performance of the LC switchable mirror element. The combination of liquid crystal fluid and element cell gap can be optimized for the best optical performance in the $1^{st}$, $2^{nd}$, or $3^{rd}$ minima with a first minima device being preferred. Compensating films can be used to improve off angle performance such as uniaxial and biaxial oriented retardation films, coated liquid crystal films or modified TAC films. These films are available from Fujifilms (Wide View), Nippon Oil, Zeon Chemical, LG Chemical, JSR and Konica-Minolta.

Multiple Electrode Surface Multiple Electrode Segments Contact Methods:

In switchable mirror systems described in this specification there is a substrate having electrodes with many segments and a substrate that can have electrodes on one or both surfaces. Making reliable electrical contact between these electrodes and a printed circuit board or drive electronics is challenging. The substrates can be offset in an alternate pattern in either transverse direction with respect to a direction of propagation of light (i.e., along either x- or y-axis or along both axes) to expose the electrode surfaces and enable contact. If a substrate has an electrode on both surfaces, or if two substrates that have electrodes oriented back-to-back share the same offset, electrical contact can be made to both electrodes with, for instance, a C-shaped clip. Alternatively, both electrodes could be patterned in an alternating offset contact configuration so as to allow for the C-shaped clip to be set in contact with the top electrode, the bottom electrode, or both electrodes. In this way the top and bottom electrodes could be addressed independently. If the top and bottom electrodes were segmented and the multiple segments were offset relative to one another, the segments could also be addressed independently. Contact can be made to electrodes with offset substrates that form a contact ledge with a multiple contact spring connector inserted onto the contact ledge, multiple C shaped clips with a leg commonly called dual or single in line clips in the LCD industry, a C shaped buss clip with a soldered wire or spring connector, a heat or pressure bonded connection to a flexible circuit ribbon or a conductive elastomer type connector. If there is no offset between the substrates a conductive material such as a coating or metal filled ink or adhesive could be applied such that it contacts the electrode and rolls over onto perimeter edge of the substrate to allow that electrode connections could be made to the edge of the substrate. Electrical connection to the conductive portion on the edge of the substrate could be made with a spring clip compressed by or molded into a bezel assembly, a L shaped clip, a Z shaped clip or a J shaped clip. One portion of the clip could be attached to the back surface of the mirror assembly if desired. If the spacing between the substrates allows, part of a J shaped clip cold be inserted between the substrates to make contact to the electrode. Another method of contacting the electrode surface is to use wire bonding to connect the electrode surface to a control module or electrical distribution system.

It is recognized that the configuration of the TN LC-cell (such as cell 3303), which rotates the polarization of light by 90 degrees upon traversal of the powered "off" cell and which is used in conjunction with the two aligned RPs (such as RPs 3311, 3312), is intentionally chosen. The purpose of such configuration is to assure that in the case of failure (power off) the switchable mirror system of any of the embodiments discussed in reference to FIGS. 33, 34, 45, 46, 52-59 that employ such a TN LC-cell in the rearview assembly remains in the reflecting state, and that the user is still able to such assembly as a simple rearview mirror. It is appreciated, however, that a similar performance will be achieved if an alternative configuration were chosen, where the LC-medium does not rotate the polarization of light upon traversal of the powered "off" LC-cell and where the LC-cell is sandwiched between the two crossed RPs (not shown). This alternative embodiment is also contemplated within the scope of the invention.

Moreover, it is desirable to have a failed (powered off) switchable mirror system have reflectance that meets or exceeds minimum reflectance standards required by regulation (reflectance greater than 35% in the US and greater than 40% in Europe). When any embodiment of an SMS described above in reference to FIGS. 52 through 59 fails, it should have intermediate ("mid R") level of reflectance, as shown by "Power OFF/Power OFF" line of Table 2B. It is desirable that various parameters and characteristics (such as dye concentration and properties, absorption and reflection of glass coatings and reflective polarizer) of an embodiment of the SMS be judiciously chosen to meet minimum reflectance regulations in the "mid R" mode. If an orientated EC-element that absorbs one polarization of light is used in place of the GH LC-cell and such EC-element is designed to become transparent (bleached) with power "off", the mirror system would fail in the high-reflectance ("high R") mode, as shown by Power OFF/Power OFF" line of Table 2B1. It is desirable that the mirror system meets or exceeds minimum reflectance regulations in the "high R" state.

Figure 61A:
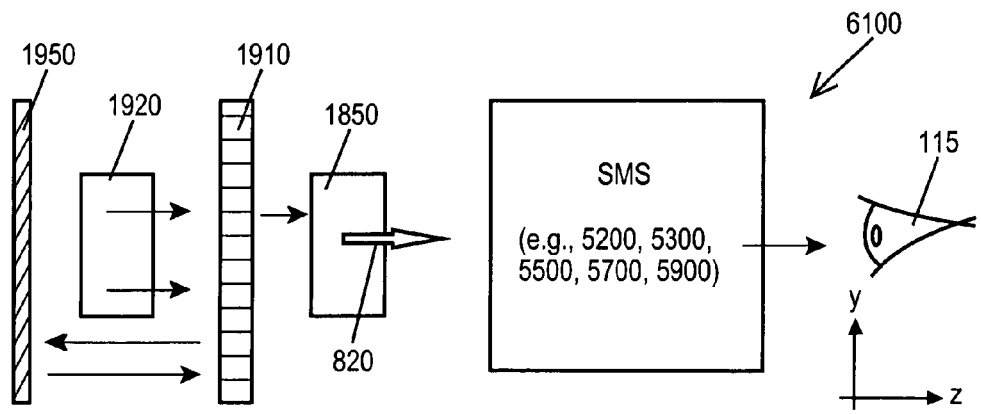
FIGS. 61(A, B) illustrate two alternative implementations of a rearview assembly employing means for recirculating light that illuminates the display of the assembly and a switchable mirror system according to an embodiment of the invention.
Figure 61B:
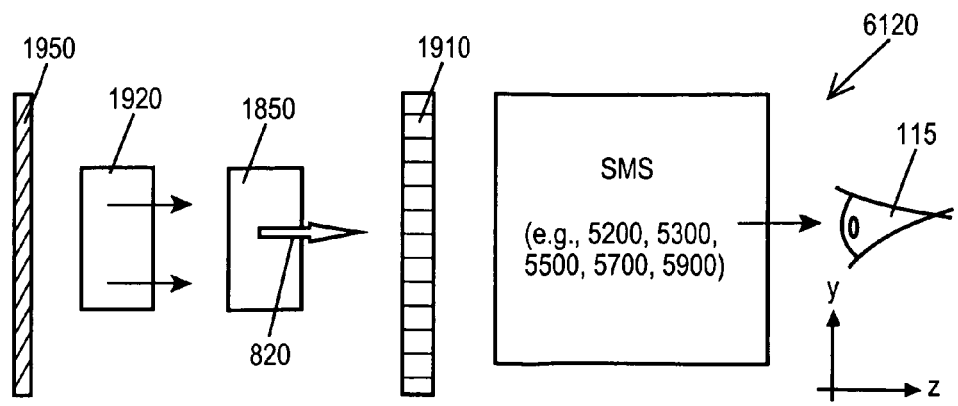

Embodiments of rearview assembly that combine means for recirculation of light emitted by a backlight (emitter) to illuminate the LCD and an embodiment of the SMS of the invention are also within the scope of the present invention. Such embodiments include generally include more than two RPs, one of which is employed outside of the SMS. As shown in FIGS. 61(A, B), for example, one such rearview assembly embodiment 6100 contains the SMS (such as 5200, 5300, 5500, 5700, or 5900) and an LCD 1850 that is illuminated with light emitted by a light emitter 1920. As shown, an RP 1910 is used to optimize transmission of unpolarized light from the light emitter 1920 through an LCD 1850 in a conventional display application by re-circulating a portion of the emitted light between the RP 1910 and the reflector 1950. The RP 1910 and the reflector 1950 positioned on the opposite sides of the light emitter 1920 in a fashion described in prior art. In a related embodiment 6120 of FIG. 61(B), the RP 1910 is shown to be disposed between the LCD 1850 and an embodiment of the switchable mirror system.

E) Exemplary Embodiments with Tailored Optical Characteristics.

The effect produced by a reflectance-enhancing coating on the overall (unpolarized light) reflectance and polarized transmittance characteristics of a mirror assembly may be quantified by defining a figure of merit such as, e.g., the ratio of the polarized transmittance and the overall reflectance (PT/R). This figure of merit is listed in Table 3, together with the corresponding reflectance and transmittance data discussed above with reference to embodiments of FIGS. 8(A-

Figure 10:
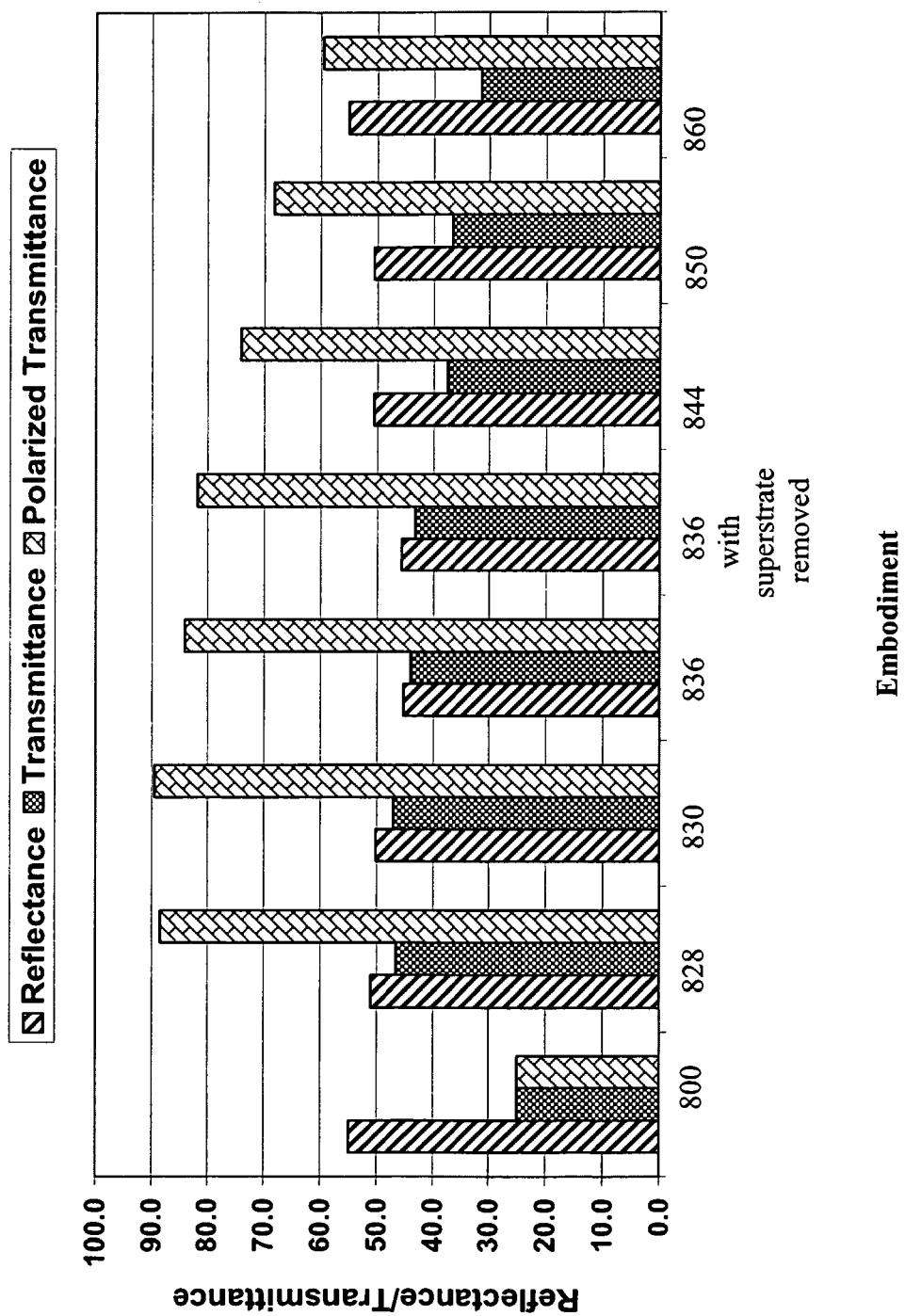
FIG. 10 graphically presents the date of Table 3.

G). In addition, Table 3 contains the data representing performance characteristics associated with an embodiment similar to the embodiment 836 of FIG. 8(D) but having the lite 826 removed. FIG. 10 presents the data of Table 3 in a graphical form. In an attempt to optimize the structure of an automotive mirror assembly (that comprises an APBF-laminate and has a given overall, unpolarized light reflectance value) by achieving high polarized transmittance, various reflectance-enhancing layers may be evaluated and those providing for higher polarized-transmittance-to-overall-reflectance (PT/R) ratios may be preferred. The choice of materials for an APBF may also be based on similar criteria. For example, in comparison with the PT/R ratio of 0.45 for the prior art transflective mirror assembly embodiment 800, the PT/R ratio of the embodiments of the current invention (where the employed thin-films stacks may or may not include the reflectance-enhancing layers) may be increased above 0.5 and preferably above 0.75. In a specific embodiment, the PT/R ratio may be increased to above 1.0 and preferably above 1.25.

reflectance value can be achieved by disposing a reflectance-enhancing coating in front of the EC-layer (with respect to the viewer), e.g., on surface I or surface II, instead of disposing such a coating behind the EC-layer. Other methods such as adjusting the cell spacing of the EC-element or the concentrations of the anode and cathode materials, or the variation of the operating voltage may also be used to adjust the minimum reflectance of the device.

The reflectance of a surface overcoated with a single dielectric overlayer can also be enhanced by adding a pair of layers to the single dielectric overlayer. The refractive index of one such layer, designated as low (or L), should be smaller than the refractive index of the single dielectric overlayer, while the index of the second layer, designated high (or H), should be larger than the refractive index of the L layer. The H layer may be made of the same material as the single dielectric overlayer, or it may be made of a different material. The degree to which the overall reflectance of an optical surface is enhanced depends on the index contrast of the

TABLE 3

| Embodiment | Overall Reflectance R, [%] (unpolarized light) | Overall Transmittance T, [%] (unpolarized light) | Polarized Transmittance PT, [%] | Light Throughput, [cd/m$^2$] (from Display of 8,000 cd/m$^2$ to Viewer) | Increase of PT, [times] (in comparison with embodiment 800) | PT/R |
|---|---|---|---|---|---|---|
| 800, FIG. 8(A) | 55.0 | 32.4 | 32.4 | 2,592 | 1.0 | 0.59 |
| 828, FIG. 8(B) | 51.1 | 46.5 | 88.5 | 7,080 | 3.5 | 1.73 |
| 830, FIG. 8(C) | 50.2 | 47 | 89.5 | 7,163 | 3.6 | 1.78 |
| 836, FIG. 8(D) | 45.3 | 44 | 84.0 | 6,719 | 3.4 | 1.85 |
| 836 (with superstrate 826 removed) | 45.6 | 43.3 | 81.8 | 6,542 | 3.3 | 1.79 |
| 844, FIG. 8(E) | 50.6 | 37.5 | 74.2 | 5,933 | 3.0 | 1.47 |
| 850, FIG. 8(F) | 50.6 | 36.7 | 68.3 | 5,463 | 2.7 | 1.35 |
| 860, FIG. 8(G) | 55.1 | 31.4 | 59.6 | 4,766 | 2.4 | 1.08 |

For example, applying quarter-wave dielectric coatings to at least one of surfaces I and II in a mirror assembly embodiment that comprises an EC-element and a reflective polarizer (such as embodiments of FIG. 6 or FIG. 8(D)), potentially increase the overall reflectance of the mirror. The gain in reflectance, however, may come at the expense of some disadvantages such as spurious reflections perceived as double-images and higher reflectance of the rearview mirror system in the "darkened" state. The "darkened" state corresponds to the situation when the transmittance of the EC-element is minimized and interfaces behind the EC-medium do not meaningfully contribute to the overall reflectivity of the mirror assembly. Therefore, in one embodiment it may be preferred to have surfaces I and II with low reflectivity values. If the reflectivity of at least one of surfaces I and II is minimized, then in the darkened state the overall reflectivity of the described mirror assembly is also minimized as the overall reflectivity is predominantly defined, in the darkened state, by reflectance values of surfaces I and II. As a result, the dynamic range of the reflectance of the mirror assembly may be broadened. The reflectivity of surface II may be reduced, for example, by depositing a half-wave thin-film layer on surface II. On the other hand, in another embodiment, it may be desirable to increase the value of overall reflectance that the mirror has in the darkened state. For example, some automotive manufacturers prefer that the minimum reflectance of convex or aspheric outside EC-mirrors be above twelve percent. An appropriate adjustment of the overall minimum thin-film materials used for such enhancement. The equivalent optical thickness of each of the H and L layers in the enhancing pair of layers should be about a quarter-wave so as to maximize the resulting reflectance of the thin-film stack. Preferably, in such a pair of layers, the refractive index of the reflectance-enhancing layer with the "high index" value is greater than about 1.7, and more preferably greater than 2.0. In some embodiments, such index may be on the order of or even exceed 2.4. Preferably, the difference between indices of the H and L layers should be greater than about 0.4 and more preferably greater than about 0.7. In some embodiments, the index of L-layer may be more than 1.0 below that of H-layer. Additional high/low pairs can be added to further enhance the reflectance. For instance, the overall material stack may comprise (starting with materials farthest from viewer) G/RP/H/G.

Alternative embodiments of the structures having enhanced reflectance, for use in automotive mirror assemblies may be, e.g., G/RP/H/L/H/G, or G/RP/H/L/H/G/ITO/EC/ITO/G and similar structures, where, instead of a layer of the ITO on surface III, a semi-transparent layer of metal (preferably Ag or Ag-based alloy such as silver-gold alloy, which is known to be chemically stable when in contact with most fluid-based EC media) may be used for enhancement of reflectance. Additional layers may be employed to attain color neutrality in reflection, as discussed in various commonly-assigned patent applications. In the abovementioned structures, G denotes a glass layer (substrate); RP corresponds to a reflective polarizer component; H and L conventionally denote dielectric layers with high and low refractive indices, respectively; and EC symbolizes a layer of electrochromic medium. The H and L layers or any combination of such layers may be deposited directly onto the glass substrate or, alternatively, may be disposed directly onto the reflective polarizer component, depending on the requirements of a given application. The refractive index of any bulk layer interface in the reflective polarizer system can also play a role in modifying, attenuating or enhancing the reflectance. In general, to enhance reflectance a larger difference in refractive index between two neighboring materials is preferred. Conversely, minimizing the difference in the refractive index between neighboring materials typically will reduce the reflectance. Any additional interface materials present on the reflective polarizer can influence the reflectance due to the refractive index mismatch phenomena.

If an additional depolarizer (in the form of a depolarizing layer, for example), or pressure sensitive adhesive or other material is placed between the reflective polarizer and a coated or uncoated glass surface then the refractive index of this material will be a determining factor in the final reflectance. For example, in one embodiment, when a high-index reflectance-enhancing layer is present on surface IV of the system, the system reflectance may be maximized if the neighboring material has a relatively low refractive index—the lower the better. It is understood that optimization of the entire system is required to achieve a desired set of properties. The optimal refractive indices of materials used will generally depend on the indices of surrounding materials and may vary depending on the application.

In other possible embodiments, as discussed below, the use of a graded index material between the reflective polarizer and the adjacent glass surface may result in the optimal reflectance effects if the there are divergent requirements for the reflective polarizer and the coated or uncoated neighboring surface or interface. Non-limiting examples of suitable high refractive index layers are: antimony trioxide, cadmium sulfide, cerium oxide, tin oxide, zinc oxide, titanium dioxide or various titanium oxides, lanthanum oxide, lead chloride, praseodymium oxide, scandium oxide, silicon, tantalum pentoxide, thallium chloride, thorium oxide, yttrium oxide, zinc sulfide, zirconium oxide, zinc tin oxide, silicon nitride, indium oxide, molybdenum oxide, tungsten oxide, vanadium oxide, barium titanate, halfnium oxide, niobium oxide, and strontium titanate. Non-limiting examples of suitable low refractive index layers are: aluminum fluoride, aluminum oxide, silicon oxide, silicon dioxide, calcium fluoride, cerium fluoride, lanthanum fluoride, lead fluoride, lithium fluoride, magnesium fluoride, magnesium oxide, neodymium fluoride, sodium fluoride, thorium fluoride or a porous film with high density of voids. The reflectance value of the mirror system and spectral properties of light reflected by the system can be further tuned by using at least one optical layer having material properties that vary with layer thickness. A common example of such materially non-uniform layer is known as a graded composition coating (GCC). In comparison with the graded thickness layers (characterized by spatially uniform material properties and spatially non-uniform thickness), a GCC may have a spatially non-uniform material composition resulting, e.g., in a refractive index that varies as a function of thickness. In one embodiment, the mirror assembly may include a GCC formed with a variable mixture of $SiO_2$ (refractive index of about 1.45) and $TiO_2$ (refractive index of about 2.4). For example, next to a substrate onto which the GCC is deposited, the GCC may predominantly contain $SiO_2$ (and, therefore, have a refractive index approaching 1.45). Throughout the thickness of the GCC, the material composition of the GCC is varied to increase the content of $TiO_2$. As a result, the refractive index of the outer portion of the GCC may be approaching 2.4.

Alternatively or in addition, the overall reflectance of the rearview mirror assembly containing a multi-layered RP may be increased by altering the layers of the RP component. This may be accomplished, e.g., by adjusting thicknesses of different layers in a multilayered plastic-film based reflective polarizer. Alternately, the indices of these layers may be altered. The net reflectance and transmittance may thus be adjusted or tuned to the needs of a given application. In an typical inside rearview automotive mirror the reflectance is preferably greater than about 45%, more preferably greater than 55%, even more preferably greater than 60% and most preferably greater than about 65%.

The spectrum of light reflected (and that of light transmitted) by an embodiment of the mirror system of the invention can be tuned or modified by adjusting the thickness of the reflectance-enhancing layers. The peak reflectance will vary with optical design wavelength and this will result in a change in color gamut of the reflected (and transmitted) light. In discussing color distributions (i.e., spectra of light), it is useful to refer to the Commission Internationale de l'Eclairage's (CIE) 1976 CIELAB Chromaticity Diagram (commonly referred to the L*a*b* chart or quantification scheme). The technology of color is relatively complex, but a fairly comprehensive discussion is given by F. W. Billmeyer and M. Saltzman in *Principles of Color Technology*, $2^{nd}$ Edition, J. Wiley and Sons Inc. (1981). The present disclosure, as it relates to color technology and uses appropriate terminology, generally follows that discussion. According to the L*a*b* quantification scheme, L* represents brightness, a* is a color coordinate that denotes the color gamut ranging from red (positive a*) to green (negative a*), and b* is a color coordinate that enotes the color gamut ranging from yellow and blue (positive and negative values of b*, respectively). As used in this application, Y (sometimes also referred to as Cap Y), represents the overall reflectance. For example, absorption spectra of an electrochromic medium, as measured at any particular voltage applied to the medium, may be converted to a three-number designation corresponding to a set of L*a*b* values. To calculate a set of color coordinates, such as L*a*b* values, from the spectral transmission or reflectance, two additional parameters are required. One is the spectral power distribution of the source or illuminant. The present disclosure uses CIE Standard Illuminant A to simulate light from automobile headlamps and uses CIE Standard Illuminant $D_{65}$ to simulate daylight. The second parameter is the spectral response of the observer. Many of the examples below refer to a value Y from the 1931 CIE Standard since it corresponds more closely to the spectral reflectance than L*. The value of "color magnitude", or C*, is defined as $C^*=\sqrt{(a^*)^2+(b^*)^2}$ and provides a measure for quantifying color neutrality. The metric of "color difference", or $\Delta C^*$ is defined as $\Delta C^*=\sqrt{(a^*-a^{*\prime})^2+(b^*-b^{*\prime})^2}$, where (a*, b*) and (a*', b*') describe color of light obtained in two different measurements. Additional CIELAB metric is defined as $\Delta E^*=(\Delta a^{*2}+\Delta b^{*2}+\Delta L^{*2})^{1/2}$. The color values described herein are based, unless stated otherwise, on the CIE Standard D65 illuminant and the 10-degree observer.

Table 4 illustrates the calculated changes in spectral distribution of light reflected by the embodiment of FIG. 8(D) that was modified by adding (depositing) a single layer of titania, $TiO_2$, on surface IV. In this calculation the refractive index of $TiO_2$ layer was assumed to equal n=2.24 (with recognition that in practice this index may somewhat vary due to processing conditions). In comparison, Table 5 similarly illustrates changes in spectral distribution of ambient light reflected by the embodiment of FIG. 8(D) that was modified by deposition of an additional H/L/H stack on surface IV. In this calculation it is assumed that the high index layer has a refractive index of 2.24 and the low index layer has a refractive index of 1.45. The thin film models described above were used for both of these calculations. In both examples (the one of Table 4 and the one of Table 5) all quarter-wave layer thicknesses are adjusted to the same design wavelength. As shown in Table 4, the reflectance reaches its peak value at a design wavelength of about 550 nm. The color gamut of the reflected light shifts towards blue (which is indicated by lower values of b*) when the design wavelength drops below approximately 450 nm, and towards yellow/red for design wavelengths of about 500 nm and above (which is indicated by increase of b* and a*). This effect is achieved due to preferential enhancement of the reflectance of the assembly in certain portions of the visible spectrum. As can be seen from comparison of Tables 4 and 5, the additional layers magnify the changes in reflectance spectrum, which is indicated by changes, in a* and b* values, that increases with changes to the optical thickness of the stack. Appropriate adjustment of optical thicknesses, refractive indices, and/or the number of layers in the stack independently may lead to a particular spectral distribution of reflectance, as may be required by a specific application of the mirror assembly. For instance, a given reflectance with a yellow hue may be obtained or a different reflectance with a blue or red hue may be obtained by the appropriate tuning of the layer thicknesses.

TABLE 4

| Reference Wavelength, nm | Cap Y | a* | b* |
| --- | --- | --- | --- |
| RP alone | 47.18 | 2.95 | −3.61 |
| 400 | 49.43 | 2.03 | −3.8 |
| 450 | 49.78 | 1.88 | −3.57 |
| 500 | 49.97 | 1.81 | −3.26 |
| 550 | 50 | 1.8 | −2.91 |
| 600 | 49.9 | 1.87 | −2.56 |
| 650 | 49.67 | 2.02 | −2.27 |
| 700 | 49.35 | 2.25 | −2.1 |
| 750 | 48.96 | 2.55 | −2.1 |

TABLE 5

| Reference Wavelength, nm | Cap Y | a* | b* |
| --- | --- | --- | --- |
| RP alone | 47.18 | 2.95 | −3.61 |
| 400 | 51.79 | 0.51 | −7.51 |
| 450 | 55.13 | −1.47 | −5.46 |
| 500 | 57.36 | −2.36 | −2.16 |
| 550 | 57.91 | −2.12 | 1.42 |
| 600 | 56.78 | −0.5 | 3.74 |
| 650 | 54.41 | 2.37 | 3.32 |
| 700 | 51.62 | 5 | 0.85 |
| 750 | 49.35 | 5.71 | −1.56 |

(E.1) Employment of UV-Protection Means.

Plastic films having little absorption in the visible portion of the spectrum and, in particular, polymer-based RP films employed in embodiments of the present invention may be susceptible to degradation upon exposure to UV and/or short-wavelength visible light. Similarly, in embodiments of the invention that include LC-cell based devices, LC-medium may be similarly vulnerable. Protection of the APBFs and LC-cells from such degradation may be required and may be achieved in a number of ways. Possible ways of UV-protection are discussed below with respect to APBFs, but are understood to equally apply to UV-protection of the LC-cell-based devices contained within the embodiments of the invention.

For example, using protecting components that facilitate reflection and/or absorption of UV-light either within or in front of the APBF will generally diminish the degree of degradation of the APBF. However, improvements in UV-stability of the APBF should be carefully weighed against possible changes in other system characteristics. For example, changing the composition of glass substrates or a laminate stack in order to improve UV-stability of the APBF-containing mirror system may reduce the overall durability of the system as measured by one of the tests discussed above. Optical distortions, haze, optical angular sensitivity, depolarization effects, color characteristics (especially, yellowish hue) of the system are but only several examples of parameters that need to be considered while improving UV-light durability of the system. The use of UV-agents in the system could also affect the color of an RGB display of the system, as perceived by the viewer, if such UV-attenuators alter the transmission of the system in the visible range. (In this respect, the use of an RGB display that emits light within very narrow bandwidths around the chosen red, blue, and green wavelengths of operation may be preferred because in such a case the UV-agents protecting the APBF are less likely to interfere with light emanating from the display.) Incorporation of UV-agents may also affect the ability of a given component to withstand the fabrication process and its resulting mechanical characteristics (e.g., pliability and inclusions of particles). For example, UV-protection means used on the first surface of the mirror system may affect susceptibility to scratches, solvent resistance, as well as hazing or fogging of that surface. Finally, cost-efficiency of employed UV-protection and commercial availability of UV-agents and methods of UV-protection present an additional factor. Some issues of attenuation of UV-light within a range of wavelengths of particular sensitivity to some types of reflective polarizing films (e.g., wavelengths below 380 nm) and related test methods are discussed in U.S. Pat. Nos. 7,557,989 and 7,124,651 and a U.S. Patent Application No. 2009/0262422, assigned to 3M, Inc. U.S. Patent Application No. 2004/0241469 discusses, for example, protection of polyethylene napthalate articles from UV exposure and other external influences. Disclosure of each of the abovementioned patent documents is incorporated herein by reference in its entirety. In the art of automotive mirrors, discussions of light exposure and related tests and pass/fail criteria can be found in SAE J1960 and SAE J1885, which are weathering methods defined by Society of Automotive Engineers. In particular, acceptable exposure of an inside rearview mirror per SAE J1885 to radiation emitted by a xenon arc light source can be as high as 600 kJ/m$^2$ or even 800 kJ/m$^{2t}$ with a resulting color change of $\Delta E^* < 3$ measured in reflectance. Other cosmetic requirements may also apply such as uniformity of fading of color, or yellowing, or haziness that might occur during testing. Additional methods on material testing solutions is provided by Atlas material Testing Technology LLC and may be found at http://www.atlas-mts.com/en/client_education/client_education_event_overview/weather-ometer_workshops/index.shtml.

Several technologies that may be useful for light attenuation to protect the reflective polarizer in various embodiments of the invention. Embodiments of the present invention may employ, for example, vacuum sputtered or sol-gel interferential coatings on one of the surfaces in front of the APBF as viewed by the observer. Some embodiments of these techniques are described in U.S. Patent Application No. 2002/0122962 and U.S. Pat. Nos. 5,332,618 and 7,153,578. Examples of applicable sol-gel coatings are taught, for example, in U.S. Pat. Nos. 5,371,138 and 7,288,283. Disclosure of each of the abovementioned patent documents is incorporated herein by reference in its entirety. By way of example only, such coatings may be used on surfaces I, II, III, and IV of the embodiment 838 of FIG. 8(D) or on first and second surfaces of the embodiments of FIGS. 32(A-C).

In addition or alternatively, material composition of any substrate in embodiments of the invention may be modified as described, e.g., in U.S. Pat. Nos. 5,350,972 and 7,435,696, the disclosure of each of which is incorporated herein by reference in its entirety. It is understood that only those lites with modified material composition that are located in front of the APBF as viewed by the outside observer will produce the desired result of protecting the APBF from UV-component of the ambient light. In a specific embodiment, a particular substrate may include more than one component or plate one of which is made of material containing a UV-agent. For example, in reference to the embodiment 404 of FIG. 4(B), a prism element 408 may contain a UV-absorbing agent while the material of the plate 308 may be made of conventionally used glass. In such a case, however, the concentration of the UV-agent across the prism may be appropriately graded to achieve spatially uniform optical characteristics of the embodiment. A preferred alternative solution may be to add a UV-agent to a plane-parallel plate 308 instead and use the prism 408 made of conventional glass.

In embodiments where the APBF is located behind an electro-optic cell such as an EC-element or a cholesteric element, it is possible to dispose the UV-attenuating agents within the electro-optics cell. In reference to FIGS. 8(D-G), for example, a UV-attenuating agent may be added within the cell 840. Cholesteric devices and EC-elements including such UV-agents are disclosed in commonly assigned U.S. Pat. Nos. 5,798,057, 5,336,448, 7,265,888, and 6,614,578, the disclosure of each of which is incorporated herein by reference in its entirety.

Adhesive films such as PSAs and UV-curable adhesive and PVB that are used in a mirror system at locations in front of an APBF may also contain UV-absorbing agents. Although not necessary, the layers of these adhesives and PVB may be as thick as a few mils. Auxiliary polymeric films, such as those utilized to minimize UV-light transmission through residential or commercial windows may be laminated or co-laminated into an embodiment of the invention. For example, a subdivision of a prism mirror element into a wedge and a flat piece with a PVB adhesive layer is disclosed in U.S. Pat. Nos. 4,902,108 and 5,481,395. In a specific embodiment, such UV-blocking films may be employed as cladding layer(s) during the manufacture of a multilayered ABPF itself. Such a film product may have the benefit of both selective light attenuation and depolarization. It is understood that several different methods of light attenuation may be combined in order to produce desired results.

(E.2) Angularly Misaligned Reflective Polarizers.

Adjustment of the overall reflectance in embodiments of the present invention may be carried out by employing laminates containing more than one APBF elements. For example, embodiments of laminates of the invention characterized in Table 6 were structured as [Glass/RP/RP/Glass]. FIG. 25 schematically illustrates this structure in exploded view, where two DBEF-Q films 2510, 2520 used as RPs are sandwiched between the glass substrates 2530, 2540. The APBF 2510 is oriented so as to have its polarization axis 2530 be collinear with the polarization of the LCD (not shown) output, indicated in the table as "s-pol" which corresponds to the x-axis. Polarization axis 2560 of the adjacent DBEF-Q film 2520 is rotated with respect to the axis 2530 in an xy-plane, which is parallel to the films, by an amount indicated in the column "Trial". The data of Table 6 are shown for a D65 illuminant 10 degree observer. Unless indicated otherwise, the data are not polarization specific. The measurement data demonstrates that, by combining a plurality of angularly misaligned reflective polarizers in an embodiment of the invention, a decrease in transmission of light from the display may be traded-off for an increase in the overall reflectance of the embodiment. It shall be realized that, in practice, additional optical layers may be disposed adjacent to at least one of the plurality of APBFs. Some embodiments employing a plurality of APBFs, such as those described in Table 6 or the like, may require that light transmitted from the display to the observer be color neutral. This situation may arise in embodiments employing a reverse camera display (RCD). The required color neutrality may be achieved by adjusting a display algorithm for more accurate color rendering. In some embodiments, the adjustments of the display algorithm may allow for compensation of the color induced transmission bias from electrochromic medium or other components.

Some applications may require a neutral spectral distribution of reflectance of the mirror assembly (such distribution may, for example, lack high purity hues). In one embodiment of the current invention the color magnitude C* may be smaller than about 15. In a related embodiment, the color magnitude may be smaller than about 10, and, in a specific embodiment, it may be most preferably less than about 5.

TABLE 6

| Trial | In Reflection | | | In Transmission | | | Absorbance % | Transmittance % | | Figure of Merit, PT/R |
| --- | --- | --- | --- | --- | --- | --- | --- | --- | --- | --- |
| | Y | a* | b* | Y | a* | b* | | p-pol | s-pol | |
| 0 deg | 51.38 | −0.52 | −0.39 | 45.7 | −0.23 | 1.68 | 2.95 | 0.85 | 88.95 | 1.73 |
| 15 deg | 55.99 | −0.84 | −0.96 | 42.9 | 0.05 | 2.29 | 1.07 | 1.42 | 76.96 | 1.37 |
| 30 deg | 59.81 | −0.73 | −1.02 | 39.6 | −0.04 | 2.57 | 0.61 | 2.31 | 71.64 | 1.20 |
| 45 deg | 65.33 | −1.29 | −1.52 | 33.1 | 0.84 | 3.43 | 1.62 | 2.73 | 52.36 | 0.80 |
| 60 deg | 74.91 | −1.20 | −1.50 | 20.4 | 1.30 | 5.70 | 4.66 | 4.17 | 31.00 | 0.41 |
| 75 deg | 84.11 | −2.40 | −2.29 | 11.1 | 6.99 | 13.20 | 4.78 | 5.15 | 8.20 | 0.10 |
| 90 deg | 88.53 | −1.95 | −2.16 | 6.3 | 8.43 | 22.56 | 5.21 | 5.91 | 5.57 | 0.06 |

(E.3.) Embodiments Employing Opacifying and Reflectance-Enhancing Layers.

In some embodiments, the area of the display may be smaller than the area of the mirror element. Such embodiments are illustrated, for example, in FIGS. 8(A, C-F, H) or in FIG. 6. The relatively high transmittance of the reflective polarizer would generally make other components in the mirror assembly to be visible to the viewer. To preserve high polarized transmittance values of the RP component while simultaneously concealing these other components in the system (e.g., in the outer areas 644 of FIG. 6), opacification may be employed. Practical means of such opacification may include, but not be limited to, addition of an opaque material such as of plastic, or a layer of paint or ink, or a thin-film coating, suitably applied to an element of the mirror assembly, across a rearward surface of the system relative to the reflective polarizer. Depending on an embodiment of the EC-mirror assembly, such opacification may be carried out on surfaces III, IV, V or VI. In embodiments containing a prism-based mirror (such as, e.g., embodiments of FIGS. 4(B-D), 4(F) and 4(G)), the opacification may be carried out on surfaces II, III, or IV. Although embodiments of the present invention describe specific mirror systems having up to 3 lites of glass (or other material), additional lites may be used without limitation as needed to meet requirements for the system. If additional lites are employed, an opacification layer may be placed on one or more appropriate surfaces located behind the reflective polarizer relative to the viewer, which may result is aesthetically pleasing appearance of the overall rearview mirror assembly. The opacification means could be present across the entire area outside of the display or only in selected locations, as needed.

Figure 17B:
FIG. 17(B): Feathered gradient.
Figure 17A:
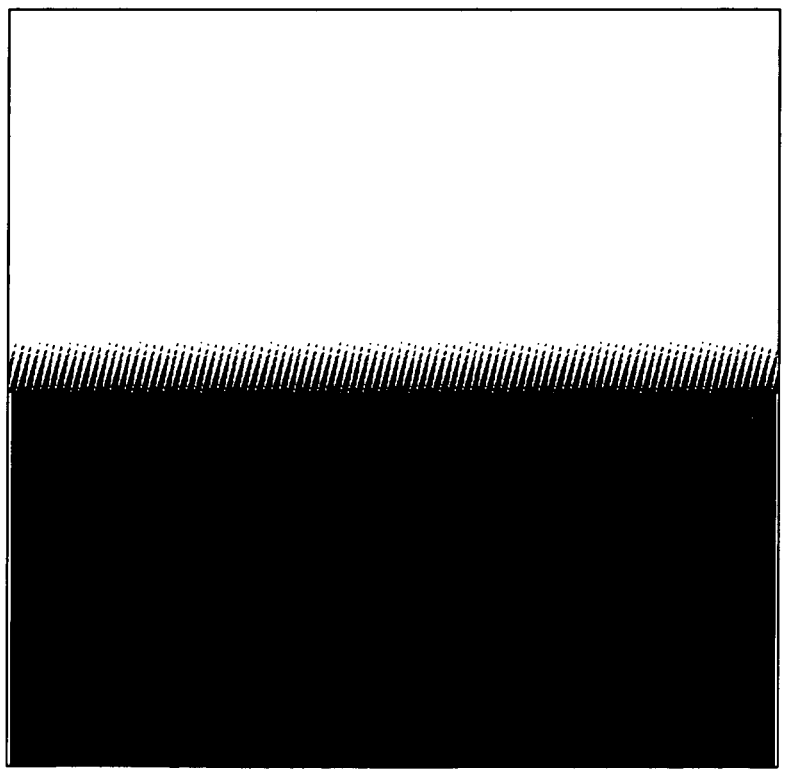
FIG. 17(A): Tapered gradient.

In addition, as discussed below, in a specific embodiment of the invention, at least some edges of the opacified areas around the perimeter of the display region may be formatted to gradually vary the transmittance of the mirror across its surface from fully transparent to fully opaque (and to accordingly gradually vary the reflectance of the mirror across its surface). Literature provides some solutions for aesthetic gradual transitions from a display area to adjacent areas have been discussed in the literature. For example, in the area of the rearview automotive mirrors the need for good match in color and reflectance has been recognized and thin-film coating-based solutions have been proposed in, e.g., commonly assigned U.S. patent application Ser. Nos. 11/713,849, 12/138,206, and 12/370,909, the disclosure of each of which is incorporated herein by reference in its entirety. A graded-thickness coating has been used in front of an APBF in, e.g., U.S. Patent Publication 2006/0164725 as a means of gradual variation of reflectance across the surface of a conventional viewing mirror employing a display. The same publication discussed additional means of hiding the edges of the display area in conventional viewing mirrors by adding a supplementary coated substrate, having a relatively high reflectance and low transmittance, in front of the APBF. Although the solution provided in U.S. 2006/0164725 facilitates concealing the edges of the display area, it suffers from the effect of parallax, whereby the spurious images are formed in reflection from the viewing mirror. Additional disadvantages of this solution stem from reduction in brightness and contrast of the display, now perceived by the viewer through the viewing mirror and the supplementary substrate. Overall, solutions proposed in prior art were recognized to be inapplicable to the field of automotive mirrors. The trade-off between a clearly discernable edge of the aperture or a parallax condition is generally recognized and no viable solution which avoids parallax and has a stealthy edge at the display area of the mirror has been realized so far. Other prior art means to adjust the reflectance (such as changing the density of reflective particles contained within a coating placed in front of the RP included in the mirror system) may result in varying haze levels (scattering from agglomerated particles within the coating) and make the edges of the aperture noticeable. In an embodiment of the present invention, the reflectance may be varied from specular to non-specular or the intensity of light reflected from the mirror may be varied or graded along the edge of the opacified area. In an embodiment of the APBF-containing rearview mirror of the present invention, depending on the size and location of the display, it may be preferred to grade either some or all of the edges of the opacified areas around the display region. The required gradations of transmittance or reflectance may be implemented by, for example, either spatially modifying the transmittance of the opacifying material itself or by patterning such material in a spatially non-uniform fashion. Such gradations may be implemented in various ways such as those described in a commonly assigned U.S. patent application Ser. No. 12/370,909. In a specific embodiment such pattern may comprise, for example, a pattern of dots created with varying spatial density. FIGS. 17(A) and 17(B) demonstrate front views of opacifying layers with graded edges specifically configured in a tapered fashion and a feathered fashion, respectively.

Figure 17C:
FIG. 17(C): Front view of an opacifying layer with graded edges that limit the layer in a horizontal direction.
Figure 17D:
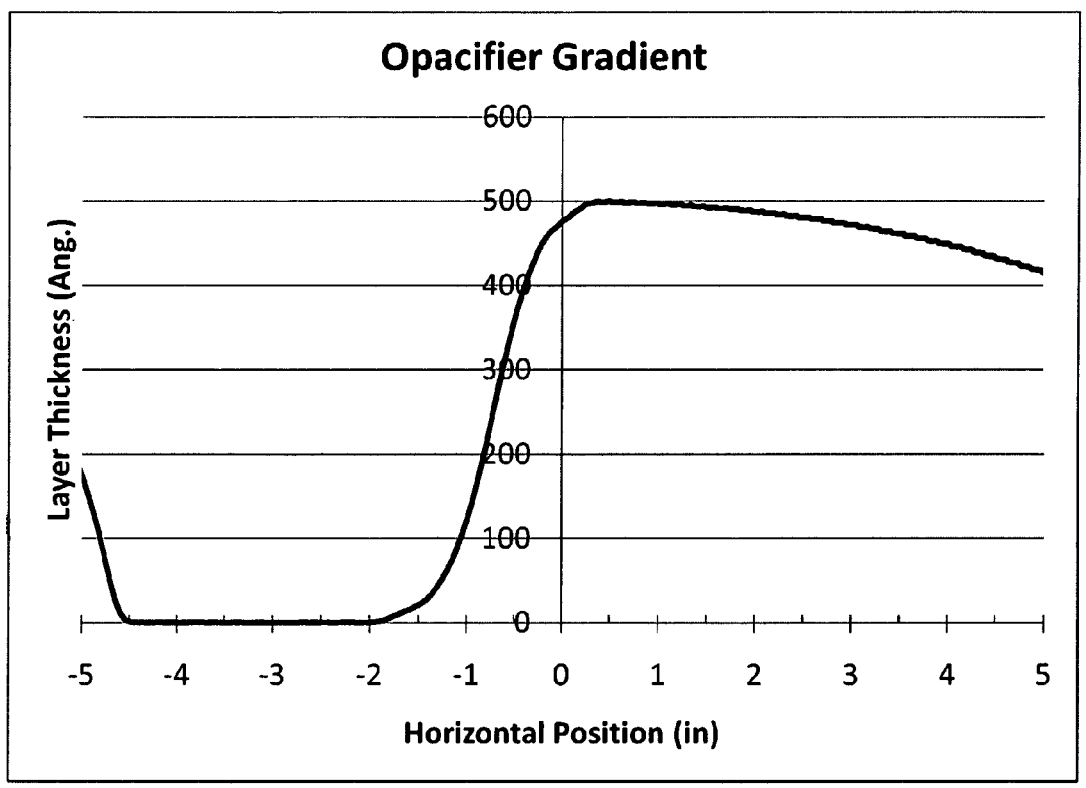
FIG. 17(D): Spatial distribution of thickness of the opacifying layer of FIG. 17(C).

Structurally, embodiments of the mirror system of the invention containing graded-thickness opacifying layers (also referred to as opacifying layers having a gradually changing thickness) may differ. For example, in an exemplary EC-type embodiment 884 of the invention, schematically shown in FIG. 8(I), a mirror system may be structured similarly to that of FIG. 8(F) but additionally have a graded-thickness opacifying layer 886 made of metal (such as Cr, Al, Ag or Ag alloy, Rh, Pd, Au, Ru, Stainless Steel, Pt, Ir, Mo, W, Ti, Cd, Co, Cu, Fe, Mg, Os, Sn, W, Zn or alloys, mixtures or combinations of the above) that is disposed on surface V of the mirror system. It would be realized that, generally, the reflectance-enhancement layer 846 added between the surface V and the graded-thickness opacifying layer 886, is optional. As shown, all the perimeter of a window 888 in the layer 886 has graded edges. The thickness of the layer 886 varies across the plane of the mirror (i.e., in xy-plane) between essentially zero and the maximum thickness (e.g., 500 Å). For comparison, FIG. 17(C) shows a front view of another embodiment 1710 of a graded opacifying layer that is limited with graded edges only along the length of the mirror (x-axis, as shown). In a second dimension (y-axis), a window 1720 in the graded layer 1710 extends to the very edge of the mirror itself. Grading of the thickness of opacifying layer 1710 along the length of the mirror, as measured, is clearly seen from FIG. 17(D). The purpose of grading the thickness of the edges is to make the transition between the display and opaque regions less noticeable to the viewer. Such gradual opacification or reflectance modification approaches may allow one to minimize the visibility of the features behind the mirror in diffuse lighting conditions. This approach thus improves the aesthetics of the mirror assembly regardless of whether a laminate, comprising a reflective polarizer such as the APBF, is a part of such assembly or not, and it is applicable in various other types of mirrors (e.g., electrochromic, simple reflectors such as or simple tilt-prism mirrors, or other mirrors suitable for use in automotive applications). Positioning of the opacifying layer, such as the layer 886, behind the RP 824 in an embodiment of the rearview mirror of the present invention facilitates a solution of problems acknowledged in prior art. In particular, such orientation of the components in the mirror system allows for reduction of the visibility of the edges of the opening 888 in the graded-edge opacifying layer without either the accompanying parallax effect or reduction in brightness and contrast of the display observed by the viewer 115.

Grading the edges of an opacifying layer as described above effectuates acceptable aesthetics of the mirror system due to the gradual transition between the transflective and opaque zones of the system. Hard-edged (abrupt) transitions between the zones of a multi-zone mirror system can also be used, provided that an adequate match of reflectance and reflected color is maintained between the zones as perceived by the viewer. Several additional examples of implementation of hard-edged transitions in embodiments of the invention are discussed further in reference to FIGS. 35 and 36.

Figure 35:
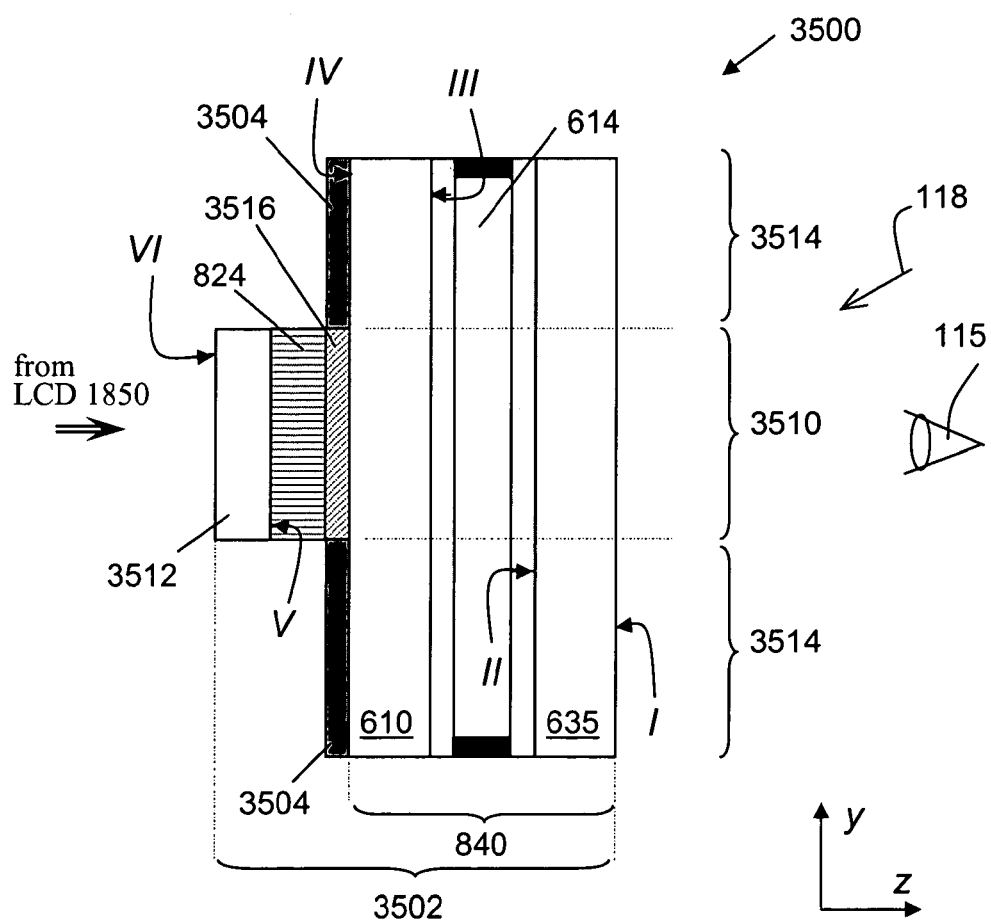
FIG. 35 shows an alternative embodiment of the invention.

FIG. 35 illustrates an example of embodiment 3500 employing a multi-zone mirror system 3502 that includes an EC-element 840, containing two lites of glass 610 and 635, and a hard-edged OREL 3504. The Chromium 300-Angstrom-thick OREL 3504 is disposed on the rear surface of the EC-element, surface IV, outside of the transflective zone 3510 of the embodiment 3500. An additional, third lite of glass 3512 is used for lamination of the APBF 824 between the lite 3512 and the EC-element 840. As shown, the APBF 824 extends over the transflective zone 3510 that corresponds to the display 1850 (not shown) but does not overlap an opaque zone 3514. Prior to lamination, a quarter-wave reflection-enhancing layer 3516 of $TiO_2$ (618 Å) is disposed on surface IV within the transflective zone 3510. Parameters of the EC-element 840 have been described elsewhere in this application. Optical characteristics of this embodiment are as follows: reflectance of the transflective zone is 51.4%, a value of $a^*$ in reflectance is of −1.9, and a value of $b^*$ in reflectance is −2.5. The opaque zone has a reflectance of 51.0%, a value of $a^*$ in reflectance is −3.1 and a value of $b^*$ in reflectance is −2.6.

In further reference to the structure of FIG. 35, in an alternative specific embodiment (not shown) a H/L/H quarter-wave stack 3516 of $TiO_2$ (523 Å)/$SiO_2$ (876 Å)/$TiO_2$ (523 Å) may be placed between APBF 824 and surface IV an alternative to a single quarter-wave layer of $TiO_2$. To match the optical characteristics of thus configured transflective zone 3510, an OREL 3504 is also modified to include a stack of Chromium (200 Å) and Aluminum (80 Å) layers deposited in that order, in the opaque zone, on surface IV. This combination of components results in the transflective zone having a reflectance of 64.1%, a reflected $a^*$ value of −6.4 and a reflected $b^*$ value of −1.0. The opaque zone has a reflectance of 64.0%, a reflected $a^*$ value of −3.7 and a $b^*$ value of −0.3.

Figure 36:
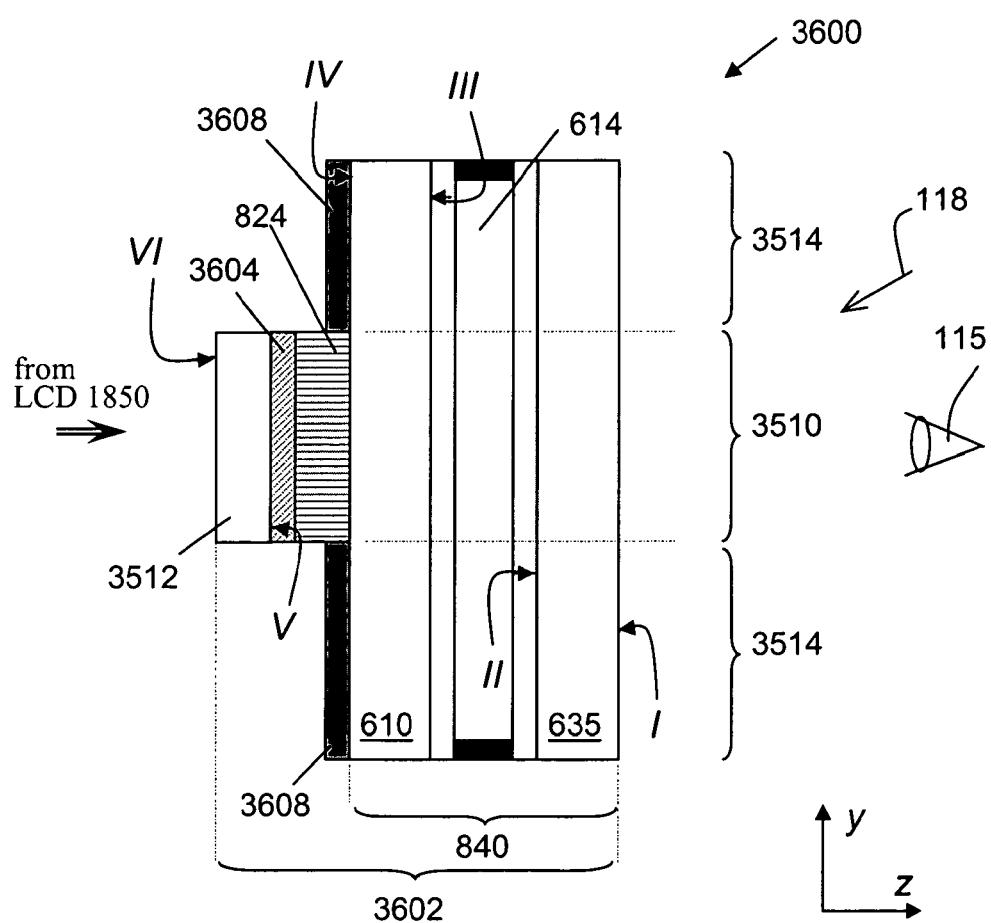
FIG. 36 shows another alternative embodiment of the invention.

In reference to FIG. 36, an embodiment 3600 of a multi-zone mirror system 3602 employs a reflectance-enhancing quarter-wave layer 3604 of $TiO_2$ (646 Å) on Surface V in the transflective zone 3510 and a Chromium (250 Å) OREL 3608 located on Surface IV in the opaque zones. In this embodiment, the APBF layer 824 is spatially limited to the transflective zone 3510 and is laminated between the third lite 3512 and the EC-element 840. Other system characteristics are the same as those of the embodiment 3500 of FIG. 35. The resulting optical characteristics are as follows: a) Transflective zone 3510: reflectance of 51.3%, a reflected $a^*$ value of −1.8 and a reflected $b^*$ value of −1.8. b) Opaque zone 3514: reflectance of 51.0%, a reflected $a^*$ value of −2.8 and a reflected $b^*$ value of −2.2.

It should be noted that, in specific embodiments, the reflectance-enhancement coating may be configured so as to include a quarter-wave stack of thin-film layers such as titania ($TiO_2$) and silica ($SiO_2$), for example. Table 6A below provides some examples of implementation of the reflectance-enhancement coating 846 in embodiments of FIGS. 8(E-G) containing an EC-mirror element. Table 6B illustrates implementations of the reflectance-enhancement coating in embodiments of FIGS. 32(A-C) that employ a prism-mirror element. Embodiments 3200 of FIG. 32(A), 3210 of FIG. 32(B), and 3220 of FIG. 32(C) are structurally similar to the embodiment 410 of FIG. 4(C) in that in any of these embodiments the APBF layer 302 is laminated between the prism 408 and the glass plate 304. As shown in these embodiments, a reflectance-enhancement stack 3202 is disposed on the rear, with respect to the viewer 115, surface of the prism 408 (surface II) prior to the lamination of the APBF 302; a reflectance-enhancement stack 3212 is disposed on the front, with respect to the observer, surface of the glass plate 304 (surface III) prior to the lamination of the APBF 302; and a reflectance-enhancement stack 3222 is disposed onto the rear surface of the embodiment (surface IV) either prior to or following the lamination of the APBF 302. Accordingly, embodiments of a mirror system of a rearview mirror assembly that have an overall reflectance of the ambient light in excess of 35%, or more than 40%, more preferably more than 50%, or even more than 60%, or more than 70%, and even more preferably more than 75% are within the scope of the present invention.

TABLE 6A

| Embodiment | Reflectance-Enhancement Coating, 846 | Reflectance | Transmittance | Display Transmittance (PT) |
|---|---|---|---|---|
| 844 (FIG. 8E) | $TiO_2$ 52.3 nm | 50.5% | 34.9% | 64.1% |
| 844 (FIG. 8E) | $TiO_2$ 52.3 nm $SiO_2$ 87.6 nm $TiO_2$ 52.3 nm | 63.0% | 21.5% | 37.8% |
| 844 (FIG. 8E) | $TiO_2$ 52.3 nm $SiO_2$ 87.6 nm $TiO_2$ 52.3 nm $SiO_2$ 87.6 nm $TiO_2$ 52.3 nm | 72.0% | 12.0% | 19.8% |
| 850 (FIG. 8F) | $TiO_2$ 52.3 nm | 50.4% | 34.9% | 64.1% |
| 850 (FIG. 8F) | $TiO_2$ 52.3 nm $SiO_2$ 87.6 nm $TiO_2$ 52.3 nm | 62.6% | 21.5% | 37.8% |
| 850 (FIG. 8F) | $TiO_2$ 52.3 nm $SiO_2$ 87.6 nm $TiO_2$ 52.3 nm $SiO_2$ 87.6 nm $TiO_2$ 52.3 nm | 71.2% | 12.0% | 19.8% |
| 860 (FIG. 8G) | $TiO_2$ 52.3 nm | 54.7% | 29.9% | 54.4% |
| 860 (FIG. 8G) | $TiO_2$ 52.3 nm $SiO_2$ 87.6 nm $TiO_2$ 52.3 nm | 66.2% | 16.8% | 28.8% |
| 860 (FIG. 8G) | $TiO_2$ 52.3 nm $SiO_2$ 87.6 nm $TiO_2$ 52.3 nm $SiO_2$ 87.6 nm $TiO_2$ 52.3 nm | 72.9% | 9.1% | 14.6% |

TABLE 6B

Figure 32A:
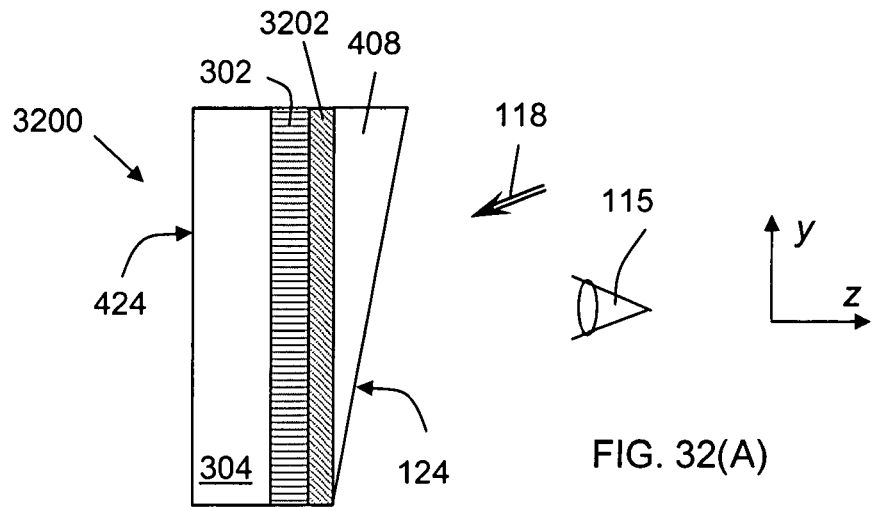
FIG. 32 shows embodiments of a prism mirror element with different implementations of a reflectance-enhancing layer.

| Embodiment | Reflectance-Enhancement Coating | Reflectance | Transmittance | Display Transmittance (PT) |
|---|---|---|---|---|
| 3200, FIG. 32(A) | 3202: $TiO_2$ 52.3 nm | 54.8% | 36.9% | 67.9% |
| 3200, FIG. 32(A) | 3202: $TiO_2$ 52.3 nm $SiO_2$ 87.6 nm $TiO_2$ 52.3 nm | 68.7% | 22.7% | 40.0% |
| 3200, FIG. 32(A) | 3202: $TiO_2$ 52.3 nm $SiO_2$ 87.6 nm $TiO_2$ 52.3 nm $SiO_2$ 87.6 nm $TiO_2$ 52.3 nm | 78.6% | 12.7% | 20.9% |

TABLE 6B-continued

Figure 32B:
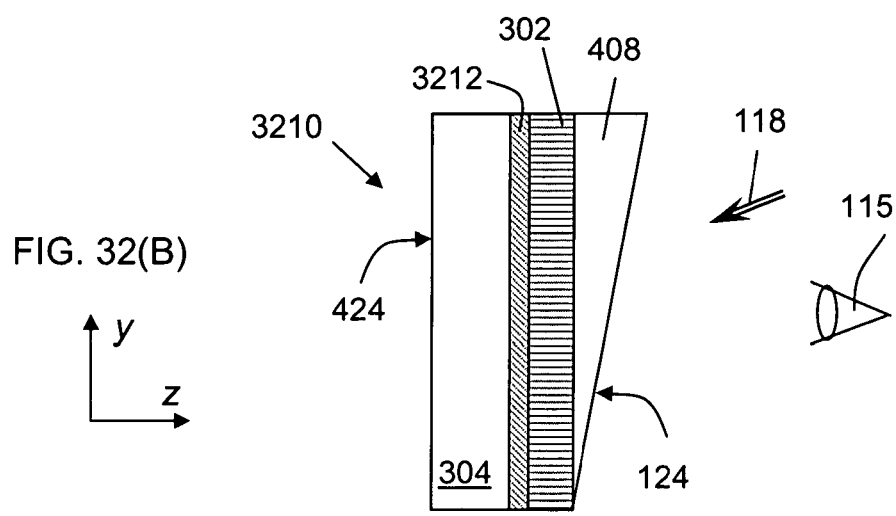
Figure 32C:
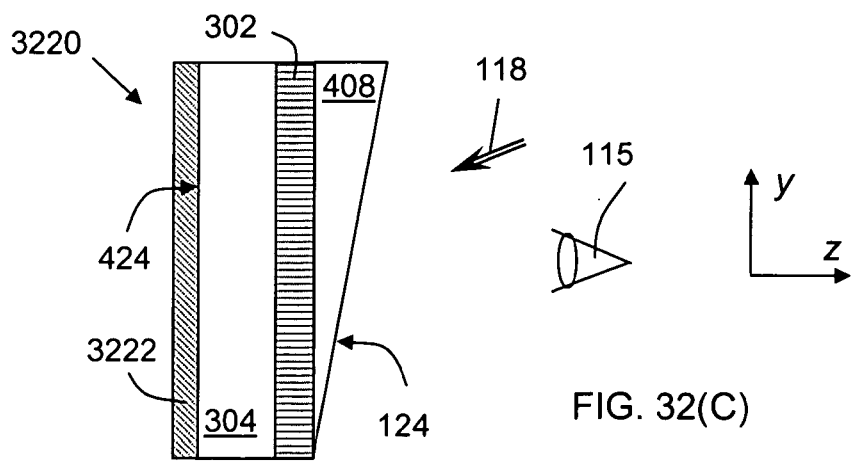

| Embodiment | Reflectance-Enhancement Coating | Reflectance | Transmittance | Display Transmittance (PT) |
|---|---|---|---|---|
| 3210, FIG. 32(B) | 3212: TiO$_2$ 52.3 nm | 54.6% | 36.9% | 67.9% |
| 3210, FIG. 32(B) | 3212: TiO$_2$ 52.3 nm SiO$_2$ 87.6 nm TiO$_2$ 52.3 nm | 68.2% | 22.7% | 40.0% |
| 3210, FIG. 32(B) | 3212: TiO$_2$ 52.3 nm SiO$_2$ 87.6 nm TiO$_2$ 52.3 nm SiO$_2$ 87.6 nm TiO$_2$ 52.3 nm | 77.7% | 12.7% | 20.9% |
| 3220, FIG. 32(C) | 3222: TiO$_2$ 52.3 nm | 59.4% | 31.6% | 57.5% |
| 3220, FIG. 32(C) | 3222: TiO$_2$ 52.3 nm SiO$_2$ 87.6 nm TiO$_2$ 52.3 nm | 72.3% | 17.7% | 30.5% |
| 3220, FIG. 32(C) | 3222: TiO$_2$ 52.3 nm SiO$_2$ 87.6 nm TiO$_2$ 52.3 nm SiO$_2$ 87.6 nm TiO$_2$ 52.3 nm | 79.6% | 9.7% | 15.5% |

Generally, a means for opacification and a means for reflectance enhancement may be combined or used alternatively in the areas of the mirror assembly outside the display area (such as areas 644 of FIG. 6 representing mirror areas outside of the display area 642) to reduce visibility of components located in those areas behind the mirror while simultaneously increasing the reflectivity. The value of transmittance in such outer areas 644 should be reduced, by either opacification, or enhancement of reflectance, or combination of both, to levels lower than about 10% and preferably lower than about 5%. In other embodiments, such transmittance may be reduced to levels lower than about 2.5% or even lower than about 1%.

Various surfaces of the mirror assembly can be treated to simultaneously achieve the opacification and reflectance-enhancing effects, depending on the requirements of a given application. For instance, in an embodiment comprising an EC element in front of the reflective polarizer as viewed by the observer (see, e.g., the embodiment 836 of FIG. 8(D)), a layer having both the opacifying and reflectance-enhancement properties, further referred to herein as the opaque reflectance-enhancing layer (OREL), may be disposed on surfaces III, IV, V, or VI. In a related embodiment such as the embodiment 410 of FIG. 4(C) or the embodiment 830 of FIG. 8(C) that comprised a reflective polarizer between the two lites of glass, one of which may be a prism, the OREL could be placed on surfaces I, II, III, or IV. Generally, positioning of the OREL behind the RP as viewed by the observe 115 (e.g., close to surface V of FIG. 8(I)) boosts the reflectance of the RP-element and lowers the transmittance of the embodiment of the mirror system beyond the mentioned increase of reflectance of the RP. In comparison, in an embodiment where the OREL is disposed in front of the RP, as viewed by the observer, the OREL will provide a dominating contribution to the overall reflectance of the system, which can be calculated using standard thin-film modeling techniques. Transmittance of an OREL is preferably sufficiently low to attain the transmittance targets for the system defined above (i.e., concealing components located behind the mirror assembly) while in some embodiments simultaneously increasing the reflectance. Requirements imposed on an OREL differ from those for the reflectance-enhancing layers described above that are used for optimization of optical performance of the display area of the mirror system. Materials for reflectance-enhancing layer disposed in the display area of the mirror (transflective zone) are chosen so as to simultaneously optimize the reflectance and transmittance of the transflective zone of the mirror, including the polarized transmittance characteristic. (The efficiency of such performance enhancement was described using the PT/R ratio, in Table 3, for example). In the areas outside of the display area (opaque areas), however, there is no need to preserve the value of polarized transmittance and other materials such as metals, borides, nitrides, carbides, and sulfides may be used to enhance the reflectance of and to opacify these areas.

Both the overall (unpolarized light) reflectance of the mirror assembly and the reflectance of light having a particular polarization depend on a material structure of the assembly. A description of a material structure of a mirror assembly can be provided, e.g., by listing material components of such a structure in the order starting from a component that is distal to the viewer towards a component that is proximal to the viewer. A structure of the embodiment 830 of FIG. 8(C) can be described as [G/RP/G] (where G, RP, and G respectively corresponding to components 826, 824, and 832), while a structure of the embodiment 836 of FIG. 8(D) can be similarly described as [G/RP/G/ITO/EC/ITO/G] (where the listed components respectively correspond to components 826, 824, 610, 808, 614, 817, and 635).

Figure 11:
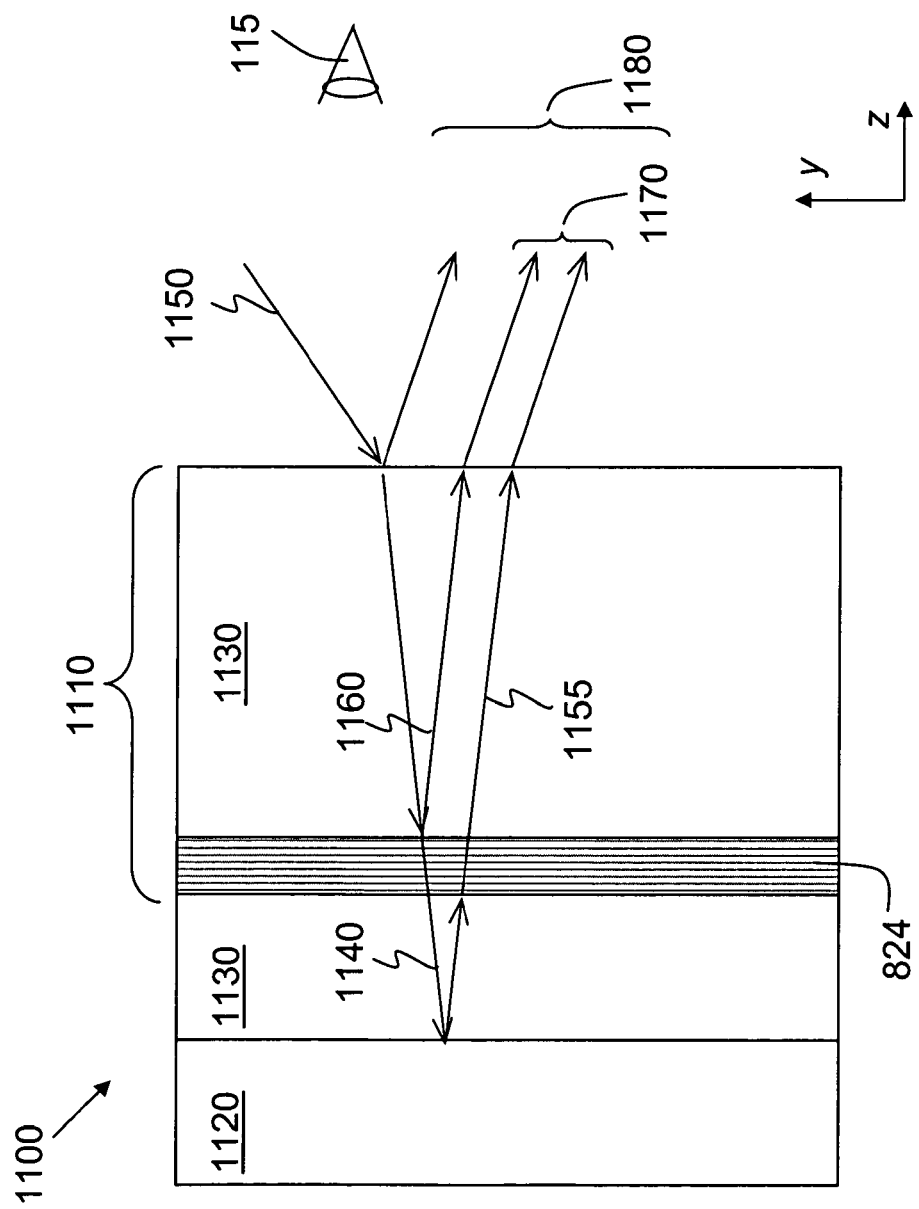
FIG. 11 schematically illustrates the reflection and transmission of ambient light upon its interaction with an embodiment of the invention.

FIG. 11 illustrates the depolarizing effect of an OREL on performance of those areas of the mirror structure that are located outside of the display area. FIG. 11 schematically shows a section 1100, of an embodiment of the mirror system, corresponding to one of the areas 644 of FIG. 6. The section 1100 includes a front portion 1110, defined as a portion of the mirror system located between the viewer 115 and an element disposed behind the RP 824, and an OREL 1120 that is optically connected to the front portion 1110 through an optional adjacent medium 1130. In practice, the adjacent medium 1130 when present may include air, polymer, adhesive, or other medium. The OREL may be directly deposited onto the RP or, alternatively, it may be deposited on an additional lite of glass that is further bonded to the RP. By way of example, a front portion of the embodiment of FIG. 8(D) would include the EC element 840 and the reflective polarizer 824 portion of the laminate 828. A corresponding front portion of the embodiment of FIG. 8(E) would contain the EC element 840, the bi-layer 846, and the reflective polarizer 824. Referring again to FIG. 11, a portion 1140 of incident ambient light 1150 having a first polarization that is predominantly transmitted by the RP 824 will pass through the front portion 1110 of the mirror system and the optional adjacent medium 1130 and will be reflected by the OREL 1120 back towards the viewer 115, as indicated by an arrow 1155. A complementary portion 1160 of ambient light 1150, having a second polarization that is opposite the first polarization, is substantially reflected by the RP 824 towards the viewer 115 and combines with the beam 1155. When the two reflected beams 1155 and 1160 having opposite polarizations are combined, a degree of polarization of the overall reflected beam 1170 is not as high as it could be otherwise. The use of an OREL in some embodiments of the present invention, therefore, allows for a less-polarized reflection of light from the mirror assembly towards the viewer and simultaneous increase in the overall reflectance of the assembly. The use of OREL serves to effectively depolarize the light. A degree of light depolarization can be varied by appropriately selecting materials for OREL and adjacent media separating the OREL and RP.

Referring again to FIG. 11, multiple reflections within the mirror assembly may be taken into account. The amount of net reflectance 1180 can be calculated, as is well known in the art, based on the index differences at the interfaces within the mirror assembly, the values of absorbance and thicknesses of the materials involved, and the value of transmittance of the reflective polarizer averaged over two polarizations (the preferred polarization of light generated by the display and the one orthogonal to it). By way of example, in a particular embodiment the front portion of the mirror assembly, including the reflective polarizer, reflects unpolarized light with 44.5% efficiency, transmits light of preferred polarization with efficiency of 81.8%, and transmits only 3.0% of light having orthogonal polarization. An OREL with a reflectance of 70% in air as adjacent medium, as shown in FIG. 13, will result in the net added reflectance of [0.818*0.7*0.818+0.03*0.70*0.03]*0.5=0.2345, or 23.45% In such a case, the overall reflectance of the embodiment of FIG. 11 would be the sum of 44.5% and 23.45%, or about 68%. Reflectance properties of the OREL depend, in part, on the refractive index of the adjacent medium 1130. For instance, the reflectance of a metal surface in contact with dielectric material is reduced as the refractive index of such dielectric material is increased. Reflectance of OREL including a chromium/ruthenium bi-layer (500 Å of chromium and 200 Å of ruthenium) in air as the adjacent medium 1130, e.g., may be about 70%. However, the reflectance of the same bi-layer OREL with a dielectric adjacent medium having an index of 1.51 will reach only about 58.5%.

(E.4) Additional Embodiments.

Table 7 shows experimentally determined reflectance and color-qualification parameters associated with various embodiments of the invention. In the following, Samples 1 through 7 are located in air (i.e., air is the incident medium). Sample 1, representing a simple mirror formed by an approximately 500 Å thick single layer of chromium on a glass substrate, has a reflectance of 57%. Sample 2 represents a laminate including a reflective polarizer (DBEF-Q film) laminated to surface IV of an EC-element (with ITO coatings on surfaces II and III) according to the method of the invention, and corresponds to the embodiment 836 of FIG. 8(D) with the lite 826 removed. Sample 2 reflects about 44.4% of the unpolarized light. Sample 3 represents a combination of the sample 1 disposed behind the sample 2 and separated from it by an air gap. The overall reflectance of Sample 3 is about 66%. Sample 4 represents the embodiment 836 of FIG. 8(D). As can be seen from the comparison of optical characteristics of Samples 3 and 4, the addition of the third lite of glass 826 does not appreciably affect the reflectance of the mirror assembly. Sample 5 is constructed by positioning Sample 1 behind Sample 4 and separating them with an air-gap. Sample 5 has a reflectance value comparable to that of Sample 3. Sample 6 represents a bi-layer coating (including an approximately 500 Å thick chromium layer and an approximately 200 Å thick ruthenium layer deposited on glass in that order. The reflectance of sample 6 is measured in air (air is the adjacent incident medium) and equals about 69.8%. Sample 7 describes the embodiment where sample 6 is behind sample 2 with an air gap. The reflectance is increased from about 44% to more than 71%. As noted above, the refractive index of the incident medium adjacent a metallic layer affects the reflectance of the metallic layer. The index-matching oil, used instead of air as incident medium with Samples 8 and 9, has a refractive index of approximately 1.5, and is used to suitably simulate laminations with materials such glass or plastics with similar refractive indices. In these examples, the use of the index-matching oil is optically comparable to having the coated glass laminated to the mirror assembly on the rearward surface. As described above, the reflectance of a metal coating is decreased when the index of the adjacent medium is higher than 1. The index-matching oil or laminate has a refractive index of about 1.5 and thus lowers the reflectance values of Samples 8 and 9 in comparison with Sample 7.

Sample 6, discussed in reference to Table 7 and having a chromium/ruthenium bi-layer, demonstrates spectrally neutral reflectance (with a* and b* values near zero). Other metals or compounds contemplated in this embodiment may be used to provide opacification, reflectance enhancement and/or color tuning Different metals and compounds may have different reflected colors and can therefore be used to tune the color of the coating stack in the region outside the display area as taught, for example, in U.S. patent application Ser. No. 11/833,701 (now published as U.S. 2008/0310005) and Ser. No. 12/370,909 (now published as U.S. 2009/0207513), each of which is incorporated herein in its entirety by reference.

TABLE 7

| Sample # | Description of Embodiment | R | a* | b* |
|---|---|---|---|---|
| 1 | Mirror with R = 57% | 57.0 | −1.1 | 1.5 |
| 2 | An EC-element with ITO coatings on surfaces II and III and APBF laminated to surface IV | 44.4 | −2.1 | 2.4 |
| 3 | Sample 1 positioned behind sample 2, with air gap in between | 65.8 | −3.7 | 1.90 |
| 4 | An APBF laminated between the EC-element (comprising ITO coatings on surfaces II and III) and third lite of glass (see embodiment 836 of FIG. 8(D) | 44.7 | −2.0 | −2.5 |
| 5 | Sample 1 positioned behind sample 4, with air gap in between | 65.9 | −3.0 | 1.9 |
| 6 | Chromium/Ruthenium bi-layer on glass substrate | 69.8 | 0.0 | 0.1 |
| 7 | Sample 6 positioned behind the APBF of sample 2, with bi-layer facing APBF and separated from APBF by air-gap | 71.4 | −3.5 | 1.6 |
| 8 | Sample 6 adjacent to sample 4 with index-matching oil between bi-layer and APBF | 66.8 | −3.5 | 1.6 |
| 9 | Sample 6 adjacent to sample 2 with index-matching oil between bi-layer and APBF | 66.5 | −3.4 | 1.6 |

Figure 12:
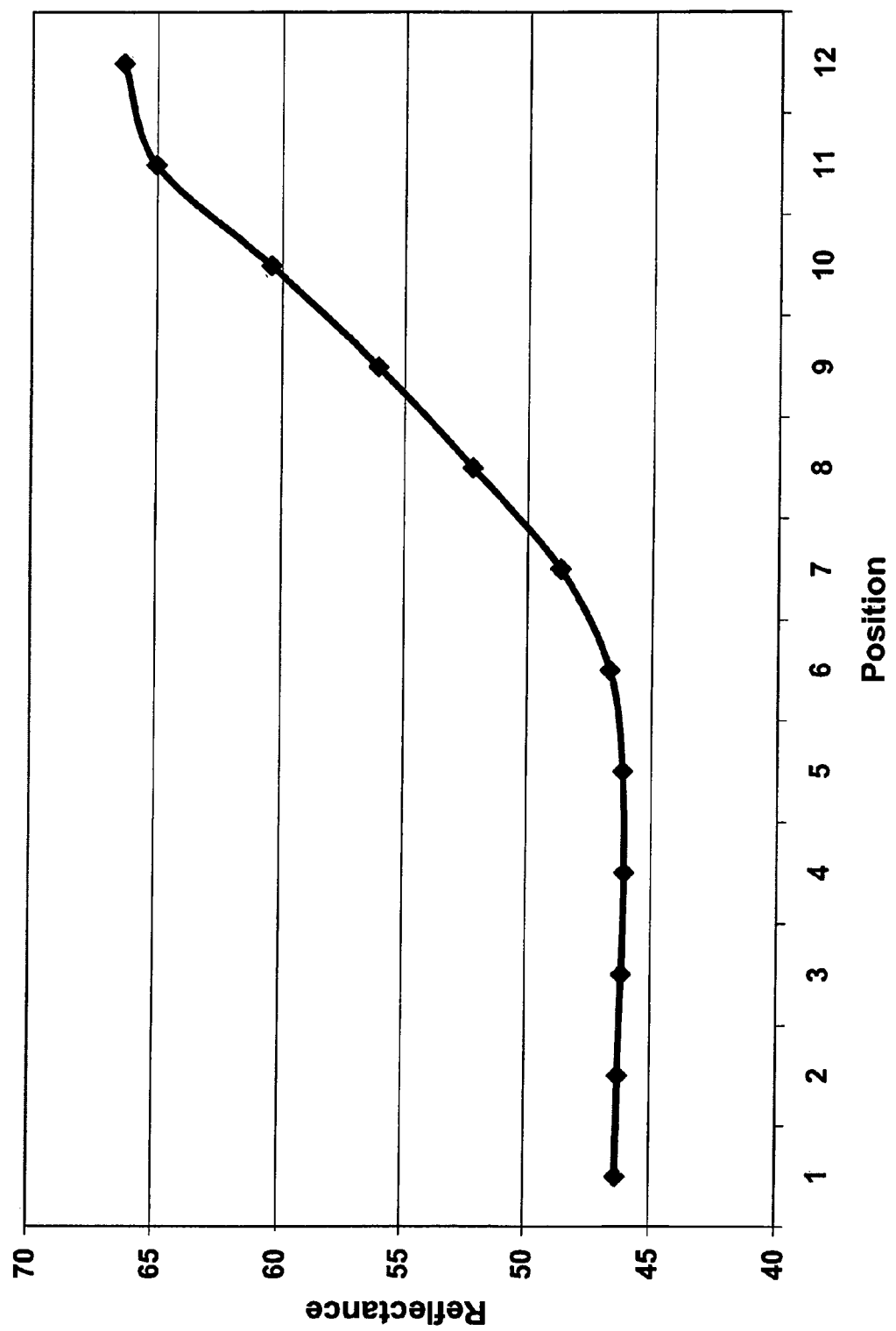
FIG. 12 shows the change in reflectance of the embodiment of FIG. 8(J) as a function of a position across the front surface of the embodiment.

By analogy with graded opacifying layers discussed in reference to FIG. 17, an OREL layer (assuring both the opacification and reflectance-enhancement effects, as discussed above) may also exhibit a graded transition between the display area and the adjacent opaque area. In one embodiment, the OREL is located behind the APBF, is absent (has zero effective thickness) in the area of the display and gradually increases its thickness (and, therefore, reflectivity) across the surface towards the "opaque" region. Optionally, a thin transflective layer (e.g., an OREL layer or another transflective layer) with finite thickness may be present at the display area to facilitate adhesion and/or optimize aesthetic appearance of the rearview mirror. The gradual transition of the OREL layer would achieve the effect of concealing at least one edge of the display area. In addition, the gradual transition additionally provides a benefit of grading the reflectance between the two regions in a manner taught in a commonly assigned U.S. patent application Ser. No. 11/833,701, incorporated herein by reference in its entirety. The gradual transition in reflectance or transmittance is not readily noticed by an observer and a relatively large difference of reflectance or transmittance between a display and another region can exist without being readily apparent to a casual observer. In contrast, if a discrete transition is present, the interface between the regions becomes noticeable even with very small changes in reflectance or transmittance. Similarly, if the color changes gradually, the difference between two regions is harder to perceive. By way of example, in the embodiment 889 of FIG. 8(J), a graded chromium OREL coating 886 may be deposited on a glass substrate 890 and positioned behind the surface VI of the embodiment 836 of FIG. 8(D). A gap 892 between the surface VI and the Cr-layer is filled with the index-matching oil having a refractive index of 1.5. As shown, the chromium coating is absent on the portion of the glass 890 that overlaps with the display region of the assembly and transitions from zero thickness to approximately 500 Å (in the opaque region) over the extent of about 1.5". FIG. 12 shows a gradual, without discontinuities change in reflectance of the embodiment 889 of FIG. 8(J) as a function of position, measured from the display region through the transition region to the region of full opacity in 0.25 inch increments. Table 8 shows the corresponding reflectance values (cap Y) and the reflected color (a* and b*). As can be seen from Table 8, the color variation is also smooth and the color difference between the two zones (the display region and the opaque region) is minimal. Preferably, the color difference between the two regions (the display region and the region of full opacity) is less than 5, preferably less than 3, most preferably less than 1 units. The color difference ΔC* is defined using the following formula:

$$\text{Color Difference} = \Delta C^* = \sqrt{(a^* - a^{*\prime})^2 + (b^* - b^{*\prime})^2}$$

where (a*, b*) and (a*', b*') are the values describing color of light reflected by the mirror system at two different positions across the mirror.

TABLE 8

| Position (inches) | Cap Y | a* | b* | |
|---|---|---|---|---|
| 0 | 46.4 | −2.0 | −2.3 | Display |
| 0.25 | 46.3 | −2.1 | −2.2 | Area |
| 0.5 | 46.2 | −2.0 | −2.3 | |
| 0.75 | 46.1 | −2.0 | −2.4 | |
| 1 | 46.2 | −2.0 | −2.3 | |
| 1.25 | 46.7 | −2.1 | −2.2 | Opaque |
| 1.5 | 48.7 | −2.4 | −1.6 | Area |
| 1.75 | 52.2 | −3.0 | −0.7 | |
| 2 | 56.1 | −3.4 | 0.1 | |
| 2.25 | 60.4 | −3.7 | 0.8 | |
| 2.5 | 65.0 | −3.8 | 1.4 | |
| 2.75 | 66.3 | −3.8 | 1.5 | |

In another example of a sample made in accordance with embodiment 884 of FIG. 8(I), a graded chrome layer is deposited on top of a TiO$_2$/ITO reflectance-enhancing layer 846 on surface V of a 1.1 mm thick lite of glass 826. The TiO$_2$ portion of the coating is about 45 nm and the ITO portion is about 18 nm thick. The EC-element 840 is constructed of 2 lites of 1.6 mm-thick clear glass (610 and 635) with a EC-cell gap of 150 microns. The thickness of the ITO coatings on surfaces II and III are approximately 150 nm thick each. Optical characteristics of this sample as measured in reflection and transmission are summarized in Table 8A. The ratio of polarized transmittance to overall reflectance is approximately 1.4 for this configuration.

TABLE 8A

| Reading in Reflection | | | Transmittance, T, % | | |
|---|---|---|---|---|---|
| Reflectance, R, % | a* | b* | p-polarization | s-polarization | PT/R |
| Display Area (transflective area) | | | | | |
| 51.7 | −2.0 | −2.0 | 5.2 | 73.2 | 1.42 |
| Area Outside the Display Area (opaque area) | | | | | |
| 66.3 | −3.2 | 0.0 | 0.0 | 0.4 | |

The graded zone may generally consist of a single graded metal, alloy or compound, or it may consist of multiple layers selected and designed to attain desired reflectance and transmittance in the opaque region, the desired reflected color in the opaque region, and the transition behavior between the display and opaque regions. The transition region may be characterized by the rate of change of reflectance or color, or the layers may be designed to minimize the color difference between the two zones with no undesired color behavior in the transition zone.

Exemplary Embodiments for Use in Conjunction with an External Polarizing Element.

In some embodiments, light generated by the display of the embodiments is polarized, for example, when a LCD is used with a mirror assembly. In reference to the embodiments of FIG. 8(A) or 8(D), for example, the portion of the display-generated light 820 that traverses the components of the mirror assembly and reaches the viewer 115 is typically linearly polarized at about 45 degrees to the vertical, which is represented in FIGS. 8(A,D) by y-axis. Such orientation of the LCD-generated light is dictated by a conventional structure of an LCD, which comprises a correspondingly oriented linear polarizer through which the light passes upon being emitted. For normal indoor viewing of LCD displays, the angle of polarization of the emitted light does not directly affect the viewer's ability to see the displayed image. However, when an LCD display is to be viewed outdoors or in a vehicle, where the ambient light is sufficiently bright, the user may be wearing sunglasses. The use of sunglasses and, in particular, polarizing sunglasses, by the driver of an automotive vehicle may become a criterion for design of automotive mirror assemblies that comprise displays.

Typically, polarizing sunglasses employ a linear polarizer to reduce the intensity of an apparent glare originating from reflection of ambient light from various surfaces. The reflection of light is described by well-known Fresnel equations that take into account a polarization state of light. For example, polarizing sunglasses that utilize a polarizing filter with a transmission axis oriented vertically (i.e., along the y-axis as seen in FIG. 8(A), for example) reduce the intensity of the s-polarized (horizontal) component of ambient light thereby reducing the apparent glare from horizontal surfaces. Since the vector of linear polarization angle of light emitted by most LCD displays is conventionally oriented at 45 degrees relative to the transmission axis of the typical polarizing sunglasses, the brightness of the LCD display perceived by the user wearing such polarized sunglasses will be reduced by about 50%. For a driver of an automotive vehicle that observes the display in the rearview mirror assembly the perceived reduction of the display intensity may be undesirable.

Figure 20:
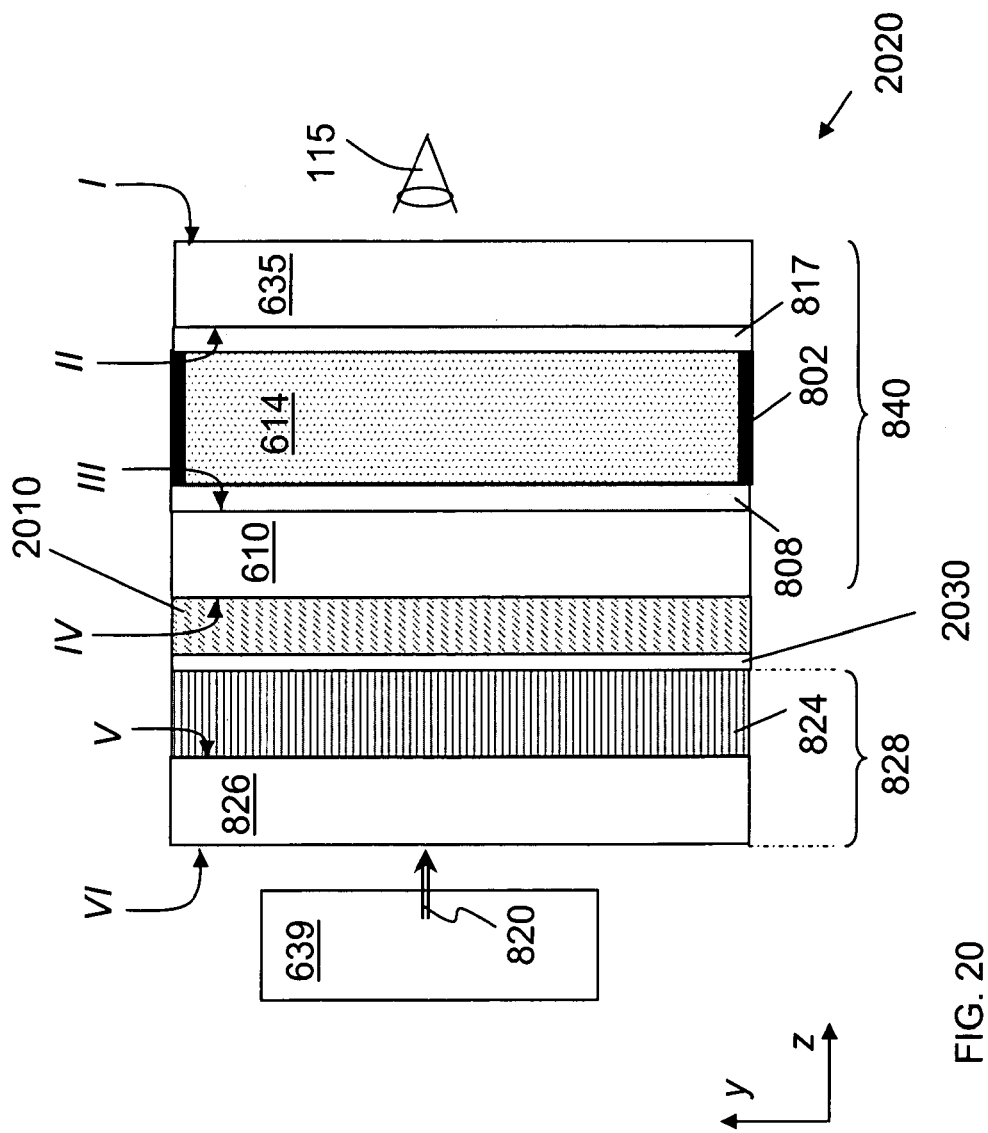
FIG. 20 shows an alternative embodiment of the present invention.

In one embodiment, the light output of the display may be depolarized by a depolarizer such as a stretched polyester film, for example, or any other suitable depolarizer. The use of a depolarizer is described generally above and in detail in a commonly assigned U.S. Patent Publication 2008/0068520. As shown in FIG. 13(A), a depolarizer 1302 may be placed between the display 639 and the transflective mirror assembly 1304 (which may be, for example, the embodiment 800 of FIG. 8(A) or any embodiment of the mirror system of the present invention). Depolarization of light 820 from the display prevents the polarizing sunglasses 1306 from interfering with the driver's ability to perceive the display light. A similar depolarizing effect may be obtained, for example, in an mirror structure embodiment 2020 of FIG. 20, by placing a depolarizer 2010 between the reflecting polarizer 824 (DBEF-Q) and the glass substrate 610 of the electrochromic element 840. As shown, the embodiment 2010 of FIG. 20 is similar to the embodiment 836 of FIG. 8(D) but it contains, in addition, the depolarizing layer 2010 comprising stretched polyester such as Flexmark PM™ 200 or uncoated PP2500 transparency film (available from 3M, Inc.) placed between the reflective polarizer 824 and the observer 115. As shown, a layer 2030 of pressure sensitive adhesive (PSA) may be operationally connecting the RP 824 and the depolarizer 2010. In another embodiment, the same effect may be obtained by placing a depolarizer directly on the face of a mirror assembly. In an embodiment similar to any of the embodiments of the current invention, such as the embodiment of FIG. 8(D), for example, a depolarizer may be disposed on surface I of the glass plate 635. In another embodiment, the same effect may be obtained by using a depolarizing transparent layer such as plastic layer, in place one or both of the lites of glass forming an EC-cell. For example, in one embodiment, at least one of the plates 610 and 635 of FIG. 8(D) may be made of a depolarizing plastic material. In another embodiment, the same effect may be obtained through the use of an optically anisotropic or birefringent material placed in the electrochromic fluid of the EC-element (such as the element 614 in FIG. 8(D)). The degree of polarization can be defined as extinction value, $(T_{high}-T_{low})/(T_{high}+T_{low})$, where high and low represent the intensity values of light in the two polarization states having, respectively, high and low intensity. When light is highly polarized, the extinction value will be high. Table 9 below shows the transmitted and reflected polarization values for systems with and without opaque metals present. Both transmission and reflection cases represent a relatively high extinction baseline for the system without the addition of a depolarizer. The samples used are described in Table 9 and two experimental samples of each configuration are shown. The high and low polarized intensity values are also listed. These values are used to calculate an extinction percentage using the formula defined above. Low extinction values equate to relatively equal intensities of the two polarization states. The difference value listed in Table 9 represents the percent change in extinction relative to the appropriate reference sample.

TABLE 9

| Sample Description | low | high | Extinction | Difference |
|---|---|---|---|---|
| Transmittance | | | | |
| Uncoated 1.6 mm glass/8161 PSA/depolarizer/DBEF/1/4 wave TiO2-ITO bi-layer coating on 1.6 mm glass | 18.4 | 60.5 | 53.36% | 35.97% |
| Uncoated 1.6 mm glass/8161 PSA/depolarizer/DBEF/1/4 wave TiO2-ITO bi-layer coating on 1.6 mm glass | 20.3 | 58.8 | 48.67% | 40.66% |
| Uncoated 1.6 mm glass/depolarizer/3M PSA DBEF/1/4 wave TiO2-ITO bi-layer coating on 1.6 mm glass | 22.5 | 58.8 | 44.65% | 44.68% |
| Uncoated 1.6 mm glass/depolarizer/3M PSA DBEF/1/4 wave TiO2-ITO bi-layer coating on 1.6 mm glass | 23 | 54.4 | 40.57% | 48.76% |
| Uncoated 1.6 mm glass/depolarizer/DBEF/1/4 wave TiO2-ITO bi-layer coating on 1.6 mm glass | 21.1 | 53.9 | 43.73% | 45.60% |
| Uncoated 1.6 mm glass/depolarizer/DBEF/1/4 wave TiO2-ITO bi-layer coating on 1.6 mm glass | 24.3 | 53.2 | 37.29% | 52.04% |
| Uncoated 1.6 mm glass/DBEF/uncoated 1.6 mm glass | 5.1 | 90.5 | 89.33% | 0.00% |
| Reflectance | | | | |
| Uncoated 1.6 mm glass/8161 PSA/depolarizer/DBEF/chrome coating on 1.6 mm glass | 59.4 | 84.3 | 17.33% | 9.48% |
| Uncoated 1.6 mm glass/8161 PSA/depolarizer/DBEF/chrome coating on 1.6 mm glass | 60.1 | 83.9 | 16.53% | 10.28% |
| Uncoated 1.6 mm glass/depolarizer/3M PSA DBEF/chrome coating on 1.6 mm glass | 65.5 | 76.5 | 7.75% | 19.06% |
| Uncoated 1.6 mm glass/depolarizer/3M PSA DBEF/chrome coating on 1.6 mm glass | 63 | 80 | 11.89% | 14.92% |
| Uncoated 1.6 mm glass/depolarizer/DBEF/chrome coating on 1.6 mm glass | 61.5 | 81.9 | 14.23% | 12.58% |
| Uncoated 1.6 mm glass/depolarizer/DBEF/chrome coating on 1.6 mm glass | 65.1 | 80.3 | 10.45% | 16.36% |
| Uncoated 1.6 mm glass/DBEF/uncoated 1.6 mm glass | 53.1 | 92 | 26.81% | 0.00% |

The samples described in a "Reflectance" portion of Table 9 (the "reflectance samples") show about a 40% to 50% improvement in the extinction. Visual examination of these samples with Polaroid sunglasses showed a substantially decreased sensitivity to head tilt and, therefore, less changes due to head tilt in the reflected and transmitted light. The term head tilt refers to rotation of the polarization system of the polarizing sunglasses. The mirror system containing such samples has lower initial extinction values than the system containing samples described in "Transmittance" portion of Table 9 (the "transmittance samples"). This is due to the presence of a metal layer behind the reflective polarizer reflecting a substantial percentage of the "low" polarization state. The presence of chrome layer in "reflectance samples" adds approximately 40% more light of the low polarization state relative to the high state. This gives the initial reference system without the depolarizer an extinction value of about 26%, essentially comparable with or better than that of the system that includes a "transmission sample" and a depolarizer. The extinction value can be further reduced by substituting the chrome with a metal having higher reflectance. This, as noted above, will increase the reflectance of the system and simultaneously reduce the extinction value by adding more light in the "low" polarization state. This beneficial characteristic enables another possible embodiment—the benefits of a depolarizer can be obtained without a depolarizer in the area where the chrome, metal or other reflectance enhancement means is present and the adjustment of the LCD/reflective polarizer's polarization angle can be judicially performed to more closely match the transmitted state of the Polaroid sunglasses (as discussed above). The reflected image in the area of the display would be reduced in a commensurate amount when viewed with Polaroid sunglasses but the image in the remainder of the mirror would remain relatively high. A viewer not using Polaroid sunglasses would not be affected by this particular configuration.

In a related embodiment, the brightness of the display, perceived by the driver wearing polarizing sunglasses, may be increased by rotating the vector of polarization of the display-generated light, upon light's passing through the mirror assembly towards the driver, to make it co-linear with the transmission axis of the sunglasses. As shown in FIG. 13(B), for example, such rotation may be achieved with the use of a polarization rotator 1308 appropriately disposed in front of the transflective mirror assembly 1304 to reorient the polarization vector of light 820', emanating from the assembly 1304 towards the user 115, along the transmission axis of the sunglasses 1306. In a specific embodiment, the polarization rotator 1308 may comprise a half-wave plate (made of a birefringent film, for example) having its transmission axis along the bi-sector of an angle formed by the transmission axis of the polarizing sunglasses and the polarization vector of light 820'. As a result, the polarization vector of light 820, initially oriented in xy-plane at 45 degrees with respect to the y-axis, will be aligned with the x-axis, according to the well-known principle of operation of the half-waveplate.

In an alternative embodiment (not shown), it may be preferred to dispose the LCD as a whole (or, alternatively, only the polarizing components of the LCD) at a predetermined angle in an xy-plane within the rearview mirror so as to produce light emission 820 that is initially polarized along the transmission axis of the sunglasses worn by the driver. In such alternative embodiments, light 820 emitted by the LCD 639 may be p-polarized (i.e., polarized along the x-axis). If, in addition, the reflecting polarizer (which may be a part of transflective mirror assembly 1304 according to any of embodiments of the present invention) is oriented so as to maximize the transmission of the LCD light 820 through the transflective assembly, the brightness of the LCD perceived by the driver 115 through the sunglasses 1306 may be also optimized. For example, in reference to FIG. 13(A), a conventionally oriented LCD 639 may emit light with luminance of 1,000 cd/m² and lenses of the polarizing sunglasses 1306 may transmit 20% of p-polarized light and 0% of s-polarized light. Then, the transmission of unpolarized light through polarizing sunglasses 1306 will be about 10%. Should a depolarizer 1302 be used between the LCD 639 and the transflective assembly 1504, the effective luminance of LCD light reaching the user 115 through the sunglasses 1306 would be about 100 cd/m². In comparison, if the LCD system is oriented to provide p-polarized light output 820, the effective luminance perceived by the observer 115 through the same polarizing lens 1306 increases to about 200 cd/m². At the same time, the brightness of the ambient light reflected by such embodiment towards the driver in sunglasses may be minimized, which worsens the performance of the mirror assembly as a reflector. The use of depolarizer 1302 with a conventionally oriented LCD 639, as shown in FIG. 13(A), may therefore be preferred overall to rotating the LCD as described above.

Figure 14:
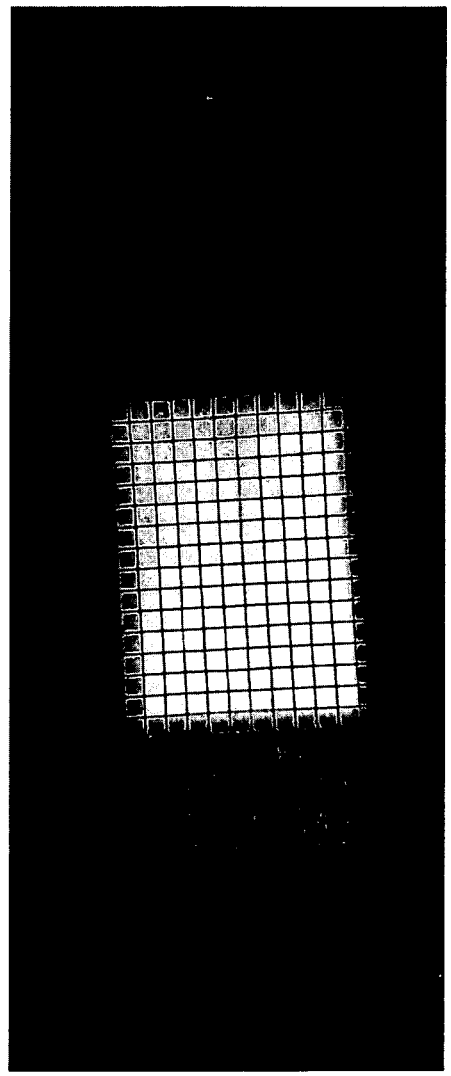
FIG. 14 depicts a photograph of a reference image formed according to the visual evaluation test in reflection from another alternative embodiment of the invention.
Figure 15:
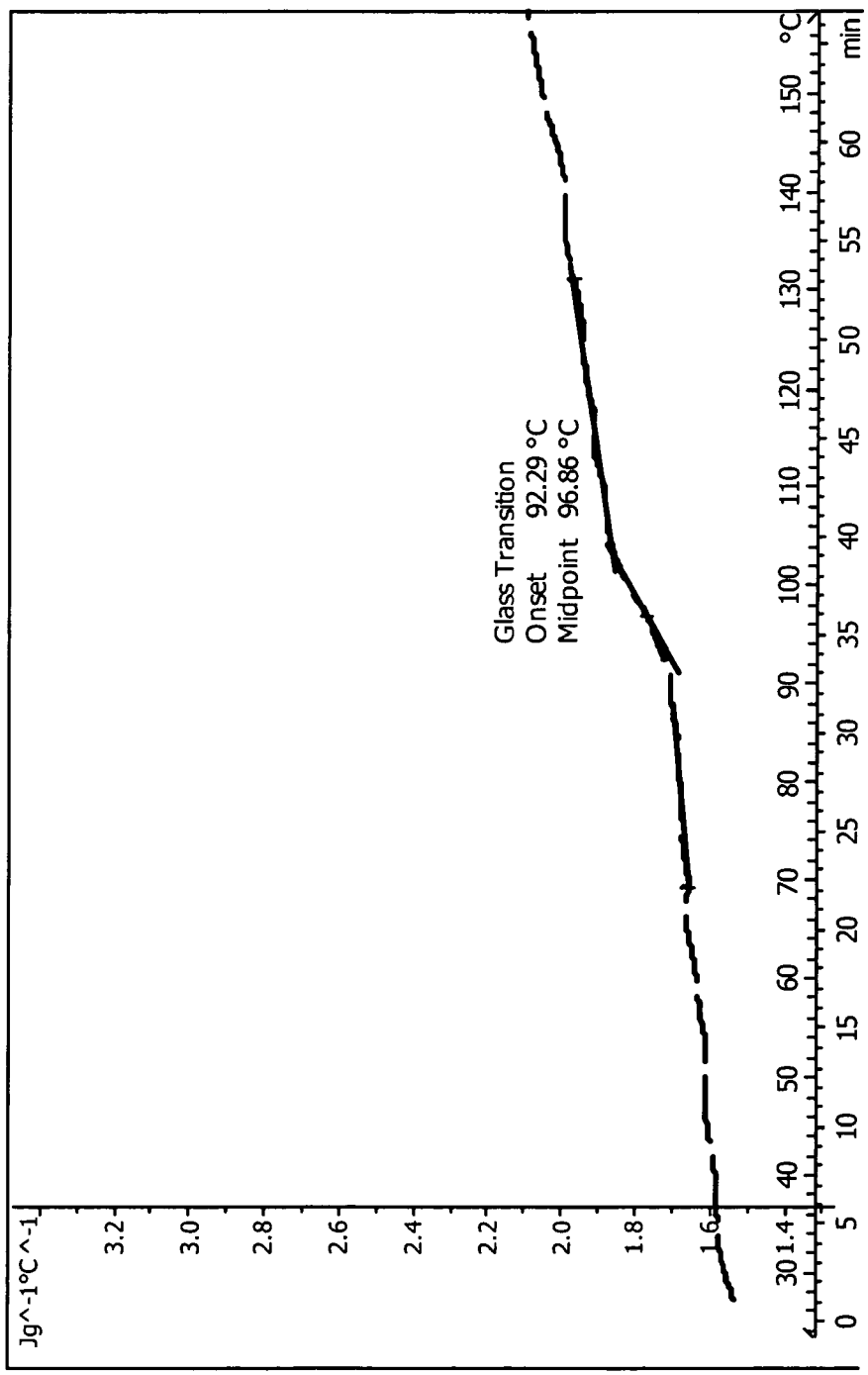
FIG. 15 illustrates experimentally measured results of the thermal analysis of a DBEF-Q film, showing a glass transition temperature region.

In the following, additional embodiments of the invention are discussed and compared in reference to FIG. 3. In one embodiment, the composite 312 was vacuum bagged, then placed into an autoclave for 1 hour at 90° C. at 100 psi. The resulting laminate 314 did not display any pattern of degradation and showed substantially no obvious extended distortions. FIG. 14 shows an image of a reference grid formed in reflection, according to the visual evaluation test, from another embodiment of the laminate comprising a 1.6. mm thick glass substrate and a DBEF-Q film. The superstrate, preliminarily treated with Aquapel®, was released from the laminate according to the embodiment of the invention. This laminate was prepared by vacuum bagging and autoclaving at about 90° C. and 200 psi for about an hour and demonstrates quality adequate for automotive use. Generally, the temperature chosen for lamination processes in the above implementations approximately corresponds well to the start of the glass transition onset temperature of the DBEF-Q polarizing film, as shown in FIG. 15. The glass transition temperature of the plastics is a well known physical characteristic of a plastic or multilayer plastic structure and based on these experiments the lamination temperature should preferably be at or near the $T_g$ in order to attain a laminate with optical properties sufficient for automotive use. There exists an interrelationship between the pressure, temperature, humidity, and time necessary for a given APBF material to attain the desired optical properties. For instance, it may be possible to shorten the lamination time if higher lamination pressure is applied at a slightly higher lamination temperature. We also discovered that the temperature for lamination of the reflective polarizer material may be controlled somewhat independently from that of the substrate by using infrared heating at wavelengths that are transparent for the glass but absorbing by the reflective polarizer. In this manner the stress profiles in the materials used for lamination may be controlled or modified, therefore facilitating higher quality of the resulting laminate.

Figure 16:
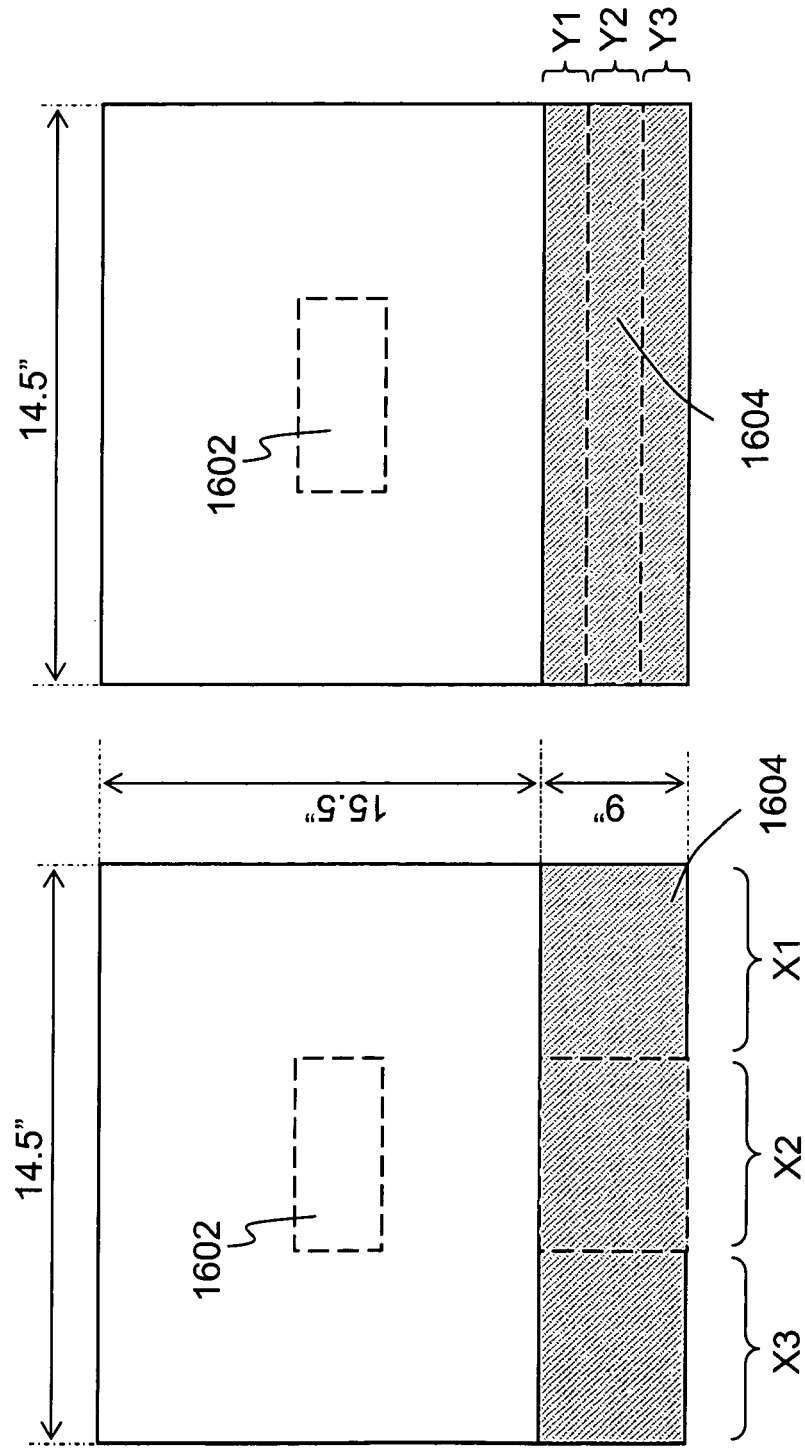
FIG. 16 diagrammatically illustrates another APBF-laminate-containing mirror sample evaluated for extended distortions in the indicated areas.

In contradistinction, and as a comparative example of a commercial product produced with a reflective polarizer having unacceptable reflective optical properties, a laminate-containing reflector (formed by a display of "Miravision" mirror-television set, manufactured and sold by Philips Corporation, model number 17MW9010/37, S/N 1BZ1A0433816730, manufacture date August 2004) was also evaluated for distortions. The inside frame dimensions of the sample are indicated in a diagram of FIG. 16. This commercial product included an opaque reflective area 1602 in the upper portion of the sample and a partially reflective/partially transmissive area 1604 in front of a display in the lower portion of the display, as indicated in the diagram. The mirror in the lower portion obtains at least part of its reflectance by the use of a reflective polarizer. The sample was examined using the visual evaluation test described above. The sample showed extended distortions in the display region, particularly in the y-direction. Furthermore, as perceived visually, the waviness of the reflective laminate was exacerbated if the viewer moved his head relative to the mirror. This worsening of the optical distortion with relative motion is a particularly negative trait for automotive mirror applications, where a reflected image must be equally well perceived at various angles. This sample proved to be unacceptable for use in an automotive rearview mirror, similarly to the commercial reflector described with reference to FIG. 2. Specific results of evaluation of this sample with BYK-Gardner wave-scan dual device are provided in Table 10. As shown, the average of three short-wave and long-wave (SW and LW, respectively) readings were taken directionally in x- and y-direction, in the corresponding regions labeled as X1 ... X3 and Y1 ... Y3 in FIG. 16. The values of SW in excess of 3, measured in the y-direction, are consistent with the presence of the unacceptable waviness. This conclusion is also supported by the fact that several of the Wa, Wb and Wc metrics are greater than 7. Characterization of the region of the opaque mirror outside the display area demonstrates values that are substantially lower than those taken in the display region.

TABLE 10

|  | LW | SW | Wa | Wb | Wc |
|---|---|---|---|---|---|
| X1 (avg) | 0.5 | 0.5 | 6.8 | 6.2 | 1.2 |
| X2 (avg) | 1.1 | 0.5 | 6.4 | 6.2 | 2.4 |
| X3 (avg) | 0.7 | 0.5 | 6.7 | 6.3 | 1.6 |
| Y1 (avg) | 0.2 | 3.6 | 7.7 | 9.2 | 2.5 |
| Y2 (avg) | 0.3 | 3.9 | 7.7 | 9.0 | 0.7 |
| Y3 (avg) | 0.2 | 3.5 | 7.9 | 9.0 | 0.7 |
| XM (avg) | 0 | 0 | 1.6 | 1.2 | 0.0 |
| YM (avg) | 0 | 0 | 1.7 | 1.4 | 0.1 |

Durability Testing.

(1) High Temperature, High Humidity, and Thermal Shock Testing.

In certain applications the laminate containing a reflective polarizer is exposed to relatively harsh environments. Automotive applications are an example of an environment that requires a component to pass stringent durability tests (environmental durability tests) for the product to be qualified for use. The durability tests vary by automotive company but there are a number of common tests a product is expected to pass. The tests are designed to ensure that a product will function adequately for the life of a vehicle. One of the tests is a so-called "high temperature/high humidity" test, where the part or component is placed in a test chamber, e.g., at approximately 85° C. and 85% humidity. (The precise temperature, humidity and duration of the test can vary depending on the requirements of an automotive company.) Another test is a "high temperature storage" test where the component is kept at about 105° C. for various lengths of time. (Four days or 96 hours is a common duration of such test.) In other tests the component is kept at lower temperature (85° C.) for up to 1,500 hours. Yet another test is a so called "thermal shock" test, where the component repeatedly undergoes heating and cooling in cycles, e.g., between −40° C. and +85° C., with 1 hour dwell, often with high humidity conditions. The hold time, ramp time, temperature extremes and number of cycles may vary depending on the requirements imposed by an automotive company. Other tests have been developed which combine the extreme conditions of the tests listed above to examine interaction effects. A failure in one or more of these tests may be sufficient to prevent a given embodiment of a fabricated component or product from being commercialized. As a result of environmental testing of various laminate embodiments of the invention it was discovered that, generally: (i) embodiments fabricated at lower levels of pressure, such as 50 psi, have decreased durability; (ii) with increase in lamination time, the durability of embodiments tends to increase; (iii) an embodiment of the laminate of the invention having both a substrate and a superstrate (such as embodiment 314 of FIG. 3(C)) has higher durability than the one with a superstrate released, which durability may be improved by post-lamination annealing.

Specifically, comparison of environmental durability of laminates having a superstrate and those with a superstrate release was determined by fabricating and testing the samples made by laminating an APBF film between the EC-element and the third lite of glass, according to the structure of the embodiment 850 of FIG. 8(F) that additionally had a graded-thickness chromium layer deposited adjacent surface V. Prior to fabrication, the moisture content of the APBF film was maintained within the preferred limits as discussed above. The third lite of glass 826 was pre-treated with a release agent, as discussed in reference to FIG. 3, to allow for optional release of the superstrate 826. The laminate samples under test were assembled along with control samples, vacuum-bagged, and autoclaved at 95° C. and 200 psi (gauge pressure) for about 1 hour. All laminates were initially inspected visually for defects and then exposed to the following environmental durability tests: 1) High Temperature Storage (105° C.), 2) High Temperature/High Humidity Storage (85° C./85% RH), and 3) Thermal Shock (−40 to 85° C., 1 hr dwell). The samples were inspected visually at variable time intervals for various defects that are specific to individual environmental durability tests. Results of these tests are shown in Tables 11, 12, and 13, respectively. As follows from these Tables, the laminate embodiments that have a superstrate released (unprotected samples), even if initially acceptable through visual inspection, became unacceptable for intended as a result of environmental durability testing.

TABLE 11

| High Temperature Storage test, 105° C. | | | | | | | | | |
|---|---|---|---|---|---|---|---|---|---|
| Sample Description | 0 hrs | 24 hrs | 48 hrs | 72 hrs | 96 hrs | 168 hrs | 336 hrs | 504 hrs | 672 hrs |
| Control #1 | xxxxx | xxxxx | xxxxx | xxxxx | xxxxx | xxxxx | xxxxx | xxxxx | xxxx |
| Control #2 | xxxxx | xxxxx | xxxxx | xxxxx | xxxxx | xxxxx | xxxxx | xxxxx | xxxx |
| Unprotected #1 | xxxxx | xxxxx | xxx | xxx | xxx | xxx | xxx | xx | xx |
| Unprotected #2 | xxxxx | xxxxx | xxxx | xxx | xxx | xxx | xxx | xx | xx |

Legend:
xxxxx = Excellent, no defects
xxxx = Acceptable, small defects
xxx = Unacceptable, bubbling, delamination, haze
xx = Unacceptable, significant bubbling, delamination, haze
x = Unacceptable, severe bubbling, delamination, haze
Blank = Removed from testing

TABLE 12

| Sample Description | High Temperature/High Humidity Storage test, −85° C./85% RH | | | | | | |
|---|---|---|---|---|---|---|---|
|  | 0 hrs | 24 hrs | 144 hrs | 312 hrs | 480 hrs | 624 hrs | 766 hrs |
| Control #1 | xxxxx | xxxxx | xxxxx | xxxxx | xxxxx | xxxxx | xxxxx |
| Control #2 | xxxxx | xxxxx | xxxxx | xxxxx | xxxxx | xxxxx | xxxxx |
| Unprotected #1 | xxxxx | xx | xx | xx | xx | xx | xx |

Legend:
xxxxx = Excellent, no defects
xxxx = Acceptable, small defects
xxx = Unacceptable, bubbling, delamination, edge ingress
xx = Unacceptable, significant bubbling, delamination, edge ingress
x = Unacceptable, severe bubbling, delamination, edge ingress
Blank = Removed from testing

TABLE 13

| Sample Description | Thermal Shock test, −40 to 85° C., 1 hr dwell | | | | | | |
|---|---|---|---|---|---|---|---|
|  | 0 hrs | 75 cycles | 150 cycles | 213 cycles | 433 cycles | 493 cycles | 568 cycles |
| Control #1 | xxxxx | xxxxx | xxxxx | xxxxx | xxxxx | xxxxx | xxxxx |
| Unprotected #1 | xxxxx | xx | x | X | X | x | x |

Legend:
xxxxx = Excellent, no defects
xxxx = Acceptable, small defects
xxx = Unacceptable, bubbling, delamination, edge ingress
xx = Unacceptable, significant bubbling, delamination, edge ingress
x = Unacceptable, severe bubbling, delamination, edge ingress
Blank = Removed from testing A similar set of experiments was directed to more completely understand the effect of a post-lamination superstrate release on the durability of a laminate of the invention. In this case, an APBF film was laminated, according to the embodiment 850 of FIG. 8(F), where glass lites 610 and 826 were not coated with additional thin-film layers. Surface V of lite 826 was pre-treated with a release agent to facilitate the post-lamination release of the lite 826. This was accomplished by incorporating a release agent which allows for the removal of one lite of glass after lamination. Fabrication of both the samples under test and control samples was carried out under the conditions described in reference to Tables 11, 12, and 13. However, to improve adhesion of the APBF to the uncoated glass plate 610, the samples were additionally annealed post-lamination for 0, 30, or 60 minutes at 105°. The laminated parts were initially inspected visually for defects and then submitted for environmental durability testing: 1) High Temperature Storage (105° C.), 2) High Temperature/High Humidity Storage (85° C./85% RH), and 3) Thermal Shock (−40 to 85° C., 1 hr dwell). The parts were inspected visually at variable time intervals for various defects which are specific to the individual environmental durability test. Results of the above-mentioned tests, shown in Tables 14, 15, and 16, respectively, demonstrate that embodiments of the laminates the parts unprotected by s superstrate (i.e., having a superstrate 826 released) demonstrate poor durability in comparison with control samples. The unprotected samples were initially marginally acceptable or unacceptable by visual inspection but quickly all became unacceptable for use when subjected to environmental durability testing. The extra lite of glass incorporated into this embodiment significantly increases the environmental durability of the laminated devices.

TABLE 14

| Sample Description | High Temperature Storage test, 105° C. | | | | | | | |
|---|---|---|---|---|---|---|---|---|
|  | 0 hrs | 120 hrs | 168 hrs | 288 hrs | 456 hrs | 624 hrs | 792 hrs | 960 hrs |
| Control | xxxxx | xxxxx | xxxxx | xxxxx | xxxx | xxxx | xxxx | Xxxx |
| Control 30 Minute | xxxxx | xxxxx | xxxxx | xxxxx | xxxxx | xxxxx | xxxx | Xxxx |
| Control 60 Minute | xxxxx | xxxxx | xxxxx | xxxxx | xxxxx | xxxxx | xxxxx | Xxxx |
| Superstrate (3$^{rd}$ lite) Removed, Control | xx | xx | Xx | xx | x | x | x | X |
| Superstrate (3$^{rd}$ lite) Removed, 30 Minutes | xx | xx | Xx | xx | x | x | x | x |

TABLE 14-continued

High Temperature Storage test, 105° C.

| Sample Description | 0 hrs | 120 hrs | 168 hrs | 288 hrs | 456 hrs | 624 hrs | 792 hrs | 960 hrs |
|---|---|---|---|---|---|---|---|---|
| Superstrate ($3^{rd}$ lite) Removed, 60 Minutes | xxxx | xxx | Xxx | xxx | xx | xx | xx | xx |

Legend:
xxxxx = Excellent, no defects
xxxx = Acceptable, small defects
xxx = Unacceptable, bubbling, delamination, haze
xx = Unacceptable, significant bubbling, delamination, haze
x = Unacceptable, severe bubbling, delamination, haze
Blank = Removed from testing

TABLE 15

High Temperature/High Humidity Storage test, 85° C./85% RH

| Sample Description | 0 hrs | 96 hrs | 264 hrs | 408 hrs | 552 hrs | 696 hrs | 792 hrs | 960 hrs |
|---|---|---|---|---|---|---|---|---|
| Control | xxxxx | xxxxx | xxxxx | xxxxx | xxxxx | xxxxx | xxxxx | xxxxx |
| Control 30 Minutes | xxxxx | xxxxx | xxxxx | xxxxx | xxxxx | xxxxx | xxxxx | xxxxx |
| Control 60 Minutes | xxxxx | xxxxx | xxxxx | xxxxx | xxxxx | xxxxx | xxxxx | xxxxx |
| Superstrate ($3^{rd}$ lite) Removed, Control | xx | x | | | | | | |
| Superstrate ($3^{rd}$ lite) Removed, 30 Minutes | xx | xx | x | | | | | |
| Superstrate ($3^{rd}$ lite) Removed, 60 Minutes | xxxx | xx | x | | | | | |

Legend:
xxxxx = Excellent, no defects
xxxx = Acceptable, small defects
xxx = Unacceptable, bubbling, delamination, edge ingress
xx = Unacceptable, significant bubbling, delamination, edge ingress
x = Unacceptable, severe bubbling, delamination, edge ingress
Blank = Removed from testing

TABLE 16

Thermal Shock - −40 to 85° C., 1 hr dwell

| Sample Description | 0 hrs | 135 cycles | 205 cycles | 280 cycles | 355 cycles | 430 cycles | 610 cycles |
|---|---|---|---|---|---|---|---|
| Control | xxxxx | xxxxx | xxxxx | xxxxx | xxxxx | xxxxx | xxxxx |
| Control 30 Minutes | xxxxx | xxxxx | xxxxx | xxxxx | xxxxx | xxxxx | xxxxx |
| Control 60 Minutes | xxxxx | xxxxx | xxxxx | xxxxx | xxxxx | xxxxx | xxxxx |
| Superstrate ($3^{rd}$ lite) Removed, Control | xx | x | | | | | |
| Superstrate ($3^{rd}$ lite) Removed, 30 Minutes | xxxx | x | | | | | |
| Superstrate ($3^{rd}$ lite) Removed, 60 Minutes | xx | x | | | | | |

Legend:
xxxxx = Excellent, no defects
xxxx = Acceptable, small defects
xxx = Unacceptable, bubbling, delamination, edge ingress
xx = Unacceptable, significant bubbling, delamination, edge ingress
x = Unacceptable, severe bubbling, delamination, edge ingress
Blank = Removed from testing The following series of samples were laminated via vacuum bagging and autoclaving (the latter occurring in pressurized gas or liquid) at 200 psi and approximately 90° C. The different embodiments are contrasted using thermal storage at 105° C. and 48 hours. These particular test conditions are not meant to be limiting and subtle differences between the tests and laminates may be found with other tests or durations:

A laminate structured as [G/PSA/DBEF-Q/G], with PSA thickness of about 1 mil, resulted in good image-forming quality and retained good quality following 48 hours of 105° C. storage.

A laminate structured as [G/DBEF-Q/G], where one of the glass plates had been pretreated with a release agent (Aquapel™ available from PPG Industries, Inc.) and then removed after the lamination procedure according to an embodiment of the invention, had good initial mirror quality and retained good optical properties, i.e., image preserving reflector, following 48 hours of 105° C. storage.

The long-term stability of laminate-containing embodiments was monitored by measuring the haze within the display region of the mirror structure. According to the standards of ASTM (American Society for Testing and Materials), haze is defined as percentage of light that, during transmission through a sample, deviates by more than 2.5 degrees from the direction of the incoming beam of light. Haze measurements of laminates structured according to the embodiment 850 of FIG. 8(F) were accomplished using a BYK Haze-gard Plus available from BYK-Gardner. Prior to fabrication of the embodiment 850, several APBF samples with protective liners were subjected to 40° C. and 95% RH for 4 and 8 hours, respectively. Each of these samples, along with control samples of APBF stored under ambient conditions, was assembled with an EC-element, vacuum bagged, and autoclaved at 95° C. and 200 psi for about 1 hour to form mirror systems of the embodiment 850. The transmitted haze readings taken after the fabrication of the embodiment and during the high temperature storage test at 105° C. and at 24 hour intervals showed that elevated pre-fabrication water content in APBF increases the haze levels of the laminate up to 4 times. It was additionally showed that pre-fabrication drying of the APBF samples under vacuum (e.g., at 40° C. and less than 50 torr pressure) removes the excess of water from the APBFs, and results in the laminates that do not exhibit excessive transmitted haze. Our study indicated that for long-term stability of APBF-containing laminates and mirror systems the APBF should preferably be stored under relatively low humidity and levels of humidity should be controlled during the lamination process. APBF-laminate-containing embodiments of the invention are characterized by transmitted haze levels of less than 5%, more preferably less than 3%, and most preferably less than 1% as tested after high-temperature storage (e.g., 105° C. for 96 hours).

We found that fabrication, according to embodiments of the invention, of APBF-based laminates having high image-forming automotive optical quality is consistent with but not necessarily limited to laminating an APBF directly to a rigid optical substrate so as to provide a substantially direct physical contact between at least one side of the film and a surface of a rigid optical substrate. Stated differently, we unexpectedly discovered that a laminate containing substantially no or a minimal amount of initially soft curable material such as pressure-sensitive adhesive (PSA) or other curable adhesive along at least one lamination interface is very likely to satisfy the imaging quality requirements. We also found that simultaneous presence of some adhesive at both lamination interfaces (in the case of a laminate structured according to FIG. 3(D), for example) the image-preserving reflecting properties of such laminate are more likely to be degraded. As a result, a rearview mirror assembly incorporating such a laminate would be less likely to satisfy the existing optical quality standards.

We have also unexpectedly discovered that, for retaining a good mirror quality after 48 hours of 105° C. storage, it may be beneficial to employ embodiments of the APBF-containing laminates of the invention where at least one side of the APBF is not be directly adhered to a rigid substrate. That is, a laminate may be formed without a superstrate according to a general embodiment of FIG. 3(F) or, if an alternative embodiment of FIG. 3(D) is used, the laminate may preferably include a layer of relatively pliable material, broadly defined as stress-relaxation means (such as flexible adhesive), between an APBF and only one of the substrate and superstrate. In operation, a benefit of using a stress relaxation means stems from at least partial compensation of the differences in coefficients of thermal expansion (CTEs) between the film and the substrate and/or superstrate. Generally, due to such mismatch in CTEs, a laminate structured according to [G/RP/G] and exposed to elevated temperatures (e.g., during the storage test at 105° C.) acquires mechanical stresses resulting in visible degradation of the RP-film and substantial reduction of quality of the laminate. A stress relaxation means, when present, may facilitate a relief of mechanical stresses at elevated temperatures.

(2) Testing of Samples Employing UV-Protection Means.

The following provides examples of experimentally measured changes in reflected spectra of APBF-containing embodiments of the invention that correspond to different UV attenuation means and methods. These test results are for exposure to the weatherometer conditions utilizing light source, filters, Automatic irradiance, Black panel temperature, and Dry bulb temperature of the light cycle of SAE J1885 (relative humidity was not controlled). One hour of exposure under these conditions corresponds to a radiant exposure of roughly 2 kJ/m$^2$ as it is calculated in various test requirements. For these examples the color values were measured using the CIE Standard D65 illuminant and a 2-degree observer.

Figure 47A:
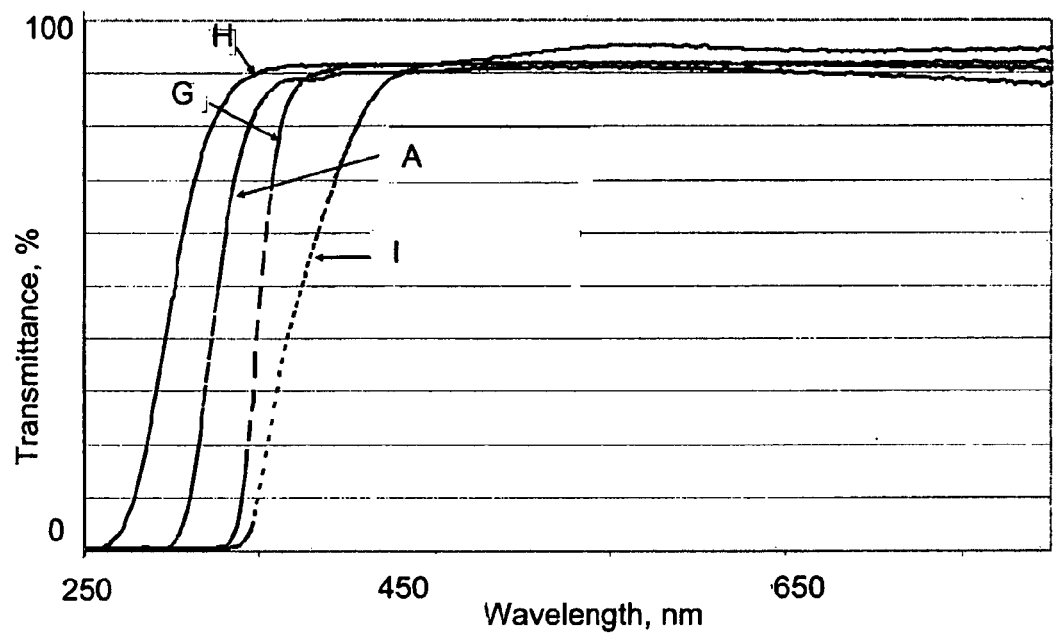
FIGS. 47(A,B) show transmission spectra of substrate materials uses in embodiments of an APBF laminate of the invention containing UV-blocking means.
Figure 47B:
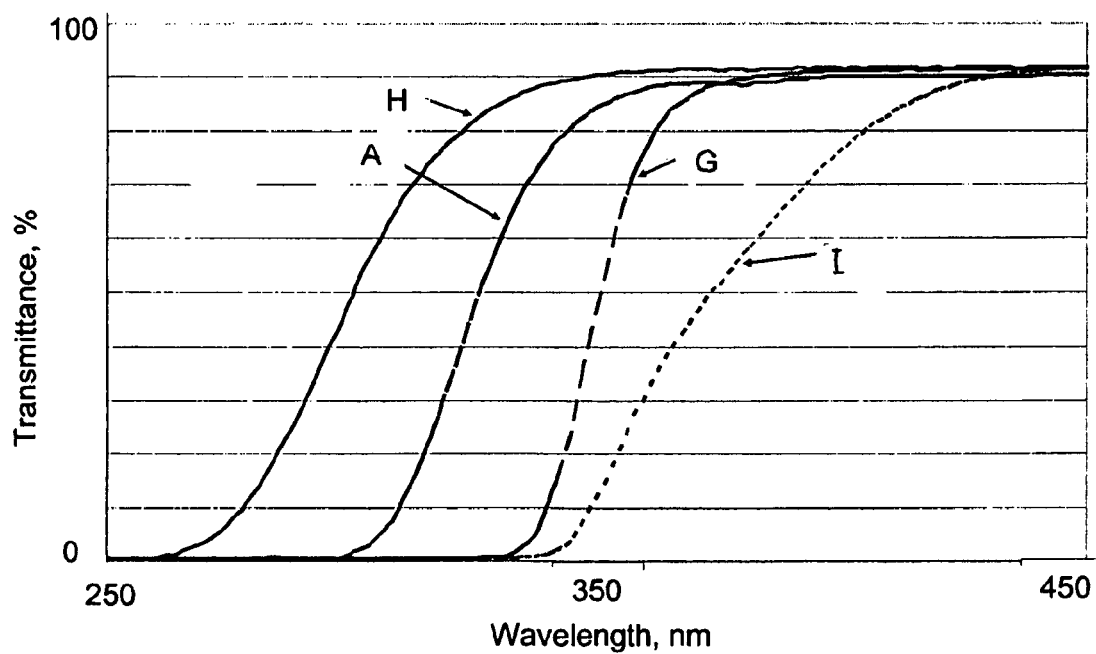

Sample A of Table 16A included a DBEF-Q laminated between a surface of the 1.6 mm thick glass and a coated with opaque layer of Chromium surface of another lite of glass. The color change value $\Delta E^* = 6.67$ after two weeks of testing which was found to be excessive for automotive purposes. Transmission spectra for 1.6 mm glass of the type used to make Sample A are shown in Table 16B and FIGS. 47(A,B).

Sample B of Table 16A included a DBEF-Q laminated between a surface of the glass prism and a coated with opaque layer of Chromium surface of another lite of glass. The corresponding color change value was $\Delta E^* = 11.37$ after two weeks of testing which was found to be excessive for automotive purposes. Transmission values for prism glass of the type used to make Sample B were not measured.

Figure 48A:
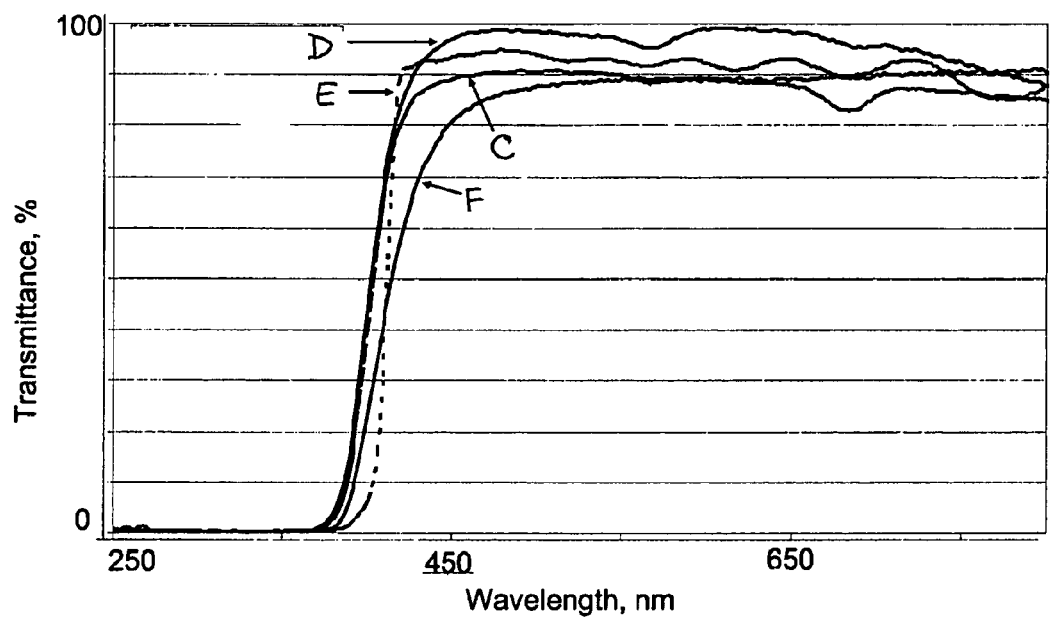
FIGS. 48(A,B) show transmission spectra of additional substrate materials used in embodiments of an APBF laminate of the invention containing UV-blocking means.
Figure 48B:
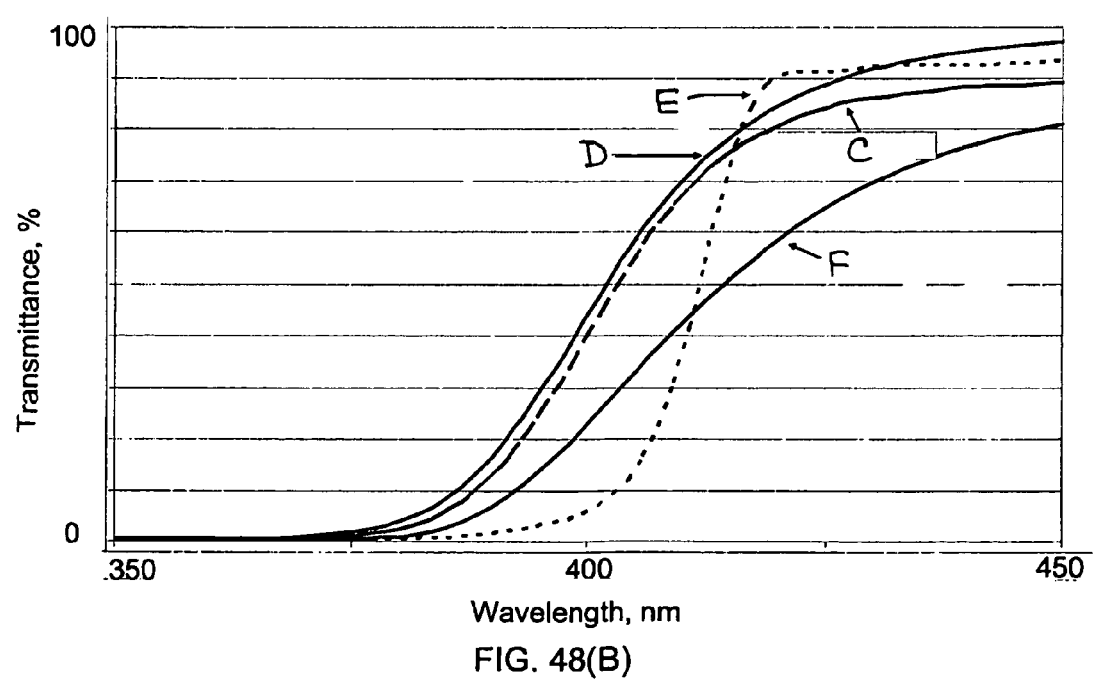

Sample C of Table 16A included a DBEF-Q laminate between a surface of glass containing a UV-blocking coating ClimaGuard-SPF® (from Guardian Industries) and a coated with opaque layer of Chromium surface of another lite of glass. The color change value was, as shown in Table 16A, $\Delta E^* = 1.99$ after two weeks of testing, which is acceptable for automotive purposes. Transmission values for used ClimaGuard® glass are shown in Table 16B and FIGS. 48(A,B).

Sample D of Table 16A included a DBEF-Q laminated between a treated surface of the Tru Vue Museum® glass (Tru Vue Inc.) and a coated with opaque layer of Chromium surface of another lite of glass. The color change value was $\Delta E^* = 2.50$ after two weeks of testing, which is acceptable for automotive purposes. Transmission values for Tru Vue Museum® glass used are shown in Table 16B and FIGS. 48(A,B).

Sample E of Table 16A included a DBEF-Q laminate between a 1.6 mm-thick raw glass and a coated with opaque layer of Chromium surface of another lite of glass. In addition, a glass plate with an interferential coating, DSI Ultra Block™ (Deposition Sciences Inc), was placed in front of the 1.6 mm raw glass as a filter. Sample E was exposed in the weatherometer with the filter plate in place, but color measurements were taken with the filter plate removed. The measured color change value $\Delta E^* = 0.72$ after 13 days of testing which is acceptable for automotive purposes. Transmission values for DSI Ultra Block™ filter plate are shown in Table 16B and FIGS. 48(A,B).

Sample F of Table 16A included a DBEF-Q laminated between the UV blocking glass from China Building Materials Academy Quartz and Special Glasses Institute and a coated with opaque layer of Chromium surface of another lite of glass. The color change value was ΔE*=0.61 after 13 days of testing which is acceptable for automotive applications. Transmission values for glass of the type used to make Sample F are shown in Table 16B and FIGS. 48(A,B).

Sample G of Table 16A included a DBEF-Q laminated between a piece of Solarphire® (PPG Inc.) and an overcoated with a bi-layer (ruthenium on top of chromium) surface of another lite of glass so as to have DBEF-Q and Ru-layers to be adjacent. The color change value was ΔE*=10.52 after 13 days of testing which is too excessive for automotive applications. Transmission values for Solarphire® glass of the type used shown in Table 16C and FIGS. 47(A,B).

Sample H of Table 16A included a DBEF-Q laminated between Solarphire PV® (PPG Inc) and an overcoated with a bi-layer (ruthenium on top of chromium) surface of another lite of glass so as to have DBEF-Q and Ru-layers to be adjacent. The color change value was ΔE*=21.53 after 13 days of testing which is excessive for automotive applications. Transmission values for Solarphire PV® glass of the type used are shown in Table 16C and FIGS. 47(A,B).

Sample I of Table 16A included a DBEF-Q laminated between Solarphire AR® (PPG Inc) and an overcoated with a bi-layer (ruthenium on top of chromium) surface of another lite of glass so as to have DBEF-Q and Ru-layers to be adjacent. The UV blocking coating of Solar4phire PV was placed towards the DBEF-Q. The color change value was ΔE*=2.78 after 13 days of testing, which is acceptable for automotive applications. Transmission values for Solarphire AR® glass are shown in Table 16C and FIGS. 47A(,B).

Figure 49A:
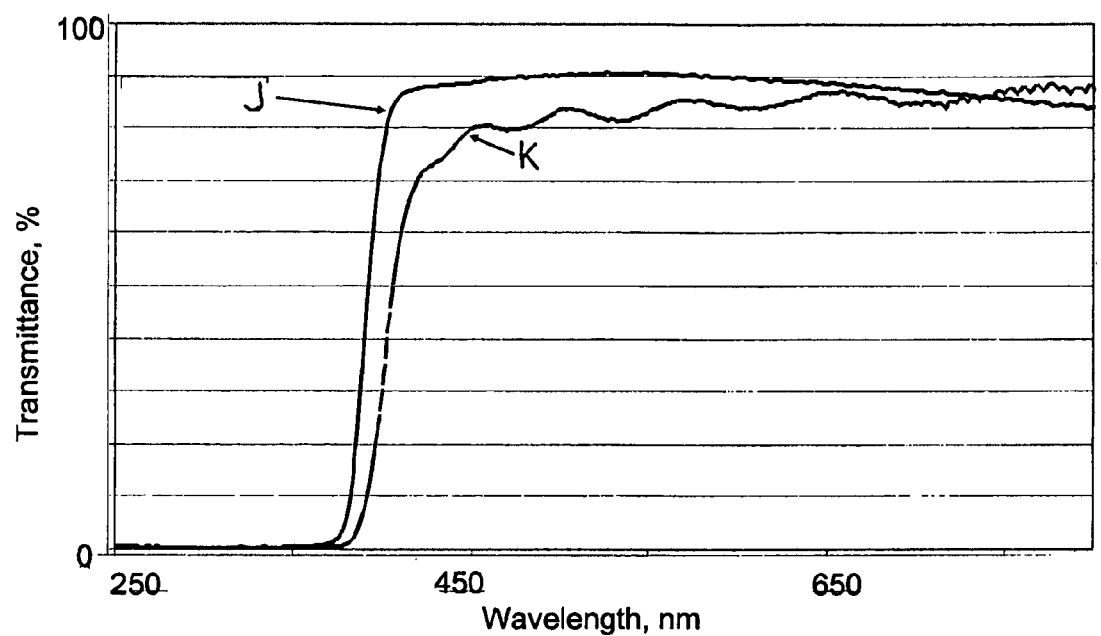
FIGS. 49(A,B) show transmission spectra of other substrate materials used in embodiments of an APBF laminate of the invention containing UV-blocking means.
Figure 49B:
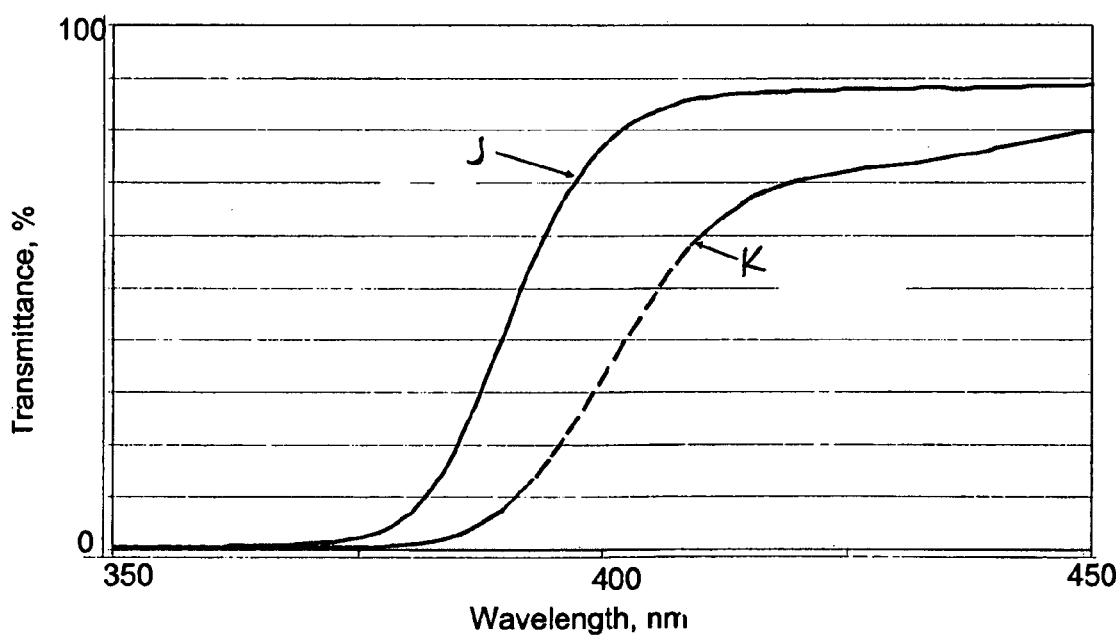

Sample J of Table 16A included a 1.6 mm-thick raw glass laminated to 3M PSA 8172P (3M) laminated to DBEF-Q laminated to a coated with opaque layer of Chromium lite of glass. The color change value was ΔE*=1.27 after 13 days of testing which is acceptable for automotive applications. Transmission values for a laminate of 3M PSA 8172P and two pieces of 1.6 mm glass of the type used are shown in Table 16C and FIGS. 49(A,B).

Sample K of Table 16A is of the construction of 1.6 mm raw glass laminated to DBEF-Q which is laminated to coated glass where the layer in contact with the DBEF-Q is opaque chrome with the addition of Gila Fade Control Clear (CP Films Inc) which was adhered to the front surface of the 1.6 mm glass top plate after the removal of the release liner. The color change value was ΔE*=2.16 after 13 days of testing which is acceptable for automotive applications. Transmission values for Gila Fade Control Clear with PSA and release liner used are shown in Table 16C and FIGS. 49(A,B).

Generally, in order to meet acceptable UV durability requirements in the J1885 test, it is desirable to attenuate UV light at wavelengths shorter than about 360 nm, preferably shorter than about 370 nm, more preferably shorter than about 380 nm and most preferably shorter than about 390 nm. It is preferred to attenuate more than 50% of the targeted wavelengths, more preferably more than 70% and even more preferably more than about 85%. One non-limiting criteria of sample acceptance is a color change value ΔE* that is less than 3 after 300 hours of the light on condition of J1885 which is approximately 600 kJ/m² of exposure per the specification.

TABLE 16A

| Glass (Coating/Film) | Type | 1 Week | | | 2 Weeks | | | 3 Weeks | | |
|---|---|---|---|---|---|---|---|---|---|---|
| | | Δa* | Δb* | ΔE* | Δa* | Δb* | ΔE* | Δa* | Δb* | ΔE* |
| A - 1.6 mm Raw Glass | Laminate | −0.46 | 2.45 | 2.51 | −1.13 | 6.42 | 6.67 | −1.63 | 10.24 | 10.69 |
| B - Prism (raw glass) | Laminate | −0.89 | 5.03 | 5.24 | −1.61 | 11.04 | 11.37 | −2.07 | 15.52 | 16.03 |
| C - ClimaGuard SPF ® | Laminate | 0.05 | 1.69 | 1.75 | −0.07 | 1.89 | 1.99 | −0.15 | 2.11 | 2.19 |
| D - Tru Vue Museum ® | Laminate | −1.03 | 1.12 | 1.63 | −1.46 | 1.87 | 2.50 | −1.59 | 2.28 | 2.86 |

| Glass/Coating/Film | Type | 1 Week | | | 13 Days | | | 3 Weeks | | |
|---|---|---|---|---|---|---|---|---|---|---|
| | | Δa* | Δb* | ΔE* | Δa* | Δb* | ΔE* | Δa* | Δb* | ΔE* |
| E - DSI Ultra Block ™ | Filter | −0.06 | 0.02 | 0.62 | −0.03 | −0.02 | 0.72 | | | |
| F - China B.M.A. UV glass | Laminate | −0.08 | 0.42 | 0.66 | −0.10 | 0.48 | 0.61 | | | |
| G - Solarphire ® | Laminate | −0.82 | 4.12 | 4.30 | −1.67 | 10.09 | 10.52 | | | |
| H - Solarphire PV ® | Laminate | −2.11 | 12.24 | 12.72 | −2.48 | 20.86 | 21.53 | | | |
| I - Solarphire AR ® | Laminate | −0.23 | 0.75 | 0.79 | −0.47 | 2.65 | 2.78 | | | |
| J - 3M PSA 8172P | Laminate | 0.18 | 0.29 | 0.36 | 0.05 | 0.49 | 1.27 | | | |
| K - Gila Fade Control | Filter | 0.04 | 1.02 | 1.06 | −0.44 | 2.07 | 2.16 | | | |

TABLE 16B

| | Transmission (%) | | | | |
|---|---|---|---|---|---|
| Wavelength (nm) | A - 1.6 mm Raw Glass | C - Clima Guard SPF ® | D - Tru Vue Museum Glass ® | E - DSI Ultra Block ™ | F - China B.M.A. UV Glass |
| 350.0 | 84.0% | 0.3% | 0.4% | 0.3% | 0.4% |
| 361.2 | 88.1% | 0.4% | 0.5% | 0.3% | 0.4% |
| 370.7 | 89.0% | 0.7% | 1.1% | 0.4% | 0.5% |
| 380.3 | 88.5% | 2.6% | 4.0% | 0.6% | 0.9% |
| 389.9 | 89.5% | 12.8% | 16.3% | 1.8% | 6.8% |
| 399.5 | 90.0% | 38.6% | 42.6% | 5.5% | 22.0% |
| 410.8 | 90.1% | 68.6% | 71.5% | 41.6% | 43.7% |
| 420.4 | 90.0% | 80.8% | 84.8% | 90.7% | 58.9% |

TABLE 16B-continued

| | Transmission (%) | | | | |
|---|---|---|---|---|---|
| Wavelength (nm) | A - 1.6 mm Raw Glass | C - Clima Guard SPF ® | D - Tru Vue Museum Glass ® | E - DSI Ultra Block ™ | F - China B.M.A. UV Glass |
| 430.0 | 90.1% | 86.2% | 91.7% | 92.2% | 69.6% |
| 439.6 | 90.1% | 88.1% | 95.1% | 92.6% | 76.5% |
| 450.8 | 90.4% | 89.1% | 97.4% | 93.6% | 81.2% |

TABLE 16C

| | Transmission (%) | | | | |
|---|---|---|---|---|---|
| Wavelength (nm) | G - Solarphire ® | H - Solarphire PV ® | I - Solarphire AR ® | J - 3M 8172P PSA | K - Gila Fade Control |
| 350.0 | 46.2% | 90.3% | 11.6% | 0.5% | 0.3% |
| 361.2 | 78.0% | 91.2% | 32.8% | 0.7% | 0.4% |
| 370.7 | 87.0% | 91.6% | 46.2% | 1.3% | 0.5% |
| 380.3 | 89.6% | 91.4% | 57.0% | 7.1% | 1.1% |
| 389.9 | 90.6% | 91.5% | 66.9% | 41.9% | 7.9% |
| 399.5 | 91.1% | 91.6% | 75.6% | 76.1% | 31.1% |
| 410.8 | 91.3% | 91.6% | 83.3% | 86.4% | 60.9% |
| 420.4 | 91.3% | 91.6% | 87.5% | 87.6% | 70.6% |
| 430.0 | 91.3% | 91.6% | 89.9% | 88.0% | 73.5% |
| 439.6 | 91.4% | 91.7% | 91.0% | 88.2% | 76.3% |
| 450.8 | 91.5% | 91.7% | 91.7% | 88.7% | 79.9% |

Characterization of Optical Distortion Characteristics of Exemplary Embodiments.

Table 17 shows the samples of data representing characterization of the extended distortions and the resulting optical properties of various embodiments of the invention. These results demonstrate that method of the invention allows for fabrication of embodiments that, as evidenced by SW, LW, Wa, Wb, Wc and Millidiopter readings, meet the optical requirements of the most demanding applications.

Characterizations were conducted with the use of wave-scan technique and by measuring the changes in optical power of the surface-under-test as discussed above. As shown, samples 1 through 3 represent inherent distortions observed in original reflective polarizer materials, and samples 4, 5, and 26 represent base-line distortions for a glass substrate, an EC-element having ITO-coatings on surfaces II and III, and an uncoated prism element, respectively. As other samples demonstrate, these inherent distortions may be compensated or reduced when the fabrication of a mirror system is carried out according to the process of the invention. In a case when the fabrication process is not adequately controlled, these inherent distortions may be magnified and translated into the final product. Samples 6 and 24 represent the properties of an embodiment 2100 structured according to [G/PSA/DBEF], see FIG. 21(A), which has a PSA layer 2030 between the glass plate 826 and the APBF 824 and the superstrate released. Samples 6 and 24 were fabricated without and with autoclaving, respectively. The lamination process carried out under substantially omnidirectional pressure resulted in significant improvement of the SW figures in the final laminate, but at the same time increased the LW values. The Wa, Wb and Wc were also generally higher for sample 24 compared to sample 6. Samples 7 and 20 were structured according to [G/PSA/DBEF/G], see embodiment 2110 of FIG. 21(B), which is a laminate having both the substrate and superstrate. Samples 7 and 20 were fabricated with and without autoclaving, respectively. As can be seen from comparison of samples 6,24 with samples 7,20, the reduction of distortion characteristics of a laminate substantially relates not only to the use of omnidirectional pressure during the fabrication of the laminate, but also to having the RP-layer of the laminate being supported by glass lites on both sides. This correlates with the findings discussed above in reference to Tables 11 through 16. The Wa, Wb and Wc numbers are all substantially improved with autoclaving (sample 20) and are all less than 3.0. Samples 8 and 19 correspond to the embodiment of FIG. 8(C), fabricated without and with autoclaving, respectively. Both the wave-scan test and the optical power test demonstrate substantial reduction of extended distortions as a result of autoclaving procedure. The autoclaving procedure is shown to reduce the aggregate distortions in the samples, as evidenced by Wa, Wb and Wc readings that are all less than 3. Similar results have been obtained for samples 9 and 25, which corresponded to the embodiment 836 of FIG. 8(D), fabricated without and with autoclaving, respectively. Each of samples 8, 19, 9, and 25 used DBEF-Q film as a reflective polarizer. Characterization of samples 11 and 13, each of which included prismatic elements, demonstrated substantial lack of extended distortion. Here, both metrics (Wa, Wb and Wc) and (SW, LW) are quire low demonstrating that the parts are substantially free of objectionable distortions. Samples 14, 15, 16, and 17 represented the use of APBF different from the DBEF-Q product by 3M Inc. In particular, sample 14 was structured according to the embodiment 850 of FIG. 8(F) and utilized the APF 35 film as a reflective polarizer 824. Sample 15 represented a laminate-containing mirror structure depicted in an embodiment 2400 of FIG. 24. The embodiment 2400 schematically illustrates a laminate of the invention, wherein the anisotropic film APF 35 used as a RP 824 is laminated between the EC-element 840 and a third light of glass 610 having an OREL coating deposited on surface V. In this embodiment, the OREL coating includes a 50 nm layer 2410 of Chromium and a 20 nm layer 2420 of Ruthenium. Sample 16 represented the embodiment 884 of FIG. 8(I) with APF 50 as a reflective polarizer 824. Sample 17 also corresponded to FIG. 8(I), but utilized APF 50 as a reflective polarizer. Although samples 14 through 17 show variable levels of distortions and are all acceptable for use in most of automotive application, the distortions of sample 16 appear to be particularly low. DBEF-Q was used as an RP in sample 21 structured according to the embodiment 884 of 8(I). Samples 27 generally corresponded to the embodiment 884 of FIG. 8(I). Sample 28 corresponded to an embodiment 2200 of FIG. 22 where, in comparison with the embodiment 884 of FIG. 8(I), the PSA layer 2030 has been disposed between the RP 824 and glass plate 610. Both samples demonstrate substantial lack of extended distortions (characterized by SW and LW values) and excellent optical properties. Additionally, all three of these examples had excellent Wa, Wb and Wc values suitable for even the most stringent applications.

assembly, the first surface of the first substrate may comprise a hydrophilic or hydrophobic coating to improve the operation. The embodiments of the reflective elements may comprise an anti-scratch layer on the exposed surfaces of at least one of the first and second substrates. Examples of various reflective elements are described in U.S. Pat. Nos. 5,682,267, 5,689,370, 5,825,527, 5,940,201, 5,998,617, 6,020,987, 6,037,471, 6,057,956, 6,062,920, 6,064,509, 6,111,684, 6,166,848, 6,193,378, 6,195,194, 6,239,898, 6,246,507, 6,268,950, 6,356,376, 6,441,943, and 6,512,624. The disclosure of each of these patents is incorporated herein in its entirety by reference.

Electrochromic mirror assemblies utilizing embodiments of the present invention contain an electrochromic medium that is preferably capable of selectively attenuating light trav-

TABLE 17

Figure 21B:
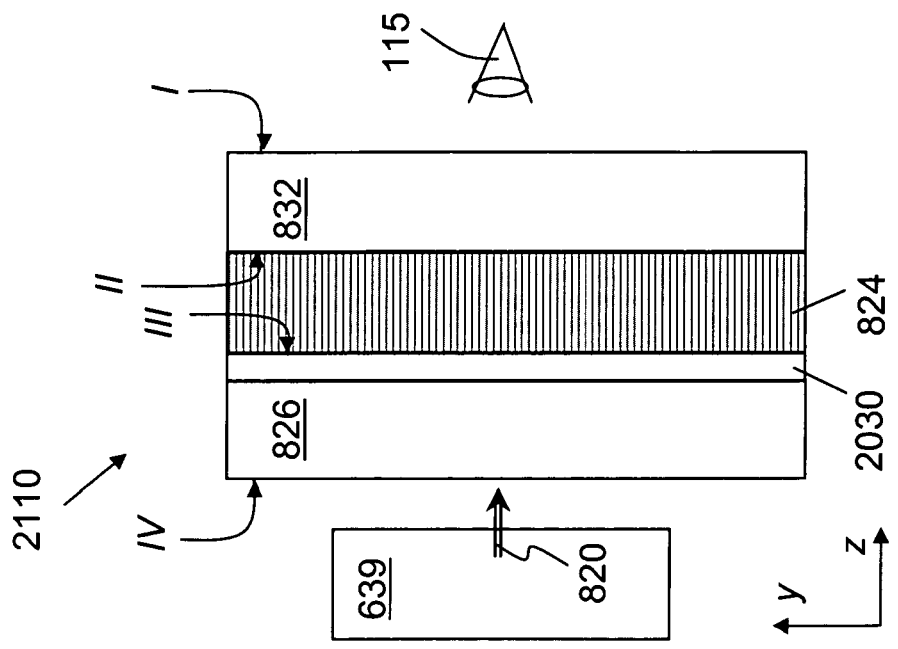
FIG. 21(B): a laminate including a PSA and having both a substrate and a superstrate.
Figure 21A:
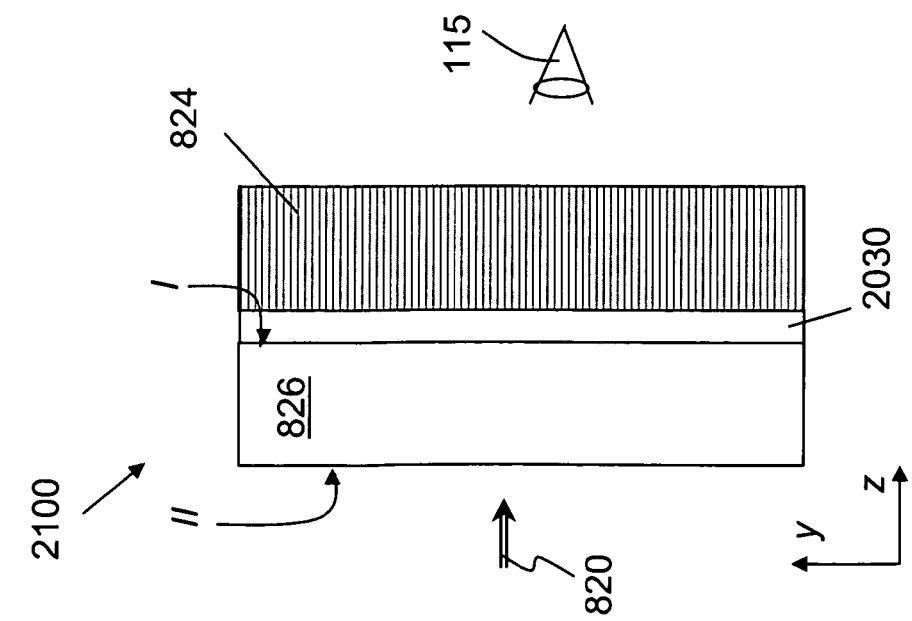
FIG. 21(A): a laminate including a PSA and having a superstrate removed.
Figure 23:
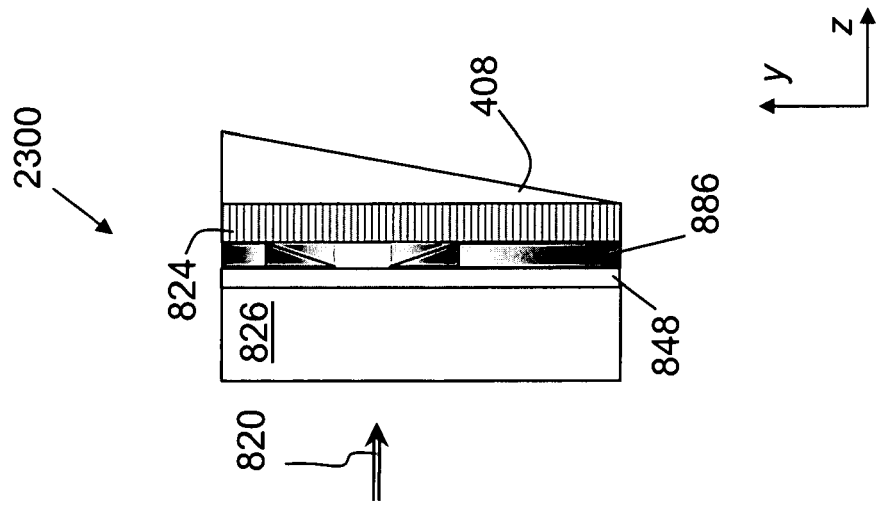
FIG. 23 shows another embodiment of the present invention.
Figure 22:
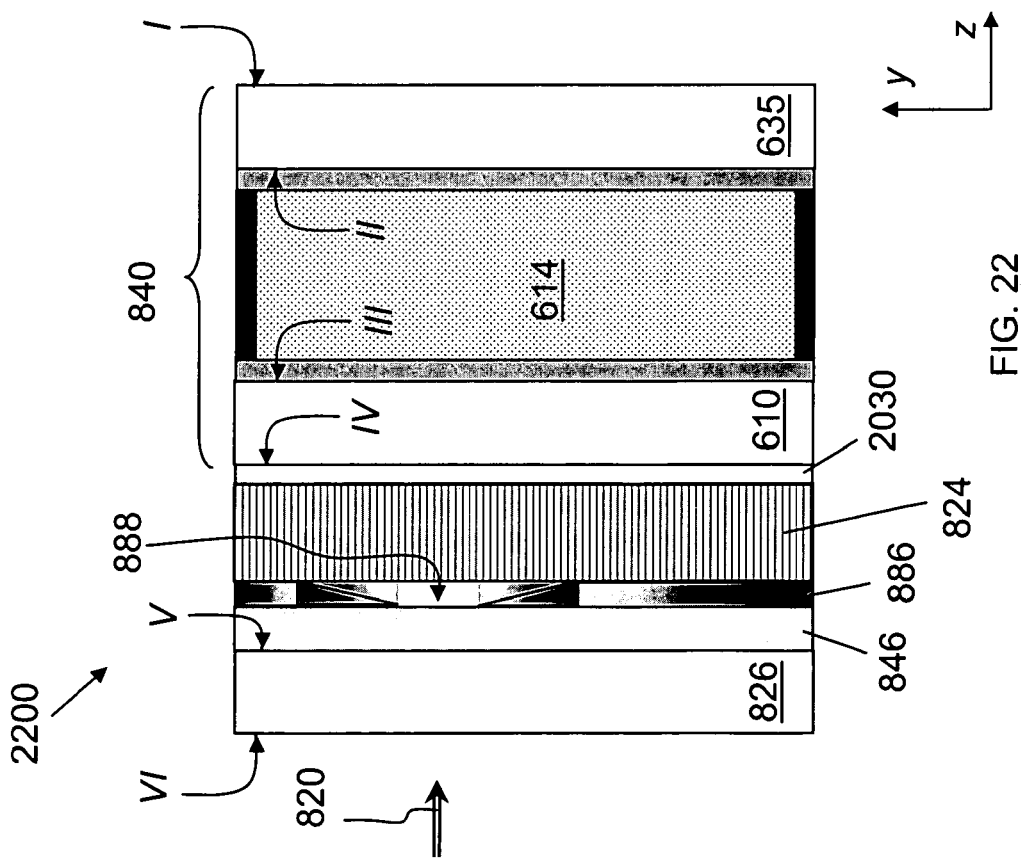
FIG. 22 shows yet another alternative embodiment of the present invention.

| # | Sample Description | SW | LW | Wa | Wb | Wc | Millidiopters |
|---|---|---|---|---|---|---|---|
| 1 | Original APF 35 film | 13.2 | 13.8 | 9.7 | 13.4 | 4 | |
| 2 | Original APF 50 film | 17.9 | 5.2 | 10.6 | 25.1 | 8.8 | |
| 3 | Original DBEF-Q film | 6.4 | 7.3 | 2.4 | 7.6 | 5.5 | |
| 4 | A glass substrate | 0 | 0 | 2.55 | 2.35 | 0.05 | 81 . . . 141 |
| 5 | An EC-element with ITO coatings on surfaces II and III | 0 | 0.2 | 2 | 1.8 | 0.1 | 156 . . . 227 |
| 26 | An uncoated glass prism | 0.1 . . . 0.2 | 0 | 2.0 | 2.5 | 0.1 | |
| 6 | Embodiment 2100 of FIG. 21(A), no autoclaving used | 4.4...8.6 | 1.5 . . . 3.1 | 3.3 . . . 4.0 | 6.3 . . . 9.4 | 2.9 . . . 5.5 | 174 . . . 204 |
| 24 | Embodiment 2100 of FIG. 21(A), with autoclaving | 2.7 | 4.7...4.9 | 12.5 | 6.8 | 5.5 | |
| 7 | Embodiment 2110 of FIG. 21(B), no autoclaving used. | 5.7 | 21.9 | 3.7 | 8.7 | 4.8 | 227 . . . 1,104 |
| 20 | Embodiment 2110 of FIG. 21(B), with autoclaving | 1.2 . . . 1.3 | 0.8 . . . 0.9 | 2.3 . . . 2.5 | 2.2 . . . 2.9 | 0.9 . . . 1.0 | 235 . . . 552 |
| 8 | Embodiment 830 of FIG. 8(C), no autoclaving used | 1.6...3.7 | 6.1...16.1 | 3.2...4.3 | 6.3...8.5 | 3.3...5.1 | 432 . . . 2,100 |
| 19 | Embodiment 830 of FIG. 8(C), with autoclaving | 1.4...2.5 | 0.8...0.9 | 1.5...2.4 | 2.4...3.9 | 0.9...1.4 | 208 . . . 257 |
| 11 | Embodiment 410 of FIG. 4(C) | 1...1.5 | 0.6...0.9 | 2.0...3.2 | 2.3...4.0 | 0.6 | |
| 13 | Embodiment 2300 of FIG. 23, with DBEF-Q as a reflective polarizer | 0...2.2 | 0.1...1 | 2.1...2.5 | 2.8...3.9 | 0.8 | |
| 14 | Embodiment 850 of FIG. 8(F), with APF 35 as reflective polarizer | 4.8...5.1 | 0.4 | 5.2 | 8.8 | 0.6 | 295 . . . 476 |
| 15 | FIG. 2400 of FIG. 24, with APF 35 as a reflective polarizer | 2.4...4.9 | 0.9 . . . 1.0 | 3.7 . . . 5.3 | 4.5 . . . 8.1 | 0.4 . . . 0.5 | 327 . . . 375 |
| 16 | Embodiment 884 of FIG. 8(I), with APF 35 as reflective polarizer | 0.1...0.2 | 0.1 | 1.2...1.4 | 0.9...1.1 | 0.0...0.1 | 285 . . . 361 |
| 17 | Embodiment 884 of FIG. 8(I), with APF 50 as reflective polarizer | 8.7...9.8 | 0.6 | 6.8...8.0 | 13.6...14.0 | 1.1...1.6 | 527 . . . 1,722 |
| 21 | Embodiment 884 of FIG. 8(I), with DBEF-Q as reflective polarizer | 0.6...1.2 | 0.5 . . . 2.4 | 1.1...1.9 | 1.2...2.6 | 0.5...0.8 | 250 . . . 592 |
| 27 | Embodiment 884 of FIG. 8(I), with DBEF-Q as reflective polarizer | 0.7...1.2 opaque zone; 1.6...1.7 transfl zone | 0.8...1.7 opaque zone; 0.4...0.6 transfl zone | 1.1...2.0 Opaque zone; 1.2...1.5 transfl zone | 1.1...2.2 Opaque zone; 2.3...2.6 transfl zone | 0.4...0.8 Opaque zone; 0.7...0.8 transfl zone | |
| 28 | Embodiment 2200 of FIG. 22, with DBEF-Q as reflective polarizer | 0.5...0.8 | 0.4...1.7 | 1.3...2.7 | 1.1...2.7 | 0.5...0.6 | |

Generally, embodiments of the invention may be configured to define a convex element, an aspheric element, a planar element, a non-planar element, an element having a wide FOV, or a combination of these various configurations in different areas to define a mirror element with generally complex shape. In case of an electrochromic rearview mirror eling therethrough and preferably has at least one solution-phase electrochromic material and preferably at least one additional electroactive material that may be solution-phase, surface-confined, or one that plates out onto a surface. However, the presently preferred media are solution-phase redox electrochromics, such as those disclosed in commonly assigned U.S. Pat. Nos. 4,902,108, 5,128,799, 5,278,693, 5,280,380, 5,282,077, 5,294,376, 5,336,448, 5,808,778 and 6,020,987. The entire disclosure of each of these patents is incorporated herein in by reference. If a solution-phase electrochromic medium is utilized, it may be inserted into the chamber through a sealable fill port through well-known techniques, such as vacuum backfilling and the like. In addition, the disclosure of each of U.S. Pat. Nos. 6,594,066, 6,407,847, 6,362,914, 6,353,493, 6,310,714 is incorporated herein by reference in its entirety.

Electrochromic medium preferably includes electrochromic anodic and cathodic materials that can be grouped into the following categories:

(i) Single layer: The electrochromic medium is a single layer of material that may include small inhomogeneous regions and includes solution-phase devices where a material is contained in solution in the ionically conducting electrolyte and remains in solution in the electrolyte when electrochemically oxidized or reduced. U.S. Pat. No. 6,193,912 entitled "NEAR INFRARED-ABSORBING ELECTROCHROMIC COMPOUNDS AND DEVICES COMPRISING SAME"; U.S. Pat. No. 6,188,505 entitled "COLOR STABILIZED ELECTROCHROMIC DEVICES"; U.S. Pat. No. 6,262,832 entitled "ANODIC ELECTROCHROMIC MATERIAL HAVING A SOLUBLIZING MOIETY"; U.S. Pat. No. 6,137,620 entitled "ELECTROCHROMIC MEDIA WITH CONCENTRATION ENHANCED STABILITY PROCESS FOR PREPARATION THEREOF AND USE IN ELECTROCHROMIC DEVICE"; U.S. Pat. No. 6,195,192 entitled "ELECTROCHROMIC MATERIALS WITH ENHANCED ULTRAVIOLET STABILITY"; U.S. Pat. No. 6,392,783 entitled "SUBSTITUTED METALLOCENES FOR USE AS AN ANODIC ELECTROCHROMIC MATERIAL AND ELECTROCHROMIC MEDIA AND DEVICES COMPRISING SAME"; and U.S. Pat. No. 6,249,369 entitled "COUPLED ELECTROCHROMIC COMPOUNDS WITH PHOTOSTABLE DICATION OXIDATION STATES" disclose anodic and cathodic materials that may be used in a single layer electrochromic medium, the entire disclosures of which are incorporated herein by reference. Solution-phase electroactive materials may be contained in the continuous solution phase of a cross-linked polymer matrix in accordance with the teachings of U.S. Pat. No. 5,928,572, entitled "IMPROVED ELECTROCHROMIC LAYER AND DEVICES COMPRISING SAME" or International Patent Application No. PCT/US98/05570 entitled "ELECTROCHROMIC POLYMERIC SOLID FILMS, MANUFACTURING ELECTROCHROMIC DEVICES USING SUCH SOLID FILMS, AND PROCESSES FOR MAKING SUCH SOLID FILMS AND DEVICES," and U.S. patent application Ser. No. 11/272,552 titled "Electrochromic Compounds and Associated Media and Devices and filed Nov. 10, 2005. The disclosure of each of these patent documents is incorporated herein in its entirety by reference.

The entire disclosure of each of the U.S. patent application Ser. No. 12/284,701, filed Sep. 24, 2008, entitled ULTRAVIOLET LIGHT STABILIZING COMPOUNDS AND ASSOCIATED MEDIA AND DEVICES, U.S. Pat. No. 7,428,091 entitled ELECTROCHROMIC COMPOUNDS AND ASSOCIATED MEDIA AND DEVICES, and U.S. Pat. No. 7,256,924 entitled MULTI-CELL ELECTROCHROMIC DEVICES, disclosing additional teachings related to the EC-element, is incorporated herein by reference in its entirety.

At least three electroactive materials, at least two of which are electrochromic, can be combined to give a pre-selected color as described in U.S. Pat. No. 6,020,987 entitled "ELECTROCHROMIC MEDIUM CAPABLE OF PRODUCING A PRE-SELECTED COLOR," the entire disclosure of which is incorporated herein by reference. This ability to select the color of the electrochromic medium is particularly advantageous when designing information displays with associated elements.

The anodic and cathodic materials can be combined or linked by a bridging unit as described in International Application No. PCT/WO97/EP498 entitled "ELECTROCHROMIC SYSTEM," the entire disclosure of which is incorporated herein by reference. It is also possible to link anodic materials or cathodic materials by similar methods. The concepts described in these applications can further be combined to yield a variety of electrochromic materials that are linked.

Additionally, a single layer medium includes the medium where the anodic and cathodic materials can be incorporated into the polymer matrix as described in International Application No. PCT/WO98/EP3862 entitled "ELECTROCHROMIC POLYMER SYSTEM," U.S. Pat. No. 6,002,511, or International Patent Application No. PCT/US98/05570 entitled "ELECTROCHROMIC POLYMERIC SOLID FILMS, MANUFACTURING ELECTROCHROMIC DEVICES USING SUCH SOLID FILMS, AND PROCESSES FOR MAKING SUCH SOLID FILMS AND DEVICES," the entire disclosures of which are incorporated herein by reference.

Also included is a medium where one or more materials in the medium undergoes a change in phase during the operation of the device, for example, a deposition system where a material contained in solution in the ionically conducting electrolyte which forms a layer, or partial layer on the electronically conducting electrode when electrochemically oxidized or reduced.

(ii) Multilayer: The medium is made up in layers and includes at least one material attached directly to an electronically conducting electrode or confined in close proximity thereto which remains attached or confined when electrochemically oxidized or reduced. Examples of this type of electrochromic medium are the metal oxide films, such as tungsten oxide, iridium oxide, nickel oxide, and vanadium oxide. A medium, which contains one or more organic electrochromic layers, such as polythiophene, polyaniline, or polypyrrole attached to the electrode, would also be considered a multilayer medium.

In addition, the electrochromic medium may also contain other materials, such as light absorbers, light stabilizers, thermal stabilizers, antioxidants, thickeners, or viscosity modifiers.

It may be desirable to incorporate a gel into the electrochromic device as disclosed in commonly assigned U.S. Pat. No. 5,940,201 entitled "AN ELECTROCHROMIC MIRROR WITH TWO THIN GLASS ELEMENTS AND A GELLED ELECTROCHROMIC MEDIUM". The entire disclosure of this U.S. patent is incorporated herein by reference.

In at least one embodiment of a rearview mirror assembly utilizing a mirror element according to the present invention, the rearview mirror assembly is provided with an electro-optic element having a substantially transparent seal. Examples of EC-structures, substantially transparent seals and methods of forming substantially transparent seals are provided in U.S. Pat. No. 5,790,298, the entire disclosure of which is included herein by reference. U.S. Pat. Nos. 6,665,107, 6,714,334, 6,963,439, 6,195,193, 6,157,480, 7,190,505, 7,414,770, and U.S. patent application Ser. No. 12/215,712 disclose additional subject matter related to seals and seal materials. The disclosure of each of theses documents is incorporated herein by reference in its entirety.

In at least one embodiment, a mirror structure according to the invention or a rearview mirror assembly utilizing such mirror structure may include a spectral filter material and/or a bezel for protecting the associated seal from damaging light rays and to provide an aesthetically pleasing appearance. Examples of various bezels are disclosed, e.g., in U.S. Pat. Nos. 5,448,397, 6,102,546, 6,195,194, 5,923,457, 6,238,898, 6,170,956 and 6,471,362, the disclosure of each of which is incorporated herein in its entirety by reference.

As discussed above, in at least one embodiment, an embodiment of the APBF-containing laminate of the invention can be used in conjunction with a display such as an RCD, or another light source such as one generated polarized light, for example a laser source. Discussion of various displays that can be used with embodiments of the invention is provided, e.g., in U.S. Provisional Application No. 60/780,655 filed on Mar. 9, 2006; U.S. Provisional Application No. 60/804,351 filed on Jun. 9, 2006; U.S. Patent Application Publication Nos. 2008/0068520, U.S. Pat. No. 7,221,363; and U.S. patent application Ser. Nos. 11/179,798 and 12/193,426. The entire disclosure of each of these applications is incorporated herein by reference. Generally, a light source can be disposed as a stand-alone component separated from the mirror structure or it can be in physical contact with the mirror structure. An embodiment of the laminate of the invention can also be beneficially used in applications utilizing rear-projection displays utilizing laser sources, e.g. a rear-projection display by Mitsubishi Corporation described at www.lasertvnews.com/features.asp.

In at least one of embodiments, a mirror structure including an APBF-based laminate of the invention may be configured in a rearview mirror assembly that may include a glare light sensor or an ambient light sensor, which are described in commonly assigned U.S. Pat. Nos. 6,359,274 and 6,402,328. The disclosure of each of these patents is incorporated herein by reference in its entirety. The electrical output signal from either or both of these sensors may be used as inputs to a controller on a circuit board of the assembly that controls the intensity of display backlighting. The details of various control circuits for use herewith are described in commonly assigned U.S. Pat. Nos. 5,956,012; 6,084,700; 6,222,177; 6,224,716; 6,247,819; 6,249,369; 6,392,783; and 6,402,328, the disclosures of which are incorporated in their entireties herein by reference. In addition or alternatively, the rearview mirror assembly may include at least one additional device such as, without limitation, an interior illumination assembly, a voice activated system, a trainable transceiver, a microphone, a compass system, a digital sound processing system, a highway toll booth interface, a telemetry system, a moisture sensor, a global positioning system, a vehicle vision system, a wireless communication interface, a camera, a transflective reflector, a navigation system, a turn signal, and an adaptive cruise control system. These systems may be integrated, at least in part, in a common control with information displays and/or may share components with the information displays. In addition, the status of these systems and/or the devices controlled thereby may be displayed on the associated information displays.

The embodiments of the invention described above are intended to be merely exemplary; numerous variations and modifications will be apparent to those skilled in the art.

Examples of Modifications

It is understood that an APBF-containing embodiment of the invention may be structured as any of multi-zone EC-reflectors disclosed in the Multi-Zone Mirror Application. Any such embodiment will contain various optical thin-film layers described therein that enhance the performance of the multi-zone mirror system of the invention. In particular, any of the multi-zone reflector embodiments described in the Multi-Zone Mirror Application—be it an embodiment utilizing an abrupt transition between the opaque and transflective zones of the mirror element, such as, e.g., one of the embodiments described in reference to FIG. 5 through FIG. 8 of the Multi-Zone Mirror Application, or an embodiment utilizing a gradual transition between the opaque and transflective zones of the mirror element, such as, e.g. one of the embodiments described in reference to FIG. 9 through FIG. 15 of the Multi-Zone Mirror Application—may be configured as part of the rearview mirror assembly according to the general principle illustrated in FIG. 18 herein. It will be understood that, in any of such possible configurations, an APBF element may be appropriately disposed between a display 1850 and a multi-zone mirror element 1820, as part of the auxiliary optics 1830, in any of the positions described herein, whether as a stand-alone component or a component laminated between other functional elements of the assembly.

Figure 37:
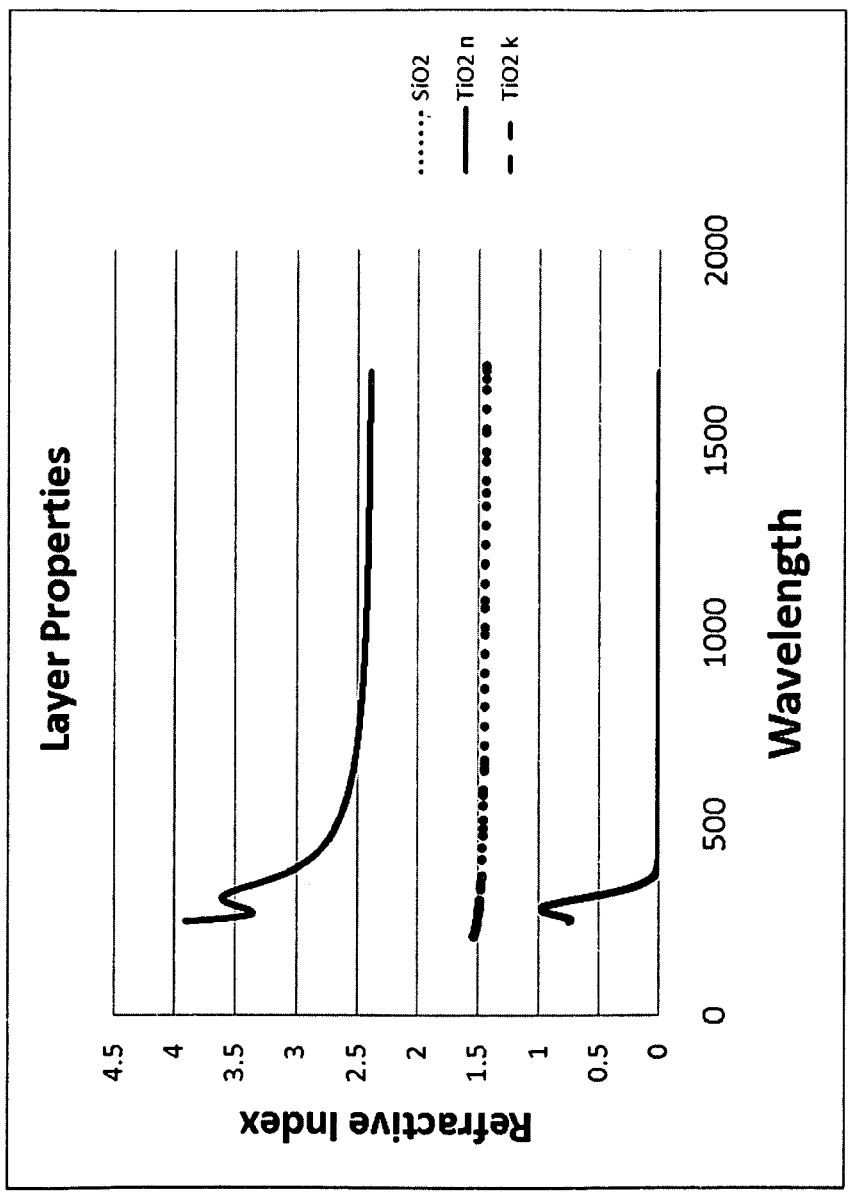
FIG. 37 shows refractive indices of materials used in constructing an embodiment of the invention.

It is also understood that UV-protection of the polymer-based RP component of the embodiments discussed above may be achieved without employing additional UV-blocking agents but through the use of appropriately designed reflectance-enhancing layers. The following Examples A and B illustrate the performance of some thin-films coatings that, when employed in front of an APBF in one of embodiments of the invention, may allow for simultaneous optimization of reflectance-enhancement of a mirror system of the invention and minimization of transmission of UV-light through the stacks towards the APBF. Optical constants for materials used to simulate the performance of these coatings (with a reference wavelength of 250 nm and a zero-degree angle of incidence) are presented in FIG. 37.

Example A

Figure 38:
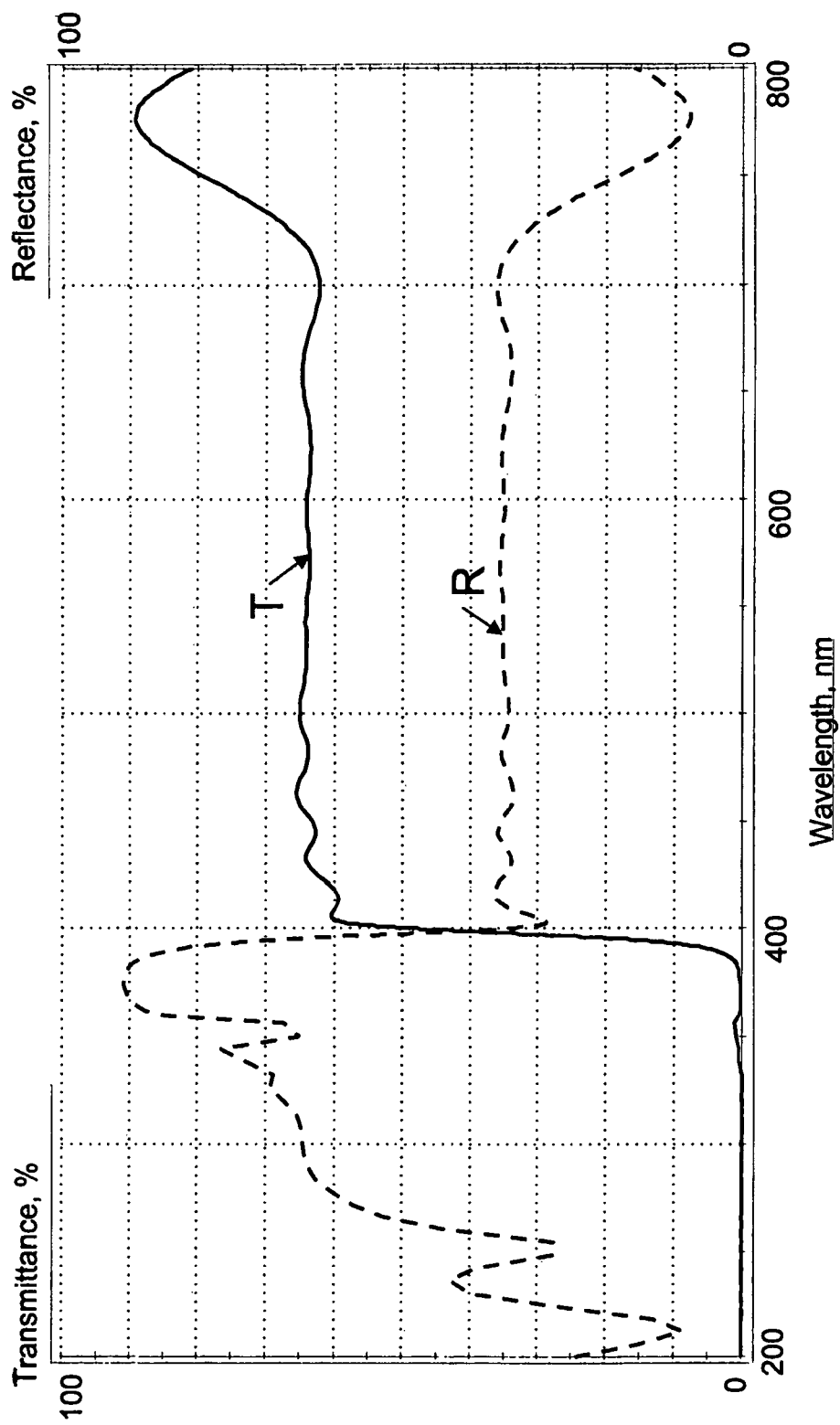
FIG. 38 shows transmission and reflection spectra of an embodiment of the invention.

Table 23 lists design parameters of a thin-film stack on a glass substrate, while FIG. 38 shows a dispersion of reflectance and transmittance characteristics for this stack. The overall reflectance value for unpolarized light is about 35% in the visible range, while the transmittance nears zero below approximately 380 nm.

Example B

Figure 39:
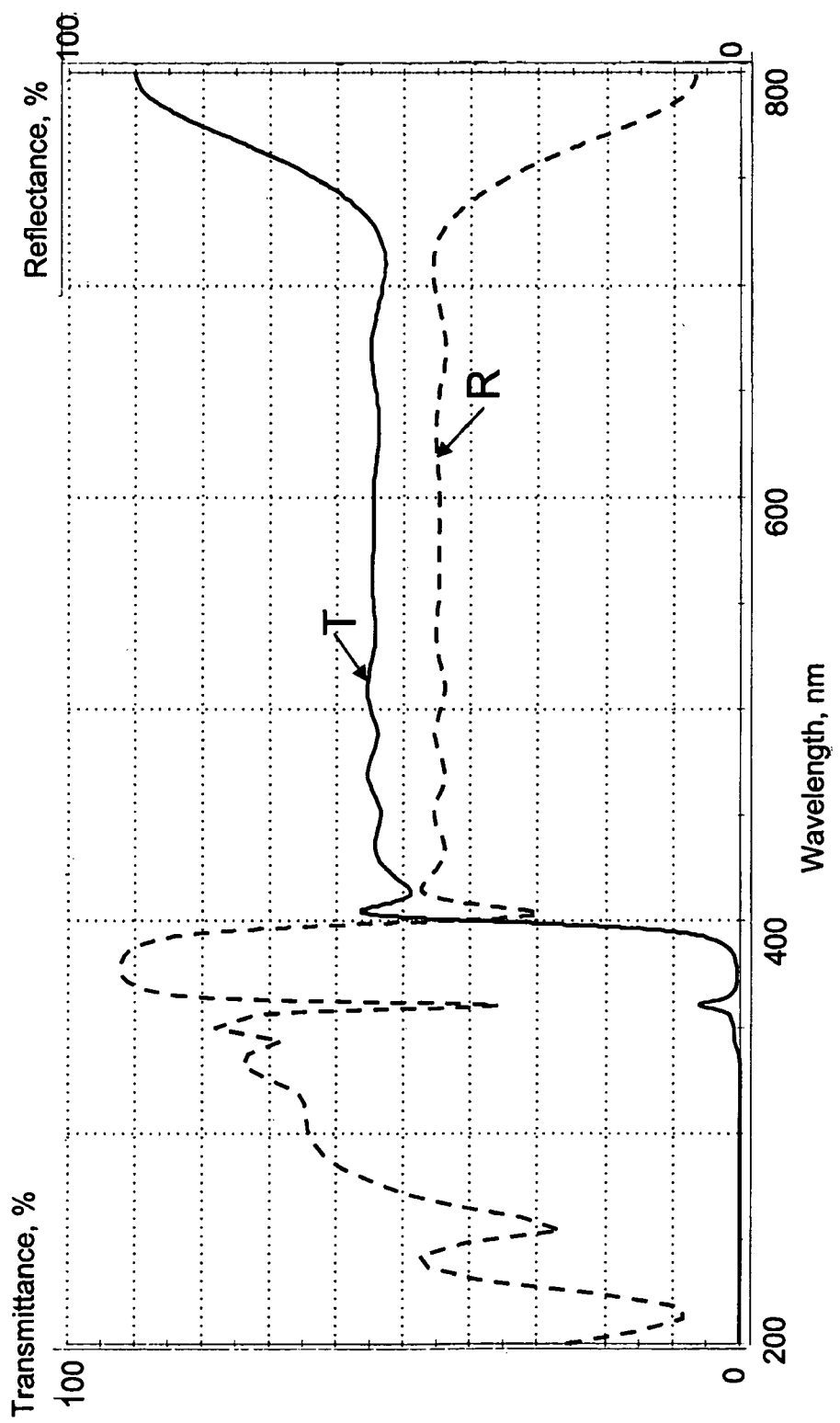
FIG. 39 shows transmission and reflection spectra of an alternative embodiment of the invention.

Design parameters for this alternative stack on a glass substrate, affording an approximately 45% reflectance in the visible spectral region and reduced transmittance at wavelengths below 400 nm as shown in FIG. 39, are illustrated in Table 24.

Example C

Figure 40:
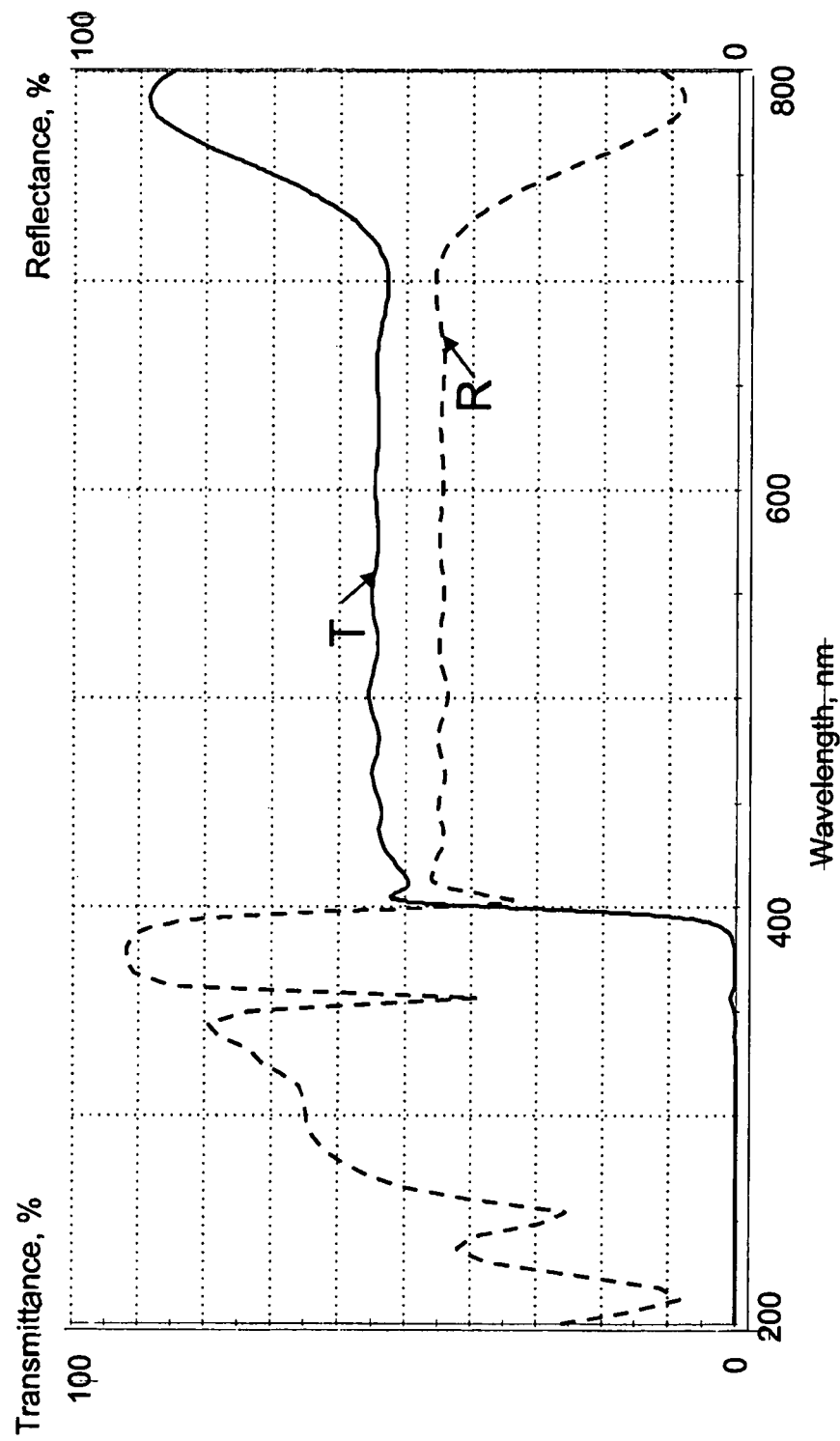
FIG. 40 shows transmission and reflection spectra of another embodiment of the invention.

Design parameters for this alternative stack on a glass substrate, affording an approximately 45% reflectance in the visible spectral region but providing improvement in UV-blocking as compared to the coating of Example B, as evidenced by FIG. 40, are shown in Table 25.

Figure 41:
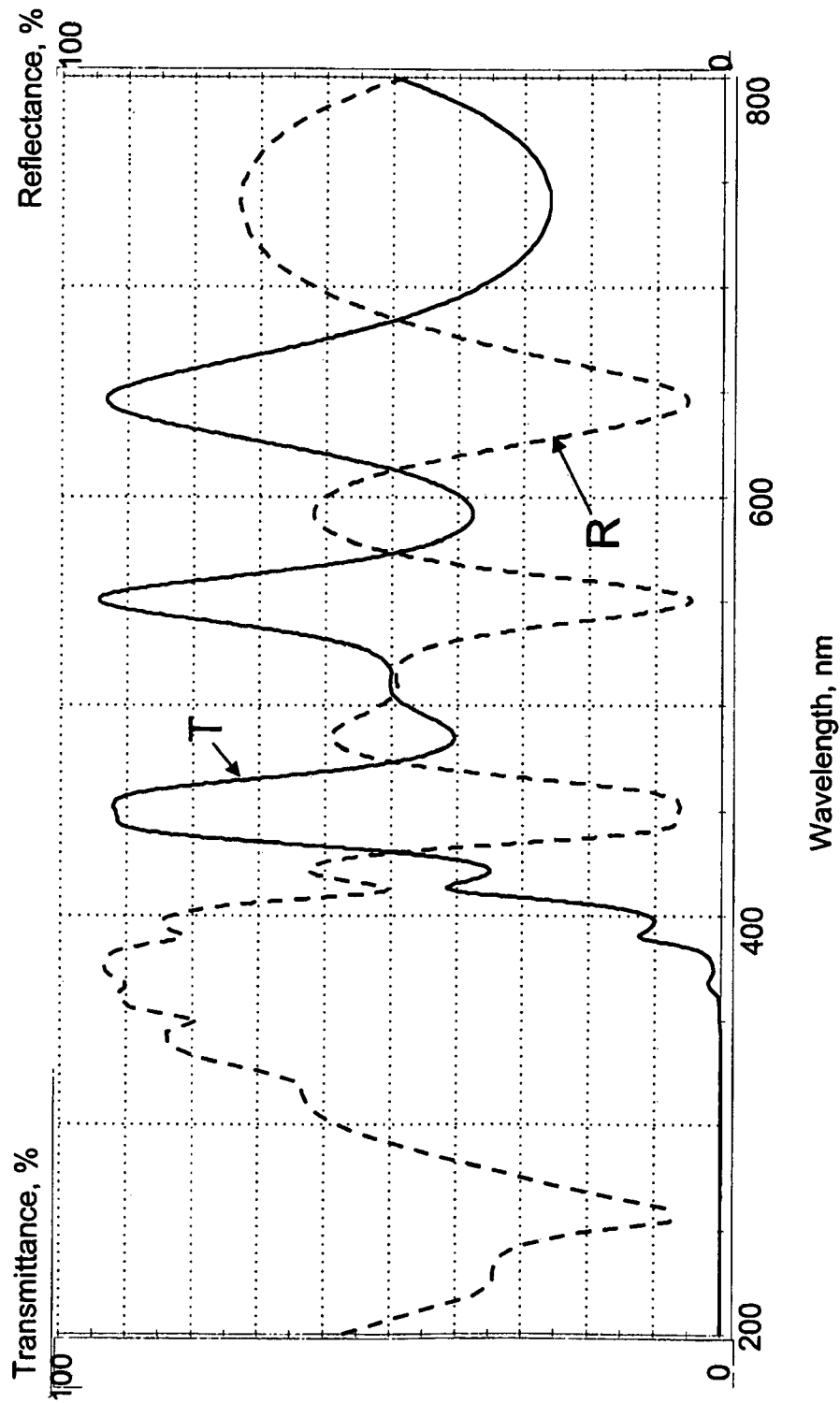
FIG. 41 shows transmission and reflection spectra of yet another alternative embodiment of the invention.

In comparison with Examples A and B, Example D illustrates a design of a thin-film coating that not only has UV-blocking and reflectance-enhancing properties but is also tailored to provide for preferentially high transmittance values in RGB-bands where a color display, located behind a mirror system of the invention, may operate. For the purpose of this example, the "blue" wavelength pass-band is defined by a 440-460 nm region, the "green" pass-band is defined as a 540-560 nm region, and a "red" pass-band is defined as a 630-660 nm region. Design parameters for this coating, deposited on a glass substrate, are listed in Table 26, and some optical characteristics of light (D 65, CIE 1964 observer) incident on this coating at zero degrees are shown in FIG. 41 and Table 27.

Figure 42:
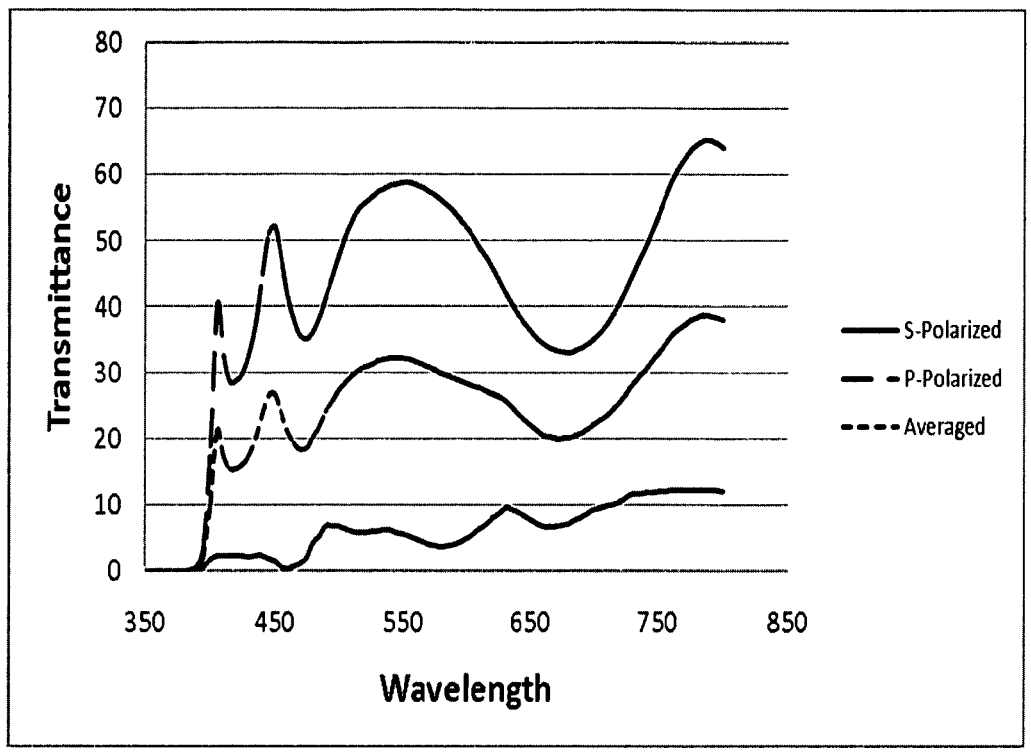
FIG. 42 shows transmittance characteristics of an embodiment of the invention.
Figure 43:
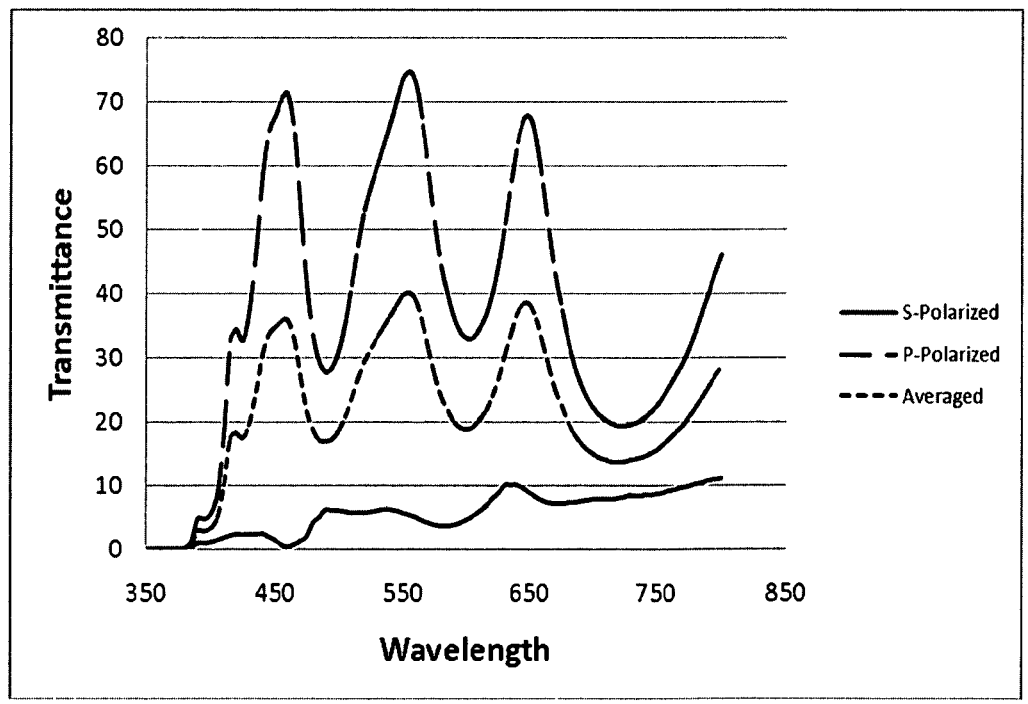
FIG. 43 shows transmittance characteristics of another embodiment of the invention.
Figure 44:
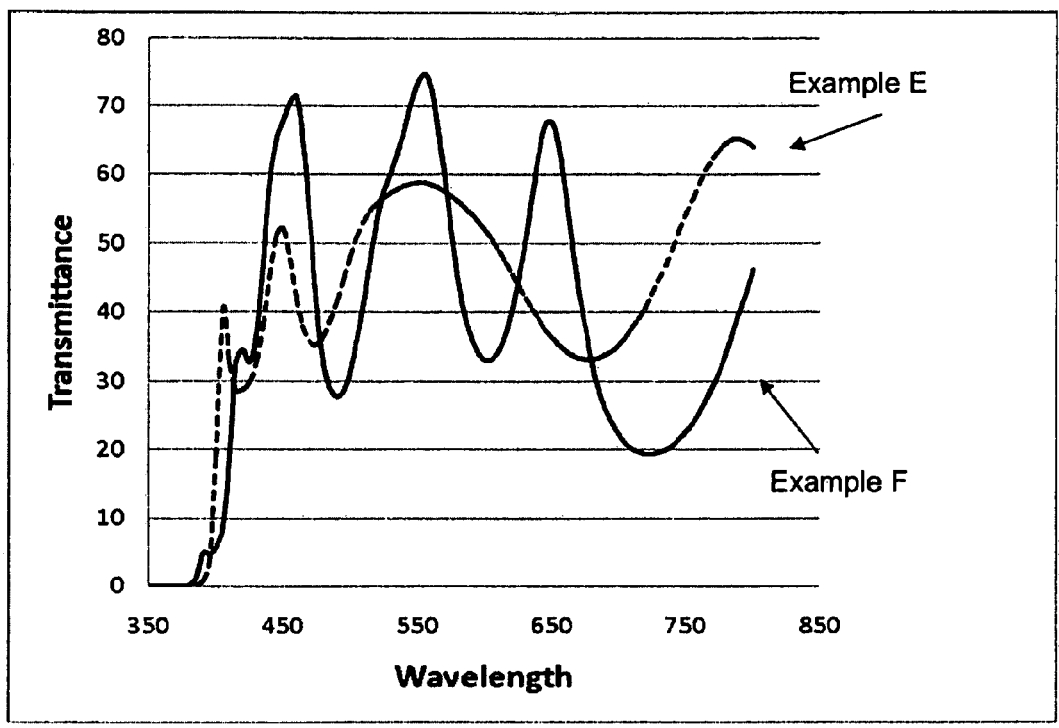
FIG. 44 demonstrates comparison of transmittance characteristics of embodiments of FIGS. 42 and 43.

The following additional Examples E and F pertain to the use of reflectance-enhancing coatings of the Examples B and D, respectively, in a transflective zone of a specific embodiment. This specific embodiment comprises, in the order viewed by the observer: 1) a 1.6 mm-thick first glass substrate with an ITO layer (150 nm) deposited on surface II, 2) an EC-medium (150 nm), 3) a 1.6 mm-thick second glass substrate with an ITO layer (150 nm) deposited on surface II, and 4) an APBF (DBEF-Q) laminated within the transflective zone between surface IV (of the second substrate) and surface V (of a 1.1 mm thick third lite of glass) that is overcoated with a reflectance-enhancing coating. In particular, in Example E, the reflectance-enhancing coating deposited on surface V is that from Example B. The transmission characteristics of the resulting embodiment are shown in FIG. 42, and the color characteristics are listed in Table 28. Example F corresponds to the situation when the reflectance-enhancing coating deposited on surface V of the above-mentioned embodiment is that from Example D. Optical characteristics of the embodiment of this example are shown in FIG. 43 and Table 29. Comparison between the transmittance characteristics of the embodiments of Example E and Example F are presented in FIG. 44.

Example G corresponds to a transflective zone of an embodiment that includes, in the order viewed by the observer: 1) a 1.6 mm-thick first glass substrate with an ITO layer (150 nm) deposited on surface II, 2) an EC-medium (150 nm), 3) a 1.6 mm-thick second glass substrate with an ITO layer (150 nm) deposited on surface II, and 4) an APBF (DBEF-Q) laminated within the transflective zone between surface IV (of the second substrate) and an uncoated surface V of a 1.1 mm-thick third lite of glass. The optical characteristics of such a design are shown in Table 30. A comparison among the Examples E and F and Example G, all of which included a reflectance-enhancing coating containing forty three thin-film layers, illustrates the improvement in reflectance characteristics. Furthermore, Example F simultaneously attains UV blocking, reflectance enhancement and transmittance enhancement in the light bands of LCD. It is understood that by appropriately designing the coatings a UV blocking function may be removed from Examples D and F, leaving the coating to demonstrate reflectance enhancement and transmittance enhancement only.

The influence of material absorption on optical characteristics of the overall mirror system is illustrates in additional Examples H, I, and J. In particular, Example H provides a value for eye-weighed absorption of ambient light that has traversed a glass substrate and a half-wave-thick ITO coating deposited on one of the substrate's surfaces. Example I provides a value for eye-weighed absorption of ambient light that has traversed an EC-element comprising an EC-medium placed between two glass substrates each having one surface overcoated with a half-wave ITO-layer. Finally, Example J demonstrates eye-weighed values for polarized transmittance and unpolarized reflectance of the embodiment of Example G. Calculations of all values thus defined were done for different thicknesses of glass substrates and different absorbance values (calculated using appropriately scaled coefficients of extinction of the ITO material), as indicated in Table 31. The eye-weighing has been performed in the range between approximately 360 nm and 750 nm. The results in Table 31 clearly demonstrate the benefit of using an electrooptic element having a low absorption front of the APBF. The amount of light absorption that is acceptable in a particular embodiment may vary. Preferably, the electrooptic element will have an absorption less than 10%, more preferably less than 5% and most preferably less than 2.5%. RELs may not be needed if the absorption is properly controlled, or the RELs may contain fewer layers thus simplifying the overall structure of the assembly and reducing costs.

TABLE 23

(Example A).
Design: uv block with vis enhance2
Reference Wavelength (nm): 250
Incident Angle (deg): 0

| Layer | Material | Refractive Index | Extinction Coefficient | Optical Thickness (QWOT) | Physical Thickness (nm) |
|---|---|---|---|---|---|
| Medium | Air | 1 | 0 | | |
| 1 | TiO2 | 3.73402 | 0.73131 | 0.35236347 | 5.9 |
| 2 | SiO2 | 1.50756 | 0 | 1.99557338 | 82.73 |
| 3 | TiO2 | 3.73402 | 0.73131 | 0.69643061 | 11.66 |
| 4 | SiO2 | 1.50756 | 0 | 0.55338444 | 22.94 |
| 5 | TiO2 | 3.73402 | 0.73131 | 0.02764588 | 0.46 |
| 6 | SiO2 | 1.50756 | 0 | 1.54587378 | 64.09 |
| 7 | TiO2 | 3.73402 | 0.73131 | 0.64552373 | 10.8 |
| 8 | SiO2 | 1.50756 | 0 | 2.1155252 | 87.71 |
| 9 | TiO2 | 3.73402 | 0.73131 | 0.15882851 | 2.66 |
| 10 | SiO2 | 1.50756 | 0 | 0.77688382 | 32.21 |
| 11 | TiO2 | 3.73402 | 0.73131 | 0.86455474 | 14.47 |
| 12 | SiO2 | 1.50756 | 0 | 0.70251929 | 29.12 |
| 13 | TiO2 | 3.73402 | 0.73131 | 1.21048825 | 20.26 |
| 14 | SiO2 | 1.50756 | 0 | 1.48678272 | 61.64 |
| 15 | TiO2 | 3.73402 | 0.73131 | 0.03674043 | 0.61 |
| 16 | SiO2 | 1.50756 | 0 | 1.49555366 | 62 |
| 17 | TiO2 | 3.73402 | 0.73131 | 1.50389386 | 25.17 |
| 18 | SiO2 | 1.50756 | 0 | 0.55062046 | 22.83 |
| 19 | TiO2 | 3.73402 | 0.73131 | 0.9918027 | 16.6 |
| 20 | SiO2 | 1.50756 | 0 | 0.82687503 | 34.28 |
| 21 | TiO2 | 3.73402 | 0.73131 | 0.61261152 | 10.25 |
| 22 | SiO2 | 1.50756 | 0 | 1.49375953 | 61.93 |

TABLE 23-continued (Example A).
Design: uv block with vis enhance2
Reference Wavelength (nm): 250
Incident Angle (deg): 0

| Layer | Material | Refractive Index | Extinction Coefficient | Optical Thickness (QWOT) | Physical Thickness (nm) |
|---|---|---|---|---|---|
| 23 | TiO2 | 3.73402 | 0.73131 | 0.59469162 | 9.95 |
| 24 | SiO2 | 1.50756 | 0 | 1.37358433 | 56.95 |
| 25 | TiO2 | 3.73402 | 0.73131 | 0.10176567 | 1.7 |
| 26 | SiO2 | 1.50756 | 0 | 1.24006099 | 51.41 |
| 27 | TiO2 | 3.73402 | 0.73131 | 0.38900365 | 6.51 |
| 28 | SiO2 | 1.50756 | 0 | 1.93868082 | 80.37 |
| 29 | TiO2 | 3.73402 | 0.73131 | 0.13721662 | 2.3 |
| 30 | SiO2 | 1.50756 | 0 | 0.73949159 | 30.66 |
| 31 | TiO2 | 3.73402 | 0.73131 | 1.11326501 | 18.63 |
| 32 | SiO2 | 1.50756 | 0 | 1.1366994 | 47.13 |
| 33 | TiO2 | 3.73402 | 0.73131 | 0.02080969 | 0.35 |
| 34 | SiO2 | 1.50756 | 0 | 1.08443578 | 44.96 |
| 35 | TiO2 | 3.73402 | 0.73131 | 0.89043295 | 14.9 |
| 36 | SiO2 | 1.50756 | 0 | 1.48167627 | 61.43 |
| 37 | TiO2 | 3.73402 | 0.73131 | 1.19582078 | 20.02 |
| 38 | SiO2 | 1.50756 | 0 | 0.98396442 | 40.79 |
| 39 | TiO2 | 3.73402 | 0.73131 | 0.45031072 | 7.54 |
| 40 | SiO2 | 1.50756 | 0 | 4.07109085 | 168.78 |
| 41 | TiO2 | 3.73402 | 0.73131 | 0.71878669 | 12.03 |
| 42 | SiO2 | 1.50756 | 0 | 1.46325333 | 60.66 |
| 43 | TiO2 | 3.73402 | 0.73131 | 0.61115184 | 10.23 |
| Substrate | Float Glass | 1.57857 | 0.00006 | | |
| Total Thickness | | | | | 1427.63 nm |

TABLE 24

(Example B).
Design: Design9
Reference Wavelength (nm): 250
Incident Angle (deg): 0

| Layer | Material | Refractive Index | Extinction Coefficient | Optical Thickness (QWOT) | Physical Thickness (nm) |
|---|---|---|---|---|---|
| Medium | Air | 1 | 0 | | |
| 1 | TiO2 | 3.73402 | 0.73131 | 0.34773154 | 5.82 |
| 2 | SiO2 | 1.50756 | 0 | 2.00740272 | 83.22 |
| 3 | TiO2 | 3.73402 | 0.73131 | 0.71244582 | 11.92 |
| 4 | SiO2 | 1.50756 | 0 | 0.59650276 | 24.73 |
| 5 | TiO2 | 3.73402 | 0.73131 | 0.04842828 | 0.81 |
| 6 | SiO2 | 1.50756 | 0 | 1.55752757 | 64.57 |
| 7 | TiO2 | 3.73402 | 0.73131 | 0.71180889 | 11.91 |
| 8 | SiO2 | 1.50756 | 0 | 2.1456861 | 88.96 |
| 9 | TiO2 | 3.73402 | 0.73131 | 0.1550899 | 2.6 |
| 10 | SiO2 | 1.50756 | 0 | 0.79393713 | 32.91 |
| 11 | TiO2 | 3.73402 | 0.73131 | 0.84344363 | 14.12 |
| 12 | SiO2 | 1.50756 | 0 | 0.65441529 | 27.13 |
| 13 | TiO2 | 3.73402 | 0.73131 | 1.29501365 | 21.68 |
| 14 | SiO2 | 1.50756 | 0 | 1.49801329 | 62.1 |
| 15 | TiO2 | 3.73402 | 0.73131 | 0.0382956 | 0.64 |
| 16 | SiO2 | 1.50756 | 0 | 1.49189184 | 61.85 |
| 17 | TiO2 | 3.73402 | 0.73131 | 1.63198813 | 27.32 |
| 18 | SiO2 | 1.50756 | 0 | 0.30009032 | 12.44 |
| 19 | TiO2 | 3.73402 | 0.73131 | 1.03370002 | 17.3 |
| 20 | SiO2 | 1.50756 | 0 | 0.89649568 | 37.17 |
| 21 | TiO2 | 3.73402 | 0.73131 | 0.54935807 | 9.2 |
| 22 | SiO2 | 1.50756 | 0 | 1.5295528 | 63.41 |
| 23 | TiO2 | 3.73402 | 0.73131 | 0.71687773 | 12 |
| 24 | SiO2 | 1.50756 | 0 | 1.39735622 | 57.93 |
| 25 | TiO2 | 3.73402 | 0.73131 | 0.15601681 | 2.61 |
| 26 | SiO2 | 1.50756 | 0 | 1.26711596 | 52.53 |
| 27 | TiO2 | 3.73402 | 0.73131 | 0.39272565 | 6.57 |
| 28 | SiO2 | 1.50756 | 0 | 1.98850216 | 82.44 |
| 29 | TiO2 | 3.73402 | 0.73131 | 0.20598867 | 3.45 |
| 30 | SiO2 | 1.50756 | 0 | 0.76170969 | 31.58 |
| 31 | TiO2 | 3.73402 | 0.73131 | 1.25336544 | 20.98 |
| 32 | SiO2 | 1.50756 | 0 | 1.20118763 | 49.8 |
| 33 | TiO2 | 3.73402 | 0.73131 | 0.04283731 | 0.72 |

TABLE 24-continued (Example B).
Design: Design9
Reference Wavelength (nm): 250
Incident Angle (deg): 0

| Layer | Material | Refractive Index | Extinction Coefficient | Optical Thickness (QWOT) | Physical Thickness (nm) |
|---|---|---|---|---|---|
| 34 | SiO2 | 1.50756 | 0 | 1.14302257 | 47.39 |
| 35 | TiO2 | 3.73402 | 0.73131 | 0.81443412 | 13.63 |
| 36 | SiO2 | 1.50756 | 0 | 1.49211396 | 61.86 |
| 37 | TiO2 | 3.73402 | 0.73131 | 1.26002182 | 21.09 |
| 38 | SiO2 | 1.50756 | 0 | 0.9831479 | 40.76 |
| 39 | TiO2 | 3.73402 | 0.73131 | 0.45252597 | 7.57 |
| 40 | SiO2 | 1.50756 | 0 | 4.09859593 | 169.92 |
| 41 | TiO2 | 3.73402 | 0.73131 | 0.79776141 | 13.35 |
| 42 | SiO2 | 1.50756 | 0 | 1.48017738 | 61.36 |
| 43 | TiO2 | 3.73402 | 0.73131 | 0.64129521 | 10.73 |
| Substrate | Glaverbel | 1.57857 | 0.00006 | | |

Total Thickness 1450.09 nm

TABLE 25

(Example C).
Design: uv block with vis enhance example 4
Reference Wavelength (nm): 250
Incident Angle (deg): 0

| Layer | Material | Refractive Index | Extinction Coefficient | Optical Thickness (QWOT) | Physical Thickness (nm) |
|---|---|---|---|---|---|
| Medium | Air | 1 | 0 | | |
| 1 | TiO2 | 3.73402 | 0.73131 | 0.34887986 | 5.84 |
| 2 | SiO2 | 1.50756 | 0 | 2.00414015 | 83.09 |
| 3 | TiO2 | 3.73402 | 0.73131 | 0.73035457 | 12.22 |
| 4 | SiO2 | 1.50756 | 0 | 0.57601583 | 23.88 |
| 5 | TiO2 | 3.73402 | 0.73131 | 0.03964011 | 0.66 |
| 6 | SiO2 | 1.50756 | 0 | 1.48776774 | 61.68 |
| 7 | TiO2 | 3.73402 | 0.73131 | 0.73697209 | 12.34 |
| 8 | SiO2 | 1.50756 | 0 | 2.11451864 | 87.66 |
| 9 | TiO2 | 3.73402 | 0.73131 | 0.12787617 | 2.14 |
| 10 | SiO2 | 1.50756 | 0 | 0.75325055 | 31.23 |
| 11 | TiO2 | 3.73402 | 0.73131 | 0.86994384 | 14.56 |
| 12 | SiO2 | 1.50756 | 0 | 0.64830262 | 26.88 |
| 13 | TiO2 | 3.73402 | 0.73131 | 1.31859059 | 22.07 |
| 14 | SiO2 | 1.50756 | 0 | 1.45803687 | 60.45 |
| 15 | TiO2 | 3.73402 | 0.73131 | 0.04370379 | 0.73 |
| 16 | SiO2 | 1.50756 | 0 | 1.47281315 | 61.06 |
| 17 | TiO2 | 3.73402 | 0.73131 | 1.74248552 | 29.17 |
| 18 | SiO2 | 1.50756 | 0 | 0.29584364 | 12.27 |
| 19 | TiO2 | 3.73402 | 0.73131 | 0.98415294 | 16.47 |
| 20 | SiO2 | 1.50756 | 0 | 0.92665976 | 38.42 |
| 21 | TiO2 | 3.73402 | 0.73131 | 0.62430475 | 10.45 |
| 22 | SiO2 | 1.50756 | 0 | 1.53922062 | 63.81 |
| 23 | TiO2 | 3.73402 | 0.73131 | 0.71809672 | 12.02 |
| 24 | SiO2 | 1.50756 | 0 | 1.34959527 | 55.95 |
| 25 | TiO2 | 3.73402 | 0.73131 | 0.1580294 | 2.65 |
| 26 | SiO2 | 1.50756 | 0 | 1.22149353 | 50.64 |
| 27 | TiO2 | 3.73402 | 0.73131 | 0.41478337 | 6.94 |
| 28 | SiO2 | 1.50756 | 0 | 1.93595747 | 80.26 |
| 29 | TiO2 | 3.73402 | 0.73131 | 0.00149092 | 0.02 |
| 30 | SiO2 | 1.50756 | 0 | 0.68213084 | 28.28 |
| 31 | TiO2 | 3.73402 | 0.73131 | 1.26372564 | 21.15 |
| 32 | SiO2 | 1.50756 | 0 | 1.11936985 | 46.41 |
| 33 | TiO2 | 3.73402 | 0.73131 | 0.01072272 | 0.18 |
| 34 | SiO2 | 1.50756 | 0 | 1.16437308 | 48.27 |
| 35 | TiO2 | 3.73402 | 0.73131 | 0.87218427 | 14.6 |
| 36 | SiO2 | 1.50756 | 0 | 1.53662606 | 63.71 |
| 37 | TiO2 | 3.73402 | 0.73131 | 1.19725742 | 20.04 |
| 38 | SiO2 | 1.50756 | 0 | 1.03802074 | 43.03 |
| 39 | TiO2 | 3.73402 | 0.73131 | 0.35117163 | 5.88 |

TABLE 25-continued (Example C).
Design: uv block with vis enhance example 4
Reference Wavelength (nm): 250
Incident Angle (deg): 0

| Layer | Material | Refractive Index | Extinction Coefficient | Optical Thickness (QWOT) | Physical Thickness (nm) |
|---|---|---|---|---|---|
| 40 | SiO2 | 1.50756 | 0 | 3.99469639 | 165.61 |
| 41 | TiO2 | 3.73402 | 0.73131 | 0.88632161 | 14.84 |
| 42 | SiO2 | 1.50756 | 0 | 1.40222652 | 58.13 |
| 43 | TiO2 | 3.73402 | 0.73131 | 0.71925322 | 12.04 |
| Substrate | Glaverbel | 1.57857 | 0.00006 | | |
| Total Thickness | | | | | 1427.72 nm |

TABLE 26

(Example D).
Design: uv block with vis enhance and LCD bandpass example 5
Reference Wavelength (nm): 250
Incident Angle (deg): 0

| Layer | Material | Refractive Index | Extinction Coefficient | Optical Thickness (QWOT) | Physical Thickness (nm) |
|---|---|---|---|---|---|
| Medium | Air | 1 | 0 | | |
| 1 | TiO2 | 3.73402 | 0.73131 | 0.42447154 | 7.1 |
| 2 | SiO2 | 1.50756 | 0 | 2.30471572 | 95.55 |
| 3 | TiO2 | 3.73402 | 0.73131 | 1.01606977 | 17.01 |
| 4 | SiO2 | 1.50756 | 0 | 0.29323852 | 12.16 |
| 5 | TiO2 | 3.73402 | 0.73131 | 0.22061093 | 3.69 |
| 6 | SiO2 | 1.50756 | 0 | 1.15562624 | 47.91 |
| 7 | TiO2 | 3.73402 | 0.73131 | 0.63633503 | 10.65 |
| 8 | SiO2 | 1.50756 | 0 | 1.96198713 | 81.34 |
| 9 | TiO2 | 3.73402 | 0.73131 | 0.13955544 | 2.34 |
| 10 | SiO2 | 1.50756 | 0 | 0.79184418 | 32.83 |
| 11 | TiO2 | 3.73402 | 0.73131 | 1.13362253 | 18.97 |
| 12 | SiO2 | 1.50756 | 0 | 0.88470124 | 36.68 |
| 13 | TiO2 | 3.73402 | 0.73131 | 1.33545495 | 22.35 |
| 14 | SiO2 | 1.50756 | 0 | 1.39427616 | 57.8 |
| 15 | TiO2 | 3.73402 | 0.73131 | 0.0694175 | 1.16 |
| 16 | SiO2 | 1.50756 | 0 | 1.16865345 | 48.45 |
| 17 | TiO2 | 3.73402 | 0.73131 | 1.52592119 | 25.54 |
| 18 | SiO2 | 1.50756 | 0 | 0.36730127 | 15.23 |
| 19 | TiO2 | 3.73402 | 0.73131 | 1.1185282 | 18.72 |
| 20 | SiO2 | 1.50756 | 0 | 0.80871772 | 33.53 |
| 21 | TiO2 | 3.73402 | 0.73131 | 0.75516097 | 12.64 |
| 22 | SiO2 | 1.50756 | 0 | 1.88371402 | 78.09 |
| 23 | TiO2 | 3.73402 | 0.73131 | 0.97266665 | 16.28 |
| 24 | SiO2 | 1.50756 | 0 | 1.35988907 | 56.38 |
| 25 | TiO2 | 3.73402 | 0.73131 | 0.35608147 | 5.96 |
| 26 | SiO2 | 1.50756 | 0 | 1.13784244 | 47.17 |
| 27 | TiO2 | 3.73402 | 0.73131 | 0.35188324 | 5.89 |
| 28 | SiO2 | 1.50756 | 0 | 2.09278061 | 86.76 |
| 29 | TiO2 | 3.73402 | 0.73131 | 0.51731663 | 8.66 |
| 30 | SiO2 | 1.50756 | 0 | 0.735246 | 30.48 |
| 31 | TiO2 | 3.73402 | 0.73131 | 1.61911124 | 27.1 |
| 32 | SiO2 | 1.50756 | 0 | 1.14835805 | 47.61 |
| 33 | TiO2 | 3.73402 | 0.73131 | 0.67754725 | 11.34 |
| 34 | SiO2 | 1.50756 | 0 | 1.06599764 | 44.19 |
| 35 | TiO2 | 3.73402 | 0.73131 | 0.623423 | 10.43 |
| 36 | SiO2 | 1.50756 | 0 | 1.56705632 | 64.97 |
| 37 | TiO2 | 3.73402 | 0.73131 | 0.91482562 | 15.31 |
| 38 | SiO2 | 1.50756 | 0 | 0.71403594 | 29.6 |
| 39 | TiO2 | 3.73402 | 0.73131 | 1.50587943 | 25.21 |
| 40 | SiO2 | 1.50756 | 0 | 3.98655573 | 165.27 |
| 41 | TiO2 | 3.73402 | 0.73131 | 1.45888837 | 24.42 |
| 42 | SiO2 | 1.50756 | 0 | 1.46194734 | 60.61 |
| 43 | TiO2 | 3.73402 | 0.73131 | 0.19291789 | 3.23 |
| Substrate | Glaverbel | 1.57857 | 0.00006 | | |
| Total Thickness | | | | | 1466.63 nm |

TABLE 27

(Example D)

|  | In Reflection | In Transmission | Absorbance |
|---|---|---|---|
| Y, % | 39.07 | 60.20 | 0.73 |
| L* | 68.80 | 81.95 | |
| a* | −2.66 | 1.34 | |
| b* | 11.49 | −6.68 | |

TABLE 28

(Example E).

|  | S-polarized light | P-polarized light | Average |
|---|---|---|---|
| L* | 89.67 | 64.92 | 77.3 |
| a* | −3.58 | 4.24 | 0.33 |

TABLE 28-continued (Example E).

|  | S-polarized light | P-polarized light | Average |
|---|---|---|---|
| b* | −0.15 | −10.42 | −5.28 |
| Reflectance (eye-weighed), % | 75.59 | 33.95 | 54.77 |
| Transmittance (eye-weighed), % | 5.39 | 52.85 | 29.12 |
| Absorbance (eye-weighed), % | 19.02 | 13.19 | 16.11 |

TABLE 29

(Example F).

|  | S-polarized light | P-polarized light | Average |
|---|---|---|---|
| L* | 89.68 | 65.2 | 77.44 |
| a* | −3.65 | 1.11 | −1.27 |
| b* | −0.13 | 3.29 | 1.58 |
| Reflectance (eye-weighed), % | 75.62 | 34.3 | 54.96 |
| Transmittance (eye-weighed), % | 5.34 | 52.46 | 28.9 |
| Absorbance (eye-weighed), % | 19.04 | 13.23 | 16.13 |

TABLE 30

(Example G).

|  | S-polarized light | P-polarized light | Average |
|---|---|---|---|
| L* | 89.57 | 40.6 | 65.09 |
| a* | −3.65 | 4.5 | 0.42 |
| b* | −0.26 | −12.77 | −6.51 |
| Reflectance (eye-weighed), % | 75.38 | 11.62 | 43.5 |
| Transmittance (eye-weighed), % | 5.71 | 77.51 | 41.61 |
| Absorbance (eye-weighed), % | 18.91 | 10.87 | 14.89 |

TABLE 31

| Thickness of Glass Substrate/ Extinction Coefficient of ITO | Example H Eye-weighed Absorption in (Glass substrate + ITO), % | Example J Eye-weighed Absorption in an EC-element, % | Example I Eye-weighed Polarized Transmittance (PT) of embodiment of EC-element | Eye-weighed average Reflectance of embodiment of EC-element |
|---|---|---|---|---|
| 1.6 mm/k | 4.1 | 9.1 | 77.5 | 43.5 |
| 1.6 mm/0.75k | 3.5 | 7.9 | 78.5 | 44.5 |
| 1.6 mm/0.5k | 2.9 | 6.8 | 79.5 | 45.6 |
| 1.6 mm/0.25k | 2.3 | 5.6 | 80.6 | 46.7 |
| 1.6 mm/0.1k | 1.9 | 4.8 | 81.2 | 47.4 |
| 1.6 mm/0.01k | 1.7 | 4.4 | 81.6 | 47.8 |
| .5 mm/0.01k | 0.6 | 2.1 | 83.5 | 49.9 |

Figure 30:
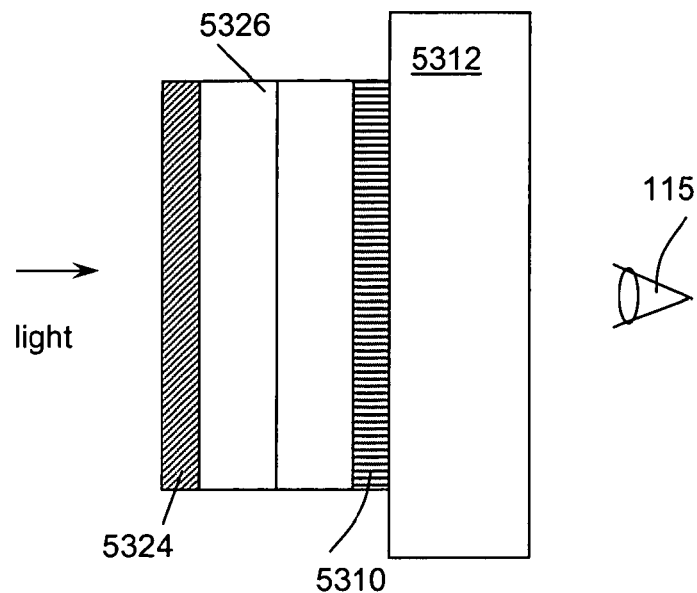
FIG. 30 shows an alternative embodiment of the invention where an APBF is laminated between a mirror element and an LCD that has its exit, absorbing polarizer removed.

As an alternative embodiment of the invention and in reference to FIG. 30, an APBF 5310 may laminated between the back surface of a mirror system 5312 (e.g., surface IV) and the LCD 5322 preserving its the entrance polarizer 5324 but having its exit, absorbing polarizer removed. In this embodiment the APBF layer 5310 functions as the exit polarizer of the LCD and increases the light throughput of the LCD display as compared to a conventional LCD having an absorbing exit polarizer. As an additional benefit, the placement of the LCD panel in optical contact with the back surface of the mirror system 5320 reduced light losses on reflection. This embodiment may potentially have by a higher extinction ratio (defined for an LCD as a ratio of light transmitted from the LC-layer 5324 by the exit polarizing component to that blocked by it), depending on the properties of the APBF 5310. For example, the current DBEF product of 3M, Inc. laminated between two glass substrates provides an extinction ratio of approximately 28, while the use of another product, APF (also from 3M Inc.) increases this number to about 43.

In additional embodiments of the invention, an APBF-containing mirror system that utilizes an EC-element can be constructed with air gap(s) between an EC-cell and the APBF laminate. Such embodiments would be represented by replacing a prism 408 in embodiments of FIGS. 4(F) and 4(G) with an EC-element such as the element 840 of FIG. 8(D). The space 435 would be filled with air or another low index material, giving the resulting embodiments higher reflectance in comparison to embodiments where the APBF laminate is in optical contact with the EC-cell.

Figure 31:
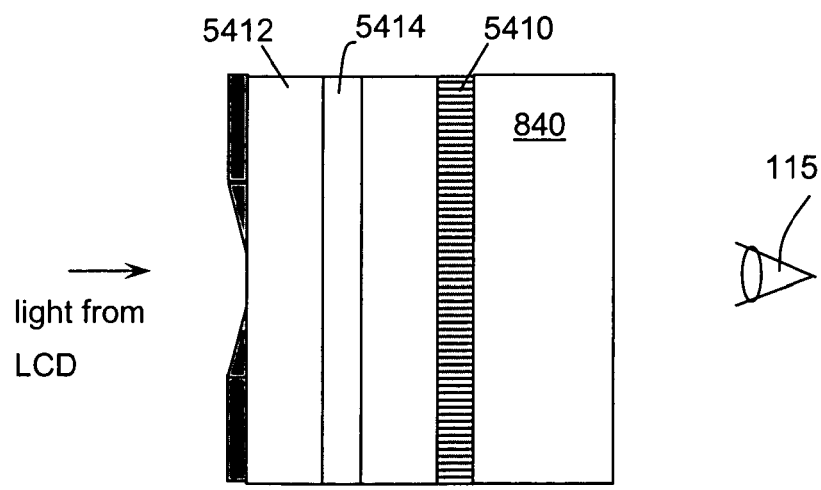
FIG. 31 shows an alternative embodiment of the invention.

In another alternative embodiment, described in reference to FIG. 31, an APBF 5410 can be laminated between the EC-element 840, for example, and a surface V of the third lite of glass 5412 that is overcoated with a reflectance-enhancing thin-film coating 5414 as discussed earlier in this application. The other surface of the lite 5412, surface VI, is shown to be coated with a graded opacifying layer. A sample according to the embodiment of FIG. 54 was fabricated for evaluation. The coating 5414 on surface V was a three quarter-wave layer H/L/H stack including $TiO_2$ (56.2 nm)/$SiO_2$ (94.2 nm)/$TiO_2$ (56.2 nm). Surface VI had a graded Chromium opacifying layer varying from essentially zero thickness in the display (transflective) zone to approximately 50 nm in the opaque zone. It is understood, however, that generally a thickness of opacifying or OREL layer can be tailored to the specific opacifying material used and the design intent of the final product. The opaque zone of the final assembly had a reflectance of 70.7% (with $a^*=-4.8$, $b^*=2.5$) and a transmittance of 0.1%. The display zone had a reflectance of 64.7% ($a^*=-5.9$, $b^*=3.6$) and a transmittance of 21.5%. The polarized transmittance (that is, for polarization aligned with a transmission axis of the APBF 5410) in the display zone was 38.5%. This combination of attributes, including the graded transition between the display and opaque zones, yields an aesthetically pleasing product.

Additionally, as has been previously discussed, once the lamination interface has been formed according to an embodiment of the method of the invention, this interface may be optionally protected from oxygen, water, or other contaminants by having the edge of the laminate sealed. If necessary, the APBF may be cut slightly smaller than the substrate and superstrate thus providing a notch therebetween for the sealing material to reside. FIGS. 50 and 51 show the location of the edge seal, denoted as "es", for exemplary prismatic and EC-element type embodiments, 410 and 850, respectively.

In other modifications, the reflectance-enhancing and opacifying layers of any multi-zone embodiment of an APBF-containing rearview mirror assembly of the invention may generally be disposed in any pre-determined order adjacent at least one of the surfaces of the structure to which the APBF is bonded, preferably adjacent a surface located between the APBF and the light source. An APBF may substantially cover only a transflective zone of the mirror structure. Alternatively, the APBF may substantially cover the FOV of the multi-zone mirror element. The transflective zone of the mirror structure may contain additional transflective layers. A light source may be part of the laminate structure or a stand-alone component. All such variations and modifications are intended to be within the scope of the present invention as defined in any appended claims.

What is claimed is:

1. A switchable mirror system (SMS) for use in a vehicular rearview assembly equipped with a light source transmitting light from within the rearview assembly through said SMS to a field-of-view (FOV) outside the assembly, the SMS comprising:

at least two electro-optic (EO) cells defined by at least three sequentially disposed spaced-apart substrates, a first EO-cell corresponding to an outside portion of the rearview assembly and a second EO-cell disposed between the first EO-cell and the light source; and at least two linear reflective polarizers disposed so as to sandwich an EO-medium of the second EO-cell between said linear reflective polarizers, wherein the first EO-cell has an EO-medium comprising absorbing and non-absorbing states, and is adapted to be a switchable linear absorptive polarizer that attenuates light reflected from the second EO-cell, and does not substantially attenuate light transmitted from the light source through the second EO-cell, and further wherein said SMS has a reflectance value that is gradually variable in response to changes in voltages applied to the first EO-cell, and as measured in said FOV in ambient light.

2. A switchable mirror system (SMS) according to claim 1, wherein at least one of the first and second EO-cells includes a thin-film alignment layer having an anisotropic surface.

3. A switchable mirror system (SMS) according to claim 1, wherein at least one of said at least two linear reflective polarizers includes multiple layers of plastic film.

4. A switchable mirror system (SMS) according to claim 1, wherein at least one of said two linear reflective polarizers includes a wire-grid polarizer.

5. A switchable mirror system (SMS) according to claim 4, further comprising a thin-film planarization layer overcoating said wire-grid polarizer, the planarization layer having a substantially flat surface.

6. A switchable mirror system (SMS) according to claim 1, wherein a substrate from the at least three substrates is a polymer-based linear reflective polarizer.

7. A switchable mirror system (SMS) according to claim 1, wherein the first and second EO-cells share a common substrate.

8. A switchable mirror system (SMS) according to claim 1, wherein molecules of an EO-medium of the first EO-cell change their spatial orientations in response to a voltage applied to said first EO-cell thereby keeping a transmittance value of the SMS substantially unchanged during the gradual variation of said reflectance value.

9. A switchable mirror system (SMS) according to claim 1, wherein said switchable linear absorptive polarizer includes an electrochromic (EC) element containing orientated EC medium.

10. A switchable mirror system (SMS) according to claim 1, wherein said switchable linear absorptive polarizer includes a guest-host liquid-crystal cell containing a dye, and wherein the second EO-cell includes a twisted nematic liquid-crystal medium.

11. A switchable mirror system (SMS) according to claim 1 configured within said rearview assembly, said rearview assembly further comprising one or more of an illumination assembly, a display, a voice activated system, a compass system, a telephone system, a highway toll booth interface, a telemetry system, a headlight controller, a glare sensor, a rain sensor, a tire pressure monitoring system, a navigation system, a lane departure warning system, and an adaptive cruise control system.

12. A switchable mirror system (SMS) for use in a rearview assembly equipped with a light source transmitting light from within the assembly through said SMS to a field-of-view (FOV) outside the assembly, said SMS comprising:

at least two electro-optic (EO) cells defined by at least three sequentially disposed spaced-apart substrates, a first EO-cell corresponding to an outside portion of the rearview assembly and a second EO-cell disposed between the first EO-cell and the light source; and two linear reflective polarizers disposed on two sequentially disposed substrates from the at least three substrates so as to sandwich an EO-medium of the second EO-cell between said two linear reflective polarizers, wherein a distance between said two linear reflective polarizers does not exceed an aggregate value of thicknesses of said two sequentially disposed substrates and a separation therebetween.

13. A switchable mirror system (SMS) according to claim 12, wherein the first EO-cell has an EO-medium comprising absorbing and non-absorbing states, and is adapted to be a switchable linear absorptive polarizer that attenuates light reflected from the reflective polarizer in the closest proximity to the first EO-cell and does not substantially attenuate light transmitted from the light source through the second EO-cell, and further wherein said SMS has a reflectance value that is gradually variable in response to changes in voltages applied to the first EO-cell, and as measured in said FOV in ambient light.

14. A switchable mirror system (SMS) according to claim 13, wherein the reflectance value that is gradually variable is measured in D65 standard illuminant light.

15. A switchable mirror system (SMS) according to claim 13, wherein the switchable absorptive polarizer is a guest-host liquid-crystal device.

16. A switchable mirror system (SMS) according to claim 12, wherein the first and second EO-cells share a common substrate.

17. A switchable mirror system (SMS) according to claim 12, wherein at least one of the two linear reflective polarizer includes multiple layers of plastic film.

18. A switchable mirror system (SMS) according to claim 12, wherein said distance does not exceed an aggregate value of a thickness of one of the two sequentially disposed substrates and said separation therebetween.

19. A switchable mirror system (SMS) according to claim 12, wherein said distance does not exceed the separation between said two sequentially disposed substrates.

20. A switchable mirror system (SMS) according to claim 12, wherein a combination of said two linear reflective polarizers and an EO-medium of the second EO-cell is configured to substantially reflect light having a first polarization and light having a second polarization when no voltage is applied to the second EO-cell, and to substantially transmit light having either the first or the second polarization when a non-zero voltage is applied to the second EO-cell, the first and second polarizations being mutually orthogonal.

21. A switchable mirror system (SMS) according to claim 12 configured within the rearview assembly wherein said light source includes a light emitter and a display, wherein the display is located between the light emitter and said SMS and is illuminated by the light emitter, the rearview assembly further comprising:
   a third linear reflective polarizer disposed between said SMS and the light emitter so as to increase a level of transmission of polarized light from the display through the SMS to said FOV.

22. A switchable mirror system (SMS) according to claim 21, wherein said level of transmission of polarized light exceeds 70 percent.

23. A switchable mirror system (SMS) according to claim 21, wherein said level of transmission of polarized light exceeds 80 percent.

* * * * *